United States Patent
Park et al.

(10) Patent No.: US 11,476,994 B2
(45) Date of Patent: Oct. 18, 2022

(54) METHOD AND APPARATUS FOR TRANSMITTING AND RECEIVING DATA ON BASIS OF TONE PLAN IN WIRELESS LAN SYSTEM

(71) Applicant: LG ELECTRONICS INC., Seoul (KR)

(72) Inventors: Eunsung Park, Seoul (KR); Sunwoong Yun, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/252,667

(22) PCT Filed: Jun. 3, 2019

(86) PCT No.: PCT/KR2019/006632
§ 371 (c)(1),
(2) Date: Dec. 15, 2020

(87) PCT Pub. No.: WO2019/240416
PCT Pub. Date: Dec. 19, 2019

(65) Prior Publication Data
US 2021/0281376 A1 Sep. 9, 2021

(30) Foreign Application Priority Data

Jun. 15, 2018 (KR) .................. 10-2018-0068770
Jun. 20, 2018 (KR) .................. 10-2018-0070778
(Continued)

(51) Int. Cl.
| H04L 5/00 | (2006.01) |
| H04W 72/04 | (2009.01) |
| H04W 84/12 | (2009.01) |

(52) U.S. Cl.
CPC ....... *H04L 5/0051* (2013.01); *H04W 72/0453* (2013.01); *H04W 84/12* (2013.01)

(58) Field of Classification Search
None
See application file for complete search history.

(56) References Cited

U.S. PATENT DOCUMENTS

2017/0170938 A1 6/2017 Lee et al.
2017/0230218 A1 8/2017 Park et al.
(Continued)

OTHER PUBLICATIONS

Lin Yang, et al., "11ax Pilot Sequence", doc.: IEEE 802.11-16/0346r0, Mar. 2016, 29 pages.
(Continued)

*Primary Examiner* — Diane L Lo
(74) *Attorney, Agent, or Firm* — Lee, Hong, Degerman, Kang & Waimey PC

(57) ABSTRACT

A method and a device for transmitting a PPDU in a WLAN system are proposed. Specifically, an AP generates a PPDU and transmits the PPDU to a STA. The PPDU includes an extremely high throughput (EHT)-LTF and a data field. The data field includes a pilot tone. The pilot tone is configured based on resource unit (RU) information about a broadband. When the broadband includes four 996-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

19 Claims, 19 Drawing Sheets

(30) Foreign Application Priority Data

Jul. 19, 2018 (KR) .......................... 10-2018-0084378
Jul. 26, 2018 (KR) .......................... 10-2018-0087457

(56) References Cited

U.S. PATENT DOCUMENTS

2017/0303242 A1    10/2017  Choi et al.
2019/0109684 A1*    4/2019  Chen .................... H04W 52/367
2019/0253296 A1*    8/2019  Chen ................. H04W 72/0453

OTHER PUBLICATIONS

Laurent Cariou, et al., "EXtreme Throughput (XT) 802.11", doc.: IEEE 802.11-18/0789r10, May 2018, 17 pages.
PCT International Application No. PCT/KR2019/006632, International Search Report dated Sep. 3, 2019, 4 pages.

* cited by examiner

FIG. 1
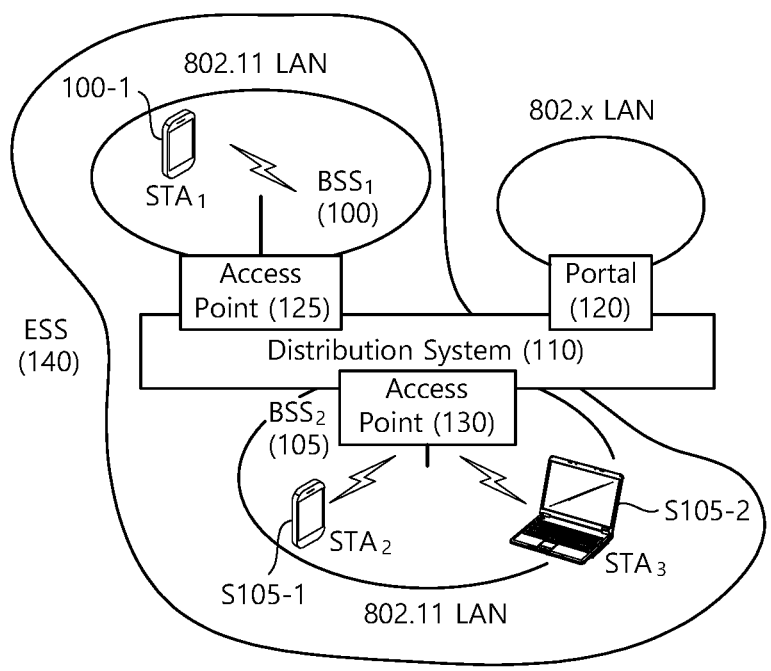
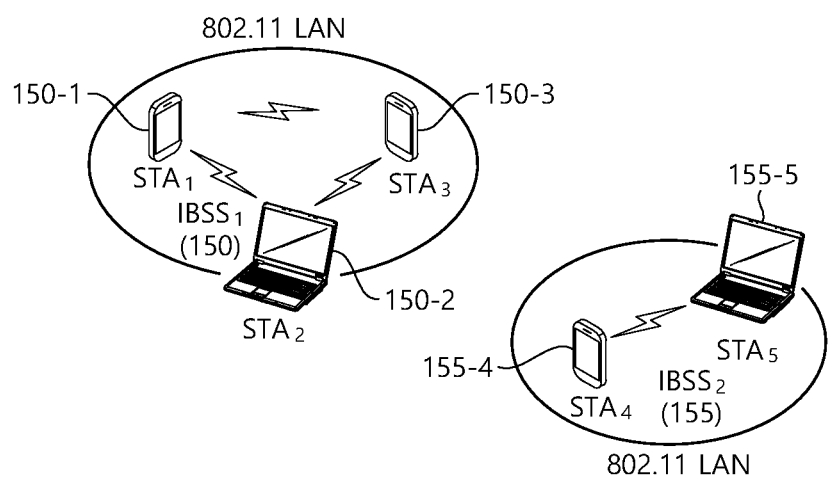

METHOD AND APPARATUS FOR TRANSMITTING AND RECEIVING DATA ON BASIS OF TONE PLAN IN WIRELESS LAN SYSTEM

CROSS-REFERENCE TO RELATED APPLICATIONS

This application is the National Stage filing under 35 U.S.C. 371 of International Application No. PCT/KR2019/006632, filed on Jun. 3, 2019, which claims the benefit of earlier filing date and right of priority to Korean Application Nos. 10-2018-0068770, filed on Jun. 15, 2018, 10-2018-0070778, filed on Jun. 20, 2018, 10-2018-0084378, filed on Jul. 19, 2018, and 10-2018-0087457, filed on Jul. 26, 2018, the contents of which are all incorporated by reference herein in their entireties.

BACKGROUND

Field

The present disclosure relates to a technique for configuring a tone plan in a wireless local area network (WLAN) system and, more particularly, to a method and a device for transmitting a pilot tone using a tone plan in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present disclosure proposes a method and a device for transmitting a pilot tone based on a tone plan in a wireless local area network (WLAN) system.

An embodiment of the present disclosure proposes a method for transmitting a pilot tone based on a tone plan.

The embodiment may be performed in a network environment supporting a next-generation WLAN system. The next-generation WLAN system may be a WLAN system evolving from an 802.11ax system and may satisfy backward compatibility with the 802.11ax system.

The embodiment may be performed by a transmission device, and the transmission device may correspond to an AP. In the embodiment, a reception device may correspond to a STA (non-AP STA).

The access point (AP) generates a physical protocol data unit (PPDU).

The AP transmits the PPDU to a station (STA).

The PPDU includes an extremely high throughput (EHT)-LTF and a data field. The data field includes a pilot tone. A specific pilot sequence may be inserted into the pilot tone.

The pilot tone may be configured based on resource unit (RU) information about a broadband.

When the broadband includes four 996-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the broadband includes two 2020-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the broadband is defined as only a single full bandwidth based on the RU information, an index for the pilot tone is set to ±{24, 158, 266, 400, 562, 696, 804, 938, 1048, 1182, 1290, 1424, 1586, 1720, 1828, 1962}.

The broadband may be 160 MHz, 240 MHz, or 320 MHz but is limited to 320 MHz in this embodiment.

When the broadband includes eight 484-tone RUs, 16 242-tone RUs, or 32 106-tone RUs based on the RU information, indices for the pilot tone may be set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}.

When the broadband includes 64 52-tone RUs based on the RU information, indices for the pilot tone may be set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}.

When the broadband includes 128 26-tone RUs based on the RU information, indices for the pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

When the broadband includes the 128 26-tone RUs, one 26-tone RU includes two pilot tones with 26-RU tone indices having the sixth largest absolute value and the seventh smallest absolute value or having the seventh largest absolute value and the seventh smallest absolute value.

For the pilot tone in the 52-tone, 106-tone, 242-tone, and 484-tone RUs, a pilot tone configuration method defined in 802.11ax is equally used.

When the broadband includes the four 996-tone RUs based on the RU information, the pilot tones may be partially selected from pilot tones configured when the broadband includes the eight 484-tone RUs. For example, half the pilot tones configured when the broadband includes the eight 484-tone RUs may be used by alternately selecting the pilot tones.

When the broadband includes the two 2020-tone RUs based on the RU information, the pilot tone may be all selected from pilot tones configured when the broadband includes the four 996-tone RUs.

When the broadband is defined as only the single full bandwidth based on the RU information, the pilot tones may be partially selected from pilot tones configured when the broadband includes the two 2020-tone RUs. For example, half the pilot tones configured when the broadband includes the two 2020-tone RUs may be used by alternately selecting the pilot tones.

The index for the pilot tone may be an even number, because 1x/2xLTF is considered.

The AP transmits data to the STA or receives data from the STA based on the RU information.

When the broadband is defined as only the single full bandwidth based on the RU information (full-band tone plan), the broadband may include 12 guard tones, a 4068-tone RU, five DC tones, and 11 guard tones. This configuration is an example, and the RU information may include allocation information about various RU configurations for actually transmitting data. When the tone plan for the full bandwidth of the broadband is used, SU transmission may be performed, and when MU MIMO is applied to the full bandwidth, MU transmission may be performed.

When the broadband includes the two 2020-tone RUs based on the RU information (OFDMA tone plan), the broadband may include 12 guard tones, a 2020-tone RU, a 13-tone RU, seven DC tones, a 13-tone RU, a 2020-tone RU, and 11 guard tones. This configuration is an example, and the RU information may include allocation information about various RU configurations for actually transmitting data.

When the broadband includes the four 996-tone RUs based on the RU information (OFDMA tone plan), the broadband may include 12 guard tones, a 996-tone RU, one null tone, a 26-tone RU, one null tone, a 996-tone RU, a 13-tone RU, seven DC tones, a 13-tone RU, a 996-tone RU, one null tone, a 26-tone RU, one null tone, a 996-tone RU, and 11 guard tones. This configuration is an example, and the RU information may include allocation information about various RU configurations for actually transmitting data. When a tone plan in which OFDMA is applied to the broadband is used, the STA is one or more STAs (SU transmission or MU transmission).

The RU information includes information about a resource unit (RU) for transmitting and receiving the data in the broadband. That is, the RU information may be considered to include scheduling information about the data for the STA (information about the configuration of an RU used for actual data transmission in the broadband). The STA may decode the RU information and may transmit and receive the data in RUs.

The 4068-tone RU is an RU including 4068 tones. The 4068-tone RU has tone indices of −2036 to −3 and 3 to 2036. The data may be transmitted or received through the 4068-tone RU.

The 2020-tone RU is an RU including 2020 tones. The 2020-tone RU may include a 996-tone RU, a null tone, a 26-tone RU, a null tone, and a 996-tone RU.

The 996-tone RU is an RU including 996 tones. The 996-tone RU may include a 484-tone RU, a null tone, a 26-tone RU, a null tone, and a 484-tone RU.

The 484-tone RU is an RU including 484 tones. The 484-tone RU may include a 242-tone RU and a 242-tone RU.

The 242-tone RU is an RU including 242 tones. The 242-tone RU may include a null tone, a 106-tone RU, a null tone, a 26-tone RU, a null tone, a 106-tone RU, and a null tone.

The 106-tone RU is an RU including 106 tones. The 106-tone RU may include a 52-tone RU, a null tone, and a 52-tone RU.

The 52-tone RU is an RU including 52 tones. The 52-tone RU may include a 26-tone RU and a 26-tone RU. The 26-tone RU may be an RU in a minimum unit including 26 tones.

In the tone plan in which OFDMA is applied to the broadband, the data may be transmitted or received through the 2020-tone RU, the 996-tone RU, the 484-tone RU, the 242-tone RU, the 106-tone RU, the 52-tone RU, or the 26-tone RU. That is, the data may be transmitted or received through the 2020-tone RU or an RU (the 996-tone RU, the 484-tone RU, the 242-tone RU, the 106-tone RU, the 52-tone RU, or the 26-tone RU) having a smaller number of tones than included in the 2020-tone RU.

The PPDU may further include a legacy preamble, an EHT-signal (SIG)-A, an EHT-SIG-B, and an EHT-short training field (STF). The RU information may be included in the EHT-SIG-B. The EHT-LTF may include the pilot tone. The EHT-STF, the EHT-LTF, and the data field in the PPDU may be transmitted in a band (RU) according to a tone plan for the broadband.

The present disclosure proposes a technique for configuring a pilot tone in a broadband in a WLAN system.

According to an embodiment proposed in the present disclosure, a pilot tone may be allocated based on a proposed tone plan to improve performance in CFO estimation, thereby achieving efficiency in a subcarrier and high throughput.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
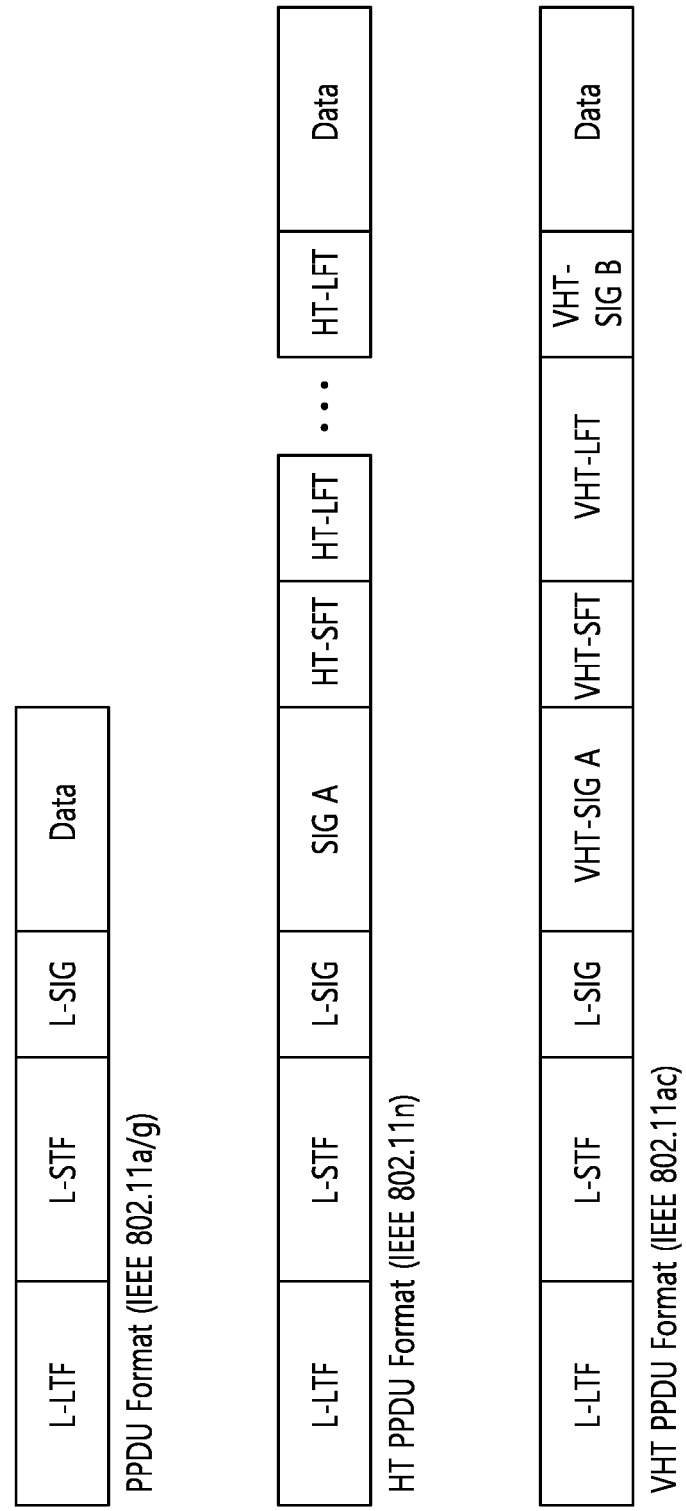
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
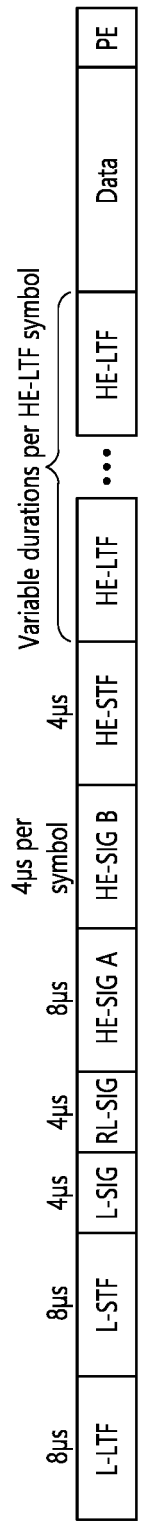
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
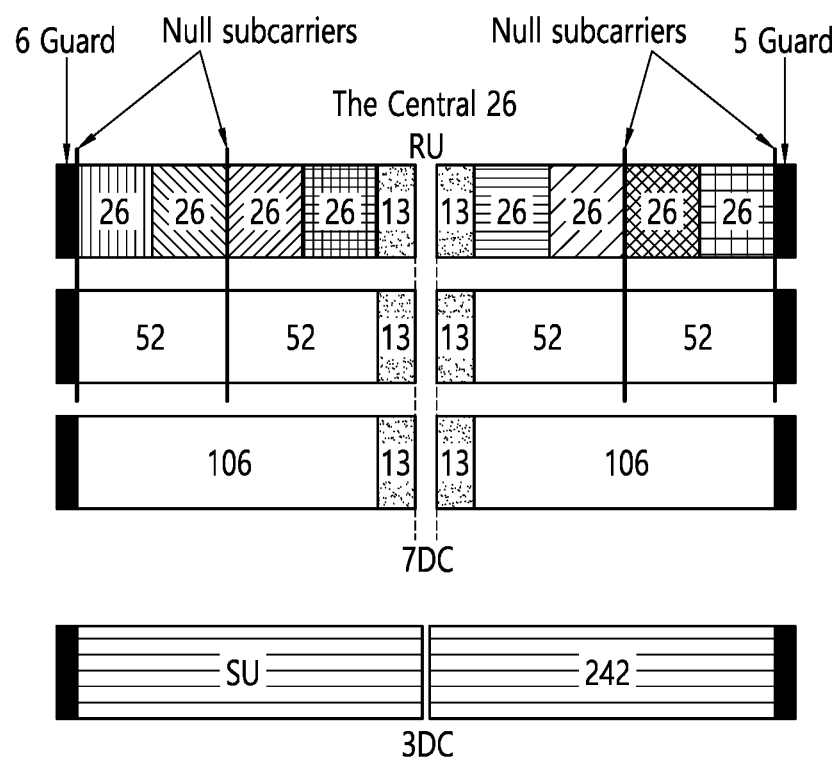
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
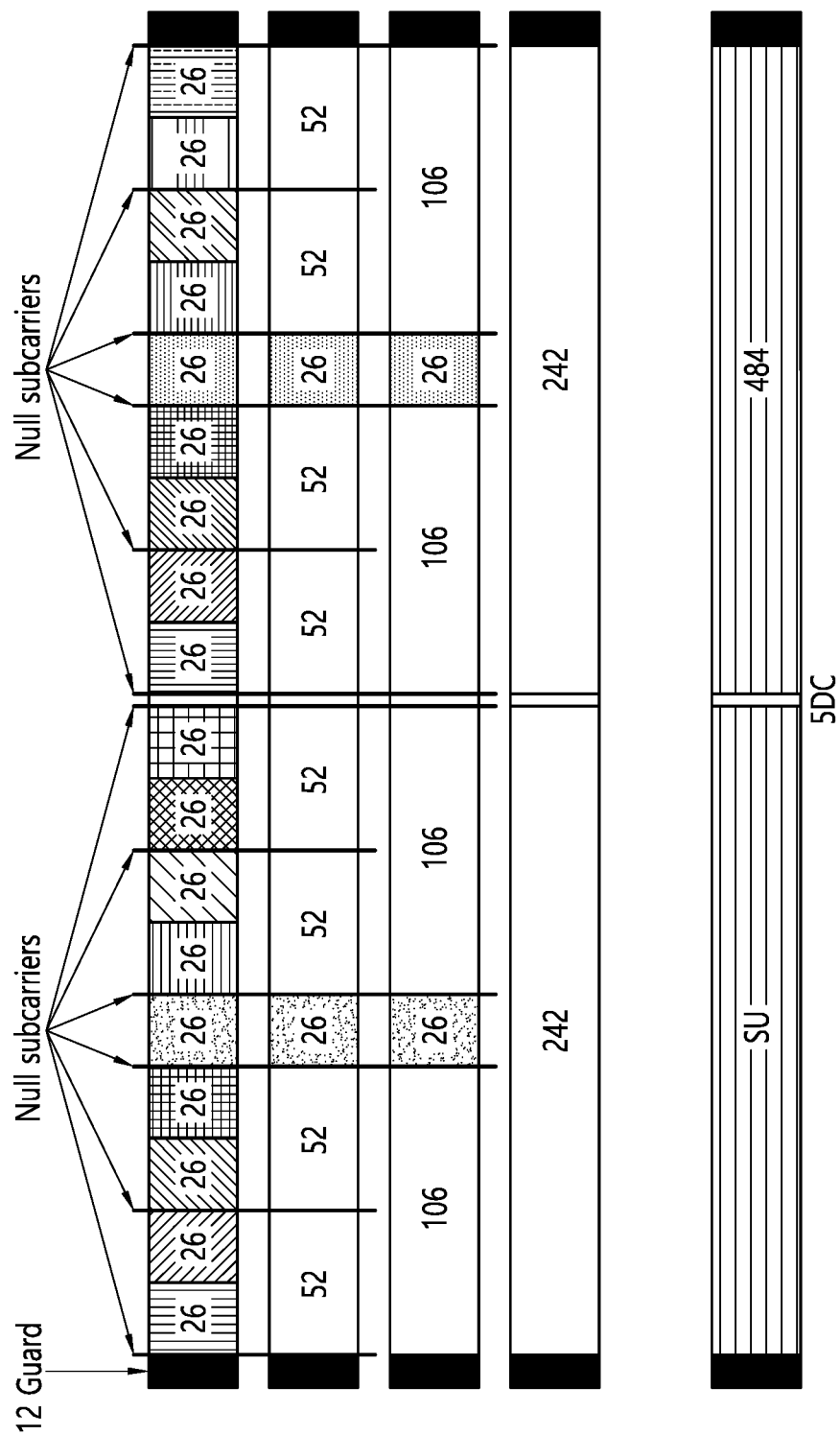
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
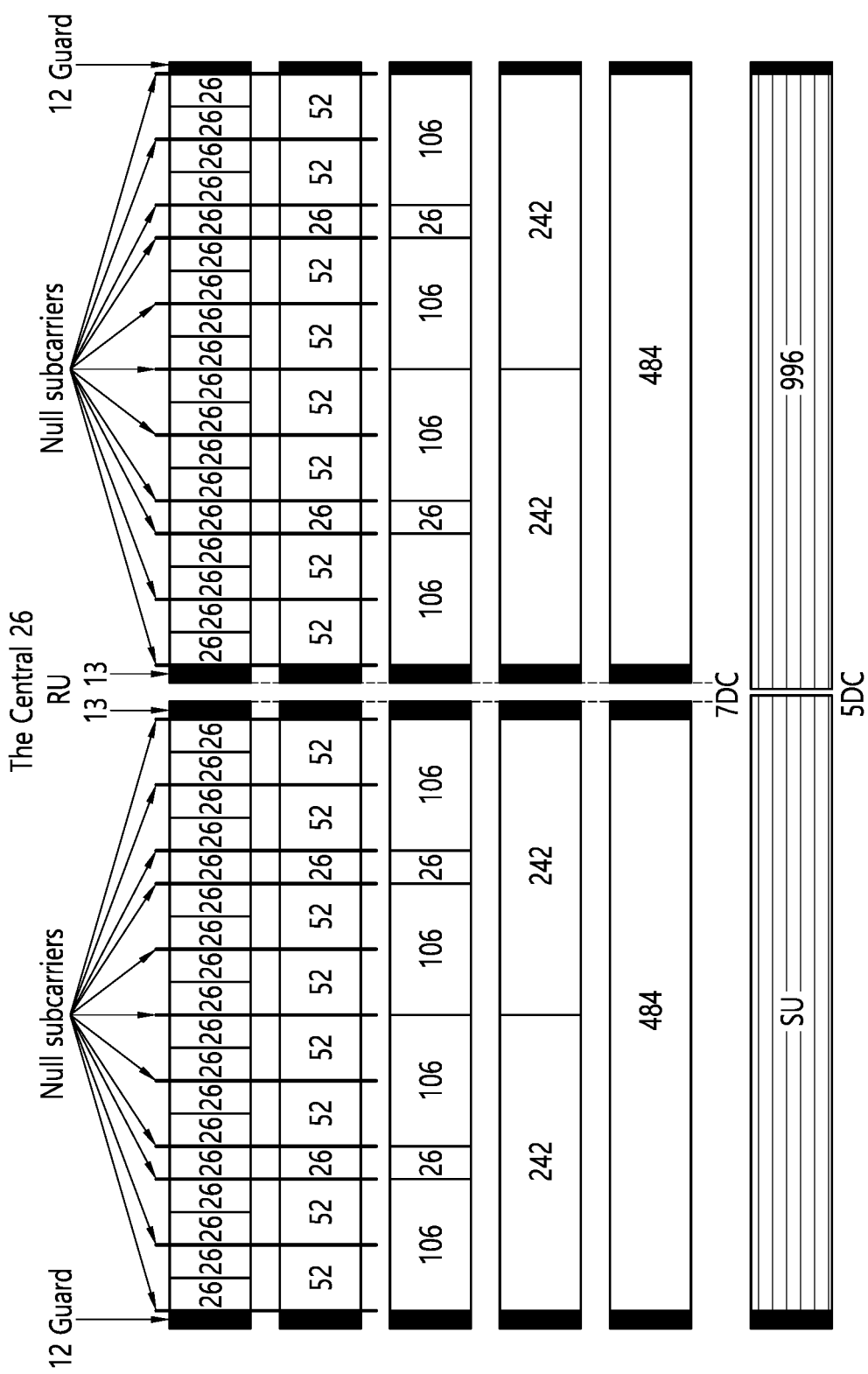
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
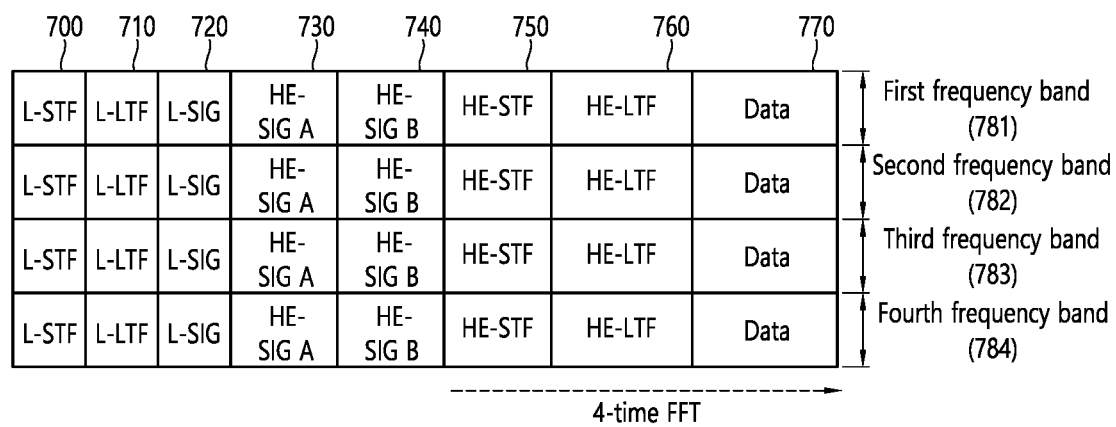
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC. |
| | B8-B13 | BSS Color | 6 | The BSS Color field is an identifier of the BSS. Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PDDU. Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| | B21-B22 | GI + LTF Size | 2 | Indicates the GI duration and HE-LTF size. Set to 0 to indicate a 1x HE-LTF and 0.8 µs GI Set to 1 to indicate a 2x HE-LTF and 0.8 µs GI Set to 2 to indicate a 2x HE-LTF and 1.6 µs GI Set to 3 to indicate: a 4x HE-LTE and 0.8 µs GI if both the DCM and STBC fields are 1. Neither DCM nor STBC shall be applied if both the DCM and STBC fields are set to 1. a 4x HE-LTF and 3.2 µs GI, otherwise |

TABLE 1-continued

| Two Parts of HE-SIG-A | Bit | Field | Number of bits | Description |
|---|---|---|---|---|
| | B23-B25 | NSTS And Midamble Periodicity | 3 | If the Doppler field is 0, indicates the number of space-time streams. Set to the number of space-time streams minus 1 For an HE ER SU PPDU, values 2 to 7 are reserved If the Doppler field is 1, then B23-B24 indicates the number of space time streams, up to 4, and B25 indicates the midamble periodicity. B23-B24 is set to the number of space time streams minus 1. For an HE ER SU PPDU, values 2 and 3 are reserved B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU)or HE-SIG-A3 (HE ER SU PPDU) | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)). Otherwise, B0 is set to 1 and B1-B6 is set to floor ((TXOP_DURATION-512)/128). where B0 indicates the TXOP length granularity. Set to 0 for 8 μs; otherwise set to 1 for 128 μs. B1-B6 indicates the scaled value of the TXOP_DURATION |
| | B7 | Coding | 1 | Indicates whether BCC or LDPC is used: Set to 0 to indicate BCC Set to 1 to indicate LDPC |
| | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0. |
| | B9 | STBC | 1 | If the DCM field is set to 0, then set to 1 if space time block coding is used. Neither DCM nor STBC shall be applied if both the DCM field and STBC field are set to 1. Set to 0 otherwise. |
| | B10 | Beam-formed | 1 | Set to 1 if a beamforming steering matrix is applied to the waveform in an SU transmission. Set to 0 otherwise. |
| | B11-B12 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present but the channel is fast varying. It recommends that midamble may be used for the PPDUs of the reverse link. Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG.<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU.<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80-80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz; where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support sub-field of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without |

TABLE 2-continued

| Two Parts of HE-SIG-A | Bit | Field | Number of bits | Description |
|---|---|---|---|---|
| | | | | DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1; indicates the number of MU-MIMO users and is set to the number of NU-MIMO users minus 1. |
| | B22 | SIGB Compression | 1 | Set to 0 if the Common field in HE-SIG-B is present. Set to 1 if the Common field in HE-SIG-B is not present. |
| | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 2 to indicate a 2x HE-LTF and 1.6 μs GI Set to 3 to indicate a 4x IIE-LTE and 3.2 μs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8). Otherwise, B0 is set to 1 and B1-B6 is set to floor ((TXOP_DURATION-512)/128). where B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |
| | B8-B10 | Number of HE-LTF SymbolsAnd Midamble Periodicity | 3 | If the Doppler field is set to 0, indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1. B8-B9 indicates the number of HE-LTF symbols and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation. |

TABLE 2-continued

| Two Parts of HE-SIG-A | Bit | Field | Number of bits | Description |
|---|---|---|---|---|
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 0 for an HE TB PPDU |
| | B1-B6 | BSS Color | 6 | The BSS Color field is an identifier of the BSS.<br>Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz then this Spatial Reuse field applies to the first 20 MHz subband.<br>If the Bandwidth field indicates 160/80-80 MHz then this Spatial Reuse field applies to the first 40 MHz subband of the 160 MHz operating band.<br>Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz:<br>This Spatial Reuse field applies to the second 20 MHz subband.<br>If the STA operating channel width is 20 MHz, then this field is set to the same value as Spatial Reuse 1 field.<br>If the STA operating channel width is 40 MHz in the 2.4 MHz band, this field is set to the same value as Spatial Reuse 1 field.<br>If the Bandwidth field indicates 160/80-80 MHz the this Spatial Reuse field applies to the second 40 MHz subband of the 160 MHz operating band.<br>Set to the value of the SPATIAL_REUSE(2) parameter of the TXVECTOR, which contains a value from Table 28-22 (Spatial Reuse field encoding for an HE |

TABLE 3-continued

| Two Parts of HE-SIG-A | Bit | Field | Number of bits | Description |
|---|---|---|---|---|
| | | | | TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRC, OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the third 20 MHz subband.<br>If the STA operating channel width is 20 MHz or 40 MHz, this field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If the STA operating dimmed width is 80 + 80 MHz, this field is set to the same value as Spatial Reuse 1 field.<br>Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | SpatialReuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the fourth 20 MHz subband.<br>If the STA operating channel width is 20 MHz, then this field is set to the same value as Spatial Reuse 1 field.<br>If the STA operating channel width is 40 MHz, then this held is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If the STA operating channel width is 80 + 80 MHz, then this field is set to same value as Spatial Reuse 2 field.<br>Set to the value of the SPATIAL_REUSE(4) parameter of the TXVFCTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE-Unlike other Reserved fields in HE-SIG-A of the HE TB PPDU, B23 does not have a corresponding bit in the Trigger frame. |

TABLE 3-continued

| Two Parts of HE-SIG-A | Bit | Field | Number of bits | Description |
|---|---|---|---|---|
| | B24-B25 | Bandwidth | 2 | Set to 0 for 20 MHz<br>Set to 1 for 40 MHz<br>Set to 2 for 80 MHz<br>Set to 3 for 160 MHz and 80-80 MHz |
| HE-SIG-A2 | B0-B6 | TXOP | 7 | Set to 127 to indicate no duration information if TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8).<br>Otherwise, B0 is set to 1 and B1-B6 is set to floor((TXOP_DURATION-512)/128).<br>where<br>B0 indicates the TXOP length granularity. Set to 0 for 8 μs; otherwise set to 1 for 128 μs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA.

Figure 8:
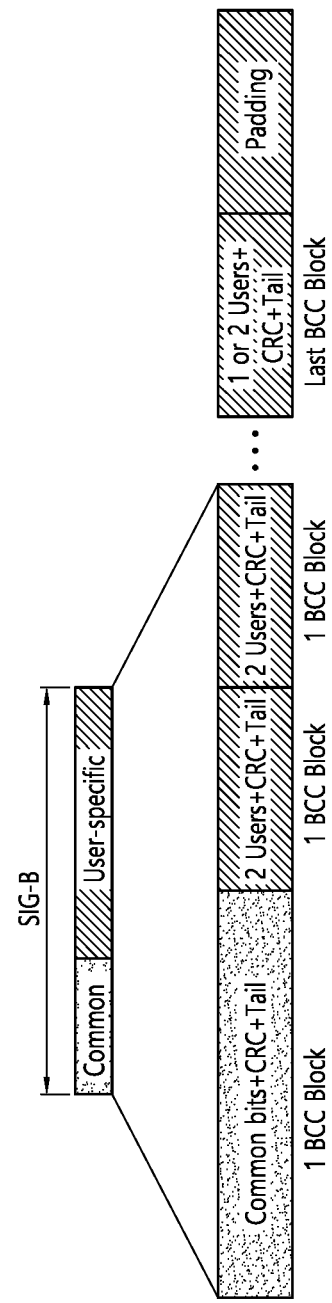
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
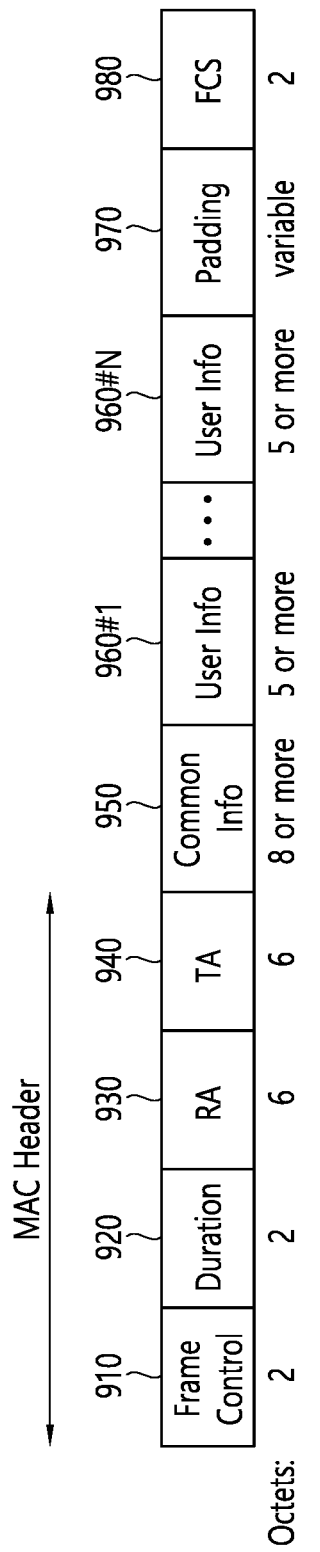
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960 #1 to 960 #N) shown in FIG. 9 includes a plurality of subfields.

Figure 10:
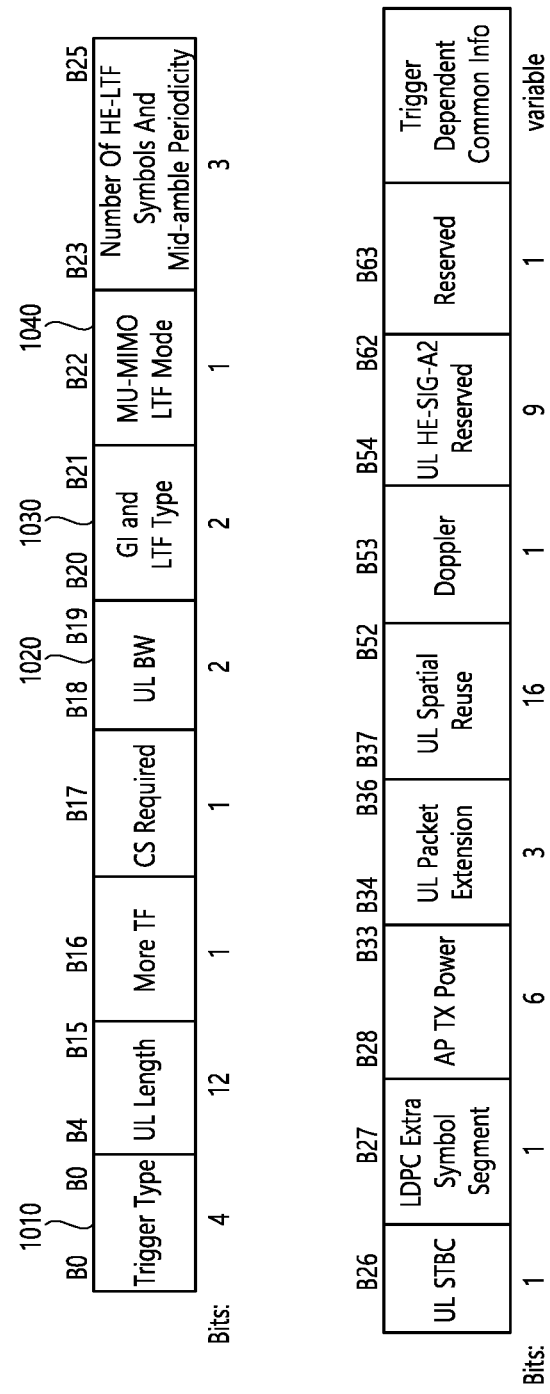
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
|---|---|
| 0 | 1x HE-LTF + 1.6 μs GI |
| 1 | 2x HE-LTF + 1.6 μs GI |
| 2 | 4x HE-LTF + 3.2 μs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
|---|---|
| 0 | HE single stream pilot HE-LTF mode |
| 1 | HE masked HE-LTF sequence mode |

Figure 11:
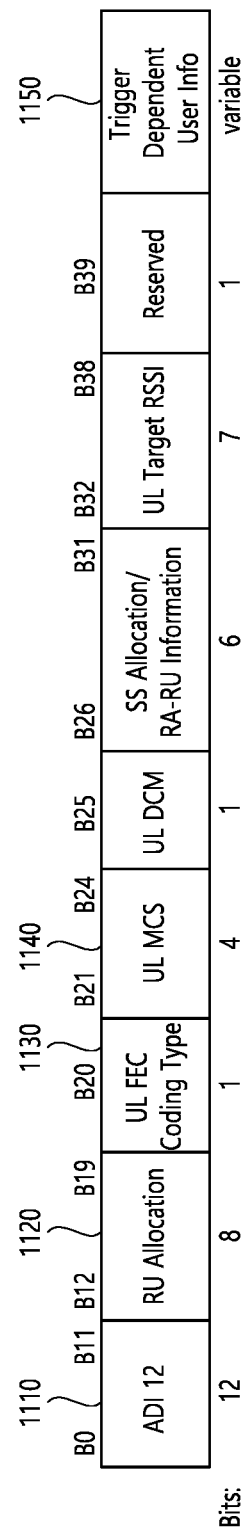
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in all HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
| --- | --- | --- | --- | --- | --- | --- | --- | --- | --- | --- |
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | | 106 | | | 8 |
| 00011$y_2y_1y_0$ | | 106 | | | — | | 52 | | 52 | 8 |
| 00100$y_2y_1y_0$ | 26 | 26 | 26 | 26 | 26 | | 106 | | | 8 |
| 00101$y_2y_1y_0$ | 26 | 26 | 52 | | 26 | | 106 | | | 8 |
| 00110$y_2y_1y_0$ | 52 | | 26 | 26 | 26 | | 106 | | | 8 |
| 00111$y_2y_1y_0$ | 52 | | 52 | | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | | 26 | 26 | 8 |
| 01011$y_2y_1y_0$ | | 106 | | | 26 | 52 | | 52 | | 8 |
| 0110$y_1y_0y_1y_0$ | | 106 | | | — | | 106 | | | 16 |
| 01110000 | 52 | | 52 | | — | | 52 | | 52 | 1 |
| 01110001 | | | | | 242-tone RU empty | | | | | 1 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-B content channel | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | | | 106 | | 26 | | 106 | | | 64 |
| 11000$y_2y_1y_0$ | | | | | 242 | | | | | 8 |
| 11001$y_2y_1y_0$ | | | | | 484 | | | | | 8 |
| 11010$y_2y_1y_0$ | | | | | 996 | | | | | 8 |
| 11011$y_2y_1y_0$ | Reserved | | | | | | | | | 8 |
| 111$x_4x_3x_2x_1x_0$ | Reserved | | | | | | | | | 32 |

If signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106- tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the WU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from led to the right) is ordered in increasing order of the absolute frequency.
$x_1x_0$ = 00-11, $x_4x_3x_2x_1x_0$ = 00000-11111.
'—' means no SIA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
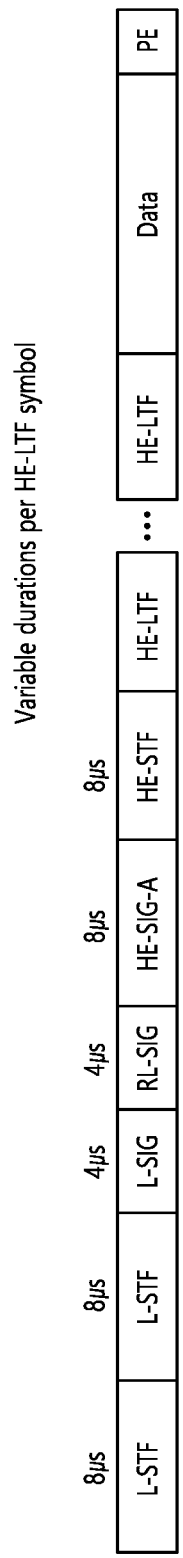
FIG. 12 illustrates an example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

The PPDU may not include the HE-SIG-B field but only the HE-SIG-A field.

Subcarrier and resource allocation in an 802.11ax system will be described.

An OFDM symbol includes subcarriers, and the number of subcarriers may function as the bandwidth of a PPDU. In the 802.11 WLAN system, a data subcarrier used for data transmission, a pilot subcarrier used for phase information and parameter tracking, and an unused subcarrier unoccupied for data transmission and pilot transmission are defined.

A HE MU PPDU using OFDMA transmission may be transmitted via a combination of a 26-tone RU, a 52-tone RU, a 106-tone RU, a 242-tone RU, a 484-tone RU, and a 996-tone RU.

The 26-tone RU includes 24 data subcarriers and two pilot subcarriers. The 52-tone RU includes 48 data subcarriers and four pilot subcarriers. The 106-tone RU includes 102 data subcarriers and four pilot subcarriers. The 242-tone RU includes 234 data subcarriers and 8 pilot subcarriers. The 484-tone RU includes 468 data subcarriers and 16 pilot subcarriers. The 996-tone RU includes 980 data subcarriers and 16 pilot subcarriers.

When a pilot subcarrier is present in a HE-LTF field of a HE SU PPDU, a HE MU PPDU, a HE ER SU PPDU, or a HE TB PPDU, the position of a pilot sequence in a HE-LTF field and a data field may be the same as the position is a 4×HE-LTF. In a 1×HE-LTF, the position of a pilot sequence in a HE-LTF includes pilot subcarriers for a quadrupled data field. When a pilot subcarrier exists in a 2×HE-LTF, the position of the pilot subcarrier needs to be the same as the position of a pilot in a 4× data symbol. All pilot subcarriers are positioned at even-numbered indices listed below.

| Channel Width | RU Size | Pilot Subcarrier Indices |
|---|---|---|
| 20 MHz | 26, 52 | ±10, ±22, ±36, ±48, ±62, ±76, ±90, ±102, ±116 |
| | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |
| | 106, 242, 484 | ±10, ±36, ±78, ±104, ±144, ±170, ±212, ±238 |
| 80 MHz | 26, 52 | ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494 |

-continued

| Channel Width | RU Size | Pilot Subcarrier Indices |
|---|---|---|
| | 106, 242, 484 | ±24, ±50, ±92, ±118, ±158, ±184, ±226, ±252, ±266, ±292, ±334, ±360, ±400, ±426, ±468, ±494 |
| | 996 | ±24, ±92, ±158, ±226, ±266, ±334, ±400, ±468 |
| 160 MHz | 26, 52, 106, 242, 484 | {pilot subcarrier indices in 80 MHz −512, pilot subcarrier indices in 80 MHz +512} |
| | 996 | {for lower 80 MHz, pilot subcarrier indices in 80 MHz −512, for the upper 80 MHz, pilot subcarrier indices in 80 MHz +512} |

In 160 MHz or 80+80 MHz, the position of a pilot subcarrier needs to use the same 80-MHz position for 80 MHz on either side.

In the 802.11 WLAN system, transmission of an increased stream using a wider band than that in conventional 11ax or using more antennas than those in 11ax is taken into consideration in order to increase peak throughput. In addition, a method of aggregating various bands for use is also taken into consideration.

The present disclosure considers using a wide band, and particularly proposes a tone plan, a pilot subcarrier, and a pilot coefficient in a case where 160 MHz/80+80+80 MHz/160+160 MHz/320 MHz is used.

In the existing 11ax, a tone plan for full band and OFDMA transmission at 20/40/80/80+80/160 MHz is designed, and a 160 MHz tone plan is used by simply repeating the existing 80 MHz tone plan twice. This is designed in consideration of a case where transmission is performed by taking two RFs into account, and may be a reasonable tone plan in case of non-contiguous 80+80 MHz. However, a situation where transmission is performed by using one RF may be considered in case of contiguous 160 MHz. In this case, since there are many subcarriers wasted in the existing tone plan, a new tone plan may be proposed to increase efficiency and throughput of a subcarrier in use.

1. New 160 MHz Tone Plan

<Full Band>

In case of transmission using a full band, a new resource unit (RU) may be proposed, and a size of the new RU may be determined by considering various DC tones according to an effect of a DC offset and by considering the existing 11 ax 160 MHz guard tone. The existing 11ax guard tone consists of left 12 tones and right 11 tones, and the number of DC tones of 80 MHz is 5 or 7. When this is directly considered, the new RU of the full band is 2020RU or 2018RU.

12/11 guard tone, 5DC, 2020RU

12/11 guard tone, 7DC, 2018RU

In 160 MHz, considering the effect of the DC offset, it is not preferable that the number of DC tones in use is less than 5/7 which is less than the number of DC tones used in the existing 80 MHz. In addition, 5/7DC may be sufficient in terms of performance. Considering the following OFDMA tone plan, up to 7DC may be suitable. In the following OFDMA tone plan, DC is designed by considering 7DC and 5DC in the existing 80 MHz OFDMA tone plan, and it is not preferable that the number of DC tones is less than that. 5 or 7DC may be sufficient in terms of performance. 7DC is used in 20 MHz and 80 MH which is a case where a center 26RU (13+13RU) is used in the existing 11ax.

<OFDMA Tone Plan>

The OFDMA tone plan can be expressed using the existing 996RU and 26RU (13+13RU) as follows. Hereinafter, G denotes a guard tone and N denotes a null tone.

12G+996RU+13RU+7DC+13RU+996RU+11G

12G+996RU+1N+13RU+5DC+13RU+1N+996RU+11G

The number of DC tones and the number of null subcarriers at both sides may be determined by a DC offset of the center 26RU (13+13 RU) and performance based on an effect of interference. Considering the effect of interference, it may be preferably configured of 5DC and 1 null carrier at both sides.

The following two configurations are proposed as a 996RU configuration.

996RU=484RU+1N+26RU+1N+484RU

996RU=1N+484RU+26RU+484RU+1N

In a first configuration, a null tone is present at both sides of the 26RU so that an effect of interference from/to an adjacent RU can be decreased. In a second configuration, the effect of interference between 484RU and its adjacent RU can be decreased. An RU which uses a small number of subcarriers, such as 26RU, may preferably use the first configuration since interference has significant effect on performance.

The 484RU has two 242RU configurations as in the existing 11ax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU

Each RU and an index of a null tone are listed below in a case where 2020/2018RU is used in full band transmission, a tone plan of '12G+996RU+13RU+7DC+13RU+996RU+11G' is used, and the first configuration of 996RU is used.

<26 RU for New 160 MHz Tone Plan>

TABLE 11

| RU1 | RU2 | RU3 | RU4 | RU5 | RU6 | RU7 | RU8 | RU9 |
|---|---|---|---|---|---|---|---|---|
| −1011: −986 | −985: −960 | −957: −932 | −931: −906 | −904: −879 | −877: −852 | −851: −826 | −823: −798 | −797: −772 |

| RU10 | RU11 | RU12 | RU13 | RU14 | RU15 | RU16 | RU17 | RU18 | RU19 |
|---|---|---|---|---|---|---|---|---|---|
| −769: −744 | −743: −718 | −715: −690 | −689: −664 | −662: −637 | −635: −610 | −609: −584 | −581: −556 | −555: −530 | −527: −502 |

| RU20 | RU21 | RU22 | RU23 | RU24 | RU25 | RU26 | RU27 | RU28 |
|---|---|---|---|---|---|---|---|---|
| −499: −474 | −473: −448 | −445: −420 | −419: −394 | −392: −367 | −365: −340 | −339: −314 | −311: −286 | −285: −260 |

| RU29 | RU30 | RU31 | RU32 | RU33 | RU34 | RU35 | RU36 | RU37 | RU38 |
|---|---|---|---|---|---|---|---|---|---|
| −257: −232 | −231: −206 | −203: −178 | −177: −152 | −150 125 | −123: −98 | −97: −72 | −69: −44 | −43: −18 | 16:−4, 4:16 |

TABLE 11-continued

| RU39 | RU40 | RU41 | RU42 | RU43 | RU44 | RU45 | RU46 | RU47 |
|---|---|---|---|---|---|---|---|---|
| 18:43 | 44:69 | 72:97 | 98:123 | 125:150 | 152:177 | 178:203 | 206:231 | 232:257 |

| RU48 | RU49 | RU50 | RU51 | RU52 | RU53 | RU54 | RU55 | RU56 | RU57 |
|---|---|---|---|---|---|---|---|---|---|
| 260:285 | 286:311 | 314:339 | 340:365 | 367:392 | 394:419 | 420:445 | 448:473 | 474:499 | 502:527 |

| RU58 | RU59 | RU60 | RU61 | RU62 | RU63 | RU64 | RU65 | RU66 |
|---|---|---|---|---|---|---|---|---|
| 530:555 | 556:581 | 584:609 | 610:635 | 637:662 | 664:689 | 690:715 | 718:743 | 744:769 |

| RU67 | RU68 | RU69 | RU70 | RU71 | RU72 | RU73 | RU74 | RU75 |
|---|---|---|---|---|---|---|---|---|
| 772:797 | 798:823 | 826:851 | 852:877 | 879:904 | 906:931 | 932:957 | 960:985 | 986:1011 |

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012}

<52 RU for New 160 MHz Tone Plan>

TABLE 12

| RU1 | RU2 | RU3 | RU4 |
|---|---|---|---|
| −1011:−960 | −957:−906 | −877:−826 | −823:−772 |
| RU5 | RU6 | RU7 | RU8 |
| −769:−718 | −715:−664 | −635:−584 | −581:−530 |
| RU9 | RU10 | RU11 | RU12 |
| −499:−448 | −445:−394 | −365:−314 | −311:−260 |
| RU13 | RU14 | RU15 | RU16 |
| −257:−206 | −203:−152 | −123:−72 | −69:−18 |
| RU17 | RU18 | RU19 | RU20 |
| 18:69 | 72:123 | 152:203 | 206:257 |
| RU21 | RU22 | RU23 | RU24 |
| 260:311 | 314:365 | 394:445 | 448:499 |
| RU25 | RU26 | RU27 | RU28 |
| 530:581 | 584:635 | 664:715 | 718:769 |
| RU29 | RU30 | RU31 | RU32 |
| 772:823 | 826:877 | 906:957 | 960:1011 |

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012}

<106 RU for New 160 MHz Tone Plan>

TABLE 13

| RU1 | RU2 | RU3 | RU4 |
|---|---|---|---|
| −1011:−906 | −877:−772 | −769:−664 | −635:−530 |

TABLE 13-continued

| RU5 | RU6 | RU7 | RU8 |
|---|---|---|---|
| −499:−394 | −365:−260 | −257:−152 | −123:−18 |
| RU9 | RU10 | RU11 | RU12 |
| 18:123 | 152:257 | 260:365 | 394:499 |
| RU13 | RU14 | RU15 | RU16 |
| 530:635 | 664:769 | 772:877 | 906:1011 |

Null subcarriers: ±{17, 124, 151, 258, 259, 366, 393, 500, 501, 528, 529, 636, 663, 770, 771, 878, 905, 1012}

<242 RU for New 160 MHz Tone Plan>

TABLE 14

| RU1 | RU2 | RU3 | RU4 |
|---|---|---|---|
| −1012:−771 | −770:−529 | −500:−259 | −258:−17 |
| RU5 | RU6 | RU7 | RU8 |
| 17:258 | 259:500 | 529:770 | 771:1012 |

Null subcarriers: ±{501, 528}

<484 RU for New 160 MHz Tone Plan>

TABLE 15

| RU1 | RU2 | RU3 | RU4 |
|---|---|---|---|
| −1012:−529 | −500:−17 | 17:500 | 529:1012 |

Null subcarriers: ±{501, 528}

<996 RU for New 160 MHz Tone Plan>

TABLE 16

| RU1 | RU2 |
|---|---|
| −1012:−17 | 17:1012 |

Null subcarriers: X

<2020 or 2018 RU for New 160 MHz Tone Plan>
2020RU: −1012:−3, 3:1012
2018RU: −1012:−4, 4:1012
Null subcarriers: X Pilot tones may be configured according to these tone plans, and tone indices may be unified based on the 26-RU pilot tone indices as in existing 11ax. In a 26-RU, tones with 26-RU tone indices having the sixth largest absolute value and the seventh smallest absolute value or having the seventh largest absolute value and the seventh smallest absolute value are configured as two pilot tones. In a 13+13 RU, a center tone of each 13 RU is configured as a pilot tone. In addition, it is preferable that an even-numbered tone is configured as a pilot tone in consideration of a 1×/2×LTF, and a configuration having an even-numbered tone is selected from among the two pilot configurations in the 26 RU. Further, in the 13+13 RU, when the center tone of the 13 RU is odd-numbered, an adjacent index may be selected, in which the absolute value of each 13-RU pilot tone index may be set equally for symmetry. A pilot subcarrier may be configured using the existing method for a 52/106/242/484 RU, and a subcarrier may be configured with a pilot subcarrier index by the following method in a 996 RU and a full band. For reference, p2020v1 to 3, which are options for the full band, are not limited to a case of the full band using a 2020 RU but may be equally applied to a case of the full band using a 2018 R U. That is, new 160 MHz pilot designs are required as follows.

<996 RU>

To select from among 484-RU pilots

P996v1: To alternately select from among edge tones

P996v2: To alternately select from among DC tones

P996v3: To alternately select from among 996-RU tones from opposite ends to center P996v4: To alternately select from among 996-RU tones from center to opposite ends <Full Band>

To select from among 996-RU pilots

P2020v1: To use all 996-RU pilots (double of number of 996-RU pilots)

P2020v2: To alternately select from among edge tones

P2020v3: To alternately select from among DC tones

Among the above options, p996v3 and p2020v3 are methods applied to the pilot tone configuration of each RU in existing 11ax (p996v3 of alternately selecting tones from the opposite ends to the center is a method applied to the pilot configuration of a 106-RU, and p2020v3 of alternately selecting tones from the DC tones is a method applied to the pilot configuration of a 996-RU in a full band of 80 MHz). If there is no difference in the number of pilots between the options, using p996v3 and p2020v3 may be advantageous in design for unified pilots for extension to a wider band (for use of a band of 320 MHz or greater) although there is no significant difference in performance in carrier frequency offset (CFO) estimation. Pilot subcarrier indices according to the above tone plans are listed below.

<26 RU>

±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}

<52 RU>

±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006}

<106/242/484 RU>

±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006}

<996 RU/Full Band>

1. P996v1: ±{50, 118, 184, 252, 292, 360, 426, 494, 562, 630, 696, 764, 804, 872, 938, 1006}

P2020v1: ±{50, 118, 184, 252, 292, 360, 426, 494, 562, 630, 696, 764, 804, 872, 938, 1006}

P2020v2: ±{118, 252, 360, 494, 630, 764, 872, 1006}

P2020v3: ±{50, 184, 292, 426, 562, 696, 804, 938}

2. P996v2: ±{24, 92, 158, 226, 266, 334, 400, 468, 536, 604, 670, 738, 778, 846, 912, 980}

P2020v1: ±{24, 92, 158, 226, 266, 334, 400, 468, 536, 604, 670, 738, 778, 846, 912, 980}

P2020v2: ±{92, 226, 334, 468, 604, 738, 846, 980}

P2020v3: ±{24, 158, 266, 400, 536, 670, 778, 912}

3. P996v3: +{24, 92, 158, 226, 266, 334, 400, 468, 562, 630, 696, 764, 804, 872, 938, 1006}

P2020v1: ±{24, 92, 158, 226, 266, 334, 400, 468, 562, 630, 696, 764, 804, 872, 938, 1006}

P2020v2: ±{92, 226, 334, 468, 630, 764, 872, 1006}

P2020v3: ±{24, 158, 266, 400, 562, 696, 804, 938}

4. P996v4: ±{50, 118, 184, 252, 292, 360, 426, 494, 536, 604, 670, 738, 778, 846, 912, 980}

P2020v1: ±{50, 118, 184, 252, 292, 360, 426, 494, 536, 604, 670, 738, 778, 846, 912, 980}

P2020v2: ±{118, 252, 360, 494, 604, 738, 846, 980}

P2020v3: +{50, 184, 292, 426, 536, 670, 778, 912}

Each RU and an index of a null tone are listed below in a case where 2020/2018RU is used in full band transmission, a tone plan of '12G+996RU+13RU+7DC+13RU+996RU+11G' is used, and the second configuration of 996RU is used.

<26 RU for New 160 MHz Tone Plan>

TABLE 17

| RU1 | RU2 | RU3 | RU4 | RU5 | RU6 | RU7 | RU8 | RU9 |
|---|---|---|---|---|---|---|---|---|
| −1010: −985 | −984: −959 | −956: −931 | −930: −905 | −903: −878 | −876: −851 | −850: −825 | −822: −797 | −796: −771 |
| RU10 | RU11 | RU12 | RU13 | RU14 | RU15 | RU16 | RU17 | RU18 | RU19 |
| −768: −743 | −742: −717 | −714: −689 | −688: −663 | −661: −636 | −634: −609 | −608: −583 | −580: −555 | −554: −529 | −527: −502 |
| RU20 | RU21 | RU22 | RU23 | RU24 | RU25 | RU26 | RU27 | RU28 |
| −500: −475 | −474: −449 | −446: −421 | −420: −395 | −393: −368 | −366: −341 | −340: −315 | −311: −287 | −286: −261 |
| RU29 | RU30 | RU31 | RU32 | RU33 | RU34 | RU35 | RU36 | RU37 | RU38 |
| −258: −233 | −232: −207 | −204: −179 | −178: −153 | −151: 126 | −124: −99 | −98: −73 | −70: −45 | −44: −19 | 16:−4, 4:16 |
| RU39 | RU40 | RU41 | RU42 | RU43 | RU44 | RU45 | RU46 | RU47 |
| 19: 44 | 45: 70 | 73: 98 | 99: 124 | 126: 151 | 153: 178 | 179: 201 | 207: 232 | 233: 258 |
| RU48 | RU49 | RU50 | RU51 | RU52 | RU53 | RU54 | RU55 | RU56 | RU57 |
| 261: 286 | 287: 312 | 315: 340 | 341: 366 | 368: 393 | 395: 420 | 421: 446 | 449: 474 | 475: 500 | 502: 527 |
| RU58 | RU59 | RU60 | RU61 | RU62 | RU63 | RU64 | RU65 | RU66 |
| 529: 554 | 555: 580 | 583: 608 | 609: 634 | 636: 661 | 663: 688 | 689: 714 | 717: 742 | 743: 768 |
| RU67 | RU68 | RU69 | RU70 | RU71 | RU72 | RU73 | RU74 | RU75 |
| 771: 796 | 797: 822 | 825: 850 | 851: 876 | 878: 903 | 905: 930 | 931: 956 | 959: 984 | 985: 1010 |

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012}

<52 RU for New 160 MHz Tone Plan>

TABLE 18

| RU1 | RU2 | RU3 | RU4 |
|---|---|---|---|
| −1010:−959 | −956:−905 | −876:−825 | −822:−771 |
| RU5 | RU6 | RU7 | RU8 |
| −768:−717 | −714:−663 | −634:−583 | −580:−529 |
| RU9 | RU10 | RU11 | RU12 |
| −500:−449 | −446:−395 | −366:−315 | −312:−261 |

TABLE 18-continued

| RU13 | RU14 | RU15 | RU16 |
|---|---|---|---|
| −258:−207 | −204:−153 | −124:−73 | −70:−19 |
| RU17 | RU18 | RU19 | RU20 |
| 19:70 | 73:124 | 153:204 | 207:258 |
| RU21 | RU22 | RU23 | RU24 |
| 261:312 | 315:366 | 395:446 | 449:500 |
| RU25 | RU26 | RU27 | RU28 |
| 529:580 | 583:634 | 663:714 | 717:768 |
| RU29 | RU30 | RU31 | RU32 |
| 771:822 | 825:876 | 905:956 | 959:1010 |

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012}
<106 RU for New 160 MHz Tone Plan>

TABLE 19

| RU1 | RU2 | RU3 | RU4 |
|---|---|---|---|
| −1010:−905 | −876:−771 | −768:−663 | −634:−529 |
| RU5 | RU6 | RU7 | RU8 |
| −500:−395 | −366:−261 | −258:−153 | −124:−19 |
| RU9 | RU10 | RU11 | RU12 |
| 19:124 | 153:258 | 261:366 | 395:500 |
| RU13 | RU14 | RU15 | RU16 |
| 529:634 | 663:768 | 771:876 | 905:1010 |

Null subcarriers: ±{17, 18, 125, 152, 259, 260, 367, 394, 501, 528, 635, 662, 769, 770, 877, 904, 1011, 1012}
<242 RU for New 160 MHz Tone Plan>

TABLE 20

| RU1 | RU2 | RU3 | RU4 |
|---|---|---|---|
| −1011:−770 | −769:−528 | −501:−260 | −259:−18 |
| RU5 | RU6 | RU7 | RU8 |
| 18:259 | 260:501 | 528:769 | 770:1011 |

Null subcarriers: ±{17, 1012}
<484 RU for New 160 MHz Tone Plan>

TABLE 21

| RU1 | RU2 | RU3 | RU4 |
|---|---|---|---|
| −1011:−528 | −501:−18 | 18:501 | 528:1011 |

Null subcarriers: ±{17, 1012}
<996 RU for New 160 MHz Tone Plan>

TABLE 22

| RU1 | RU2 |
|---|---|
| −1012:−17 | 17:1012 |

Null subcarriers: X
<2020 or 2018 RU for New 160 MHz Tone Plan>
2020RU: −1012:−3, 3:1012
2018RU: −1012:−4, 4:1012
Null subcarriers: X
Pilot subcarrier indices according to the above tone plans are listed below.
<26 RU>
±{10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004}
<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004}
<106/242/484 RU>
±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004}
<996 RU/Full Band>
1. P996v1: ±{50, 118, 184, 252, 292, 360, 426, 494, 560, 628, 694, 762, 802, 870, 936, 1004}
P2020v1: ±{50, 118, 184, 252, 292, 360, 426, 494, 560, 628, 694, 762, 802, 870, 936, 1004}
P2020v2: ±{118, 252, 360, 494, 628, 762, 870, 1004}
P2020v3: ±{50, 184, 292, 426, 560, 694, 802, 936}
2. P996v2: ±{24, 92, 158, 226, 266, 334, 400, 468, 534, 602, 668, 736, 776, 844, 910, 978}
P2020v1: ±{24, 92, 158, 226, 266, 334, 400, 468, 534, 602, 668, 736, 776, 844, 910, 978}
P2020v2: ±{92, 226, 334, 468, 602, 736, 844, 978}
P2020v3: ±{24, 158, 266, 400, 534, 668, 776, 910}
3. P996v3: ±{24, 92, 158, 226, 266, 334, 400, 468, 560, 628, 694, 762, 802, 870, 936, 1004}
P2020v1: ±{24, 92, 158, 226, 266, 334, 400, 468, 560, 628, 694, 762, 802, 870, 936, 1004}
P2020v2: ±{92, 226, 334, 468, 628, 762, 870, 1004}
P2020v3: ±{24, 158, 266, 400, 560, 694, 802, 936}
4. P996v4: ±{50, 118, 184, 252, 292, 360, 426, 494, 534, 602, 668, 736, 776, 844, 910, 978}
P2020v1: ±{50, 118, 184, 252, 292, 360, 426, 494, 534, 602, 668, 736, 776, 844, 910, 978}
P2020v2: ±{118, 252, 360, 494, 602, 736, 844, 978}
P2020v3: ±{50, 184, 292, 426, 534, 668, 776, 910}
Each RU and an index of a null tone are listed below in a case where 2020/2018RU is used in full band transmission, a tone plan of '12G+996RU+1N+13RU+5DC+13RU+1N+996RU+11G' is used, and the first configuration of 996RU is used.

<26 RU for New 160 MHz Tone Plan>

TABLE 23

| RU1 | RU2 | RU3 | RU4 | RU5 | RU6 | RU7 | RU8 | RU9 | |
|---|---|---|---|---|---|---|---|---|---|
| −1011: −986 | −985: −960 | −957: −932 | −931: −906 | −904: −879 | −877: −852 | −851: −826 | −823: −798 | −797: −772 | |

| RU10 | RU11 | RU12 | RU13 | RU14 | RU15 | RU16 | RU17 | RU18 | RU19 |
|---|---|---|---|---|---|---|---|---|---|
| −769: −744 | −743: −718 | −715: −690 | −689: −664 | −662: −637 | −635: −610 | −609: −584 | −581: −556 | −555: −530 | −527: −502 |

| RU20 | RU21 | RU22 | RU23 | RU24 | RU25 | RU26 | RU27 | RU28 | |
|---|---|---|---|---|---|---|---|---|---|
| −499: −474 | −473: −448 | −445: −420 | −419: −394 | −392: −367 | −365: −340 | −339: −314 | −311: −286 | −285: −260 | |

| RU29 | RU30 | RU31 | RU32 | RU33 | RU34 | RU35 | RU36 | RU37 | RU38 |
|---|---|---|---|---|---|---|---|---|---|
| −257: −232 | −231: −206 | −203: −178 | −177: −152 | −150: 125 | −123: −98 | −97: −72 | −69: −44 | −43: −18 | 15:−3, 3:15 |

| RU39 | RU40 | RU41 | RU42 | RU43 | RU44 | RU45 | RU46 | RU47 | |
|---|---|---|---|---|---|---|---|---|---|
| 18: 43 | 44: 69 | 72: 97 | 98: 123 | 125: 150 | 152: 177 | 178: 203 | 206: 231 | 232: 257 | |

| RU48 | RU49 | RU50 | RU51 | RU52 | RU53 | RU54 | RU55 | RU56 | RU57 |
|---|---|---|---|---|---|---|---|---|---|
| 260: 285 | 286: 311 | 314: 339 | 340: 365 | 367: 392 | 394: 419 | 420: 445 | 448: 473 | 474: 499 | 502: 527 |

| RU58 | RU59 | RU60 | RU61 | RU62 | RU63 | RU64 | RU65 | RU66 | |
|---|---|---|---|---|---|---|---|---|---|
| 530: 555 | 556: 581 | 584: 609 | 610: 635 | 637: 662 | 664: 689 | 690: 715 | 718: 743 | 744: 769 | |

| RU67 | RU68 | RU69 | RU70 | RU71 | RU72 | RU73 | RU74 | RU75 | |
|---|---|---|---|---|---|---|---|---|---|
| 772: 797 | 798: 823 | 826: 851 | 852: 877 | 879: 904 | 906: 931 | 932: 957 | 960: 985 | 986: 1011 | |

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012}

<52 RU for New 160 MHz Tone Plan>

TABLE 24

| RU1 | RU2 | RU3 | RU4 |
|---|---|---|---|
| −1011:−960 | −957:−906 | −877:−826 | −823:−772 |
| RU5 | RU6 | RU7 | RU8 |
| −769:−718 | −715:−664 | −635:−584 | −581:−530 |
| RU9 | RU10 | RU11 | RU12 |
| −499:−448 | −445:−394 | −365:−314 | −311:−260 |
| RU13 | RU14 | RU15 | RU16 |
| −257:−206 | −203:−152 | −123:−72 | −69:−18 |
| RU17 | RU18 | RU19 | RU20 |
| 18:69 | 72:123 | 152:203 | 206:257 |
| RU21 | RU22 | RU23 | RU24 |
| 260:311 | 314:365 | 394:445 | 448:499 |
| RU25 | RU26 | RU27 | RU28 |
| 530:581 | 584:635 | 664:715 | 718:769 |
| RU29 | RU30 | RU31 | RU32 |
| 772:823 | 826:877 | 906:957 | 960:1011 |

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012}

<106 RU for New 160 MHz Tone Plan>

TABLE 25

| RU1 | RU2 | RU3 | RU4 |
|---|---|---|---|
| −1011:−906 | −877:−772 | −769:−664 | −635:−530 |
| RU5 | RU6 | RU7 | RU8 |
| −499:−394 | −365:−260 | −257:−152 | −123:−18 |
| RU9 | RU10 | RU11 | RU12 |
| 18:123 | 152:257 | 260:365 | 394:499 |
| RU13 | RU14 | RU15 | RU16 |
| 530:635 | 664:769 | 772:877 | 906:1011 |

Null subcarriers: ±{16, 17, 124, 151, 258, 259, 366, 393, 500, 501, 528, 529, 636, 663, 770, 771, 878, 905, 1012}

<242 RU for New 160 MHz Tone Plan>

TABLE 26

| RU1 | RU2 | RU3 | RU4 |
|---|---|---|---|
| −1012:−771 | −770:−529 | −500:−259 | −258:−17 |
| RU5 | RU6 | RU7 | RU8 |
| 17:258 | 259:500 | 529:770 | 771:1012 |

Null subcarriers: ±{16, 501, 528}

<484 RU for New 160 MHz Tone Plan>

TABLE 27

| RU1 | RU2 | RU3 | RU4 |
|---|---|---|---|
| −1012:−529 | −500:−17 | 17:500 | 529:1012 |

Null subcarriers: ±{16, 501, 528}

<996 RU for New 160 MHz Tone Plan>

TABLE 28

| RU1 | RU2 |
|---|---|
| −1012:−17 | 17:1012 |

Null subcarriers: ±{16}

<2020 or 2018 RU for New 160 MHz Tone Plan>
2020RU: −1012:−3, 3:1012
2018RU: −1012:−4, 4:1012
Null subcarriers: X
Listed below are pilot indices in a case where a 2020/2018 RU is used in full-band transmission, a tone plane of 12G+996RU+1N+13RU+5DC+13RU+1N+996RU+11G is used, and the first configuration for the 996 RU is used.

<26 RU>
±{8 or 10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006}

<106/242/484 RU>
±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006}

<996 RU/Full Band>
1. P996v1: ±{50, 118, 184, 252, 292, 360, 426, 494, 562, 630, 696, 764, 804, 872, 938, 1006}
P2020v1: +{50, 118, 184, 252, 292, 360, 426, 494, 562, 630, 696, 764, 804, 872, 938, 1006}
P2020v2: ±{118, 252, 360, 494, 630, 764, 872, 1006}
P2020v3: ±{50, 184, 292, 426, 562, 696, 804, 938}
2. P996v2: +{24, 92, 158, 226, 266, 334, 400, 468, 536, 604, 670, 738, 778, 846, 912, 980}
P2020v1: ±{24, 92, 158, 226, 266, 334, 400, 468, 536, 604, 670, 738, 778, 846, 912, 980}
P2020v2: ±{92, 226, 334, 468, 604, 738, 846, 980}
P2020v3: ±{24, 158, 266, 400, 536, 670, 778, 912}
3. P996v3: ±{24, 92, 158, 226, 266, 334, 400, 468, 562, 630, 696, 764, 804, 872, 938, 1006}
P2020v1: ±{24, 92, 158, 226, 266, 334, 400, 468, 562, 630, 696, 764, 804, 872, 938, 1006}
P2020v2: ±{92, 226, 334, 468, 630, 764, 872, 1006}
P2020v3: ±{24, 158, 266, 400, 562, 696, 804, 938}
4. P996v4: ±{50, 118, 184, 252, 292, 360, 426, 494, 536, 604, 670, 738, 778, 846, 912, 980}
P2020v1: ±{50, 118, 184, 252, 292, 360, 426, 494, 536, 604, 670, 738, 778, 846, 912, 980}
P2020v2: ±{118, 252, 360, 494, 604, 738, 846, 980}
P2020v3: ±{50, 184, 292, 426, 536, 670, 778, 912}

Pilot indices for a 52/106/242/484/996 RU and the full band are the same as those in the above case where the 2020/2018 RU is used in full-band transmission, the tone plane of 12G+996RU+13RU+7DC+13RU+996RU+11G is used, and the first configuration for the 996 RU is used.

Each RU and an index of a null tone are listed below in a case where 2020/2018RU is used in full band transmission, a tone plan of '12G+996RU+1N+13RU+5DC+13RU+1N+996RU+HG' is used, and the second configuration of 996RU is used.

<26 RU for New 160 MHz Tone Plan>

TABLE 29

| RU1 | RU2 | RU3 | RU4 | RU5 | RU6 | RU7 | RU8 | RU9 |
|---|---|---|---|---|---|---|---|---|
| −1010:−985 | −984:−959 | −956:−931 | −930:−905 | −903:−878 | −876:−851 | −850:−825 | −822:−797 | −796:−771 |

| RU10 | RU11 | RU12 | RU13 | RU14 | RU15 | RU16 | RU17 | RU18 | RU19 |
|---|---|---|---|---|---|---|---|---|---|
| −768:−743 | −742:−717 | −714:−689 | −688:−663 | −661:−636 | −634:−609 | −608:−583 | −580:−555 | −554:−529 | −527:−502 |

TABLE 29-continued

| RU20 | RU21 | RU22 | RU23 | RU24 | RU25 | RU26 | RU27 | RU28 |
|---|---|---|---|---|---|---|---|---|
| −500:−475 | −474:−449 | −446:−421 | −420:−395 | −393:−368 | −366:−341 | −340:−315 | −311:−287 | −286:−261 |

| RU29 | RU30 | RU31 | RU32 | RU33 | RU34 | RU35 | RU36 | RU37 | RU38 |
|---|---|---|---|---|---|---|---|---|---|
| −258:−233 | −232:−207 | −204:−179 | −178:−153 | −151:126 | −124:−99 | −98:−73 | −70:−45 | −44:−19 | 15:−3, 3:15 |

| RU39 | RU40 | RU41 | RU42 | RU43 | RU44 | RU45 | RU46 | RU47 |
|---|---|---|---|---|---|---|---|---|
| 19:44 | 45:70 | 73:98 | 99:124 | 126:151 | 153:178 | 179:204 | 207:232 | 233:258 |

| RU48 | RU49 | RU50 | RU51 | RU52 | RU53 | RU54 | RU55 | RU56 | RU57 |
|---|---|---|---|---|---|---|---|---|---|
| 261:286 | 287:312 | 315:340 | 341:366 | 368:393 | 395:420 | 421:446 | 449:474 | 475:500 | 502:527 |

| RU58 | RU59 | RU60 | RU61 | RU62 | RU63 | RU64 | RU65 | RU66 |
|---|---|---|---|---|---|---|---|---|
| 529:554 | 555:580 | 583:608 | 609:634 | 636:661 | 663:688 | 689:714 | 717:742 | 743:768 |

| RU67 | RU68 | RU69 | RU70 | RU71 | RU72 | RU73 | RU74 | RU75 |
|---|---|---|---|---|---|---|---|---|
| 771:796 | 797:822 | 825:850 | 851:876 | 878:903 | 905:930 | 931:956 | 959:984 | 985:1010 |

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012}

<52 RU for New 160 MHz Tone Plan>

TABLE 30

| RU1 | RU2 | RU3 | RU4 |
|---|---|---|---|
| −1010:−959 | −956:−905 | −876:−825 | −822:−771 |
| RU5 | RU6 | RU7 | RU8 |
| −768:−717 | −714:−663 | −634:−583 | −580:−529 |
| RU9 | RU10 | RU11 | RU12 |
| −500:−449 | −446:−395 | −366:−315 | −312:−261 |
| RU13 | RU14 | RU15 | RU16 |
| −258:−207 | −204:−153 | −124:−73 | −70:−19 |
| RU17 | RU18 | RU19 | RU20 |
| 19:70 | 73:124 | 153:204 | 207:258 |
| RU21 | RU22 | RU23 | RU24 |
| 261:312 | 315:366 | 395:446 | 449:500 |
| RU25 | RU26 | RU27 | RU28 |
| 529:580 | 583:634 | 663:714 | 717:768 |
| RU29 | RU30 | RU31 | RU32 |
| 771:822 | 825:876 | 905:956 | 959:1010 |

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012}

<106 RU for New 160 MHz Tone Plan>

TABLE 31

| RU1 | RU2 | RU3 | RU4 |
|---|---|---|---|
| −1010:−905 | −876:−771 | −768:−663 | −634:−529 |
| RU5 | RU6 | RU7 | RU8 |
| −500:−395 | −366:−261 | −258:−153 | −124:−19 |
| RU9 | RU10 | RU11 | RU12 |
| 19:124 | 153:258 | 261:366 | 395:500 |
| RU13 | RU14 | RU15 | RU16 |
| 529:634 | 663:768 | 771:876 | 905:1010 |

Null subcarriers: ±{16, 17, 18, 125, 152, 259, 260, 367, 394, 501, 528, 635, 662, 769, 770, 877, 904, 1011, 1012}

<242 RU for New 160 MHz Tone Plan>

TABLE 32

| RU1 | RU2 | RU3 | RU4 |
|---|---|---|---|
| −1011:−770 | −769:−528 | −501:−260 | −259:−18 |
| RU5 | RU6 | RU7 | RU8 |
| 18:259 | 260:501 | 528:769 | 770:1011 |

Null subcarriers: ±{16, 17, 1012}

<484 RU for New 160 MHz Tone Plan>

TABLE 33

| RU1 | RU2 | RU3 | RU4 |
|---|---|---|---|
| −1011:−528 | −501:−18 | 18:501 | 528:1011 |

Null subcarriers: ±{16, 17, 1012}

<996 RU for New 160 MHz Tone Plan>

TABLE 34

| RU1 | RU2 |
|---|---|
| −1012:−17 | 17:1012 |

Null subcarriers: ±{16}
<2020 or 2018 RU for New 160 MHz Tone Plan>
2020RU: −1012:−3, 3:1012
2018RU: −1012:−4, 4:1012
Null subcarriers: X Listed below are pilot indices in a case where a 2020/2018 RU is used in full-band transmission, a tone plane of 12G+996RU+1N+13RU+5DC+13RU+1N+996RU+11 G is used, and the second configuration for the 996 RU is used.
<26 RU>
±{8 or 10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004}
<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004}
<106/242/484 RU>
±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004}
<996 RU/Full Band>
1. P996v1: +{50, 118, 184, 252, 292, 360, 426, 494, 560, 628, 694, 762, 802, 870, 936, 1004}
P2020v1: ±{50, 118, 184, 252, 292, 360, 426, 494, 560, 628, 694, 762, 802, 870, 936, 1004}
P2020v2: ±{118, 252, 360, 494, 628, 762, 870, 1004}
P2020v3: ±{50, 184, 292, 426, 560, 694, 802, 936}
2. P996v2: ±{24, 92, 158, 226, 266, 334, 400, 468, 534, 602, 668, 736, 776, 844, 910, 978}
P2020v1: ±{24, 92, 158, 226, 266, 334, 400, 468, 534, 602, 668, 736, 776, 844, 910, 978}
P2020v2: ±{92, 226, 334, 468, 602, 736, 844, 978}
P2020v3: ±{24, 158, 266, 400, 534, 668, 776, 910}
3. P996v3: ±{24, 92, 158, 226, 266, 334, 400, 468, 560, 628, 694, 762, 802, 870, 936, 1004}
P2020v1: ±{24, 92, 158, 226, 266, 334, 400, 468, 560, 628, 694, 762, 802, 870, 936, 1004}
P2020v2: ±{92, 226, 334, 468, 628, 762, 870, 1004}
P2020v3: +{24, 158, 266, 400, 560, 694, 802, 936}
4. P996v4: ±{50, 118, 184, 252, 292, 360, 426, 494, 534, 602, 668, 736, 776, 844, 910, 978}
P2020v1: ±{50, 118, 184, 252, 292, 360, 426, 494, 534, 602, 668, 736, 776, 844, 910, 978}
P2020v2: ±{118, 252, 360, 494, 602, 736, 844, 978}
P2020v3: ±{50, 184, 292, 426, 534, 668, 776, 910}

Pilot indices for a 52/106/242/484/996 RU and the full band are the same as those in the above case where the 2020/2018 RU is used in full-band transmission, the tone plane of 12G+996RU+13RU+7DC+13RU+996RU+11G is used, and the second configuration for the 996 RU is used.

In addition, non-contiguous 80+80 MHz may directly use the existing 11ax tone plan. In this case, each 80 MHz bandwidth may be located within the same band, or may be located at a different band. For example, transmission may be performed by using one 80 MHz bandwidth at a 2.4 GHz band and by using another 80 MHz bandwidth at a 5 GHz band.

2. 320 MHz Tone Plan

A configuration of 320 MHz may consider various options as follows.

Option 1: Combination of Four Existing 11ax 80 MHz Tone Plans

This may be expressed as follows by considering both contiguous and non-contiguous situations.

80+80+80+80 MHz/160+80+80 MHz/80+160+80 MHz/80+80+160 MHz/240+80 MHz/80+240 MHz/320 MHz

+ means non-contiguous, and 160/240/320 manes that 2/3/4 80 MHz tone plans are contiguously arranged in succession.

<In the Presence of Contiguous Band>

When 160 MHz is used, a tone index of a left 80 MHz tone plan is tone index−512 of the existing 80 MHz tone plan, and a tone index of a right 80 MHz tone plan is tone index+512 of the existing 80 MHZ tone plan.

When 240 MHz is used, a tone index of a center 80 MHz tone plan is directly a tone index of the existing 80 MHz tone plan, a tone index of the leftmost 80 MHz tone plan is a tone index−1024 of the existing 80 NHz tone plan, and a tone index of the rightmost 80 MHz tone index is tone index+1024 of the existing 80 MHz tone plan.

When 320 MHz is used, a tone index of a first left 80 MHz tone plan is tone index−1536 of the existing 80 MHz tone plan, a tone index of a second left 80 MHz tone plan is tone index−512 of the existing 80 MHz tone plan, a tone index of a third left 80 MHz tone plan is tone index+512 of the existing 80 MHz tone plan, and a tone index of a fourth left 80 MHz tone plan is tone index+1536 of the existing 80 MHz tone plan.

A pilot subcarrier also needs to be adjusted corresponding to the position. When 160 MHz is used, pilot tone indices in a left 80 MHz tone plan are the pilot tone indices in the conventional 80 MHz tone plan−512, and pilot tone indices in a right 80 MHz tone plan are the pilot tone indices in the conventional 80 MHz tone plan+512.

When 240 MHz is used, pilot tone indices in a middle 80 MHz tone plan are the same pilot tone indices in the conventional 80 MHz tone plan, pilot tone indices in a left 80 MHz tone plan are pilot tone indices in the conventional 80 MHz tone plan−1024, and pilot tone indices in a right 80 MHz tone plan are the pilot tone indices in the conventional 80 MHz tone plan+1024.

When 320 MHz is used, pilot tone indices in a first 80 MHz tone plan are the pilot tone indices in the conventional 80 MHz tone plan−1536, pilot tone indices in a second 80 MHz tone plan are the pilot tone indices in the conventional 80 MHz tone plan−512, pilot tone indices in a third 80 MHz tone plan are the pilot tone indices in the conventional 80 MHz tone plan+512, and pilot tone indices in a fourth 80 MHz tone plan are the pilot tone indices in the conventional 80 MHz tone plan+1536.

The aforementioned various non-contiguous combinations may use not only the same band but also different bands. For example, in 80+160+80 MHz, each 80/160/80 MHz bandwidth may use 2.4 GH/5 GHz/6 GHz band in transmission.

Option 2: Combination of Two New 160 MHz Tone Plans

This may be expressed as follows by considering both contiguous and non-contiguous situations.

160+160 MHz/320 MHz

+ means non-contiguous, and 320 MHz means that two new 160 MHz tone plans are contiguously arranged.

<In the Presence of Contiguous Band>

When 320 MHz is used, a tone index of a left 160 MHz tone plan is tone index−1024 of the new 160 MHz tone plan, and a tone index of a right 160 MHz tone plan is tone index+1024 of the existing 160 MHZ tone plan.

A pilot subcarrier also needs to be adjusted corresponding to the position. When 320 MHz is used, pilot tone indices in a left 160 MHz tone plan are the pilot tone indices in the new 160 MHz tone plan−1024, and pilot tone indices in a right 160 MHz tone plan are the pilot tone indices in the new 160 MHz tone plan+1024.

In the above noncontiguous combination, not only the same band but also different bands may be used. For example, in 160+160 MHz, each 160 MHz bandwidth may be transmitted using a 2.4 GH/5 GHz band.

Option 3: Combination of Two Existing 11Ax 80 MHz Tone Plans and One New 160 MHz This may be expressed as follows by considering both contiguous and non-contiguous situations.

c80+c80+n160 MHz/c80+n160 MHz+c80/n160+c80+c80 MHz/cc160+n160 MHz/n160+cc160 MHz/ncc320 MHz/cnc320 MHz/ccn320 MHz + means non-contiguous, and c80 MHz, cc160 MHz, and n160 MHz respectively mean the existing 11ax 80 MHz tone plan, the existing 11ax successive two 80 MHz tone plans, and a new 160 MHz tone plan. ncc320 MHz/cnc320 MHz/ccn320 MHz mean successive one new 160 MHz tone plan and existing two 1 lax 80 MHz tone plan, and ncc/cnc/ccn denote successive orders of the respective tone plans.

<In the Presence of Contiguous Band>

When cc160 MHz is used, a tone index of a left 80 MHz tone plan is tone index−512 of the existing 80 MHz tone plan, and a tone index of a right 80 MHz is tone index+512 of the existing 80 MHz tone plan.

When ncc320 MHz is used, a tone index of a left 160 MHz tone plan is tone index−1024 of a 160 MHz tone plan, a tone index of a next 80 MHz tone plan is tone index+512 of the existing 80 MHz tone plan, and a tone index of a last 80 MHz tone plan is tone index+1536 of the existing 80 MHz tone plan.

When cnc320 MHz is used, a tone index of a left 80 MHz tone plan is tone index−1536 of the existing 80 MHZ tone plan, a tone index of a center 160 MHz tone plan is directly tone index of the new 160 MHz tone plan, a tone index of a last 80 MHz tone plan is tone index+1536 of the existing 80 MHz tone plan.

When ccn320 MHz is used, a tone index of a left 80 MHz tone plan is tone index−1536, a tone index of a next 80 MHz tone plan is tone index−512 of the existing 80 MHz tone plan, and a tone index of a last 160 MHz tone plan is tone index+1024 of the new 160 MHz tone plan.

A pilot subcarrier also needs to be adjusted corresponding to the position. When cc160 MHz is used, pilot tone indices in a left 80 MHz tone plan are the pilot tone indices in the conventional 80 MHz tone plan−512, and pilot tone indices in a right 80 MHz tone plan are the pilot tone indices in the conventional 80 MHz tone plan+512.

When ncc320 MHz is used, pilot tone indices in a left 160 MHz tone plan are the pilot tone indices in the new 160 MHz tone plan−1024, pilot tone indices in a subsequent 80 MHz tone plan are the pilot tone indices in the conventional 80 MHz tone plan+512, and pilot tone indices in a last 80 MHz tone plan are the pilot tone indices in the conventional 80 MHz tone plan+1536.

When cnc320 MHz is used, pilot tone indices in a left 80 MHz tone plan are the pilot tone indices in the conventional 80 MHz tone plan−1536, pilot tone indices in a middle 160 MHz tone plan are the same pilot tone indices in the new 160 MHz tone plan, and pilot tone indices in a last 80 MHz tone plan are the pilot tone indices in the conventional 80 MHz tone plan+1536.

When ccn320 MHz is used, pilot tone indices in a left 80 MHz tone plan are the pilot tone indices in the conventional 80 MHz tone plan−1536, pilot tone indices in a subsequent 80 MHz tone plan are the pilot tone indices in the conventional 80 MHz tone plan−512, and pilot tone indices in a last 160 MHz tone plan are the pilot tone indices in the new 160 MHz tone plan+1024.

In the above options, various combinations of tone plans having different structures of c80 and n160 may be considered. In this case, an indication as to RU allocation may be very complicated. Therefore, there may be a restriction that only a structure having a specific order is used in order to reduce signaling overhead. For example, only c80+c80+n160 MHz/ccn320 MHz may be used.

In the above various noncontiguous combinations, not only the same band but also different bands may be used. For example, in c80+n160+c80 MHz, each c80/n160/c80

MHz bandwidth may be transmitted using a 2.4 GH/5 GHz/6 GHz band.

Option 4: Alternative 320 MHz Tone Plan Considering Use of One RF

In case of contiguous 320 MHz, a situation where transmission is performed by using one RF may be considered. In this case, 320 MHz constituted by combining 160 MHz or 80 MHz tone plans has many subcarriers which are wasted. Therefore, a new tone plan may be proposed to increase efficiency and throughput of subcarrier in use. Various alternative tone plans are proposed below.

A. Alternative 320 MHz Tone Plan 1

When two 160 MHz tone plans are successive to constitute 320 MHz, 12 left/11 right guard tones are used, and may be directly applied to the alternative 320 MHz tone plan. In addition, when a full band is used in transmission, a new RU may be proposed, and a size of the new RU may be determined by considering various DC tones according to an effect of a DC offset. The number of DC tones of the existing 11ax 80 MHz is 5 or 7, and when this is directly considered, the new RU of the full band is 4068RU or 4066RU.

12/11 guard tone, 5DC, 4068RU (RU subcarrier index: −2036:−3, 3:2036)

12/11 guard tone, 7DC, 4066RU (RU subcarrier index: −2036:−4, 4:2036)

In 320 MHz, considering the effect of the DC offset, it is not preferable that the number of DC tones in use is less than 5/7 which is less than the number of DC tones used in the existing 80 MHz. In addition, 5/7DC may be sufficient in terms of performance. Considering the following OFDMA tone plan using 2020RU described below, up to 7DC may be suitable. The number of DC tones in the OFDMA tone plan is designed by considering 7DC used in the existing 11ax 80 MHz OFDMA tone plan, and it is not preferable that the number of DC tones is less than that, and 7DC may also be sufficient in 320 MHZ in terms of performance.

The OFDMA tone plan can be expressed using the existing 2020RU and 26RU (13+13RU) as follows.

$$12G+2020RU+13RU+7DC+13RU+2020RU+11G$$

The following two configurations are proposed as a 2020RU configuration.

$$2020RU=996RU+1N+26RU+1N+996RU$$

$$2020RU=1N+996RU+26RU+996RU+1N$$

In a first configuration, a null tone is present at both sides of the 26RU so that an effect of interference from/to an adjacent RU can be decreased. In a second configuration, the effect of interference between 996RU and its adjacent RU can be decreased. An RU which uses a small number of subcarriers, such as 26RU, may preferably use the first configuration since interference has significant effect on performance.

The following two configurations are proposed as a 996RU configuration as in the new 160 MHz.

$$996RU=484RU+1N+26RU+1N+484RU$$

$$996RU=1N+484RU+26RU+484RU+1N$$

The 484RU has two 242RU configurations as in the existing 11ax.

$$484RU=242RU+242RU$$

The 242RU has the following configuration as in the existing 11ax.

$$242RU=1N+106RU+1N+26RU+1N+106RU+1N$$

The 106RU has the following configuration as in the existing 11ax.

$$106RU=52RU+2N+52RU$$

The 52RU has the following configuration as in the existing 11ax.

$$52RU=26RU+26RU$$

Listed below are indices for each RU and null tone in a case where a 4066/4068 RU is used in full-band transmission, the first configuration for the 2020 RU is used, and the first configuration for the 996 RU is used.

<26 RU>

TABLE 35

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |
| RU10 | RU11 | RU12 | RU13 | RU14 | RU15 | RU16 | RU17 | RU18 | RU19 |
|---|---|---|---|---|---|---|---|---|---|
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 |
|---|---|---|---|---|---|---|---|---|
| −1523:−1498 | −1497:−1472 | −1469:−1444 | −1443:−1418 | −1416:−1391 | −1389:−1364 | −1363:−1338 | −1335:−1310 | −1309:−1284 |
| RU29 | RU30 | RU31 | RU32 | RU33 | RU34 | RU35 | RU36 | RU37 | RU38 |
|---|---|---|---|---|---|---|---|---|---|
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 |
|---|---|---|---|---|---|---|---|---|
| −1011:−986 | −985:−960 | −957:−932 | −931:−906 | −904:−879 | −877:−852 | −851:−826 | −823:−798 | −797:−772 |
| RU48 | RU49 | RU50 | RU51 | RU52 | RU53 | RU54 | RU55 | RU56 | RU57 |
|---|---|---|---|---|---|---|---|---|---|
| −769:−744 | −743:−718 | −715:−690 | −689:−664 | −662:−637 | −635:−610 | −609:−584 | −581:−556 | −555:−530 | −527:−502 |

TABLE 35-continued

| RU58 | RU59 | RU60 | RU61 | RU62 | RU63 | RU64 | RU65 | RU66 |
|------|------|------|------|------|------|------|------|------|
| −499:−474 | −473:−448 | −445:−420 | −419:−394 | −392:−367 | −365:−340 | −339:−314 | −311:−286 | −285:−260 |

| RU67 | RU68 | RU69 | RU70 | RU71 | RU72 | RU73 | RU74 | RU75 | RU76 |
|------|------|------|------|------|------|------|------|------|------|
| −257:−232 | −231:−206 | −203:−178 | −177:−152 | −150:−125 | −123:−98 | −97:−72 | −69:−44 | −43:−18 | −16:−4, 4:16 | multiplied by −1, that is, 18:43

Null subcarriers: +{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 36

| RU1 | RU2 | RU3 | RU4 |
|-----|-----|-----|-----|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −499:−448 | −445:−394 | −365:−314 | −311:−260 |
| RU29 | RU30 | RU31 | RU32 |
| −257:−206 | −203:−152 | −123:−72 | −69:−18 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 72:123

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 37

| RU1 | RU2 | RU3 | RU4 |
|-----|-----|-----|-----|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −499:−394 | −365:−260 | −257:−152 | −123:−18 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 152:257

Null subcarriers: ±{17, 124, 151, 258, 259, 366, 393, 500, 501, 528, 529, 636, 663, 770, 771, 878, 905, 1012, 1013, 1040, 1041, 1148, 1175, 1282, 1283, 1390, 1417, 1524, 1525, 1552, 1553, 1660, 1687, 1794, 1795, 1902, 1929, 2036}

<242 RU>

TABLE 38

| RU1 | RU2 | RU3 | RU4 |
|-----|-----|-----|-----|
| −2036:−1795 | −1794:−1553 | −1524:−1283 | −1282:−1041 |
| RU5 | RU6 | RU7 | RU8 |
| −1012:−771 | −770:−529 | −500:−259 | −258:−17 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 259:500

Null subcarriers: ±{501, 528, 1013, 1040, 1525, 1552}

<484 RU>

TABLE 39

| RU1 | RU2 | RU3 | RU4 |
|-----|-----|-----|-----|
| −2036:−1553 | −1524:−1041 | −1012:−529 | −500:−17 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 529:1012

Null subcarriers: ±{501, 528, 1013, 1040, 1525, 1552}
<996 RU>

TABLE 40

| RU1 | RU2 | RU3 | RU4 |
|---|---|---|---|
| −2036:−1041 | −1012:−17 | 17:1012 | 1041:2036 |

Null subcarriers: ±{1013, 1040}
<2020 RU>

TABLE 41

| RU1 | RU2 |
|---|---|
| −2036:−17 | 17:2036 |

Null subcarriers: X
<4068 or 4066 RU for New 160 MHz Tone Plan>
4068RU: −2036:−3, 3:2036
4066RU: −2036:−4, 4:2036
Null subcarriers: X Pilot subcarriers may be configured according to these tone plans, subcarrier indices may be unified based on the 26-RU pilot subcarrier indices as in existing 11 ax, and a pilot may be disposed on an even-numbered tone in consideration of a 1×/2×LTF. Further, a pilot subcarrier may be configured using the existing method for a 52/106/242/484 RU, and a subcarrier may be configured with a pilot subcarrier index by the following method in a 996 RU, a 2018/2020 RU, and a full band. For reference, although a 2020 RU is illustrated for convenience in p2020v1 to 3, which are options for a 2018/2020 RU, p2020v1 to 3 are not limited to a 2020 RU but may be equally applied to a 2018 R U. Further, p4096v1 to 3, which are options for the full band, may be equally applied to various RU cases in the full band. That is, in 320 MHz option 4, pilot designs may be defined as follows.
<996 RU>
To select from 484-RU pilots
P996v1: To alternately select from among subcarrier indices having a greater absolute value
P996v2: To alternately select from among subcarrier indices having a smaller absolute value
P996v3: To alternately select from among 996-RU tones from opposite ends to center
P996v4: To alternately select from among 996-RU tones from center to opposite ends
<2018/2020 RU>
To select from 996-RU pilots
P2020v1: To use all 996-RU pilots (double of number of 996-RU pilots)
P2020v2: To alternately select from among edge tones
P2020v3: To alternately select from among DC tones
P2020v4: To alternately select from among 2020-RU tones from opposite ends to center
P2020v5: To alternately select from among 2020-RU tones from center to opposite ends
<Full Band>
To select from 2018/2020-RU pilots
P4096v1: To use all 2020-RU pilots (double of number of 2020-RU pilots)
P4096v2: To alternately select from among edge tones
P4096v3: To alternately select from among DC tones Among the above options, p996v3, p2020v4, and p4096v3 are methods applied to a pilot tone configuration in existing 11ax. If there is no difference in the number of pilots between the options, using p996v3, p2020v4, and p4096v3 may be advantageous in design for unified pilots for extension to a wider band although there is no significant difference in performance in carrier frequency offset (CFO) estimation. Pilot subcarrier indices according to the above tone plans are listed below.
<26 RU>
±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}
<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}
<106/242/484 RU>
±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}
<996 RU/2020 RU/Full Band>
1. P996v1: +{50, 118, 184, 252, 292, 360, 426, 494, 562, 630, 696, 764, 804, 872, 938, 1006, 1074, 1142, 1208, 1276, 1316, 1384, 1450, 1518, 1586, 1654, 1720, 1788, 1828, 1896, 1962, 2030}
1.1. P2020v1: ±{50, 118, 184, 252, 292, 360, 426, 494, 562, 630, 696, 764, 804, 872, 938, 1006, 1074, 1142, 1208, 1276, 1316, 1384, 1450, 1518, 1586, 1654, 1720, 1788, 1828, 1896, 1962, 2030}
P4096v1: ±{50, 118, 184, 252, 292, 360, 426, 494, 562, 630, 696, 764, 804, 872, 938, 1006, 1074, 1142, 1208, 1276, 1316, 1384, 1450, 1518, 1586, 1654, 1720, 1788, 1828, 1896, 1962, 2030}
P4096v2: ±{118, 252, 360, 494, 630, 764, 872, 1006, 1142, 1276, 1384, 1518, 1654, 1788, 1896, 2030}
P4096v3: ±{50, 184, 292, 426, 562, 696, 804, 938, 1074, 1208, 1316, 1450, 1586, 1720, 1828, 1962}
1.2. P2020v2: ±{118, 252, 360, 494, 630, 764, 872, 1006, 1142, 1276, 1384, 1518, 1654, 1788, 1896, 2030}

P4096v1: ±{118, 252, 360, 494, 630, 764, 872, 1006, 1142, 1276, 1384, 1518, 1654, 1788, 1896, 2030}

P4096v2: ±{252, 494, 764, 1006, 1276, 1518, 1788, 2030}

P4096v3: ±{118, 360, 630, 872, 1142, 1384, 1654, 1896}

1.3. P2020v3: ±{50, 184, 292, 426, 562, 696, 804, 938, 1074, 1208, 1316, 1450, 1586, 1720, 1828, 1962}

P4096v1: ±{50, 184, 292, 426, 562, 696, 804, 938, 1074, 1208, 1316, 1450, 1586, 1720, 1828, 1962}

P4096v2: ±{184, 426, 696, 938, 1208, 1450, 1720, 1962}

P4096v3: ±{50, 292, 562, 804, 1074, 1316, 1586, 1828}

1.4. P2020v4: ±{50, 184, 292, 426, 562, 696, 804, 938, 1142, 1276, 1384, 1518, 1654, 1788, 1896, 2030}

P4096v1: ±{50, 184, 292, 426, 562, 696, 804, 938, 1142, 1276, 1384, 1518, 1654, 1788, 1896, 2030}

P4096v2: ±{184, 426, 696, 938, 1276, 1518, 1788, 2030}

P4096v3: ±{50, 292, 562, 804, 1142, 1384, 1654, 1896}

1.5. P2020v5: ±{118, 252, 360, 494, 630, 764, 872, 1006, 1074, 1208, 1316, 1450, 1586, 1720, 1828, 1962}

P4096v1: +{118, 252, 360, 494, 630, 764, 872, 1006, 1074, 1208, 1316, 1450, 1586, 1720, 1828, 1962}

P4096v2: ±{252, 494, 764, 1006, 1208, 1450, 1720, 1962}

P4096v3: ±{118, 360, 630, 872, 1074, 1316, 1586, 1828}

2. P996v2: ±{24, 92, 158, 226, 266, 334, 400, 468, 536, 604, 670, 738, 778, 846, 912, 980, 1048, 1116, 1182, 1250, 1290, 1358, 1424, 1492, 1560, 1628, 1694, 1762, 1802, 1870, 1936, 2004}

2.1. P2020v1: ±{24, 92, 158, 226, 266, 334, 400, 468, 536, 604, 670, 738, 778, 846, 912, 980, 1048, 1116, 1182, 1250, 1290, 1358, 1424, 1492, 1560, 1628, 1694, 1762, 1802, 1870, 1936, 2004}

P4096v1: ±{24, 92, 158, 226, 266, 334, 400, 468, 536, 604, 670, 738, 778, 846, 912, 980, 1048, 1116, 1182, 1250, 1290, 1358, 1424, 1492, 1560, 1628, 1694, 1762, 1802, 1870, 1936, 2004}

P4096v2: ±{92, 226, 334, 468, 604, 738, 846, 980, 1116, 1250, 1358, 1492, 1628, 1762, 1870, 2004}

P4096v3: ±{24, 158, 266, 400, 536, 670, 778, 912, 1048, 1182, 1290, 1424, 1560, 1694, 1802, 1936}

2.2. P2020v2: ±{92, 226, 334, 468, 604, 738, 846, 980, 1116, 1250, 1358, 1492, 1628, 1762, 1870, 2004}

P4096v1: ±{92, 226, 334, 468, 604, 738, 846, 980, 1116, 1250, 1358, 1492, 1628, 1762, 1870, 2004}

P4096v2: ±{226, 468, 738, 980, 1250, 1492, 1762, 2004}

P4096v3: ±{92, 334, 604, 846, 1116, 1358, 1628, 1870}

2.3. P2020v3: ±{24, 158, 266, 400, 536, 670, 778, 912, 1048, 1182, 1290, 1424, 1560, 1694, 1802, 1936}

P4096v1: ±{24, 158, 266, 400, 536, 670, 778, 912, 1048, 1182, 1290, 1424, 1560, 1694, 1802, 1936}

P4096v2: ±{158, 400, 670, 912, 1182, 1424, 1694, 1936}

P4096v3: ±{24, 266, 536, 778, 1048, 1290, 1560, 1802}

2.4. P2020v4: ±{24, 158, 266, 400, 536, 670, 778, 912, 1116, 1250, 1358, 1492, 1628, 1762, 1870, 2004}

P4096v1: ±{24, 158, 266, 400, 536, 670, 778, 912, 1116, 1250, 1358, 1492, 1628, 1762, 1870, 2004}

P4096v2: ±{158, 400, 670, 912, 1250, 1492, 1762, 2004}

P4096v3: ±{24, 266, 536, 778, 1116, 1358, 1628, 1870}

2.5. P2020v5: ±{92, 226, 334, 468, 604, 738, 846, 980, 1048, 1182, 1290, 1424, 1560, 1694, 1802, 1936}

P4096v1: ±{92, 226, 334, 468, 604, 738, 846, 980, 1048, 1182, 1290, 1424, 1560, 1694, 1802, 1936}

P4096v2: ±{226, 468, 738, 980, 1182, 1424, 1694, 1936}

P4096v3: ±{92, 334, 604, 846, 1048, 1290, 1560, 1802}

3. P996v3: ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}

3.1. P2020v1: ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}

P4096v1: ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}

P4096v2: ±{92, 226, 334, 468, 630, 764, 872, 1006, 1116, 1250, 1358, 1492, 1654, 1788, 1896, 2030}

P4096v3: ±{24, 158, 266, 400, 562, 696, 804, 938, 1048, 1182, 1290, 1424, 1586, 1720, 1828, 1962}

3.2. P2020v2: ±{92, 226, 334, 468, 630, 764, 872, 1006, 1116, 1250, 1358, 1492, 1654, 1788, 1896, 2030}

P4096v1: ±{92, 226, 334, 468, 630, 764, 872, 1006, 1116, 1250, 1358, 1492, 1654, 1788, 1896, 2030}

P4096v2: ±{226, 468, 764, 1006, 1250, 1492, 1788, 2030}

P4096v3: ±{92, 334, 630, 872, 1116, 1358, 1654, 1896}

3.3. P2020v3: ±{24, 158, 266, 400, 562, 696, 804, 938, 1048, 1182, 1290, 1424, 1586, 1720, 1828, 1962}

P4096v1: ±{24, 158, 266, 400, 562, 696, 804, 938, 1048, 1182, 1290, 1424, 1586, 1720, 1828, 1962}

P4096v2: ±{158, 400, 696, 938, 1182, 1424, 1720, 1962}

P4096v3: ±{24, 266, 562, 804, 1048, 1290, 1586, 1828}

3.4. P2020v4: ±{24, 158, 266, 400, 562, 696, 804, 938, 1116, 1250, 1358, 1492, 1654, 1788, 1896, 2030}

P4096v1: ±{24, 158, 266, 400, 562, 696, 804, 938, 1116, 1250, 1358, 1492, 1654, 1788, 1896, 2030}

P4096v2: ±{158, 400, 696, 938, 1250, 1492, 1788, 2030}

P4096v3: ±{24, 266, 562, 804, 1116, 1358, 1654, 1896}

3.5. P2020v5: ±{92, 226, 334, 468, 630, 764, 872, 1006, 1048, 1182, 1290, 1424, 1586, 1720, 1828, 1962}

P4096v1: ±{92, 226, 334, 468, 630, 764, 872, 1006, 1048, 1182, 1290, 1424, 1586, 1720, 1828, 1962}

P4096v2: ±{226, 468, 764, 1006, 1182, 1424, 1720, 1962}

P4096v3: ±{92, 334, 630, 872, 1048, 1290, 1586, 1828}

4. P996v4: ±{50, 118, 184, 252, 292, 360, 426, 494, 536, 604, 670, 738, 778, 846, 912, 980, 1074, 1142, 1208, 1276, 1316, 1384, 1450, 1518, 1560, 1628, 1694, 1762, 1802, 1870, 1936, 2004}

4.1. P2020v1: ±{50, 118, 184, 252, 292, 360, 426, 494, 536, 604, 670, 738, 778, 846, 912, 980, 1074, 1142, 1208, 1276, 1316, 1384, 1450, 1518, 1560, 1628, 1694, 1762, 1802, 1870, 1936, 2004}

P4096v1: ±{50, 118, 184, 252, 292, 360, 426, 494, 536, 604, 670, 738, 778, 846, 912, 980, 1074, 1142, 1208, 1276, 1316, 1384, 1450, 1518, 1560, 1628, 1694, 1762, 1802, 1870, 1936, 2004}

P4096v2: ±{118, 252, 360, 494, 604, 738, 846, 980, 1142, 1276, 1384, 1518, 1628, 1762, 1870, 2004}

P4096v3: ±{50, 184, 292, 426, 536, 670, 778, 912, 1074, 1208, 1316, 1450, 1560, 1694, 1802, 1936}

4.2. P2020v2: ±{118, 252, 360, 494, 604, 738, 846, 980, 1142, 1276, 1384, 1518, 1628, 1762, 1870, 2004}

P4096v1: ±{118, 252, 360, 494, 604, 738, 846, 980, 1142, 1276, 1384, 1518, 1628, 1762, 1870, 2004}

P4096v2: ±{252, 494, 738, 980, 1276, 1518, 1762, 2004}

P4096v3: ±{118, 360, 604, 846, 1142, 1384, 1628, 1870}

4.3. P2020v3: ±{50, 184, 292, 426, 536, 670, 778, 912, 1074, 1208, 1316, 1450, 1560, 1694, 1802, 1936}

P4096v1: ±{50, 184, 292, 426, 536, 670, 778, 912, 1074, 1208, 1316, 1450, 1560, 1694, 1802, 1936}

P4096v2: ±{184, 426, 670, 912, 1208, 1450, 1694, 1936}

P4096v3: ±{50, 292, 536, 778, 1074, 1316, 1560, 1802}

4.4. P2020v4: ±{50, 184, 292, 426, 536, 670, 778, 912, 1142, 1276, 1384, 1518, 1628, 1762, 1870, 2004}

P4096v1: ±{50, 184, 292, 426, 536, 670, 778, 912, 1142, 1276, 1384, 1518, 1628, 1762, 1870, 2004}

P4096v2: ±{184, 426, 670, 912, 1276, 1518, 1762, 2004}

P4096v3: ±{50, 292, 536, 778, 1142, 1384, 1628, 1870}

4.5. P2020v5: ±{118, 252, 360, 494, 604, 738, 846, 980, 1074, 1208, 1316, 1450, 1560, 1694, 1802, 1936}

P4096v1: ±{118, 252, 360, 494, 604, 738, 846, 980, 1074, 1208, 1316, 1450, 1560, 1694, 1802, 1936}

P4096v2: ±{252, 494, 738, 980, 1208, 1450, 1694, 1936}

P4096v3: ±{118, 360, 604, 846, 1074, 1316, 1560, 1802}

Listed below are indices for each RU and null tone in a case where a 4066/4068 RU is used in full-band transmission, the first configuration for the 2020 RU is used, and the second configuration for the 996 RU is used.

<26 RU>

TABLE 42

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |
| RU20 | RU21 | RU22 | RU23 | RU24 | RU25 | RU26 | RU27 | RU28 |
| −1524:−1499 | −1498:−1473 | −1470:−1445 | −1444:−1419 | −1417:−1392 | −1390:−1365 | −1364:−1339 | −1336:−1311 | −1310:1285 |
| RU29 | RU30 | RU31 | RU32 | RU33 | RU34 | RU35 | RU36 | RU37 | RU38 |
| −1282:−1257 | −1256:−1231 | −1228:−1203 | −1202:−1177 | −1175:−1150 | −1148:−1123 | −1122:−1097 | −1094:−1069 | −1068:−1043 | −1039:−1014 |
| RU39 | RU40 | RU41 | RU42 | RU43 | RU44 | RU45 | RU46 | RU47 |
| −1010:−985 | −984:−959 | −956:−931 | −930:−905 | −903:−878 | −876:−851 | −850:−825 | −822:−797 | −796:−771 |
| RU48 | RU49 | RU50 | RU51 | RU52 | RU53 | RU54 | RU55 | RU56 | RU57 |
| −768:−743 | −742:−717 | −714:−689 | −688:−663 | −661:−636 | −634:−609 | −608:−583 | −580:−555 | −554:−529 | −527:−502 |
| RU58 | RU59 | RU60 | RU61 | RU62 | RU63 | RU64 | RU65 | RU66 |
| −500:−475 | −474:−449 | −446:−421 | −420:−395 | −393:−368 | −366:−341 | −340:−315 | −312:−287 | −286:−261 |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −16:−4, 4:16 |

→RU 77 to RU 151→ Subcarrier indices for RU 76+x are the same as subcarrier indices for RU 76-x multiplied by −1 (x is a positive integer that is less than or equal to 75)

→Ex) Subcarrier indices for RU 77 are the same as subcarriers indices for RU 75 multiplied by −1, that is, 19:44

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1013, 1040, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<52 RU>

TABLE 43

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1010:−959 | −956:−905 | −876:−825 | −822:−771 |

TABLE 43-continued

| RU21 | RU22 | RU23 | RU24 |
|---|---|---|---|
| −768:−717 | −714:−663 | −634:−583 | −580:−529 |
| RU25 | RU26 | RU27 | RU28 |
| −500:−449 | −446:−395 | −366:−315 | −312:−261 |

TABLE 43-continued

| RU29 | RU30 | RU31 | RU32 |
|---|---|---|---|
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)
→Ex) Subcarrier indices for RU 34 are the same as subcarriers indices for RU 31 multiplied by −1, that is, 73:124
Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1013, 1040, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}
<106 RU>

TABLE 44

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)
→Ex) Subcarrier indices for RU 18 are the same as subcarrier indices for RU 15 multiplied by −1, that is, 153:258
Null subcarriers: ±{17, 18, 125, 152, 259, 260, 367, 394, 501, 528, 635, 662, 769, 770, 877, 904, 1011, 1012, 1013, 1040, 1041, 1042, 1149, 1176, 1283, 1284, 1391, 1418, 1525, 1552, 1659, 1686, 1793, 1794, 1901, 1928, 2035, 2036}
<242 RU>

TABLE 45

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1011:−770 | −769:−528 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 260:501
Null subcarriers: ±{17, 1012, 1013, 1040, 1041, 2036}

<484 RU>

TABLE 46

| RU1 | RU2 | RU3 | RU4 |
|---|---|---|---|
| −2035:−1552 | −1525:−1042 | −1011:−528 | −501:−18 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 528:1011
Null subcarriers: ±{17, 1012, 1013, 1040, 1041, 2036}
<996 RU>

TABLE 47

| RU1 | RU2 | RU3 | RU4 |
|---|---|---|---|
| −2036:−1041 | −1012:−17 | 17:1012 | 1041:2036 |

Null subcarriers: ±{1013, 1040}
<2020 RU>

TABLE 48

| RU1 | RU2 |
|---|---|
| −2036:−17 | 17:2036 |

Null subcarriers: X
<4068 or 4066 RU for New 160 MHz tone plan>
4068RU: −2036:−3, 3:2036
4066RU: −2036:−4, 4:2036
Null subcarriers: X
Pilot subcarrier indices according to the above tone plans are listed below.
<26 RU>
±{10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004, 1020, 1034, 1048, 1062, 1074, 1088, 1102, 1116, 1128, 1142, 1156, 1170, 1182, 1196, 1208, 1222, 1236, 1250, 1262, 1276, 1290, 1304, 1316, 1330, 1344, 1358, 1370, 1384, 1398, 1412, 1424, 1438, 1450, 1464, 1478, 1492, 1504, 1518, 1532, 1546, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}
<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>

±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}

1.1. P2020v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}

P4096v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}

P4096v2: ±{118, 252, 360, 494, 628, 762, 870, 1004, 1142, 1276, 1384, 1518, 1652, 1786, 1894, 2028}

P4096v3: ±{50, 184, 292, 426, 560, 694, 802, 936, 1074, 1208, 1316, 1450, 1584, 1718, 1826, 1960}

1.2. P2020v2: ±{118, 252, 360, 494, 628, 762, 870, 1004, 1142, 1276, 1384, 1518, 1652, 1786, 1894, 2028}

P4096v1: ±{118, 252, 360, 494, 628, 762, 870, 1004, 1142, 1276, 1384, 1518, 1652, 1786, 1894, 2028}

P4096v2: ±{252, 494, 762, 1004, 1276, 1518, 1786, 2028}

P4096v3: ±{118, 360, 628, 870, 1142, 1384, 1652, 1894}

1.3. P2020v3: ±{50, 184, 292, 426, 560, 694, 802, 936, 1074, 1208, 1316, 1450, 1584, 1718, 1826, 1960}

P4096v1: ±{50, 184, 292, 426, 560, 694, 802, 936, 1074, 1208, 1316, 1450, 1584, 1718, 1826, 1960}

P4096v2: ±{184, 426, 694, 936, 1208, 1450, 1718, 1960}

P4096v3: ±{50, 292, 562, 802, 1074, 1316, 1584, 1826}

1.4. P2020v4: ±{50, 184, 292, 426, 560, 694, 802, 936, 1142, 1276, 1384, 1518, 1652, 1786, 1894, 2028}

P4096v1: ±{50, 184, 292, 426, 560, 694, 802, 936, 1142, 1276, 1384, 1518, 1652, 1786, 1894, 2028}

P4096v2: ±{184, 426, 694, 936, 1276, 1518, 1786, 2028}

P4096v3: ±{50, 292, 560, 802, 1142, 1384, 1652, 1894}

1.5. P2020v5: ±{118, 252, 360, 494, 628, 762, 870, 1004, 1074, 1208, 1316, 1450, 1584, 1718, 1826, 1960}

P4096v1: ±{118, 252, 360, 494, 628, 762, 870, 1004, 1074, 1208, 1316, 1450, 1584, 1718, 1826, 1960}

P4096v2: ±{252, 494, 762, 1004, 1208, 1450, 1718, 1960}

P4096v3: ±{118, 360, 628, 870, 1074, 1316, 1584, 1826}

<996 RU/2020 RU/Full Band>

2. P996v2: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}

2.1. P2020v1: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}

P4096v1: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}

P4096v2: ±{92, 226, 334, 468, 602, 736, 844, 978, 1116, 1250, 1358, 1492, 1626, 1760, 1868, 2002}

P4096v3: ±{24, 158, 266, 400, 534, 668, 776, 910, 1048, 1182, 1290, 1424, 1558, 1692, 1800, 1934}

2.2. P2020v2: ±{92, 226, 334, 468, 602, 736, 844, 978, 1116, 1250, 1358, 1492, 1626, 1760, 1868, 2002}

P4096v1: ±{92, 226, 334, 468, 602, 736, 844, 978, 1116, 1250, 1358, 1492, 1626, 1760, 1868, 2002}

P4096v2: ±{226, 468, 736, 978, 1250, 1492, 1760, 2002}

P4096v3: ±{92, 334, 602, 844, 1116, 1358, 1626, 1868}

2.3. P2020v3: ±{24, 158, 266, 400, 534, 668, 776, 910, 1048, 1182, 1290, 1424, 1558, 1692, 1800, 1934}

P4096v1: ±{24, 158, 266, 400, 534, 668, 776, 910, 1048, 1182, 1290, 1424, 1558, 1692, 1800, 1934}

P4096v2: ±{158, 400, 668, 910, 1182, 1424, 1692, 1934}

P4096v3: ±{24, 266, 534, 776, 1048, 1290, 1558, 1800}

2.4. P2020v4: ±{24, 158, 266, 400, 534, 668, 776, 910, 1116, 1250, 1358, 1492, 1626, 1760, 1868, 2002}

P4096v1: ±{24, 158, 266, 400, 534, 668, 776, 910, 1116, 1250, 1358, 1492, 1626, 1760, 1868, 2002}

P4096v2: ±{158, 400, 668, 910, 1250, 1492, 1760, 2002}

P4096v3: ±{24, 266, 534, 776, 1116, 1358, 1626, 1868}

2.5. P2020v5: ±{92, 226, 334, 468, 602, 736, 844, 978, 1048, 1182, 1290, 1424, 1558, 1692, 1800, 1934}

P4096v1: ±{92, 226, 334, 468, 602, 736, 844, 978, 1048, 1182, 1290, 1424, 1558, 1692, 1800, 1934}

P4096v2: ±{226, 468, 736, 978, 1182, 1424, 1692, 1934}

P4096v3: ±{92, 334, 602, 844, 1048, 1290, 1558, 1800}

<996 RU/2020 RU/Full Band>

3. P996v3: ±{24, 92, 158, 226, 266, 334, 400, 468, 560, 628, 694, 762, 802, 870, 936, 1004, 1048, 1116, 1182, 1250, 1290, 1358, 1424, 1492, 1584, 1652, 1718, 1786, 1826, 1894, 1960, 2028}

3.1. P2020v1: ±{24, 92, 158, 226, 266, 334, 400, 468, 560, 628, 694, 762, 802, 870, 936, 1004, 1048, 1116, 1182, 1250, 1290, 1358, 1424, 1492, 1584, 1652, 1718, 1786, 1826, 1894, 1960, 2028}

P4096v1: ±{24, 92, 158, 226, 266, 334, 400, 468, 560, 628, 694, 762, 802, 870, 936, 1004, 1048, 1116, 1182, 1250, 1290, 1358, 1424, 1492, 1584, 1652, 1718, 1786, 1826, 1894, 1960, 2028}

P4096v2: ±{92, 226, 334, 468, 628, 762, 870, 1004, 1116, 1250, 1358, 1492, 1652, 1786, 1894, 2028}

P4096v3: ±{24, 158, 266, 400, 560, 694, 802, 936, 1048, 1182, 1290, 1424, 1584, 1718, 1826, 1960}

3.2. P2020v2: ±{92, 226, 334, 468, 628, 762, 870, 1004, 1116, 1250, 1358, 1492, 1652, 1786, 1894, 2028}

P4096v1: ±{92, 226, 334, 468, 628, 762, 870, 1004, 1116, 1250, 1358, 1492, 1652, 1786, 1894, 2028}

P4096v2: ±{226, 468, 762, 1004, 1250, 1492, 1786, 2028}

P4096v3: ±{92, 334, 628, 870, 1116, 1358, 1652, 1894}

3.3. P2020v3: ±{24, 158, 266, 400, 560, 694, 802, 936, 1048, 1182, 1290, 1424, 1584, 1718, 1826, 1960}

P4096v1: ±{24, 158, 266, 400, 560, 694, 802, 936, 1048, 1182, 1290, 1424, 1584, 1718, 1826, 1960}

P4096v2: ±{158, 400, 694, 936, 1182, 1424, 1718, 1960}

P4096v3: ±{24, 266, 560, 802, 1048, 1290, 1584, 1826}

3.4. P2020v4: ±{24, 158, 266, 400, 560, 694, 802, 936, 1116, 1250, 1358, 1492, 1652, 1786, 1894, 2028}

P4096v1: ±{24, 158, 266, 400, 560, 694, 802, 936, 1116, 1250, 1358, 1492, 1652, 1786, 1894, 2028}

P4096v2: ±{158, 400, 694, 936, 1250, 1492, 1786, 2028}

P4096v3: ±{24, 266, 560, 802, 1116, 1358, 1652, 1894}

3.5. P2020v5: ±{92, 226, 334, 468, 628, 762, 870, 1004, 1048, 1182, 1290, 1424, 1584, 1718, 1826, 1960}

P4096v1: ±{92, 226, 334, 468, 628, 762, 870, 1004, 1048, 1182, 1290, 1424, 1584, 1718, 1826, 1960}

P4096v2: ±{226, 468, 762, 1004, 1182, 1424, 1718, 1960}

P4096v3: ±{92, 334, 628, 870, 1048, 1290, 1584, 1826}

<996 RU/2020 RU/Full Band>

4. P996v4: ±{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}

4.1. P2020v1: +{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}

P4096v1: ±{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}

P4096v2: ±{118, 252, 360, 494, 602, 736, 844, 978, 1142, 1276, 1384, 1518, 1626, 1760, 1868, 2002}

P4096v3: ±{50, 184, 292, 426, 534, 668, 776, 910, 1074, 1208, 1316, 1450, 1558, 1692, 1800, 1934}

4.2. P2020v2: ±{118, 252, 360, 494, 602, 736, 844, 978, 1142, 1276, 1384, 1518, 1626, 1760, 1868, 2002}

P4096v1: ±{118, 252, 360, 494, 602, 736, 844, 978, 1142, 1276, 1384, 1518, 1626, 1760, 1868, 2002}

P4096v2: ±{252, 494, 736, 978, 1276, 1518, 1760, 2002}

P4096v3: ±{118, 360, 602, 844, 1142, 1384, 1626, 1868}

4.3. P2020v3: ±{50, 184, 292, 426, 534, 668, 776, 910, 1074, 1208, 1316, 1450, 1558, 1692, 1800, 1934}

P4096v1: ±{50, 184, 292, 426, 534, 668, 776, 910, 1074, 1208, 1316, 1450, 1558, 1692, 1800, 1934}

P4096v2: ±{184, 426, 668, 910, 1208, 1450, 1692, 1934}

P4096v3: ±{50, 292, 534, 776, 1074, 1316, 1558, 1800}

4.4. P2020v4: ±{50, 184, 292, 426, 534, 668, 776, 910, 1142, 1276, 1384, 1518, 1626, 1760, 1868, 2002}

P4096v1: ±{50, 184, 292, 426, 534, 668, 776, 910, 1142, 1276, 1384, 1518, 1626, 1760, 1868, 2002}

P4096v2: ±{184, 426, 668, 910, 1276, 1518, 1760, 2002}

P4096v3: ±{50, 292, 534, 776, 1142, 1384, 1626, 1868}

4.5. P2020v5: ±{118, 252, 360, 494, 602, 736, 844, 978, 1074, 1208, 1316, 1450, 1558, 1692, 1800, 1934}

P4096v1: ±{118, 252, 360, 494, 602, 736, 844, 978, 1074, 1208, 1316, 1450, 1558, 1692, 1800, 1934}

P4096v2: ±{252, 494, 736, 978, 1208, 1450, 1692, 1934}

P4096v3: ±{118, 360, 602, 844, 1074, 1316, 1558, 1800}

Listed below are indices for each RU and null tone in a case where a 4066/4068 RU is used in full-band transmission, the second configuration for the 2020 RU is used, and the first configuration for the 996 RU is used.

<26 RU>

TABLE 49

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |

| RU10 | RU11 | RU12 | RU13 | RU14 | RU15 | RU16 | RU17 | RU18 | RU19 |
|---|---|---|---|---|---|---|---|---|---|
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |

| RU20 | RU21 | RU22 | RU23 | RU24 | RU25 | RU26 | RU27 | RU28 |
|---|---|---|---|---|---|---|---|---|
| −1522:−1497 | −1496:−1471 | −1468:−1443 | −1442:−1417 | −1415:−1390 | −1388:−1363 | −1362:−1337 | −1334:−1309 | −1308:−1283 |

| RU29 | RU30 | RU31 | RU32 | RU33 | RU34 | RU35 | RU36 | RU37 | RU38 |
|---|---|---|---|---|---|---|---|---|---|
| −1280:−1255 | −1254:−1229 | −1226:−1201 | −1200:−1175 | −1173:−1148 | −1146:−1121 | −1120:−1095 | −1092:−1067 | −1066:−1041 | −1039:−1014 |

| RU39 | RU40 | RU41 | RU42 | RU43 | RU44 | RU45 | RU46 | RU47 |
|---|---|---|---|---|---|---|---|---|
| −1012:−987 | −986:−961 | −958:−933 | −932:−907 | −905:−880 | −878:−853 | −852:−827 | −824:−799 | −798:−773 |

| RU48 | RU49 | RU50 | RU51 | RU52 | RU53 | RU54 | RU55 | RU56 | RU57 |
|---|---|---|---|---|---|---|---|---|---|
| −770:−745 | −744:−719 | −716:−691 | −690:−665 | −663:−638 | −636:−611 | −610:−585 | −582:−557 | −556:−531 | −528:−503 |

| RU58 | RU59 | RU60 | RU61 | RU62 | RU63 | RU64 | RU65 | RU66 |
|---|---|---|---|---|---|---|---|---|
| −500:−475 | −474:−449 | −446:−421 | −420:−395 | −393:−368 | −366:−341 | −340:−315 | −312:−287 | −286:−261 |

| RU67 | RU68 | RU69 | RU70 | RU71 | RU72 | RU73 | RU74 | RU75 | RU76 |
|---|---|---|---|---|---|---|---|---|---|
| −258:−233 | −232:−207 | −204:−179 | −178:−153 | −151:−126 | −124:−99 | −98:−73 | −70:−45 | −44:−19 | −16:−4, 4:16 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarriers indices for RU 75 multiplied by −1, that is, 19:44

Null subcarriers: ±{17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035, 2036}

<52 RU>

TABLE 50

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |

TABLE 50-continued

| RU13 | RU14 | RU15 | RU16 |
|---|---|---|---|
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarriers indices for RU 31 multiplied by −1, that is, 73:124

Null subcarriers: ±{17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035, 2036}

<106 RU>

TABLE 51

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 153:258

Null subcarriers: ±{17, 18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035, 2036}

<242 RU>

TABLE 52

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 260:501

Null subcarriers: ±{17, 502, 529, 1524, 1551, 2036}

<484 RU>

TABLE 53

| RU1 | RU2 | RU3 | RU4 |
|---|---|---|---|
| −2035:−1552 | −1523:−1040 | −1013:−530 | −501:−18 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 530:1013

Null subcarriers: ±{17, 502, 529, 1524, 1551, 2036}

<996 RU>

TABLE 54

| RU1 | RU2 | RU3 | RU4 |
|---|---|---|---|
| −2035:−1040 | −1013:−18 | 18:1013 | 1040:2035 |

Null subcarriers: ±{17, 2036}

<2020 RU>

TABLE 55

| RU1 | RU2 |
|---|---|
| −2036:−17 | 17:2036 |

Null subcarriers: X

<4068 or 4066 RU for New 160 MHz tone plan>
4068RU: −2036:−3, 3:2036
4066RU: −2036:−4, 4:2036
Null subcarriers: X
Pilot subcarrier indices according to the above tone plans are listed below.

<26 RU>
±{10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

<52 RU>

±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>

±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1046, 1072, 1114, 1140, 1180, 1206, 1248, 1274, 1288, 1314, 1356, 1382, 1422, 1448, 1490, 1516, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

1.1. P2020v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

P4096v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

P4096v2: +{118, 252, 360, 494, 630, 764, 872, 1006, 1140, 1274, 1382, 1516, 1652, 1786, 1894, 2028}

P4096v3: ±{50, 184, 292, 426, 562, 696, 804, 938, 1072, 1206, 1314, 1448, 1584, 1718, 1826, 1960}

1.2. P2020v2: ±{118, 252, 360, 494, 630, 764, 872, 1006, 1140, 1274, 1382, 1516, 1652, 1786, 1894, 2028}

P4096v1: ±{118, 252, 360, 494, 630, 764, 872, 1006, 1140, 1274, 1382, 1516, 1652, 1786, 1894, 2028}

P4096v2: ±{252, 494, 764, 1006, 1274, 1516, 1786, 2028}

P4096v3: +018, 360, 630, 872, 1140, 1382, 1652, 18941

1.3. P2020v3: ±{50, 184, 292, 426, 562, 696, 804, 938, 1072, 1206, 1314, 1448, 1584, 1718, 1826, 1960}

P4096v1: ±{50, 184, 292, 426, 562, 696, 804, 938, 1072, 1206, 1314, 1448, 1584, 1718, 1826, 1960}

P4096v2: ±{184, 426, 696, 938, 1206, 1448, 1718, 1960}

P4096v3: ±{50, 292, 562, 804, 1072, 1314, 1584, 1826}

1.4. P2020v4: ±{50, 184, 292, 426, 562, 696, 804, 938, 1140, 1274, 1382, 1516, 1652, 1786, 1894, 2028}

P4096v1: ±{50, 184, 292, 426, 562, 696, 804, 938, 1140, 1274, 1382, 1516, 1652, 1786, 1894, 2028}

P4096v2: ±{184, 426, 696, 938, 1274, 1516, 1786, 2028}

P4096v3: ±{50, 292, 562, 804, 1140, 1382, 1652, 1894}

1.5. P2020v5: ±{118, 252, 360, 494, 630, 764, 872, 1006, 1072, 1206, 1314, 1448, 1584, 1718, 1826, 1960}

P4096v1: ±{118, 252, 360, 494, 630, 764, 872, 1006, 1072, 1206, 1314, 1448, 1584, 1718, 1826, 1960}

P4096v2: ±{252, 494, 764, 1006, 1206, 1448, 1718, 1960}

P4096v3: ±{118, 360, 630, 872, 1072, 1314, 1584, 1826}

<996 RU/2020 RU/Full Band>

2. P996v2: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

2.1. P2020v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

P4096v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

P4096v2: ±{92, 226, 334, 468, 604, 738, 846, 980, 1114, 1248, 1356, 1490, 1626, 1760, 1868, 2002}

P4096v3: ±{24, 158, 266, 400, 536, 670, 778, 912, 1046, 1180, 1288, 1422, 1558, 1692, 1800, 1934}

2.2. P2020v2: ±{92, 226, 334, 468, 604, 738, 846, 980, 1114, 1248, 1356, 1490, 1626, 1760, 1868, 2002}

P4096v1: ±{92, 226, 334, 468, 604, 738, 846, 980, 1114, 1248, 1356, 1490, 1626, 1760, 1868, 2002}

P4096v2: ±{226, 468, 738, 980, 1248, 1490, 1760, 2002}

P4096v3: ±{92, 334, 604, 846, 1114, 1356, 1626, 1868}

2.3. P2020v3: ±{24, 158, 266, 400, 536, 670, 778, 912, 1046, 1180, 1288, 1422, 1558, 1692, 1800, 1934}

P4096v1: ±{24, 158, 266, 400, 536, 670, 778, 912, 1046, 1180, 1288, 1422, 1558, 1692, 1800, 1934}

P4096v2: ±{158, 400, 670, 912, 1180, 1422, 1692, 1934}

P4096v3: ±{24, 266, 536, 778, 1046, 1288, 1558, 1800}

2.4. P2020v4: +{24, 158, 266, 400, 536, 670, 778, 912, 1114, 1248, 1356, 1490, 1626, 1760, 1868, 2002}

P4096v1: +{24, 158, 266, 400, 536, 670, 778, 912, 1114, 1248, 1356, 1490, 1626, 1760, 1868, 2002}

P4096v2: +{158, 400, 670, 912, 1248, 1490, 1760, 2002}

P4096v3: +{24, 266, 536, 778, 1114, 1356, 1626, 1868}

2.5. P2020v5: ±{92, 226, 334, 468, 604, 738, 846, 980, 1046, 1180, 1288, 1422, 1558, 1692, 1800, 1934}

P4096v1: +{92, 226, 334, 468, 604, 738, 846, 980, 1046, 1180, 1288, 1422, 1558, 1692, 1800, 1934}

P4096v2: +{226, 468, 738, 980, 1180, 1422, 1692, 1934}

P4096v3: ±{92, 334, 604, 846, 1046, 1288, 1558, 1800}

<996 RU/2020 RU/Full Band>

3. P996v3: +{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

3.1. P2020v1: +{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v2: ±{92, 226, 334, 468, 630, 764, 872, 1006, 1114, 1248, 1356, 1490, 1652, 1786, 1894, 2028}

P4096v3: ±{24, 158, 266, 400, 562, 696, 804, 938, 1046, 1180, 1288, 1422, 1584, 1718, 1826, 1960}

3.2. P2020v2: ±{92, 226, 334, 468, 630, 764, 872, 1006, 1114, 1248, 1356, 1490, 1652, 1786, 1894, 2028}

P4096v1: ±{92, 226, 334, 468, 630, 764, 872, 1006, 1114, 1248, 1356, 1490, 1652, 1786, 1894, 2028}

P4096v2: ±{226, 468, 764, 1006, 1248, 1490, 1786, 2028}

P4096v3: ±{92, 334, 630, 872, 1114, 1356, 1652, 1894}

3.3. P2020v3: ±{24, 158, 266, 400, 562, 696, 804, 938, 1046, 1180, 1288, 1422, 1584, 1718, 1826, 1960}

P4096v1: ±{24, 158, 266, 400, 562, 696, 804, 938, 1046, 1180, 1288, 1422, 1584, 1718, 1826, 1960}

P4096v2: ±{158, 400, 696, 938, 1180, 1422, 1718, 1960}

P4096v3: ±{24, 266, 562, 804, 1046, 1288, 1584, 1826}

3.4. P2020v4: ±{24, 158, 266, 400, 562, 696, 804, 938, 1114, 1248, 1356, 1490, 1652, 1786, 1894, 2028}

P4096v1: ±{24, 158, 266, 400, 562, 696, 804, 938, 1114, 1248, 1356, 1490, 1652, 1786, 1894, 2028}

P4096v2: ±{158, 400, 696, 938, 1248, 1490, 1786, 2028}

P4096v3: ±{24, 266, 562, 804, 1114, 1356, 1652, 1894}

3.5. P2020v5: ±{92, 226, 334, 468, 630, 764, 872, 1006, 1046, 1180, 1288, 1422, 1584, 1718, 1826, 1960}

P4096v1: ±{92, 226, 334, 468, 630, 764, 872, 1006, 1046, 1180, 1288, 1422, 1584, 1718, 1826, 1960}

P4096v2: ±{226, 468, 764, 1006, 1180, 1422, 1718, 1960}

P4096v3: ±{92, 334, 630, 872, 1046, 1288, 1584, 1826}

<996 RU/2020 RU/Full Band>

4. P996v4: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

4.1. P2020v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v2: ±{118, 252, 360, 494, 604, 738, 846, 980, 1140, 1274, 1382, 1516, 1626, 1760, 1868, 2002}

P4096v3: ±{50, 184, 292, 426, 536, 670, 778, 912, 1072, 1206, 1314, 1448, 1558, 1692, 1800, 1934}

4.2. P2020v2: ±{118, 252, 360, 494, 604, 738, 846, 980, 1140, 1274, 1382, 1516, 1626, 1760, 1868, 2002}

P4096v1: ±{118, 252, 360, 494, 604, 738, 846, 980, 1140, 1274, 1382, 1516, 1626, 1760, 1868, 2002}

P4096v2: ±{252, 494, 738, 980, 1274, 1516, 1760, 2002}

P4096v3: ±{118, 360, 604, 846, 1140, 1382, 1626, 1868}

4.3. P2020v3: ±{50, 184, 292, 426, 536, 670, 778, 912, 1072, 1206, 1314, 1448, 1558, 1692, 1800, 1934}

P4096v1: ±{50, 184, 292, 426, 536, 670, 778, 912, 1072, 1206, 1314, 1448, 1558, 1692, 1800, 1934}

P4096v2: ±{184, 426, 670, 912, 1206, 1448, 1692, 1934}

P4096v3: ±{50, 292, 536, 778, 1072, 1314, 1558, 1800}

4.4. P2020v4: ±{50, 184, 292, 426, 536, 670, 778, 912, 1140, 1274, 1382, 1516, 1626, 1760, 1868, 2002}

P4096v1: ±{50, 184, 292, 426, 536, 670, 778, 912, 1140, 1274, 1382, 1516, 1626, 1760, 1868, 2002}

P4096v2: ±{184, 426, 670, 912, 1274, 1516, 1760, 2002}

P4096v3: ±{50, 292, 536, 778, 1140, 1382, 1626, 1868}

4.5. P2020v5: ±{118, 252, 360, 494, 604, 738, 846, 980, 1072, 1206, 1314, 1448, 1558, 1692, 1800, 1934}

P4096v1: ±{118, 252, 360, 494, 604, 738, 846, 980, 1072, 1206, 1314, 1448, 1558, 1692, 1800, 1934}

P4096v2: ±{252, 494, 738, 980, 1206, 1448, 1692, 1934}

P4096v3: ±{118, 360, 604, 846, 1072, 1314, 1558, 1800}

Listed below are indices for each RU and null tone in a case where a 4066/4068 RU is used in full-band transmission, the second configuration for the 2020 RU is used, and the second configuration for the 996 RU is used.

<26 RU>

TABLE 56

| RU1 | RU2 | RU3 | RU4 | RU5 | RU6 | RU7 | RU8 | RU9 |
|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 |

| RU10 | RU11 | RU12 | RU13 | RU14 | RU15 | RU16 | RU17 | RU18 | RU19 |
|---|---|---|---|---|---|---|---|---|---|
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |

| RU20 | RU21 | RU22 | RU23 | RU24 | RU25 | RU26 | RU27 | RU28 |
|---|---|---|---|---|---|---|---|---|
| −1523:−1498 | −1497:−1472 | −1469:−1444 | −1443:−1418 | −1416:−1391 | −1389:−1364 | −1363:−1338 | −1335:−1310 | −1309:−1284 |

| RU29 | RU30 | RU31 | RU32 | RU33 | RU34 | RU35 | RU36 | RU37 | RU38 |
|---|---|---|---|---|---|---|---|---|---|
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |

| RU39 | RU40 | RU41 | RU42 | RU43 | RU44 | RU45 | RU46 | RU47 |
|---|---|---|---|---|---|---|---|---|
| −1011:−986 | −985:−960 | −957:−932 | −931:−906 | −904:−879 | −877:−852 | −851:−826 | −823:−798 | −797:−772 |

| RU48 | RU49 | RU50 | RU51 | RU52 | RU53 | RU54 | RU55 | RU56 | RU57 |
|---|---|---|---|---|---|---|---|---|---|
| −769:−744 | −743:−718 | −715:−690 | −689:−664 | −662:−637 | −635:−610 | −609:−584 | −581:−556 | −555:−530 | −528:−503 |

| RU58 | RU59 | RU60 | RU61 | RU62 | RU63 | RU64 | RU65 | RU66 |
|---|---|---|---|---|---|---|---|---|
| −501:−476 | −475:−450 | −447:−422 | −421:−396 | −394:−369 | −367:−342 | −341:−316 | −313:−288 | −287:−262 |

| RU67 | RU68 | RU69 | RU70 | RU71 | RU72 | RU73 | RU74 | RU75 | RU76 |
|---|---|---|---|---|---|---|---|---|---|
| −259:−234 | −233:−208 | −205:−180 | −179:−154 | −152:−127 | −125:−100 | −99:−74 | −71:−46 | −45:−20 | −16:−4, 4:16 |

→RU 77 to RU 151→ Subcarrier indices for RU 76+x are the same as subcarrier indices for RU 76-x multiplied by −1 (x is a positive integer that is less than or equal to 75)

→Ex) Subcarrier indices for RU 77 are the same as subcarriers indices for RU 75 multiplied by −1, that is, 20:45

Null subcarriers: ±{17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035, 2036}
<52 RU>

TABLE 57

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU 33 to RU 64→ Subcarrier indices for RU 32+x are the same as subcarrier indices for RU 33-x multiplied by −1 (x is a positive integer that is less than or equal to 32)
→Ex) Subcarrier indices for RU 34 are the same as subcarriers indices for RU 31 multiplied by −1, that is, 74:125
Null subcarriers: ±{17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035, 2036}
<106 RU>

TABLE 58

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −501:−396 | −367:−262 | −259:−154 | −125:−20 |

→RU 17 to RU 32→ Subcarrier indices for RU 16+x are the same as subcarrier indices for RU 17-x multiplied by −1 (x is a positive integer that is less than or equal to 16)
→Ex) Subcarrier indices for RU 18 are the same as subcarriers indices for RU 15 multiplied by −1, that is, 154:259
Null subcarriers: ±{17, 18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035, 2036}
<242 RU>

TABLE 59

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1012:−771 | −770:−529 | −502:−261 | −260:−19 |

→RU 9 to RU 16→ Subcarrier indices for RU 8+x are the same as subcarrier indices for RU 9-x subcarrier index multiplied by −1 (x is a positive integer that is less than or equal to 8)
→Ex) Subcarrier indices for RU 10 are the same as subcarrier indices for RU 7 multiplied by −1, that is, 261:502
Null subcarriers: ±{17, 18, 1013, 1040, 2035, 2036}
<484 RU>

TABLE 60

| RU1 | RU2 | RU3 | RU4 |
|---|---|---|---|
| −2034:−1551 | −1524:−1041 | −1012:−529 | −502:−19 |

→RU 5 to RU 8→ Subcarrier indices for RU 4+x are the same as subcarrier indices for RU 5-x multiplied by −1 (x is a positive integer that is less than or equal to 4)
→Ex) Subcarrier indices for RU 6 are the same as subcarrier indices for RU 3 multiplied by −1, that is, 529:1012
Null subcarriers: ±{17, 18, 1013, 1040, 2035, 2036}
<996 RU>

TABLE 61

| RU1 | RU2 | RU3 | RU4 |
|---|---|---|---|
| −2035:−1040 | −1013:−18 | 18:1013 | 1040:2035 |

Null subcarriers: ±{17, 2036}
<2020 RU>

TABLE 62

| RU1 | RU2 |
|---|---|
| −2036:−17 | 17:2036 |

Null subcarriers: X
<4068 or 4066 RU for New 160 MHz Tone Plan>
4068RU: −2036:−3, 3:2036
4066RU: −2036:−4, 4:2036
Null subcarriers: X
Pilot subcarrier indices according to the above tone plans are listed below.
<26 RU>
±{10, 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1530, 1544, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}

<52 RU>

±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>

±{26, 52, 94, 120, 160, 186, 228, 254, 268, 294, 336, 362, 402, 428, 470, 496, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

1.1. P2020v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v2: +{120, 254, 362, 496, 630, 764, 872, 1006, 1142, 1276, 1384, 1518, 1652, 1786, 1894, 2028}

P4096v3: ±{52, 186, 294, 428, 562, 696, 804, 938, 1074, 1208, 1316, 1450, 1584, 1718, 1826, 1960}

1.2. P2020v2: ±{120, 254, 362, 496, 630, 764, 872, 1006, 1142, 1276, 1384, 1518, 1652, 1786, 1894, 2028}

P4096v1: ±{120, 254, 362, 496, 630, 764, 872, 1006, 1142, 1276, 1384, 1518, 1652, 1786, 1894, 2028}

P4096v2: ±{254, 496, 764, 1006, 1276, 1518, 1786, 2028}

P4096v3: ±{120, 362, 630, 872, 1142, 1384, 1652, 1894}

1.3. P2020v3: ±{52, 186, 294, 428, 562, 696, 804, 938, 1074, 1208, 1316, 1450, 1584, 1718, 1826, 1960}

P4096v1: ±{52, 186, 294, 428, 562, 696, 804, 938, 1074, 1208, 1316, 1450, 1584, 1718, 1826, 1960}

P4096v2: ±{186, 428, 696, 938, 1208, 1450, 1718, 1960}

P4096v3: ±{52, 294, 562, 804, 1074, 1316, 1584, 1826}

1.4. P2020v4: ±{52, 186, 294, 428, 562, 696, 804, 938, 1142, 1276, 1384, 1518, 1652, 1786, 1894, 2028}

P4096v1: ±{52, 186, 294, 428, 562, 696, 804, 938, 1142, 1276, 1384, 1518, 1652, 1786, 1894, 2028}

P4096v2: ±{186, 428, 696, 938, 1276, 1518, 1786, 2028}

P4096v3: ±{52, 294, 562, 804, 1142, 1384, 1652, 1894}

1.5. P2020v5: ±{120, 254, 362, 496, 630, 764, 872, 1006, 1074, 1208, 1316, 1450, 1584, 1718, 1826, 1960}

P4096v1: ±{120, 254, 362, 496, 630, 764, 872, 1006, 1074, 1208, 1316, 1450, 1584, 1718, 1826, 1960}

P4096v2: ±{254, 496, 764, 1006, 1208, 1450, 1718, 1960}

P4096v3: ±{120, 362, 630, 872, 1074, 1316, 1584, 1826}

<996 RU/2020 RU/Full Band>

2. P996v2: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

2.1. P2020v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v2: ±{94, 228, 336, 470, 604, 738, 846, 980, 1116, 1250, 1358, 1492, 1626, 1760, 1868, 2002}

P4096v3: ±{26, 160, 268, 402, 536, 670, 778, 912, 1048, 1182, 1290, 1424, 1558, 1692, 1800, 1934}

2.2. P2020v2: ±{94, 228, 336, 470, 604, 738, 846, 980, 1116, 1250, 1358, 1492, 1626, 1760, 1868, 2002}

P4096v1: ±{94, 228, 336, 470, 604, 738, 846, 980, 1116, 1250, 1358, 1492, 1626, 1760, 1868, 2002}

P4096v2: ±{228, 470, 738, 980, 1250, 1492, 1760, 2002}

P4096v3: ±{94, 336, 604, 846, 1116, 1358, 1626, 1868}

2.3. P2020v3: +{26, 160, 268, 402, 536, 670, 778, 912, 1048, 1182, 1290, 1424, 1558, 1692, 1800, 1934}

P4096v1: ±{26, 160, 268, 402, 536, 670, 778, 912, 1048, 1182, 1290, 1424, 1558, 1692, 1800, 1934}

P4096v2: ±{160, 402, 670, 912, 1182, 1424, 1692, 1934}

P4096v3: ±{26, 268, 536, 778, 1048, 1290, 1558, 1800}

2.4. P2020v4: ±{26, 160, 268, 402, 536, 670, 778, 912, 1116, 1250, 1358, 1492, 1626, 1760, 1868, 2002}

P4096v1: ±{26, 160, 268, 402, 536, 670, 778, 912, 1116, 1250, 1358, 1492, 1626, 1760, 1868, 2002}

P4096v2: ±{160, 402, 670, 912, 1250, 1492, 1760, 2002}

P4096v3: ±{26, 268, 536, 778, 1116, 1358, 1626, 1868}

2.5. P2020v5: ±{94, 228, 336, 470, 604, 738, 846, 980, 1048, 1182, 1290, 1424, 1558, 1692, 1800, 1934}

P4096v1: ±{94, 228, 336, 470, 604, 738, 846, 980, 1048, 1182, 1290, 1424, 1558, 1692, 1800, 1934}

P4096v2: ±{228, 470, 738, 980, 1182, 1424, 1692, 1934}

P4096v3: ±{94, 336, 604, 846, 1048, 1290, 1558, 1800}

<996 RU/2020 RU/Full Band>

3. P996v3: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

3.1. P2020v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v2: ±{94, 228, 336, 470, 630, 764, 872, 1006, 1116, 1250, 1358, 1492, 1652, 1786, 1894, 2028}

P4096v3: ±{26, 160, 268, 402, 562, 696, 804, 938, 1048, 1182, 1290, 1424, 1584, 1718, 1826, 1960}
  3.2. P2020v2: ±{94, 228, 336, 470, 630, 764, 872, 1006, 1116, 1250, 1358, 1492, 1652, 1786, 1894, 2028}
P4096v1: ±{94, 228, 336, 470, 630, 764, 872, 1006, 1116, 1250, 1358, 1492, 1652, 1786, 1894, 2028}
P4096v2: ±{228, 470, 764, 1006, 1250, 1492, 1786, 2028}
P4096v3: ±{94, 336, 630, 872, 1116, 1358, 1652, 1894}
  3.3. P2020v3: ±{26, 160, 268, 402, 562, 696, 804, 938, 1048, 1182, 1290, 1424, 1584, 1718, 1826, 1960}
P4096v1: ±{26, 160, 268, 402, 562, 696, 804, 938, 1048, 1182, 1290, 1424, 1584, 1718, 1826, 1960}
P4096v2: ±{160, 402, 696, 938, 1182, 1424, 1718, 1960}
P4096v3: ±{26, 268, 562, 804, 1048, 1290, 1584, 1826}
  3.4. P2020v4: ±{26, 160, 268, 402, 562, 696, 804, 938, 1116, 1250, 1358, 1492, 1652, 1786, 1894, 2028}
P4096v1: ±{26, 160, 268, 402, 562, 696, 804, 938, 1116, 1250, 1358, 1492, 1652, 1786, 1894, 2028}
P4096v2: ±{160, 402, 696, 938, 1250, 1492, 1786, 2028}
P4096v3: ±{26, 268, 562, 804, 1116, 1358, 1652, 1894}
  3.5. P2020v5: ±{94, 228, 336, 470, 630, 764, 872, 1006, 1048, 1182, 1290, 1424, 1584, 1718, 1826, 1960}
P4096v1: ±{94, 228, 336, 470, 630, 764, 872, 1006, 1048, 1182, 1290, 1424, 1584, 1718, 1826, 1960}
P4096v2: ±{228, 470, 764, 1006, 1182, 1424, 1718, 1960}
P4096v3: ±{94, 336, 630, 872, 1048, 1290, 1584, 1826}
<996 RU/2020 RU/Full Band>
  4. P996v4: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
  4.1. P2020v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
P4096v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
P4096v2: ±{120, 254, 362, 496, 604, 738, 846, 980, 1142, 1276, 1384, 1518, 1626, 1760, 1868, 2002}
P4096v3: ±{52, 186, 294, 428, 536, 670, 778, 912, 1074, 1208, 1316, 1450, 1558, 1692, 1800, 1934}
  4.2. P2020v2: +{120, 254, 362, 496, 604, 738, 846, 980, 1142, 1276, 1384, 1518, 1626, 1760, 1868, 2002}
P4096v1: ±{120, 254, 362, 496, 604, 738, 846, 980, 1142, 1276, 1384, 1518, 1626, 1760, 1868, 2002}
P4096v2: ±{254, 496, 738, 980, 1276, 1518, 1760, 2002}
P4096v3: ±{120, 362, 604, 846, 1142, 1384, 1626, 1868}
  4.3. P2020v3: ±{52, 186, 294, 428, 536, 670, 778, 912, 1074, 1208, 1316, 1450, 1558, 1692, 1800, 1934}
P4096v1: ±{52, 186, 294, 428, 536, 670, 778, 912, 1074, 1208, 1316, 1450, 1558, 1692, 1800, 1934}
P4096v2: ±{186, 428, 670, 912, 1208, 1450, 1692, 1934}
P4096v3: ±{52, 294, 536, 778, 1074, 1316, 1558, 1800}
  4.4. P2020v4: ±{52, 186, 294, 428, 536, 670, 778, 912, 1142, 1276, 1384, 1518, 1626, 1760, 1868, 2002}
P4096v1: ±{52, 186, 294, 428, 536, 670, 778, 912, 1142, 1276, 1384, 1518, 1626, 1760, 1868, 2002}
P4096v2: ±{186, 428, 670, 912, 1276, 1518, 1760, 2002}
P4096v3: ±{52, 294, 536, 778, 1142, 1384, 1626, 1868}
  4.5. P2020v5: ±{120, 254, 362, 496, 604, 738, 846, 980, 1074, 1208, 1316, 1450, 1558, 1692, 1800, 1934}
P4096v1: ±{120, 254, 362, 496, 604, 738, 846, 980, 1074, 1208, 1316, 1450, 1558, 1692, 1800, 1934}
P4096v2: ±{254, 496, 738, 980, 1208, 1450, 1692, 1934}
P4096v3: ±{120, 362, 604, 846, 1074, 1316, 1558, 1800}

B. Alternative 320 MHz Tone Plan 1-A

Tone plans are designed in the same manner as in A except that the number of DC tones is fixed to 5 in the full band and OFDMA as below.

<Full Band>
12/11 guard tone, 5DC, 4068RU (RU subcarrier indices are −2036:−3 and 3:2036)
<OFDMA Tone Plan>
12G+2020RU+1N+13RU+5DC+13RU+1N+2020RU+11G The number of DC tones is fixed to 5 and one null subcarrier is disposed on either side of a 26 RU, which is for reducing the impact of interference from an adjacent RU on the center 26 RU.

Two configurations for a 2020 RU are proposed as below.
2020RU=996RU+1N+26RU+1N+996RU
2020RU=1N+996RU+26RU+996RU+1N A first configuration has a null tone disposed on either side of a 26 RU to reduce the impact of interference from/in an adjacent RU, while a second configuration can reduce the impact of interference between a 996 RU and an RU adjacent thereto. An RU using a small number of subcarriers, such as a 26 RU, may preferably use the first configuration since interference significantly affects performance.

Two configurations for a 996 RU are proposed as in the new 160 MHz tone plan.

996RU=484RU+1*N*+26RU+1*N*+484RU

996RU=1*N*+484RU+26RU+484RU+1*N*

A 484 RU has a configuration of two 242 RUs as in existing 11ax.

484RU=242RU+242RU

A 242 RU has the following configuration as in existing 11ax.

242RU=1*N*+106RU+1*N*+26RU+1*N*+106RU+1*N*

A 106 RU has the following configuration as in existing 11ax.

106RU=52RU+2*N*+52RU

A 52 RU has the following configuration as in existing 11ax.

52RU=26RU+26RU

Listed below are indices for each RU and null tone in a case where a 4068 RU is used in full-band transmission, the first configuration for the 2020 RU is used, and the first configuration for the 996 RU is used.

<26 RU>

TABLE 63

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |

TABLE 63-continued

| RU10 | RU11 | RU12 | RU13 | RU14 | RU15 | RU16 | RU17 | RU18 | RU19 |
|---|---|---|---|---|---|---|---|---|---|
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −527:−502 |
| RU58 | RU59 | RU60 | RU61 | RU62 | RU63 | RU64 | RU65 | RU66 | |
| −499:−474 | −473:−448 | −445:−420 | −419:−394 | −392:−367 | −365:−340 | −339:−314 | −311:−286 | −285:−260 | |
| RU67 | RU68 | RU69 | RU70 | RU71 | RU72 | RU73 | RU74 | RU75 | RU76 |
| −257:−232 | −231:−206 | −203:−178 | −177:−152 | −150:−125 | −123:−98 | −97:−72 | −69:−44 | −43:−18 | −15:−3, 3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarriers indices for RU 75 multiplied by −1, that is, 18:43

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 64

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −499:−448 | −445:−394 | −365:−314 | −311:−260 |

TABLE 64-continued

| RU29 | RU30 | RU31 | RU32 |
|---|---|---|---|
| −257:−206 | −203:−152 | −123:−72 | −69:−18 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarriers indices for RU 31 multiplied by −1, that is, 72:123

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 65

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −499:−394 | −365:−260 | −257:−152 | −123:−18 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarriers indices for RU 15 multiplied by −1, that is, 152:257

Null subcarriers: ±{16, 17, 124, 151, 258, 259, 366, 393, 500, 501, 528, 529, 636, 663, 770, 771, 878, 905, 1012, 1013, 1040, 1041, 1148, 1175, 1282, 1283, 1390, 1417, 1524, 1525, 1552, 1553, 1660, 1687, 1794, 1795, 1902, 1929, 2036}
<242 RU>

TABLE 66

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1012:−771 | −770:−529 | −500:−259 | −258:−17 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 259:500
Null subcarriers: ±{16, 501, 528, 1013, 1040, 1525, 1552}
<484 RU>

TABLE 67

| RU1 | RU2 | RU3 | RU4 |
|---|---|---|---|
| −2036:−1553 | −1524:−1041 | −1012:−529 | −500:−17 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 529:1012
Null subcarriers: +{16, 501, 528, 1013, 1040, 1525, 1552}
<996 RU>

TABLE 68

| RU1 | RU2 | RU3 | RU4 |
|---|---|---|---|
| −2036:−1041 | −1012:−17 | 17:1012 | 1041:2036 |

Null subcarriers: ±{16, 1013, 1040}
<2020 RU>

TABLE 69

| RU1 | RU2 |
|---|---|
| −2036:−17 | 17:2036 |

Null subcarriers: +16
<4068 RU for New 320 MHz Tone Plan>
4068RU: −2036:−3, 3:2036
Null subcarriers: X
Pilot subcarrier indices according to the above tone plans are listed below.
<26 RU>
±{8 or 10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1532, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}
<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}
<106/242/484 RU>
±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}
<996 RU/2020 RU/Full Band>
1. P996v1: ±{50, 118, 184, 252, 292, 360, 426, 494, 562, 630, 696, 764, 804, 872, 938, 1006, 1074, 1142, 1208, 1276, 1316, 1384, 1450, 1518, 1586, 1654, 1720, 1788, 1828, 1896, 1962, 2030}
1.1. P2020v1: ±{50, 118, 184, 252, 292, 360, 426, 494, 562, 630, 696, 764, 804, 872, 938, 1006, 1074, 1142, 1208, 1276, 1316, 1384, 1450, 1518, 1586, 1654, 1720, 1788, 1828, 1896, 1962, 2030}
P4096v1: ±{50, 118, 184, 252, 292, 360, 426, 494, 562, 630, 696, 764, 804, 872, 938, 1006, 1074, 1142, 1208, 1276, 1316, 1384, 1450, 1518, 1586, 1654, 1720, 1788, 1828, 1896, 1962, 2030}
P4096v2: ±{118, 252, 360, 494, 630, 764, 872, 1006, 1142, 1276, 1384, 1518, 1654, 1788, 1896, 2030}
P4096v3: ±{50, 184, 292, 426, 562, 696, 804, 938, 1074, 1208, 1316, 1450, 1586, 1720, 1828, 1962}
1.2. P2020v2: ±{118, 252, 360, 494, 630, 764, 872, 1006, 1142, 1276, 1384, 1518, 1654, 1788, 1896, 2030}
P4096v1: ±{118, 252, 360, 494, 630, 764, 872, 1006, 1142, 1276, 1384, 1518, 1654, 1788, 1896, 2030}
P4096v2: ±{252, 494, 764, 1006, 1276, 1518, 1788, 2030}
P4096v3: ±{118, 360, 630, 872, 1142, 1384, 1654, 1896}
1.3. P2020v3: ±{50, 184, 292, 426, 562, 696, 804, 938, 1074, 1208, 1316, 1450, 1586, 1720, 1828, 1962}
P4096v1: ±{50, 184, 292, 426, 562, 696, 804, 938, 1074, 1208, 1316, 1450, 1586, 1720, 1828, 1962}
P4096v2: ±{184, 426, 696, 938, 1208, 1450, 1720, 1962}
P4096v3: ±{50, 292, 562, 804, 1074, 1316, 1586, 1828}
1.4. P2020v4: ±{50, 184, 292, 426, 562, 696, 804, 938, 1142, 1276, 1384, 1518, 1654, 1788, 1896, 2030}
P4096v1: ±{50, 184, 292, 426, 562, 696, 804, 938, 1142, 1276, 1384, 1518, 1654, 1788, 1896, 2030}

P4096v2: ±{184, 426, 696, 938, 1276, 1518, 1788, 2030}
P4096v3: ±{50, 292, 562, 804, 1142, 1384, 1654, 1896}
 1.5. P2020v5: ±{118, 252, 360, 494, 630, 764, 872, 1006, 1074, 1208, 1316, 1450, 1586, 1720, 1828, 1962}
P4096v1: ±{118, 252, 360, 494, 630, 764, 872, 1006, 1074, 1208, 1316, 1450, 1586, 1720, 1828, 1962}
P4096v2: ±{252, 494, 764, 1006, 1208, 1450, 1720, 1962}
P4096v3: ±{118, 360, 630, 872, 1074, 1316, 1586, 1828}
<996 RU/2020 RU/Full Band>
 2. P996v2: ±{24, 92, 158, 226, 266, 334, 400, 468, 536, 604, 670, 738, 778, 846, 912, 980, 1048, 1116, 1182, 1250, 1290, 1358, 1424, 1492, 1560, 1628, 1694, 1762, 1802, 1870, 1936, 2004}
 2.1. P2020v1: ±{24, 92, 158, 226, 266, 334, 400, 468, 536, 604, 670, 738, 778, 846, 912, 980, 1048, 1116, 1182, 1250, 1290, 1358, 1424, 1492, 1560, 1628, 1694, 1762, 1802, 1870, 1936, 2004}
P4096v1: ±{24, 92, 158, 226, 266, 334, 400, 468, 536, 604, 670, 738, 778, 846, 912, 980, 1048, 1116, 1182, 1250, 1290, 1358, 1424, 1492, 1560, 1628, 1694, 1762, 1802, 1870, 1936, 2004}
P4096v2: ±{92, 226, 334, 468, 604, 738, 846, 980, 1116, 1250, 1358, 1492, 1628, 1762, 1870, 2004}
P4096v3: ±{24, 158, 266, 400, 536, 670, 778, 912, 1048, 1182, 1290, 1424, 1560, 1694, 1802, 1936}
 2.2. P2020v2: ±{92, 226, 334, 468, 604, 738, 846, 980, 1116, 1250, 1358, 1492, 1628, 1762, 1870, 2004}
P4096v1: ±{92, 226, 334, 468, 604, 738, 846, 980, 1116, 1250, 1358, 1492, 1628, 1762, 1870, 2004}
P4096v2: ±{226, 468, 738, 980, 1250, 1492, 1762, 2004}
P4096v3: ±{92, 334, 604, 846, 1116, 1358, 1628, 1870}
 2.3. P2020v3: ±{24, 158, 266, 400, 536, 670, 778, 912, 1048, 1182, 1290, 1424, 1560, 1694, 1802, 1936}
P4096v1: ±{24, 158, 266, 400, 536, 670, 778, 912, 1048, 1182, 1290, 1424, 1560, 1694, 1802, 1936}
P4096v2: ±{158, 400, 670, 912, 1182, 1424, 1694, 1936}
P4096v3: ±{24, 266, 536, 778, 1048, 1290, 1560, 1802}
 2.4. P2020v4: ±{24, 158, 266, 400, 536, 670, 778, 912, 1116, 1250, 1358, 1492, 1628, 1762, 1870, 2004}
P4096v1: ±{24, 158, 266, 400, 536, 670, 778, 912, 1116, 1250, 1358, 1492, 1628, 1762, 1870, 2004}
P4096v2: ±{158, 400, 670, 912, 1250, 1492, 1762, 2004}
P4096v3: ±{24, 266, 536, 778, 1116, 1358, 1628, 1870}
 2.5. P2020v5: ±{92, 226, 334, 468, 604, 738, 846, 980, 1048, 1182, 1290, 1424, 1560, 1694, 1802, 1936}
P4096v1: ±{92, 226, 334, 468, 604, 738, 846, 980, 1048, 1182, 1290, 1424, 1560, 1694, 1802, 1936}
P4096v2: ±{226, 468, 738, 980, 1182, 1424, 1694, 1936}
P4096v3: ±{92, 334, 604, 846, 1048, 1290, 1560, 1802}
<996 RU/2020 RU/Full Band>
 3. P996v3: ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}
 3.1. P2020v1: ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}
P4096v1: ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}
P4096v2: ±{92, 226, 334, 468, 630, 764, 872, 1006, 1116, 1250, 1358, 1492, 1654, 1788, 1896, 2030}
P4096v3: ±{24, 158, 266, 400, 562, 696, 804, 938, 1048, 1182, 1290, 1424, 1586, 1720, 1828, 1962}
 3.2. P2020v2: ±{92, 226, 334, 468, 630, 764, 872, 1006, 1116, 1250, 1358, 1492, 1654, 1788, 1896, 2030}
P4096v1: ±{92, 226, 334, 468, 630, 764, 872, 1006, 1116, 1250, 1358, 1492, 1654, 1788, 1896, 2030}
P4096v2: ±{226, 468, 764, 1006, 1250, 1492, 1788, 2030}
P4096v3: ±{92, 334, 630, 872, 1116, 1358, 1654, 1896}
 3.3. P2020v3: ±{24, 158, 266, 400, 562, 696, 804, 938, 1048, 1182, 1290, 1424, 1586, 1720, 1828, 1962}
P4096v1: ±{24, 158, 266, 400, 562, 696, 804, 938, 1048, 1182, 1290, 1424, 1586, 1720, 1828, 1962}
P4096v2: ±{158, 400, 696, 938, 1182, 1424, 1720, 1962}
P4096v3: ±{24, 266, 562, 804, 1048, 1290, 1586, 1828}
 3.4. P2020v4: ±{24, 158, 266, 400, 562, 696, 804, 938, 1116, 1250, 1358, 1492, 1654, 1788, 1896, 2030}
P4096v1: ±{24, 158, 266, 400, 562, 696, 804, 938, 1116, 1250, 1358, 1492, 1654, 1788, 1896, 2030}
P4096v2: ±{158, 400, 696, 938, 1250, 1492, 1788, 2030}
P4096v3: ±{24, 266, 562, 804, 1116, 1358, 1654, 1896}
 3.5. P2020v5: ±{92, 226, 334, 468, 630, 764, 872, 1006, 1048, 1182, 1290, 1424, 1586, 1720, 1828, 1962}
P4096v1: ±{92, 226, 334, 468, 630, 764, 872, 1006, 1048, 1182, 1290, 1424, 1586, 1720, 1828, 1962}
P4096v2: ±{226, 468, 764, 1006, 1182, 1424, 1720, 1962}
P4096v3: ±{92, 334, 630, 872, 1048, 1290, 1586, 1828}
<996 RU/2020 RU/Full Band>
 4. P996v4: ±{50, 118, 184, 252, 292, 360, 426, 494, 536, 604, 670, 738, 778, 846, 912, 980, 1074, 1142, 1208, 1276, 1316, 1384, 1450, 1518, 1560, 1628, 1694, 1762, 1802, 1870, 1936, 2004}
 4.1. P2020v1: ±{50, 118, 184, 252, 292, 360, 426, 494, 536, 604, 670, 738, 778, 846, 912, 980, 1074, 1142, 1208, 1276, 1316, 1384, 1450, 1518, 1560, 1628, 1694, 1762, 1802, 1870, 1936, 2004}
P4096v1: ±{50, 118, 184, 252, 292, 360, 426, 494, 536, 604, 670, 738, 778, 846, 912, 980, 1074, 1142, 1208, 1276, 1316, 1384, 1450, 1518, 1560, 1628, 1694, 1762, 1802, 1870, 1936, 2004}
P4096v2: ±{118, 252, 360, 494, 604, 738, 846, 980, 1142, 1276, 1384, 1518, 1628, 1762, 1870, 2004}
P4096v3: ±{50, 184, 292, 426, 536, 670, 778, 912, 1074, 1208, 1316, 1450, 1560, 1694, 1802, 1936}
 4.2. P2020v2: ±{118, 252, 360, 494, 604, 738, 846, 980, 1142, 1276, 1384, 1518, 1628, 1762, 1870, 2004}
P4096v1: ±{118, 252, 360, 494, 604, 738, 846, 980, 1142, 1276, 1384, 1518, 1628, 1762, 1870, 2004}
P4096v2: ±{252, 494, 738, 980, 1276, 1518, 1762, 2004}
P4096v3: ±{118, 360, 604, 846, 1142, 1384, 1628, 1870}
 4.3. P2020v3: ±{50, 184, 292, 426, 536, 670, 778, 912, 1074, 1208, 1316, 1450, 1560, 1694, 1802, 1936}
P4096v1: ±{50, 184, 292, 426, 536, 670, 778, 912, 1074, 1208, 1316, 1450, 1560, 1694, 1802, 1936}
P4096v2: ±{184, 426, 670, 912, 1208, 1450, 1694, 1936}
P4096v3: ±{50, 292, 536, 778, 1074, 1316, 1560, 1802}
 4.4. P2020v4: ±{50, 184, 292, 426, 536, 670, 778, 912, 1142, 1276, 1384, 1518, 1628, 1762, 1870, 2004}
P4096v1: ±{50, 184, 292, 426, 536, 670, 778, 912, 1142, 1276, 1384, 1518, 1628, 1762, 1870, 2004}
P4096v2: ±{184, 426, 670, 912, 1276, 1518, 1762, 2004}
P4096v3: ±{50, 292, 536, 778, 1142, 1384, 1628, 1870}
 4.5. P2020v5: ±{118, 252, 360, 494, 604, 738, 846, 980, 1074, 1208, 1316, 1450, 1560, 1694, 1802, 1936}
P4096v1: ±{118, 252, 360, 494, 604, 738, 846, 980, 1074, 1208, 1316, 1450, 1560, 1694, 1802, 1936}
P4096v2: ±{252, 494, 738, 980, 1208, 1450, 1694, 1936}
P4096v3: ±{118, 360, 604, 846, 1074, 1316, 1560, 1802}

Listed below are indices for each RU and null tone in a case where a 4068 RU is used in full-band transmission, the first configuration for the 2020 RU is used, and the second configuration for the 996 RU is used.

<26 RU>

TABLE 70

| RU1 | RU2 | RU3 | RU4 | RU5 | RU6 | RU7 | RU8 | RU9 | |
|---|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 | |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |
| RU20 | RU21 | RU22 | RU23 | RU24 | RU25 | RU26 | RU27 | RU28 | |
| −1524:−1499 | −1498:−1473 | −1470:−1445 | −1444:−1419 | −1417:−1392 | −1390:−1365 | −1364:−1339 | −1336:−1311 | −1310:−1285 | |
| RU29 | RU30 | RU31 | RU32 | RU33 | RU34 | RU35 | RU36 | RU37 | RU38 |
| −1282:−1257 | −1256:−1231 | −1228:−1203 | −1202:−1177 | −1175:−1150 | −1148:−1123 | −1122:−1097 | −1094:−1069 | −1068:−1043 | −1039:−1014 |
| RU39 | RU40 | RU41 | RU42 | RU43 | RU44 | RU45 | RU46 | RU47 | |
| −1010:−985 | −984:−959 | −956:−931 | −930:−905 | −903:−878 | −876:−851 | −850:−825 | −822:−797 | −796:−771 | |
| RU48 | RU49 | RU50 | RU51 | RU52 | RU53 | RU54 | RU55 | RU56 | RU57 |
| −768:−743 | −742:−717 | −714:−689 | −688:−663 | −661:−636 | −634:−609 | −608:−583 | −580:−555 | −554:−529 | −527:−502 |
| RU58 | RU59 | RU60 | RU61 | RU62 | RU63 | RU64 | RU65 | RU66 | |
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −15:−3, 3:15 |

→RU 77 to RU 151→ Subcarrier indices for RU 76+x are the same as subcarrier indices for RU 76-x multiplied by −1 (x is a positive integer that is less than or equal to 75)

→Ex) Subcarrier indices for RU 77 are the same as subcarriers indices for RU 75 multiplied by −1, that is, 19:44

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1013, 1040, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<52 RU>

TABLE 71

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU 33 to RU 64→ Subcarrier indices for RU 32+x are the same as subcarrier indices for RU 33-x multiplied by −1 (x is a positive integer that is less than or equal to 32)

→Ex) Subcarrier indices for RU 34 are the same as subcarrier indices for RU 31 multiplied by −1, that is, 73:124

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1013, 1040, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<106 RU>

TABLE 72

| RU1 | RU2 | RU3 | RU4 |
|---|---|---|---|
| −2034:−1929 | −1900:−1795 | −1792:−1687 | −1658:−1553 |

TABLE 72-continued

| RU5 | RU6 | RU7 | RU8 |
|---|---|---|---|
| −1524:−1419 | −1390:−1285 | −1282:−1177 | −1148:−1043 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17-x multiplied by −1 (x is a positive integer that is less than or equal to 16)

→Ex) Subcarrier indices for RU 18 are the same as subcarriers indices for RU 15 multiplied by −1, that is, 153:258

Null subcarriers: ±{16, 17, 18, 125, 152, 259, 260, 367, 394, 501, 528, 635, 662, 769, 770, 877, 904, 1011, 1012, 1013, 1040, 1041, 1042, 1149, 1176, 1283, 1284, 1391, 1418, 1525, 1552, 1659, 1686, 1793, 1794, 1901, 1928, 2035, 2036}

<242 RU>

TABLE 73

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1011:−770 | −769:−528 | −501:−260 | −259:−18 |

→RU 9 to RU 16→ Subcarrier indices for RU 8+x are the same as subcarrier indices for RU 9-x subcarrier index multiplied by −1 (x is a positive integer that is less than or equal to 8)

→Ex) Subcarrier indices for RU 10 are the same as subcarrier indices for RU 7 multiplied by −1, that is, 260:501

Null subcarriers: ±{16, 17, 1012, 1013, 1040, 1041, 2036}

<484 RU>

TABLE 74

| RU1 | RU2 | RU3 | RU4 |
|---|---|---|---|
| −2035:−1552 | −1525:−1042 | −1011:−528 | −501:−18 |

→RU5 to RU8→Subcarrier indices for RU 4+x are the same as subcarrier indices for RU 5-x multiplied by −1 (x is a positive integer that is less than or equal to 4)

→Ex) Subcarrier indices for RU 6 are the same as subcarrier indices for RU 3 multiplied by −1, that is, 528:1011

Null subcarriers: ±{16, 17, 1012, 1013, 1040, 1041, 2036}

<996 RU>

TABLE 75

| RU1 | RU2 | RU3 | RU4 |
|---|---|---|---|
| −2036:−1041 | −1012:−17 | 17:1012 | 1041:2036 |

Null subcarriers: ±{16, 1013, 1040}

<2020 RU>

TABLE 76

| RU1 | RU2 |
|---|---|
| −2036:−17 | 17:2036 |

Null subcarriers: +16

<4068 RU for New 320 MHz tone plan>
4068RU: −2036:−3, 3:2036
Null subcarriers: X Pilot subcarrier indices according to the above tone plans are listed below.

<26 RU>
±{8 or 10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004, 1020, 1034, 1048, 1062, 1074, 1088, 1102, 1116, 1128, 1142, 1156, 1170, 1182, 1196, 1208, 1222, 1236, 1250, 1262, 1276, 1290, 1304, 1316, 1330, 1344, 1358, 1370, 1384, 1398, 1412, 1424, 1438, 1450, 1464, 1478, 1492, 1504, 1518, 1532, 1546, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{24, 50, 92, 118, 158, 184, 226, 252, 266, 292, 334, 360, 400, 426, 468, 494, 534, 560, 602, 628, 668, 694, 736, 762, 776, 802, 846, 870, 910, 936, 978, 1004, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>
1. P996v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}
1.1. P2020v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}
P4096v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}
P4096v2: ±{118, 252, 360, 494, 628, 762, 870, 1004, 1142, 1276, 1384, 1518, 1652, 1786, 1894, 2028}

P4096v3: ±{50, 184, 292, 426, 560, 694, 802, 936, 1074, 1208, 1316, 1450, 1584, 1718, 1826, 1960}

1.2. P2020v2: ±{118, 252, 360, 494, 628, 762, 870, 1004, 1142, 1276, 1384, 1518, 1652, 1786, 1894, 2028}

P4096v1: +{118, 252, 360, 494, 628, 762, 870, 1004, 1142, 1276, 1384, 1518, 1652, 1786, 1894, 2028}

P4096v2: ±{252, 494, 762, 1004, 1276, 1518, 1786, 2028}

P4096v3: +{118, 360, 628, 870, 1142, 1384, 1652, 1894}

1.3. P2020v3: ±{50, 184, 292, 426, 560, 694, 802, 936, 1074, 1208, 1316, 1450, 1584, 1718, 1826, 1960}

P4096v1: ±{50, 184, 292, 426, 560, 694, 802, 936, 1074, 1208, 1316, 1450, 1584, 1718, 1826, 1960}

P4096v2: ±{184, 426, 694, 936, 1208, 1450, 1718, 1960}

P4096v3: ±{50, 292, 562, 802, 1074, 1316, 1584, 1826}

1.4. P2020v4: ±{50, 184, 292, 426, 560, 694, 802, 936, 1142, 1276, 1384, 1518, 1652, 1786, 1894, 2028}

P4096v1: ±{50, 184, 292, 426, 560, 694, 802, 936, 1142, 1276, 1384, 1518, 1652, 1786, 1894, 2028}

P4096v2: ±{184, 426, 694, 936, 1276, 1518, 1786, 2028}

P4096v3: ±{50, 292, 560, 802, 1142, 1384, 1652, 1894}

1.5. P2020v5: ±{118, 252, 360, 494, 628, 762, 870, 1004, 1074, 1208, 1316, 1450, 1584, 1718, 1826, 1960}

P4096v1: ±{118, 252, 360, 494, 628, 762, 870, 1004, 1074, 1208, 1316, 1450, 1584, 1718, 1826, 1960}

P4096v2: ±{252, 494, 762, 1004, 1208, 1450, 1718, 1960}

P4096v3: ±{118, 360, 628, 870, 1074, 1316, 1584, 1826}

<996 RU/2020 RU/Full Band>

2. P996v2: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}

2.1. P2020v1: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}

P4096v1: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}

P4096v2: ±{92, 226, 334, 468, 602, 736, 844, 978, 1116, 1250, 1358, 1492, 1626, 1760, 1868, 2002}

P4096v3: ±{24, 158, 266, 400, 534, 668, 776, 910, 1048, 1182, 1290, 1424, 1558, 1692, 1800, 1934}

2.2. P2020v2: ±{92, 226, 334, 468, 602, 736, 844, 978, 1116, 1250, 1358, 1492, 1626, 1760, 1868, 2002}

P4096v1: ±{92, 226, 334, 468, 602, 736, 844, 978, 1116, 1250, 1358, 1492, 1626, 1760, 1868, 2002}

P4096v2: ±{226, 468, 736, 978, 1250, 1492, 1760, 2002}

P4096v3: ±{92, 334, 602, 844, 1116, 1358, 1626, 1868}

2.3. P2020v3: ±{24, 158, 266, 400, 534, 668, 776, 910, 1048, 1182, 1290, 1424, 1558, 1692, 1800, 1934}

P4096v1: ±{24, 158, 266, 400, 534, 668, 776, 910, 1048, 1182, 1290, 1424, 1558, 1692, 1800, 1934}

P4096v2: ±{158, 400, 668, 910, 1182, 1424, 1692, 1934}

P4096v3: ±{24, 266, 534, 776, 1048, 1290, 1558, 1800}

2.4. P2020v4: ±{24, 158, 266, 400, 534, 668, 776, 910, 1116, 1250, 1358, 1492, 1626, 1760, 1868, 2002}

P4096v1: ±{24, 158, 266, 400, 534, 668, 776, 910, 1116, 1250, 1358, 1492, 1626, 1760, 1868, 2002}

P4096v2: ±{158, 400, 668, 910, 1250, 1492, 1760, 2002}

P4096v3: ±{24, 266, 534, 776, 1116, 1358, 1626, 1868}

2.5. P2020v5: +{92, 226, 334, 468, 602, 736, 844, 978, 1048, 1182, 1290, 1424, 1558, 1692, 1800, 1934}

P4096v1: ±{92, 226, 334, 468, 602, 736, 844, 978, 1048, 1182, 1290, 1424, 1558, 1692, 1800, 1934}

P4096v2: ±{226, 468, 736, 978, 1182, 1424, 1692, 1934}

P4096v3: ±{92, 334, 602, 844, 1048, 1290, 1558, 1800}

<996 RU/2020 RU/Full Band>

3. P996v3: ±{24, 92, 158, 226, 266, 334, 400, 468, 560, 628, 694, 762, 802, 870, 936, 1004, 1048, 1116, 1182, 1250, 1290, 1358, 1424, 1492, 1584, 1652, 1718, 1786, 1826, 1894, 1960, 2028}

3.1. P2020v1: ±{24, 92, 158, 226, 266, 334, 400, 468, 560, 628, 694, 762, 802, 870, 936, 1004, 1048, 1116, 1182, 1250, 1290, 1358, 1424, 1492, 1584, 1652, 1718, 1786, 1826, 1894, 1960, 2028}

P4096v1: +{24, 92, 158, 226, 266, 334, 400, 468, 560, 628, 694, 762, 802, 870, 936, 1004, 1048, 1116, 1182, 1250, 1290, 1358, 1424, 1492, 1584, 1652, 1718, 1786, 1826, 1894, 1960, 2028}

P4096v2: ±{92, 226, 334, 468, 628, 762, 870, 1004, 1116, 1250, 1358, 1492, 1652, 1786, 1894, 2028}

P4096v3: ±{24, 158, 266, 400, 560, 694, 802, 936, 1048, 1182, 1290, 1424, 1584, 1718, 1826, 1960}

3.2. P2020v2: ±{92, 226, 334, 468, 628, 762, 870, 1004, 1116, 1250, 1358, 1492, 1652, 1786, 1894, 2028}

P4096v1: ±{92, 226, 334, 468, 628, 762, 870, 1004, 1116, 1250, 1358, 1492, 1652, 1786, 1894, 2028}

P4096v2: ±{226, 468, 762, 1004, 1250, 1492, 1786, 2028}

P4096v3: ±{92, 334, 628, 870, 1116, 1358, 1652, 1894}

3.3. P2020v3: ±{24, 158, 266, 400, 560, 694, 802, 936, 1048, 1182, 1290, 1424, 1584, 1718, 1826, 1960}

P4096v1: ±{24, 158, 266, 400, 560, 694, 802, 936, 1048, 1182, 1290, 1424, 1584, 1718, 1826, 1960}

P4096v2: ±{158, 400, 694, 936, 1182, 1424, 1718, 1960}

P4096v3: ±{24, 266, 560, 802, 1048, 1290, 1584, 1826}

3.4. P2020v4: ±{24, 158, 266, 400, 560, 694, 802, 936, 1116, 1250, 1358, 1492, 1652, 1786, 1894, 2028}

P4096v1: ±{24, 158, 266, 400, 560, 694, 802, 936, 1116, 1250, 1358, 1492, 1652, 1786, 1894, 2028}

P4096v2: ±{158, 400, 694, 936, 1250, 1492, 1786, 2028}

P4096v3: ±{24, 266, 560, 802, 1116, 1358, 1652, 1894}

3.5. P2020v5: ±{92, 226, 334, 468, 628, 762, 870, 1004, 1048, 1182, 1290, 1424, 1584, 1718, 1826, 1960}

P4096v1: ±{92, 226, 334, 468, 628, 762, 870, 1004, 1048, 1182, 1290, 1424, 1584, 1718, 1826, 1960}

P4096v2: ±{226, 468, 762, 1004, 1182, 1424, 1718, 1960}

P4096v3:±{92, 334, 628, 870, 1048, 1290, 1584, 1826}

<996 RU/2020 RU/Full Band>

4. P996v4: ±{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}

4.1. P2020v1: ±{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}

P4096v1: ±{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}

P4096v2: ±{118, 252, 360, 494, 602, 736, 844, 978, 1142, 1276, 1384, 1518, 1626, 1760, 1868, 2002}

P4096v3: ±{50, 184, 292, 426, 534, 668, 776, 910, 1074, 1208, 1316, 1450, 1558, 1692, 1800, 1934}

4.2. P2020v2: ±{118, 252, 360, 494, 602, 736, 844, 978, 1142, 1276, 1384, 1518, 1626, 1760, 1868, 2002}

P4096v1: ±{118, 252, 360, 494, 602, 736, 844, 978, 1142, 1276, 1384, 1518, 1626, 1760, 1868, 2002}

P4096v2: ±{252, 494, 736, 978, 1276, 1518, 1760, 2002}

P4096v3: ±{118, 360, 602, 844, 1142, 1384, 1626, 1868}

4.3. P2020v3: ±{50, 184, 292, 426, 534, 668, 776, 910, 1074, 1208, 1316, 1450, 1558, 1692, 1800, 1934}

P4096v1: ±{50, 184, 292, 426, 534, 668, 776, 910, 1074, 1208, 1316, 1450, 1558, 1692, 1800, 1934}

P4096v2: ±{184, 426, 668, 910, 1208, 1450, 1692, 1934}

P4096v3: ±{50, 292, 534, 776, 1074, 1316, 1558, 1800}

4.4. P2020v4: ±{50, 184, 292, 426, 534, 668, 776, 910, 1142, 1276, 1384, 1518, 1626, 1760, 1868, 2002}

P4096v1: ±{50, 184, 292, 426, 534, 668, 776, 910, 1142, 1276, 1384, 1518, 1626, 1760, 1868, 2002}

P4096v2: ±{184, 426, 668, 910, 1276, 1518, 1760, 2002}

P4096v3: ±{50, 292, 534, 776, 1142, 1384, 1626, 1868}

4.5. P2020v5: ±{118, 252, 360, 494, 602, 736, 844, 978, 1074, 1208, 1316, 1450, 1558, 1692, 1800, 1934}

P4096v1: ±{118, 252, 360, 494, 602, 736, 844, 978, 1074, 1208, 1316, 1450, 1558, 1692, 1800, 1934}

P4096v2: ±{252, 494, 736, 978, 1208, 1450, 1692, 1934}

P4096v3: ±{118, 360, 602, 844, 1074, 1316, 1558, 1800}

Listed below are indices for each RU and null tone in a case where a 4068 RU is used in full-band transmission, the second configuration for the 2020 RU is used, and the first configuration for the 996 RU is used.

<26 RU>

TABLE 77

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |
| RU20 | RU21 | RU22 | RU23 | RU24 | RU25 | RU26 | RU27 | RU28 |
| −1522:−1497 | −1496:−1471 | −1468:−1443 | −1442:−1417 | −1415:−1390 | −1388:−1363 | −1362:−1337 | −1334:−1309 | −1308:−1283 |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1039:−1014 |
| RU39 | RU40 | RU41 | RU42 | RU43 | RU44 | RU45 | RU46 | RU47 |
| −1012:−987 | −986:−961 | −958:−933 | −932:−907 | −905:−880 | −878:−853 | −852:−827 | −824:−799 | −798:−773 |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −528:−503 |
| RU58 | RU59 | RU60 | RU61 | RU62 | RU63 | RU64 | RU65 | RU66 |
| −500:−475 | −474:−449 | −446:−421 | −420:−395 | −393:−368 | −366:−341 | −340:−315 | −312:−287 | −286:−261− |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −15:−3, 3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarriers indices for RU 75 multiplied by −1, that is, 19:44

Null subcarriers: ±{16, 17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035, 2036}

<52 RU>

TABLE 78

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |

TABLE 78-continued

| RU25 | RU26 | RU27 | RU28 |
|---|---|---|---|
| −500:−449 | −446:−395 | −366:−315 | −312:−261 |
| RU29 | RU30 | RU31 | RU32 |
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 73:124

Null subcarriers: ±{16, 17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035, 2036}

<106 RU>

TABLE 79

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 153:258

Null subcarriers: ±{16, 17, 18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035, 2036}

<242 RU>

TABLE 80

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 260:501

Null subcarriers: ±{16, 17, 502, 529, 1524, 1551, 2036}
<484 RU>

TABLE 81

| RU1 | RU2 | RU3 | RU4 |
|---|---|---|---|
| −2035:−1552 | −1523:−1040 | −1013:−530 | −501:−18 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 530:1013

Null subcarriers: ±{16, 17, 502, 529, 1524, 1551, 2036}
<996 RU>

TABLE 82

| RU1 | RU2 | RU3 | RU4 |
|---|---|---|---|
| −2035:−1040 | −1013:−18 | 18:1013 | 1040:2035 |

Null subcarriers: ±{16, 17, 2036}
<2020 RU>

TABLE 83

| RU1 | RU2 |
|---|---|
| −2036:−17 | 17:2036 |

Null subcarriers: ±16

<4068 RU for New 320 MHz tone plan>
4068RU: −2036:−3, 3:2036
Null subcarriers: X Pilot subcarrier indices according to the above tone plans are listed below.

<26 RU>
±{8 or 10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1046, 1072, 1114, 1140, 1180, 1206, 1248, 1274, 1288, 1314, 1356, 1382, 1422, 1448, 1490, 1516, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

1.1. P2020v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

P4096v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

P4096v2: ±{118, 252, 360, 494, 630, 764, 872, 1006, 1140, 1274, 1382, 1516, 1652, 1786, 1894, 2028}

P4096v3: ±{50, 184, 292, 426, 562, 696, 804, 938, 1072, 1206, 1314, 1448, 1584, 1718, 1826, 1960}

1.2. P2020v2: ±{118, 252, 360, 494, 630, 764, 872, 1006, 1140, 1274, 1382, 1516, 1652, 1786, 1894, 2028}

P4096v1: ±{118, 252, 360, 494, 630, 764, 872, 1006, 1140, 1274, 1382, 1516, 1652, 1786, 1894, 2028}

P4096v2: ±{252, 494, 764, 1006, 1274, 1516, 1786, 2028}

P4096v3: ±{118, 360, 630, 872, 1140, 1382, 1652, 1894}

1.3. P2020v3: ±{50, 184, 292, 426, 562, 696, 804, 938, 1072, 1206, 1314, 1448, 1584, 1718, 1826, 1960}

P4096v1: ±{50, 184, 292, 426, 562, 696, 804, 938, 1072, 1206, 1314, 1448, 1584, 1718, 1826, 1960}

P4096v2: ±{184, 426, 696, 938, 1206, 1448, 1718, 1960}

P4096v3: ±{50, 292, 562, 804, 1072, 1314, 1584, 1826}

1.4. P2020v4: ±{50, 184, 292, 426, 562, 696, 804, 938, 1140, 1274, 1382, 1516, 1652, 1786, 1894, 2028}

P4096v1: ±{50, 184, 292, 426, 562, 696, 804, 938, 1140, 1274, 1382, 1516, 1652, 1786, 1894, 2028}

P4096v2: ±{184, 426, 696, 938, 1274, 1516, 1786, 2028}

P4096v3: ±{50, 292, 562, 804, 1140, 1382, 1652, 1894}

1.5. P2020v5: ±{118, 252, 360, 494, 630, 764, 872, 1006, 1072, 1206, 1314, 1448, 1584, 1718, 1826, 1960}

P4096v1: ±{118, 252, 360, 494, 630, 764, 872, 1006, 1072, 1206, 1314, 1448, 1584, 1718, 1826, 1960}

P4096v2: ±{252, 494, 764, 1006, 1206, 1448, 1718, 1960}

P4096v3: +{118, 360, 630, 872, 1072, 1314, 1584, 1826}

<996 RU/2020 RU/Full Band>

2. P996v2: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

2.1. P2020v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

P4096v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

P4096v2: ±{92, 226, 334, 468, 604, 738, 846, 980, 1114, 1248, 1356, 1490, 1626, 1760, 1868, 2002}

P4096v3: ±{24, 158, 266, 400, 536, 670, 778, 912, 1046, 1180, 1288, 1422, 1558, 1692, 1800, 1934}

2.2. P2020v2: ±{92, 226, 334, 468, 604, 738, 846, 980, 1114, 1248, 1356, 1490, 1626, 1760, 1868, 2002}

P4096v1: ±{92, 226, 334, 468, 604, 738, 846, 980, 1114, 1248, 1356, 1490, 1626, 1760, 1868, 2002}

P4096v2: ±{226, 468, 738, 980, 1248, 1490, 1760, 2002}

P4096v3: ±{92, 334, 604, 846, 1114, 1356, 1626, 1868}

2.3. P2020v3: ±{24, 158, 266, 400, 536, 670, 778, 912, 1046, 1180, 1288, 1422, 1558, 1692, 1800, 1934}

P4096v1: ±{24, 158, 266, 400, 536, 670, 778, 912, 1046, 1180, 1288, 1422, 1558, 1692, 1800, 1934}

P4096v2: ±{158, 400, 670, 912, 1180, 1422, 1692, 1934}

P4096v3: ±{24, 266, 536, 778, 1046, 1288, 1558, 1800}

2.4. P2020v4: ±{24, 158, 266, 400, 536, 670, 778, 912, 1114, 1248, 1356, 1490, 1626, 1760, 1868, 2002}

P4096v1: ±{24, 158, 266, 400, 536, 670, 778, 912, 1114, 1248, 1356, 1490, 1626, 1760, 1868, 2002}

P4096v2: ±{158, 400, 670, 912, 1248, 1490, 1760, 2002}

P4096v3: ±{24, 266, 536, 778, 1114, 1356, 1626, 1868}

2.5. P2020v5: ±{92, 226, 334, 468, 604, 738, 846, 980, 1046, 1180, 1288, 1422, 1558, 1692, 1800, 1934}

P4096v1: ±{92, 226, 334, 468, 604, 738, 846, 980, 1046, 1180, 1288, 1422, 1558, 1692, 1800, 1934}

P4096v2: ±{226, 468, 738, 980, 1180, 1422, 1692, 1934}

P4096v3: ±{92, 334, 604, 846, 1046, 1288, 1558, 1800}

<996 RU/2020 RU/Full Band>

3. P996v3: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

3.1. P2020v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v2: ±{92, 226, 334, 468, 630, 764, 872, 1006, 1114, 1248, 1356, 1490, 1652, 1786, 1894, 2028}

P4096v3: ±{24, 158, 266, 400, 562, 696, 804, 938, 1046, 1180, 1288, 1422, 1584, 1718, 1826, 1960}

3.2. P2020v2: ±{92, 226, 334, 468, 630, 764, 872, 1006, 1114, 1248, 1356, 1490, 1652, 1786, 1894, 2028}

P4096v1: ±{92, 226, 334, 468, 630, 764, 872, 1006, 1114, 1248, 1356, 1490, 1652, 1786, 1894, 2028}

P4096v2: ±{226, 468, 764, 1006, 1248, 1490, 1786, 2028}

P4096v3: ±{92, 334, 630, 872, 1114, 1356, 1652, 1894}

3.3. P2020v3: ±{24, 158, 266, 400, 562, 696, 804, 938, 1046, 1180, 1288, 1422, 1584, 1718, 1826, 1960}

P4096v1: ±{24, 158, 266, 400, 562, 696, 804, 938, 1046, 1180, 1288, 1422, 1584, 1718, 1826, 1960}

P4096v2: ±{158, 400, 696, 938, 1180, 1422, 1718, 1960}

P4096v3: ±{24, 266, 562, 804, 1046, 1288, 1584, 1826}

3.4. P2020v4: ±{24, 158, 266, 400, 562, 696, 804, 938, 1114, 1248, 1356, 1490, 1652, 1786, 1894, 2028}

P4096v1: ±{24, 158, 266, 400, 562, 696, 804, 938, 1114, 1248, 1356, 1490, 1652, 1786, 1894, 2028}

P4096v2: ±{158, 400, 696, 938, 1248, 1490, 1786, 2028}

P4096v3: ±{24, 266, 562, 804, 1114, 1356, 1652, 1894}

3.5. P2020v5: ±{92, 226, 334, 468, 630, 764, 872, 1006, 1046, 1180, 1288, 1422, 1584, 1718, 1826, 1960}

P4096v1: ±{92, 226, 334, 468, 630, 764, 872, 1006, 1046, 1180, 1288, 1422, 1584, 1718, 1826, 1960}

P4096v2: ±{226, 468, 764, 1006, 1180, 1422, 1718, 1960}

P4096v3: ±{92, 334, 630, 872, 1046, 1288, 1584, 1826}

<996 RU/2020 RU/Full Band>

4. P996v4: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

4.1. P2020v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

Listed below are indices for each RU and null tone in a case where a 4068 RU is used in full-band transmission, the second configuration for the 2020 RU is used, and the second configuration for the 996 RU is used.

<26 RU>

TABLE 84

| RU1 | RU2 | RU3 | RU4 | RU5 | RU6 | RU7 | RU8 | RU9 |
|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 |
| −1523:−1498 | −1497:−1472 | −1469:−1444 | −1443:−1418 | −1416:−1391 | −1389:−1364 | −1363:−1338 | −1335:−1310 | −1309:−1284 |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 |
| −1011:−986 | −985:−960 | −957:−932 | −931:−906 | −904:−879 | −877:−852 | −851:−826 | −823:−798 | −797:−772 |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −528:−503 |
| RU58 | RU59 | RU60 | RU61 | RU62 | RU63 | RU64 | RU65 | RU66 |
| −501:−476 | −475:−450 | −447:−422 | −421:−396 | −394:−369 | −367:−342 | −341:−316 | −313:−288 | −287:−262 |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −15:−3, 3:15 |

P4096v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}
P4096v2: +{118, 252, 360, 494, 604, 738, 846, 980, 1140, 1274, 1382, 1516, 1626, 1760, 1868, 2002}
P4096v3: ±{50, 184, 292, 426, 536, 670, 778, 912, 1072, 1206, 1314, 1448, 1558, 1692, 1800, 1934}
4.2. P2020v2: ±{118, 252, 360, 494, 604, 738, 846, 980, 1140, 1274, 1382, 1516, 1626, 1760, 1868, 2002}
P4096v1: ±{118, 252, 360, 494, 604, 738, 846, 980, 1140, 1274, 1382, 1516, 1626, 1760, 1868, 2002}
P4096v2: ±{252, 494, 738, 980, 1274, 1516, 1760, 2002}
P4096v3: ±{118, 360, 604, 846, 1140, 1382, 1626, 1868}
4.3. P2020v3: ±{50, 184, 292, 426, 536, 670, 778, 912, 1072, 1206, 1314, 1448, 1558, 1692, 1800, 1934}
P4096v1: ±{50, 184, 292, 426, 536, 670, 778, 912, 1072, 1206, 1314, 1448, 1558, 1692, 1800, 1934}
P4096v2: ±{184, 426, 670, 912, 1206, 1448, 1692, 1934}
P4096v3: ±{50, 292, 536, 778, 1072, 1314, 1558, 1800}
4.4. P2020v4: ±{50, 184, 292, 426, 536, 670, 778, 912, 1140, 1274, 1382, 1516, 1626, 1760, 1868, 2002}
P4096v1: ±{50, 184, 292, 426, 536, 670, 778, 912, 1140, 1274, 1382, 1516, 1626, 1760, 1868, 2002}
P4096v2: ±{184, 426, 670, 912, 1274, 1516, 1760, 2002}
P4096v3: ±{50, 292, 536, 778, 1140, 1382, 1626, 1868}
4.5. P2020v5: ±{118, 252, 360, 494, 604, 738, 846, 980, 1072, 1206, 1314, 1448, 1558, 1692, 1800, 1934}
P4096v1: ±{118, 252, 360, 494, 604, 738, 846, 980, 1072, 1206, 1314, 1448, 1558, 1692, 1800, 1934}
P4096v2: ±{252, 494, 738, 980, 1206, 1448, 1692, 1934}
P4096v3: ±{118, 360, 604, 846, 1072, 1314, 1558, 1800}

→RU 77 to RU 151→ Subcarrier indices for RU 76+x are the same as subcarrier indices for RU 76−x multiplied by −1 (x is a positive integer that is less than or equal to 75)
→Ex) Subcarrier indices for RU 77 are the same as subcarriers indices for RU 75 multiplied by −1, that is, 20:45

Null subcarriers: ±{16, 17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035, 2036}

<52 RU>

TABLE 85

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |

TABLE 85-continued

| RU17 | RU18 | RU19 | RU20 |
|---|---|---|---|
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 74:125

Null subcarriers: ±{16, 17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035, 2036}

<106 RU>

TABLE 86

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −501:−396 | −367:−262 | −259:−154 | −125:−20 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarriers indices for RU 15 multiplied by −1, that is, 154:259

Null subcarriers: ±{16, 17, 18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035, 2036}

<242 RU>

TABLE 87

| RU1 | RU2 | RU3 | RU4 |
|---|---|---|---|
| −2034:−1793 | −1792:−1551 | −1524:−1283 | −1282:−1041 |

TABLE 87-continued

| RU5 | RU6 | RU7 | RU8 |
|---|---|---|---|
| −1012:−771 | −770:−529 | −502:−261 | −260:−19 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 261:502

Null subcarriers: ±{16, 17, 18, 1013, 1040, 2035, 2036}
<484 RU>

TABLE 88

| RU1 | RU2 | RU3 | RU4 |
|---|---|---|---|
| −2034:−1551 | −1524:−1041 | −1012:−529 | −502:−19 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 529:1012

Null subcarriers: ±{16, 17, 18, 1013, 1040, 2035, 2036}
<996 RU>

TABLE 89

| RU1 | RU2 | RU3 | RU4 |
|---|---|---|---|
| −2035:−1040 | −1013:−18 | 18:1013 | 1040:2035 |

Null subcarriers: +{16, 17, 2036}
<2020 RU>

TABLE 90

| RU1 | RU2 |
|---|---|
| −2036:−17 | 17:2036 |

Null subcarriers: ±16<4068 RU for New 320 MHz tone plan>
4068RU: −2036:−3, 3:2036
Null subcarriers: X
Pilot subcarrier indices according to the above tone plans are listed below.
<26 RU>
±{8 or 10, 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1530, 1544, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}
<52 RU>
±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>

±{26, 52, 94, 120, 160, 186, 228, 254, 268, 294, 336, 362, 402, 428, 470, 496, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

1.1. P2020v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v2: ±{120, 254, 362, 496, 630, 764, 872, 1006, 1142, 1276, 1384, 1518, 1652, 1786, 1894, 2028}

P4096v3: ±{52, 186, 294, 428, 562, 696, 804, 938, 1074, 1208, 1316, 1450, 1584, 1718, 1826, 1960}

1.2. P2020v2: ±{120, 254, 362, 496, 630, 764, 872, 1006, 1142, 1276, 1384, 1518, 1652, 1786, 1894, 2028}

P4096v1: ±{120, 254, 362, 496, 630, 764, 872, 1006, 1142, 1276, 1384, 1518, 1652, 1786, 1894, 2028}

P4096v2: ±{254, 496, 764, 1006, 1276, 1518, 1786, 2028}

P4096v3: ±{120, 362, 630, 872, 1142, 1384, 1652, 1894}

1.3. P2020v3: ±{52, 186, 294, 428, 562, 696, 804, 938, 1074, 1208, 1316, 1450, 1584, 1718, 1826, 1960}

P4096v1: +{52, 186, 294, 428, 562, 696, 804, 938, 1074, 1208, 1316, 1450, 1584, 1718, 1826, 1960}

P4096v2: ±{186, 428, 696, 938, 1208, 1450, 1718, 1960}

P4096v3: ±{52, 294, 562, 804, 1074, 1316, 1584, 1826}

1.4. P2020v4: ±{52, 186, 294, 428, 562, 696, 804, 938, 1142, 1276, 1384, 1518, 1652, 1786, 1894, 2028}

P4096v1: ±{52, 186, 294, 428, 562, 696, 804, 938, 1142, 1276, 1384, 1518, 1652, 1786, 1894, 2028}

P4096v2: ±{186, 428, 696, 938, 1276, 1518, 1786, 2028}

P4096v3: ±{52, 294, 562, 804, 1142, 1384, 1652, 1894}

1.5. P2020v5: ±{120, 254, 362, 496, 630, 764, 872, 1006, 1074, 1208, 1316, 1450, 1584, 1718, 1826, 1960}

P4096v1: +{120, 254, 362, 496, 630, 764, 872, 1006, 1074, 1208, 1316, 1450, 1584, 1718, 1826, 1960}

P4096v2: ±{254, 496, 764, 1006, 1208, 1450, 1718, 1960}

P4096v3: ±{120, 362, 630, 872, 1074, 1316, 1584, 1826}

<996 RU/2020 RU/Full Band>

2. P996v2: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

2.1. P2020v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v2: ±{94, 228, 336, 470, 604, 738, 846, 980, 1116, 1250, 1358, 1492, 1626, 1760, 1868, 2002}

P4096v3: ±{26, 160, 268, 402, 536, 670, 778, 912, 1048, 1182, 1290, 1424, 1558, 1692, 1800, 1934}

2.2. P2020v2: ±{94, 228, 336, 470, 604, 738, 846, 980, 1116, 1250, 1358, 1492, 1626, 1760, 1868, 2002}

P4096v1: ±{94, 228, 336, 470, 604, 738, 846, 980, 1116, 1250, 1358, 1492, 1626, 1760, 1868, 2002}

P4096v2: ±{228, 470, 738, 980, 1250, 1492, 1760, 2002}

P4096v3: ±{94, 336, 604, 846, 1116, 1358, 1626, 1868}

2.3. P2020v3: ±{26, 160, 268, 402, 536, 670, 778, 912, 1048, 1182, 1290, 1424, 1558, 1692, 1800, 1934}

P4096v1: ±{26, 160, 268, 402, 536, 670, 778, 912, 1182, 1290, 1424, 1558, 1692, 1800, 1934}

P4096v2: ±{160, 402, 670, 912, 1182, 1424, 1692, 1934}

P4096v3: ±{26, 268, 536, 778, 1048, 1290, 1558, 1800}

2.4. P2020v4: ±{26, 160, 268, 402, 536, 670, 778, 912, 1116, 1250, 1358, 1492, 1626, 1760, 1868, 2002}

P4096v1: ±{26, 160, 268, 402, 536, 670, 778, 912, 1116, 1250, 1358, 1492, 1626, 1760, 1868, 2002}

P4096v2: +{160, 402, 670, 912, 1250, 1492, 1760, 2002}

P4096v3: ±{26, 268, 536, 778, 1116, 1358, 1626, 1868}

2.5. P2020v5: ±{94, 228, 336, 470, 604, 738, 846, 980, 1048, 1182, 1290, 1424, 1558, 1692, 1800, 1934}

P4096v1: ±{94, 228, 336, 470, 604, 738, 846, 980, 1048, 1182, 1290, 1424, 1558, 1692, 1800, 1934}

P4096v2: ±{228, 470, 738, 980, 1182, 1424, 1692, 1934}

P4096v3: ±{94, 336, 604, 846, 1048, 1290, 1558, 1800}

<996 RU/2020 RU/Full Band>

3. P996v3: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

3.1. P2020v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v2: ±{94, 228, 336, 470, 630, 764, 872, 1006, 1116, 1250, 1358, 1492, 1652, 1786, 1894, 2028}

P4096v3: ±{26, 160, 268, 402, 562, 696, 804, 938, 1048, 1182, 1290, 1424, 1584, 1718, 1826, 1960}

3.2. P2020v2: ±{94, 228, 336, 470, 630, 764, 872, 1006, 1116, 1250, 1358, 1492, 1652, 1786, 1894, 2028}

P4096v1: ±{94, 228, 336, 470, 630, 764, 872, 1006, 1116, 1250, 1358, 1492, 1652, 1786, 1894, 2028}

P4096v2: ±{228, 470, 764, 1006, 1250, 1492, 1786, 2028}

P4096v3: ±{94, 336, 630, 872, 1116, 1358, 1652, 1894}

3.3. P2020v3: ±{26, 160, 268, 402, 562, 696, 804, 938, 1048, 1182, 1290, 1424, 1584, 1718, 1826, 1960}

P4096v1: +{26, 160, 268, 402, 562, 696, 804, 938, 1048, 1182, 1290, 1424, 1584, 1718, 1826, 1960}

P4096v2: ±{160, 402, 696, 938, 1182, 1424, 1718, 1960}

P4096v3: ±{26, 268, 562, 804, 1048, 1290, 1584, 1826}

3.4. P2020v4: ±{26, 160, 268, 402, 562, 696, 804, 938, 1116, 1250, 1358, 1492, 1652, 1786, 1894, 2028}

P4096v1: ±{26, 160, 268, 402, 562, 696, 804, 938, 1116, 1250, 1358, 1492, 1652, 1786, 1894, 2028}

P4096v2: ±{160, 402, 696, 938, 1250, 1492, 1786, 2028}

P4096v3: ±{26, 268, 562, 804, 1116, 1358, 1652, 1894}

3.5. P2020v5: ±{94, 228, 336, 470, 630, 764, 872, 1006, 1048, 1182, 1290, 1424, 1584, 1718, 1826, 1960}

P4096v1: ±{94, 228, 336, 470, 630, 764, 872, 1006, 1048, 1182, 1290, 1424, 1584, 1718, 1826, 1960}

P4096v2: ±{228, 470, 764, 1006, 1182, 1424, 1718, 1960}

P4096v3: ±{94, 336, 630, 872, 1048, 1290, 1584, 1826}

<996 RU/2020 RU/Full Band>

4. P996v4: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

4.1. P2020v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v2: ±{120, 254, 362, 496, 604, 738, 846, 980, 1142, 1276, 1384, 1518, 1626, 1760, 1868, 2002}

P4096v3: ±{52, 186, 294, 428, 536, 670, 778, 912, 1074, 1208, 1316, 1450, 1558, 1692, 1800, 1934}

4.2. P2020v2: ±{120, 254, 362, 496, 604, 738, 846, 980, 1142, 1276, 1384, 1518, 1626, 1760, 1868, 2002}

P4096v1: ±{120, 254, 362, 496, 604, 738, 846, 980, 1142, 1276, 1384, 1518, 1626, 1760, 1868, 2002}

P4096v2: ±{254, 496, 738, 980, 1276, 1518, 1760, 2002}

P4096v3: ±{120, 362, 604, 846, 1142, 1384, 1626, 1868}

4.3. P2020v3: ±{52, 186, 294, 428, 536, 670, 778, 912, 1074, 1208, 1316, 1450, 1558, 1692, 1800, 1934}

P4096v1: ±{52, 186, 294, 428, 536, 670, 778, 912, 1074, 1208, 1316, 1450, 1558, 1692, 1800, 1934}

P4096v2: ±{186, 428, 670, 912, 1208, 1450, 1692, 1934}

P4096v3: ±{52, 294, 536, 778, 1074, 1316, 1558, 1800}

4.4. P2020v4: ±{52, 186, 294, 428, 536, 670, 778, 912, 1142, 1276, 1384, 1518, 1626, 1760, 1868, 2002}

P4096v1: ±{52, 186, 294, 428, 536, 670, 778, 912, 1142, 1276, 1384, 1518, 1626, 1760, 1868, 2002}

P4096v2: ±{186, 428, 670, 912, 1276, 1518, 1760, 2002}

P4096v3: ±{52, 294, 536, 778, 1142, 1384, 1626, 1868}

4.5. P2020v5: ±{120, 254, 362, 496, 604, 738, 846, 980, 1074, 1208, 1316, 1450, 1558, 1692, 1800, 1934}

P4096v1: ±{120, 254, 362, 496, 604, 738, 846, 980, 1074, 1208, 1316, 1450, 1558, 1692, 1800, 1934}

P4096v2: ±{254, 496, 738, 980, 1208, 1450, 1692, 1934}

P4096v3: ±{120, 362, 604, 846, 1074, 1316, 1558, 1800}

C. Alternative 320 MHz Tone Plan 2

When 320 MHz is designed by consecutively combining two 160 MHz tone plans, 12 left/11 right guard tones are used, which may be applied to an alternative 320 MHz tone plan. Further, in transmission using the full band, a new RU may be proposed, and the size of the new RU may be determined in consideration of various DC tones and a guard tone size according to the impact of a DC offset. The number of DC tones in existing 11 ax 80 MHz is 5 or 7, and 9 or 11 DC tones may be used in consideration of this number of DC tones and performance, in which case the new RU is a 4068/4066/4064/4062 RU.

<Full Band>

12/11 guard tone, 5DC, 4068RU (RU subcarrier indices are −2036:−3 and 3:2036)

12/11 guard tone, 7DC, 4066RU (RU subcarrier indices are −2036:−4 and 4:2036)

12/11 guard tone, 9DC, 4064RU (RU subcarrier indices are −2036:−5 and 5:2036)

12/11 guard tone, 11DC, 4062RU (RU subcarrier indices are −2036:−6 and 6:2036)

In 320 MHz, it is not preferable to use a smaller number of DC tones than the number of DC tones conventionally used in 80 MHz, which is 5/7, in consideration of the impact of a DC offset, it may be adequate to use 5/7 DC tones, and it is possible to use 9/11 DC tones for reliable performance. Considering the following OFDMA tone plans using a 2018 RU, up to 11 DC tones may be adequate.

<OFDMA Tone Plan>

OFDMA tone plans may be expressed using a 2018 RU and a 26 RU (13+13 RU) as below.

12$G$+2018RU+13RU+11DC+13RU+2018RU+11$G$

12$G$+2018RU+1$N$+13RU+9DC+13RU+1$N$+2018RU+11$G$

12$G$+2018RU+2$N$+13RU+7DC+13RU+2$N$+2018RU+11$G$

12$G$+2018RU+3$N$+13RU+5DC+13RU+3$N$+2018RU+11$G$

The number of DC tones and the number of null tones for the center 26 RU (13+13 RU) may be determined in consideration of the performance of a DC offset and performance according to the impact of interference on the center 25 RU (13+13 RU). Considering the existing 11 ax tone plane, when the center 26 RU (13+13 RU) is used, 7 DC tones may be sufficient A configuration for a 2018 RU is proposed as below.

2018RU=996RU+26RU+996RU

Two configurations for a 996 RU are proposed as in the new 160 MHz tone plan.

996RU=484RU+1$N$+26RU+1$N$+484RU

996RU=1$N$+484RU+26RU+484RU+1$N$

A 484 RU has a configuration of two 242 RUs as in existing 11ax.

484RU=242RU+242RU

A 242 RU has the following configuration as in existing 11ax.

242RU=1$N$+106RU+1$N$+26RU+1$N$+106RU+1$N$

A 106 RU has the following configuration as in existing 11ax.

106RU=52RU+2$N$+52RU

A 52 RU has the following configuration as in existing 11ax.

52RU=26RU+26RU

Listed below are indices for each RU and null tone in a case where a 4062/4064/4066/4068 RU is used in full-band transmission, a tone plane of 12G+2018RU+13RU+11DC+13RU+2018RU+11G is used, and the first configuration for the 996 RU is used.

<26 RU>

TABLE 91

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 |
| −1523:−1498 | −1497:−1472 | −1469:−1444 | −1443:−1418 | −1416:−1391 | −1389:−1364 | −1363:−1338 | −1335:−1310 | −1309:−1284 |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1040:−1015 |
| RU39 | RU40 | RU41 | RU42 | RU43 | RU44 | RU45 | RU46 | RU47 |
| −1013:−988 | −987:−962 | −959:−934 | −933:−908 | −906:−881 | −879:−854 | −853:−828 | −825:−800 | −799:−774 |
| RU48 | RU49 | RU50 | RU51 | RU52 | RU53 | RU54 | RU55 | RU56 | RU57 |
| −771:−746 | −745:−720 | −717:−692 | −691:−666 | −664:−639 | −637:−612 | −611:−586 | −583:−558 | −557:−532 | −529:−504 |
| RU58 | RU59 | RU60 | RU61 | RU62 | RU63 | RU64 | RU65 | RU66 |
| 501:−476 | −475:−450 | −447:−422 | −421:−396 | −394:−369 | −367:−342 | −341:−316 | −313:−288 | −287:−262 |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −18:−6, 6:18 |

→RU 77 to RU 151→ Subcarrier indices for RU 76+x are the same as subcarrier indices for RU 76-x multiplied by −1 (x is a positive integer that is less than or equal to 75)

→Ex) Subcarrier indices for RU 77 are the same as subcarriers indices for RU 75 multiplied by −1, that is, 20:45

Null subcarriers: ±{19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 92

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1013:−962 | −959:−908 | −879:−828 | −825:−774 |
| RU21 | RU22 | RU23 | RU24 |
| −771:−720 | −717:−666 | −637:−586 | −583:−532 |

TABLE 92-continued

| RU25 | RU26 | RU27 | RU28 |
|---|---|---|---|
| −501:−450 | −447:−396 | −367:−316 | −313:−262 |
| RU29 | RU30 | RU31 | RU32 |
| −259:−208 | −205:−154 | −125:−74 | −71:−20 |

→RU 33 to RU 64→ Subcarrier indices for RU 32+x are the same as subcarrier indices for RU 33-x multiplied by −1 (x is a positive integer that is less than or equal to 32)

→Ex) Subcarrier indices for RU 34 are the same as subcarriers indices for RU 31 multiplied by −1, that is, 74:125

Null subcarriers: ±{19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 93

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1013:−908 | −879:−774 | −771:−666 | −637:−532 |
| RU13 | RU14 | RU15 | RU16 |
| −501:−396 | −367:−262 | −259:−154 | −125:−20 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 154:259

Null subcarriers: ±{19, 126, 153, 260, 261, 368, 395, 502, 503, 530, 531, 638, 665, 772, 773, 880, 907, 1014, 1041, 1148, 1175, 1282, 1283, 1390, 1417, 1524, 1525, 1552, 1553, 1660, 1687, 1794, 1795, 1902, 1929, 2036}

<242 RU>

TABLE 94

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1014:−773 | −772:−531 | −502:−261 | −260:−19 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 261:502

Null subcarriers: ±{503, 530, 1525, 1552}

<484 RU>

TABLE 95

| RU1 | RU2 | RU3 | RU4 |
|---|---|---|---|
| −2036:−1553 | −1524:−1041 | −1014:−531 | −502:−19 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 531:1014

Null subcarriers: ±{503, 530, 1525, 1552}

<996 RU>

TABLE 96

| RU1 | RU2 | RU3 | RU4 |
|---|---|---|---|
| −2036:−1041 | −1014:−19 | 19:1014 | 1041:2036 |

Null subcarriers: X

<2018 RU>

TABLE 97

| RU1 | RU2 |
|---|---|
| −2036:−19 | 19:2036 |

Null subcarriers: X

<4068 or 4066 or 4064 or 4062 RU for New 160 MHz tone plan>

4068RU: −2036:−3, 3:2036
4066RU: −2036:−4, 4:2036
4064RU: −2036:−5, 5:2036
4062RU: −2036:−6, 6:2036

Null subcarriers: X

Pilot subcarrier indices according to the above tone plans are listed below.

<26 RU>

±{12, 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 509, 523, 538, 552, 564, 578, 592, 606, 618, 632, 644, 658, 672, 686, 698, 712, 726, 740, 752, 766, 780, 794, 806, 820, 834, 848, 860, 874, 886, 900, 914, 928, 940, 954, 968, 982, 994, 1008, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}

<52 RU>

±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 538, 552, 564, 578, 592, 606, 618, 632, 672, 686, 698, 712, 726, 740, 752, 766, 780, 794, 806, 820, 834, 848, 860, 874, 914, 928, 940, 954, 968, 982, 994, 1008, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}

<106/242/484 RU>

±{26, 52, 94, 120, 160, 186, 228, 254, 268, 294, 336, 362, 402, 428, 470, 496, 538, 564, 606, 632, 672, 698, 740, 766, 780, 806, 848, 874, 914, 940, 982, 1008, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}

<996 RU/2020 RU/Full Band>

1. P996v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}

1.1. P2020v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}

P4096v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}

P4096v2: ±{120, 254, 362, 496, 632, 766, 874, 1008, 1142, 1276, 1384, 1518, 1654, 1788, 1896, 2030}

P4096v3: ±{52, 186, 294, 428, 564, 698, 806, 940, 1074, 1208, 1316, 1450, 1586, 1720, 1828, 1962}

1.2. P2020v2: ±{120, 254, 362, 496, 632, 766, 874, 1008, 1142, 1276, 1384, 1518, 1654, 1788, 1896, 2030}

P4096v1: ±{120, 254, 362, 496, 632, 766, 874, 1008, 1142, 1276, 1384, 1518, 1654, 1788, 1896, 2030}

P4096v2: +{254, 496, 766, 1008, 1276, 1518, 1788, 2030}

P4096v3: ±{120, 362, 632, 874, 1142, 1384, 1654, 1896}

1.3. P2020v3: ±{52, 186, 294, 428, 564, 698, 806, 940, 1074, 1208, 1316, 1450, 1586, 1720, 1828, 1962}

P4096v1: ±{52, 186, 294, 428, 564, 698, 806, 940, 1074, 1208, 1316, 1450, 1586, 1720, 1828, 1962}

P4096v2: ±{186, 428, 698, 940, 1208, 1450, 1720, 1962}

P4096v3: ±{52, 294, 564, 806, 1074, 1316, 1586, 1828}

1.4. P2020v4: ±{52, 186, 294, 428, 564, 698, 806, 940, 1142, 1276, 1384, 1518, 1654, 1788, 1896, 2030}

P4096v1: ±{52, 186, 294, 428, 564, 698, 806, 940, 1142, 1276, 1384, 1518, 1654, 1788, 1896, 2030}

P4096v2: ±{186, 428, 698, 940, 1276, 1518, 1788, 2030}

P4096v3: ±{52, 294, 564, 806, 1142, 1384, 1654, 1896}

1.5. P2020v5: ±{120, 254, 362, 496, 632, 766, 874, 1008, 1074, 1208, 1316, 1450, 1586, 1720, 1828, 1962}

P4096v1: ±{120, 254, 362, 496, 632, 766, 874, 1008, 1074, 1208, 1316, 1450, 1586, 1720, 1828, 1962}

P4096v2: ±{254, 496, 766, 1008, 1208, 1450, 1720, 1962}

P4096v3: +{120, 362, 632, 874, 1074, 1316, 1586, 1828}

<996 RU/2020 RU/Full Band>

2. P996v2: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

2.1. P2020v1: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

P4096v1: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

P4096v2: ±{94, 228, 336, 470, 606, 740, 848, 982, 1116, 1250, 1358, 1492, 1628, 1762, 1870, 2004}

P4096v3: ±{26, 160, 268, 402, 538, 672, 780, 914, 1048, 1182, 1290, 1424, 1560, 1694, 1802, 1936}

2.2. P2020v2: ±{94, 228, 336, 470, 606, 740, 848, 982, 1116, 1250, 1358, 1492, 1628, 1762, 1870, 2004}

P4096v1: ±{94, 228, 336, 470, 606, 740, 848, 982, 1116, 1250, 1358, 1492, 1628, 1762, 1870, 2004}

P4096v2: ±{228, 470, 740, 982, 1250, 1492, 1762, 2004}

P4096v3: ±{94, 336, 606, 848, 1116, 1358, 1628, 1870}

2.3. P2020v3: +{26, 160, 268, 402, 538, 672, 780, 914, 1048, 1182, 1290, 1424, 1560, 1694, 1802, 1936}

P4096v1: +{26, 160, 268, 402, 538, 672, 780, 914, 1048, 1182, 1290, 1424, 1560, 1694, 1802, 1936}

P4096v2: ±{160, 402, 672, 914, 1182, 1424, 1694, 1936}

P4096v3: ±{26, 268, 538, 780, 1048, 1290, 1560, 1802}

2.4. P2020v4: ±{26, 160, 268, 402, 538, 672, 780, 914, 1116, 1250, 1358, 1492, 1628, 1762, 1870, 2004}

P4096v1: ±{26, 160, 268, 402, 538, 672, 780, 914, 1116, 1250, 1358, 1492, 1628, 1762, 1870, 2004}

P4096v2: ±{160, 402, 672, 914, 1250, 1492, 1762, 2004}

P4096v3: ±{26, 268, 538, 780, 1116, 1358, 1628, 1870}

2.5. P2020v5: ±{94, 228, 336, 470, 606, 740, 848, 982, 1048, 1182, 1290, 1424, 1560, 1694, 1802, 1936}

P4096v1: ±{94, 228, 336, 470, 606, 740, 848, 982, 1048, 1182, 1290, 1424, 1560, 1694, 1802, 1936}

P4096v2: ±{228, 470, 740, 982, 1182, 1424, 1694, 1936}

P4096v3: ±{94, 336, 606, 848, 1048, 1290, 1560, 1802}

<996 RU/2020 RU/Full Band>

3. P996v3: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

3.1. P2020v1: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

P4096v1: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

P4096v2: ±{94, 228, 336, 470, 632, 766, 874, 1008, 1116, 1250, 1358, 1492, 1654, 1788, 1896, 2030}

P4096v3: ±{26, 160, 268, 402, 564, 698, 806, 940, 1048, 1182, 1290, 1424, 1586, 1720, 1828, 1962}

3.2. P2020v2: ±{94, 228, 336, 470, 632, 766, 874, 1008, 1116, 1250, 1358, 1492, 1654, 1788, 1896, 2030}

P4096v1: ±{94, 228, 336, 470, 632, 766, 874, 1008, 1116, 1250, 1358, 1492, 1654, 1788, 1896, 2030}

P4096v2: ±{228, 470, 766, 1008, 1250, 1492, 1788, 2030}

P4096v3: ±{94, 336, 632, 874, 1116, 1358, 1654, 1896}

3.3. P2020v3: ±{26, 160, 268, 402, 564, 698, 806, 940, 1048, 1182, 1290, 1424, 1586, 1720, 1828, 1962}

P4096v1: ±{26, 160, 268, 402, 564, 698, 806, 940, 1048, 1182, 1290, 1424, 1586, 1720, 1828, 1962}

P4096v2: ±{160, 402, 698, 940, 1182, 1424, 1720, 1962}

P4096v3: ±{26, 268, 564, 806, 1048, 1290, 1586, 1828}

3.4. P2020v4: ±{26, 160, 268, 402, 564, 698, 806, 940, 1116, 1250, 1358, 1492, 1654, 1788, 1896, 2030}

P4096v1: ±{26, 160, 268, 402, 564, 698, 806, 940, 1116, 1250, 1358, 1492, 1654, 1788, 1896, 2030}

P4096v2: ±{160, 402, 698, 940, 1250, 1492, 1788, 2030}

P4096v3: ±{26, 268, 564, 806, 1116, 1358, 1654, 1896}

3.5. P2020v5: ±{94, 228, 336, 470, 632, 766, 874, 1008, 1048, 1182, 1290, 1424, 1586, 1720, 1828, 1962}

P4096v1: ±{94, 228, 336, 470, 632, 766, 874, 1008, 1048, 1182, 1290, 1424, 1586, 1720, 1828, 1962}

P4096v2: ±{228, 470, 766, 1008, 1182, 1424, 1720, 1962}

P4096v3: ±{94, 336, 632, 874, 1048, 1290, 1586, 1828}

<996 RU/2020 RU/Full Band>

4. P996v4: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

4.1. P2020v1: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

P4096v1: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

P4096v2: ±{120, 254, 362, 496, 606, 740, 848, 982, 1142, 1276, 1384, 1518, 1628, 1762, 1870, 2004}

P4096v3: ±{52, 186, 294, 428, 538, 672, 780, 914, 1074, 1208, 1316, 1450, 1560, 1694, 1802, 1936}

4.2. P2020v2: ±{120, 254, 362, 496, 606, 740, 848, 982, 1142, 1276, 1384, 1518, 1628, 1762, 1870, 2004}

P4096v1: ±{120, 254, 362, 496, 606, 740, 848, 982, 1142, 1276, 1384, 1518, 1628, 1762, 1870, 2004}

P4096v2: ±{254, 496, 740, 982, 1276, 1518, 1762, 2004}

P4096v3: ±{120, 362, 606, 848, 1142, 1384, 1628, 1870}

4.3. P2020v3: ±{52, 186, 294, 428, 538, 672, 780, 914, 1074, 1208, 1316, 1450, 1560, 1694, 1802, 1936}

P4096v1: ±{52, 186, 294, 428, 538, 672, 780, 914, 1074, 1208, 1316, 1450, 1560, 1694, 1802, 1936}

P4096v2: ±{186, 428, 672, 914, 1208, 1450, 1694, 1936}

P4096v3: ±{52, 294, 538, 780, 1074, 1316, 1560, 1802}

4.4. P2020v4: ±{52, 186, 294, 428, 538, 672, 780, 914, 1142, 1276, 1384, 1518, 1628, 1762, 1870, 2004}

P4096v1: ±{52, 186, 294, 428, 538, 672, 780, 914, 1142, 1276, 1384, 1518, 1628, 1762, 1870, 2004}

P4096v2: ±{186, 428, 672, 914, 1276, 1518, 1762, 2004}
P4096v3: ±{52, 294, 538, 780, 1142, 1384, 1628, 1870}
4.5. P2020v5: ±{120, 254, 362, 496, 606, 740, 848, 982, 1074, 1208, 1316, 1450, 1560, 1694, 1802, 1936}
P4096v1: ±{120, 254, 362, 496, 606, 740, 848, 982, 1074, 1208, 1316, 1450, 1560, 1694, 1802, 1936}
P4096v2: ±{254, 496, 740, 982, 1208, 1450, 1694, 1936}
P4096v3: ±{120, 362, 606, 848, 1074, 1316, 1560, 1802}

Listed below are indices for each RU and null tone in a case where a 4062/4064/4066/4068 RU is used in full-band transmission, the tone plane of 12G+2018RU+13RU+11DC+13RU+2018RU+11G is used, and the second configuration for the 996 RU is used.

<26 RU>

TABLE 98

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |

| RU10 | RU11 | RU12 | RU13 | RU14 | RU15 | RU16 | RU17 | RU18 | RU19 |
|---|---|---|---|---|---|---|---|---|---|
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |

| RU20 | RU21 | RU22 | RU23 | RU24 | RU25 | RU26 | RU27 | RU28 |
|---|---|---|---|---|---|---|---|---|
| −1524:−1499 | −1498:−1473 | −1470:−1445 | −1444:−1419 | −1417:−1392 | −1390:−1365 | −1364:−1339 | −1336:−1311 | −1310:−1285 |

| RU29 | RU30 | RU31 | RU32 | RU33 | RU34 | RU35 | RU36 | RU37 | RU38 |
|---|---|---|---|---|---|---|---|---|---|
| −1282:−1257 | −1256:−1231 | −1228:−1203 | −1202:−1177 | −1175:−1150 | −1148:−1123 | −1122:−1097 | −1094:−1069 | −1068:−1043 | −1040:−1015 |

| RU39 | RU40 | RU41 | RU42 | RU43 | RU44 | RU45 | RU46 | RU47 |
|---|---|---|---|---|---|---|---|---|
| −1012:−987 | −986:−961 | −958:−933 | −932:−907 | −905:−880 | −878:−853 | −852:−827 | −824:−799 | −798:−773 |

| RU48 | RU49 | RU50 | RU51 | RU52 | RU53 | RU54 | RU55 | RU56 | RU57 |
|---|---|---|---|---|---|---|---|---|---|
| −770:−745 | −744:−719 | −716:−691 | −690:−665 | −663:−638 | −636:−611 | −610:−585 | −582:−557 | −556:−531 | −529:−504 |

| RU58 | RU59 | RU60 | RU61 | RU62 | RU63 | RU64 | RU65 | RU66 |
|---|---|---|---|---|---|---|---|---|
| −502:−477 | −476:−451 | −448:−423 | −422:−397 | −395:−370 | −368:−343 | −342:−317 | −314:−289 | −288:−263 |

| RU67 | RU68 | RU69 | RU70 | RU71 | RU72 | RU73 | RU74 | RU75 | RU76 |
|---|---|---|---|---|---|---|---|---|---|
| −260:−235 | −234:−209 | −206:−181 | −180:−155 | −153:−128 | −126:−101 | −100:−75 | −72:−47 | −46:−21 | −18:−6, 6:18 |

→RU 77 to RU 151→ Subcarrier indices for RU 76+x are the same as subcarrier indices for RU 76-x multiplied by −1 (x is a positive integer that is less than or equal to 75)
→Ex) Subcarrier indices for RU 77 are the same as subcarriers indices for RU 75 multiplied by −1, that is, 21:46

Null subcarriers: ±{19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<52 RU>

TABLE 99

| RU1 | RU2 | RU3 | RU4 |
|---|---|---|---|
| −2034:−1983 | −1980:−1929 | −1900:−1849 | −1846:−1795 |

| RU5 | RU6 | RU7 | RU8 |
|---|---|---|---|
| −1792:−1741 | −1738:−1687 | −1658:−1607 | −1604:−1553 |

TABLE 99-continued

| RU9 | RU10 | RU11 | RU12 |
|---|---|---|---|
| −1524:−1473 | −1470:−1419 | −1390:−1339 | −1336:−1285 |

| RU13 | RU14 | RU15 | RU16 |
|---|---|---|---|
| −1282:−1231 | −1228:−1177 | −1148:−1097 | −1094:−1043 |

| RU17 | RU18 | RU19 | RU20 |
|---|---|---|---|
| −1012:−961 | −958:−907 | −878:−827 | −824:−773 |

TABLE 99-continued

| RU21 | RU22 | RU23 | RU24 |
|---|---|---|---|
| −770:−719 | −716:−665 | −636:−585 | −582:−531 |

| RU25 | RU26 | RU27 | RU28 |
|---|---|---|---|
| −502:−451 | −448:−397 | −368:−317 | −314:−263 |

| RU29 | RU30 | RU31 | RU32 |
|---|---|---|---|
| −260:−209 | −206:−155 | −126:−75 | −72:−21 |

→RU 33 to RU 64→ Subcarrier indices for RU 32+x are the same as subcarrier indices for RU 33-x multiplied by −1 (x is a positive integer that is less than or equal to 32)
→Ex) Subcarrier indices for RU 34 are the same as subcarriers indices for RU 31 multiplied by −1, that is, 75:126

Null subcarriers: ±{19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<106 RU>

TABLE 100

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1012:−907 | −878:−773 | −770:−665 | −636:−531 |
| RU13 | RU14 | RU15 | RU16 |
| −502:−397 | −368:−263 | −260:−155 | −126:−21 |

→RU 17 to RU 32→≠Subcarrier indices for RU 76+x are the same as subcarrier indices for RU 17-x multiplied by −1 (x is a positive integer that is less than or equal to 16)

→Ex) Subcarrier indices for RU 18 are the same as subcarriers indices for RU 15 multiplied by −1, that is, 155:260

Null subcarriers: ±{19, 20, 127, 154, 261, 262, 369, 396, 503, 530, 637, 664, 771, 772, 879, 906, 1013, 1014, 1041, 1042, 1149, 1176, 1283, 1284, 1391, 1418, 1525, 1552, 1659, 1686, 1793, 1794, 1901, 1928, 2035, 2036}

<242 RU>

TABLE 101

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1013:−772 | −771:−530 | −503:−262 | −261:−20 |

→RU 9 to RU 16→ Subcarrier indices for RU 8+x are the same as subcarrier indices for RU 9-x subcarrier index multiplied by −1 (x is a positive integer that is less than or equal to 8)

→Ex) Subcarrier indices for RU 10 are the same as subcarrier indices for RU 7 multiplied by −1, that is, 262:503

Null subcarriers: ±{19, 1014, 1041, 2036}

<484 RU>

TABLE 102

| RU1 | RU2 | RU3 | RU4 |
|---|---|---|---|
| −2035:−1552 | −1525:−1042 | −1013:−530 | −503:−20 |

→RU 5 to RU 8→ Subcarrier indices for RU 4+x are the same as subcarrier indices for RU 5-x multiplied by −1 (x is a positive integer that is less than or equal to 4)

→Ex) Subcarrier indices for RU 6 are the same as subcarrier indices for RU 3 multiplied by −1, that is, 530:1013

Null subcarriers: ±{19, 1014, 1041, 2036}

<996 RU>

TABLE 103

| RU1 | RU2 | RU3 | RU4 |
|---|---|---|---|
| −2036:−1041 | −1014:−19 | 19:1014 | 1041:2036 |

Null subcarriers: X

<2018 RU>

TABLE 104

| RU1 | RU2 |
|---|---|
| −2036:−19 | 19:2036 |

Null subcarriers: X

<4068 or 4066 or 4064 or 4062 RU for New 160 MHz tone plan>
4068RU: −2036:−3, 3:2036
4066RU: −2036:−4, 4:2036
4064RU: −2036:−5, 5:2036
4062RU: −2036:−6, 6:2036
Null subcarriers: X Pilot subcarrier indices according to the above tone plans are listed below.

<26 RU>
±{12, 26, 40, 52, 66, 80, 94, 106, 120, 134, 148, 160, 174, 186, 200, 214, 228, 240, 254, 268, 282, 294, 308, 322, 336, 348, 362, 376, 390, 402, 416, 428, 442, 456, 470, 482, 496, 510, 524, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1048, 1062, 1074, 1088, 1102, 1116, 1128, 1142, 1156, 1170, 1182, 1196, 1208, 1222, 1236, 1250, 1262, 1276, 1290, 1304, 1316, 1330, 1344, 1358, 1370, 1384, 1398, 1412, 1424, 1438, 1450, 1464, 1478, 1492, 1504, 1518, 1532, 1546, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

<52 RU>
±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{26, 52, 94, 120, 160, 186, 228, 254, 268, 294, 336, 362, 402, 428, 470, 496, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>
1. P996v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

1.1. P2020v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v2: ±{120, 254, 362, 496, 630, 764, 872, 1006, 1142, 1276, 1384, 1518, 1652, 1786, 1894, 2028}

P4096v3: ±{52, 186, 294, 428, 562, 696, 804, 938, 1074, 1208, 1316, 1450, 1584, 1718, 1826, 1960}

1.2. P2020v2: ±{120, 254, 362, 496, 630, 764, 872, 1006, 1142, 1276, 1384, 1518, 1652, 1786, 1894, 2028}

P4096v1: ±{120, 254, 362, 496, 630, 764, 872, 1006, 1142, 1276, 1384, 1518, 1652, 1786, 1894, 2028}

P4096v2: ±{254, 496, 764, 1006, 1276, 1518, 1786, 2028}

P4096v3: ±{120, 362, 630, 872, 1142, 1384, 1652, 1894}

1.3. P2020v3: ±{52, 186, 294, 428, 562, 696, 804, 938, 1074, 1208, 1316, 1450, 1584, 1718, 1826, 1960}

P4096v1: ±{52, 186, 294, 428, 562, 696, 804, 938, 1074, 1208, 1316, 1450, 1584, 1718, 1826, 1960}

P4096v2: ±{186, 428, 696, 938, 1208, 1450, 1718, 1960}

P4096v3: ±{52, 294, 562, 804, 1074, 1316, 1584, 1826}

1.4. P2020v4: ±{52, 186, 294, 428, 562, 696, 804, 938, 1142, 1276, 1384, 1518, 1652, 1786, 1894, 2028}

P4096v1: ±{52, 186, 294, 428, 562, 696, 804, 938, 1142, 1276, 1384, 1518, 1652, 1786, 1894, 2028}

P4096v2: ±{186, 428, 696, 938, 1276, 1518, 1786, 2028}

P4096v3: ±{52, 294, 562, 804, 1142, 1384, 1652, 1894}

1.5. P2020v5:: ±{120, 254, 362, 496, 630, 764, 872, 1006, 1074, 1208, 1316, 1450, 1584, 1718, 1826, 1960}

P4096v1: ±{120, 254, 362, 496, 630, 764, 872, 1006, 1074, 1208, 1316, 1450, 1584, 1718, 1826, 1960}

P4096v2: ±{254, 496, 764, 1006, 1208, 1450, 1718, 1960}

P4096v3: ±{120, 362, 630, 872, 1074, 1316, 1584, 1826}

<996 RU/2020 RU/Full Band>

2. P996v2: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

2.1. P2020v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v2: ±{94, 228, 336, 470, 604, 738, 846, 980, 1116, 1250, 1358, 1492, 1626, 1760, 1868, 2002}

P4096v3: ±{26, 160, 268, 402, 536, 670, 778, 912, 1048, 1182, 1290, 1424, 1558, 1692, 1800, 1934}

2.2. P2020v2: ±{94, 228, 336, 470, 604, 738, 846, 980, 1116, 1250, 1358, 1492, 1626, 1760, 1868, 2002}

P4096v1: ±{94, 228, 336, 470, 604, 738, 846, 980, 1116, 1250, 1358, 1492, 1626, 1760, 1868, 2002}

P4096v2: ±{228, 470, 738, 980, 1250, 1492, 1760, 2002}

P4096v3: ±{94, 336, 604, 846, 1116, 1358, 1626, 1868}

2.3. P2020v3: ±{26, 160, 268, 402, 536, 670, 778, 912, 1048, 1182, 1290, 1424, 1558, 1692, 1800, 1934}

P4096v1: ±{26, 160, 268, 402, 536, 670, 778, 912, 1048, 1182, 1290, 1424, 1558, 1692, 1800, 1934}

P4096v2: ±{160, 402, 670, 912, 1182, 1424, 1692, 1934}

P4096v3: ±{26, 268, 536, 778, 1048, 1290, 1558, 1800}

2.4. P2020v4: ±{26, 160, 268, 402, 536, 670, 778, 912, 1116, 1250, 1358, 1492, 1626, 1760, 1868, 2002}

P4096v1: ±{26, 160, 268, 402, 536, 670, 778, 912, 1116, 1250, 1358, 1492, 1626, 1760, 1868, 2002}

P4096v2: +{160, 402, 670, 912, 1250, 1492, 1760, 2002}

P4096v3: +{26, 268, 536, 778, 1116, 1358, 1626, 1868}

2.5. P2020v5: ±{94, 228, 336, 470, 604, 738, 846, 980, 1048, 1182, 1290, 1424, 1558, 1692, 1800, 1934}

P4096v1: ±{94, 228, 336, 470, 604, 738, 846, 980, 1048, 1182, 1290, 1424, 1558, 1692, 1800, 1934}

P4096v2: ±{228, 470, 738, 980, 1182, 1424, 1692, 1934}

P4096v3: ±{94, 336, 604, 846, 1048, 1290, 1558, 1800}

<996 RU/2020 RU/Full Band>

3. P996v3: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

3.1. P2020v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v2: ±{94, 228, 336, 470, 630, 764, 872, 1006, 1116, 1250, 1358, 1492, 1652, 1786, 1894, 2028}

P4096v3: ±{26, 160, 268, 402, 562, 696, 804, 938, 1048, 1182, 1290, 1424, 1584, 1718, 1826, 1960}

3.2. P2020v2: ±{94, 228, 336, 470, 630, 764, 872, 1006, 1116, 1250, 1358, 1492, 1652, 1786, 1894, 2028}

P4096v1: ±{94, 228, 336, 470, 630, 764, 872, 1006, 1116, 1250, 1358, 1492, 1652, 1786, 1894, 2028}

P4096v2: ±{228, 470, 764, 1006, 1250, 1492, 1786, 2028}

P4096v3: ±{94, 336, 630, 872, 1116, 1358, 1652, 1894}

3.3. P2020v3: ±{26, 160, 268, 402, 562, 696, 804, 938, 1048, 1182, 1290, 1424, 1584, 1718, 1826, 1960}

P4096v1: ±{26, 160, 268, 402, 562, 696, 804, 938, 1048, 1182, 1290, 1424, 1584, 1718, 1826, 1960}

P4096v2: ±{160, 402, 696, 938, 1182, 1424, 1718, 1960}

P4096v3: ±{26, 268, 562, 804, 1048, 1290, 1584, 1826}

3.4. P2020v4: ±{26, 160, 268, 402, 562, 696, 804, 938, 1116, 1250, 1358, 1492, 1652, 1786, 1894, 2028}

P4096v1: ±{26, 160, 268, 402, 562, 696, 804, 938, 1116, 1250, 1358, 1492, 1652, 1786, 1894, 2028}

P4096v2: ±{160, 402, 696, 938, 1250, 1492, 1786, 2028}

P4096v3: ±{26, 268, 562, 804, 1116, 1358, 1652, 1894}

3.5. P2020v5: ±{94, 228, 336, 470, 630, 764, 872, 1006, 1048, 1182, 1290, 1424, 1584, 1718, 1826, 1960}

P4096v1: ±{94, 228, 336, 470, 630, 764, 872, 1006, 1048, 1182, 1290, 1424, 1584, 1718, 1826, 1960}

P4096v2: ±{228, 470, 764, 1006, 1182, 1424, 1718, 1960}

P4096v3: ±{94, 336, 630, 872, 1048, 1290, 1584, 1826}

<996 RU/2020 RU/Full Band>

4. P996v4: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

4.1. P2020v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v2: ±{120, 254, 362, 496, 604, 738, 846, 980, 1142, 1276, 1384, 1518, 1626, 1760, 1868, 2002}

P4096v3: ±{52, 186, 294, 428, 536, 670, 778, 912, 1074, 1208, 1316, 1450, 1558, 1692, 1800, 1934}

4.2. P2020v2: ±{120, 254, 362, 496, 604, 738, 846, 980, 1142, 1276, 1384, 1518, 1626, 1760, 1868, 2002}

P4096v1: ±{120, 254, 362, 496, 604, 738, 846, 980, 1142, 1276, 1384, 1518, 1626, 1760, 1868, 2002}

P4096v2: ±{254, 496, 738, 980, 1276, 1518, 1760, 2002}

P4096v3: ±{120, 362, 604, 846, 1142, 1384, 1626, 1868}

4.3. P2020v3: ±{52, 186, 294, 428, 536, 670, 778, 912, 1074, 1208, 1316, 1450, 1558, 1692, 1800, 1934}

P4096v1: ±{52, 186, 294, 428, 536, 670, 778, 912, 1074, 1208, 1316, 1450, 1558, 1692, 1800, 1934}

P4096v2: +{186, 428, 670, 912, 1208, 1450, 1692, 1934}

P4096v3: ±{52, 294, 536, 778, 1074, 1316, 1558, 1800}

4.4. P2020v4: ±{52, 186, 294, 428, 536, 670, 778, 912, 1142, 1276, 1384, 1518, 1626, 1760, 1868, 2002}

P4096v1: ±{52, 186, 294, 428, 536, 670, 778, 912, 1142, 1276, 1384, 1518, 1626, 1760, 1868, 2002}

P4096v2: ±{186, 428, 670, 912, 1276, 1518, 1760, 2002}

P4096v3: ±{52, 294, 536, 778, 1142, 1384, 1626, 1868}

4.5. P2020v5: ±{120, 254, 362, 496, 604, 738, 846, 980, 1074, 1208, 1316, 1450, 1558, 1692, 1800, 1934}

P4096v1: ±{120, 254, 362, 496, 604, 738, 846, 980, 1074, 1208, 1316, 1450, 1558, 1692, 1800, 1934}

P4096v2: ±{254, 496, 738, 980, 1208, 1450, 1692, 1934}

P4096v3: ±{120, 362, 604, 846, 1074, 1316, 1558, 1800}

Listed below are indices for each RU and null tone in a case where a 4062/4064/4066/4068 RU is used in full-band transmission, a tone plane of 12G+2018RU+1N+13RU+9DC+13RU+1N+2018RU+11G is used, and the first configuration for the 996 RU is used.

<26 RU>

→RU 77 to RU 151→ Subcarrier indices for RU 76+x are the same as subcarrier indices for RU 76-x multiplied by −1 (x is a positive integer that is less than or equal to 75)

→Ex) Subcarrier indices for RU 77 are the same as subcarriers indices for RU 75 multiplied by −1, that is, 20:45

Null subcarriers: ±{18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 106

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1013:−962 | −959:−908 | −879:−828 | −825:−774 |
| RU21 | RU22 | RU23 | RU24 |
| −771:−720 | −717:−666 | −637:−586 | −583:−532 |

TABLE 105

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 |
| −1523:−1498 | −1497:−1472 | −1469:−1444 | −1443:−1418 | −1416:−1391 | −1389:−1364 | −1363:−1338 | −1335:−1310 | −1309:−1284 |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1040:−1015 |
| RU39 | RU40 | RU41 | RU42 | RU43 | RU44 | RU45 | RU46 | RU47 |
| −1013:−988 | −987:−962 | −959:−934 | −933:−908 | −906:−881 | −879:−854 | −853:−828 | −825:−800 | −799:−774 |
| RU48 | RU49 | RU50 | RU51 | RU52 | RU53 | RU54 | RU55 | RU56 | RU57 |
| −771:−746 | −745:−720 | −717:−692 | −691:−666 | −664:−639 | −637:−612 | −611:−586 | −583:−558 | −557:−532 | −529:−504 |
| RU58 | RU59 | RU60 | RU61 | RU62 | RU63 | RU64 | RU65 | RU66 |
| 501:−476 | −475:−450 | −447:−422 | −421:−396 | −394:−369 | −367:−342 | −341:−316 | −313:−288 | −287:−262 |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −17:−5, 5:17 |

TABLE 106-continued

| RU25 | RU26 | RU27 | RU28 |
|---|---|---|---|
| −501:−450 | −447:−396 | −367:−316 | −313:−262 |
| RU29 | RU30 | RU31 | RU32 |
| −259:−208 | −205:−154 | −125:−74 | −71:−20 |

→RU 33 to RU 64→ Subcarrier indices for RU 32+x are the same as subcarrier indices for RU 33−x multiplied by −1 (x is a positive integer that is less than or equal to 32)
→Ex) Subcarrier indices for RU 34 are the same as subcarrier indices for RU 31 multiplied by −1, that is, 74:125
Null subcarriers: ±{18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}
<106 RU>

TABLE 107

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1013:−908 | −879:−774 | −771:−666 | −637:−532 |
| RU13 | RU14 | RU15 | RU16 |
| −501:−396 | −367:−262 | −259:−154 | −125:−20 |

→RU 17 to RU 32→ Subcarrier indices for RU 16+x are the same as subcarrier indices for RU 17−x multiplied by −1 (x is a positive integer that is less than or equal to 16)
→Ex) Subcarrier indices for RU 18 are the same as subcarriers indices for RU 15 multiplied by −1, that is, 154:259
Null subcarriers: ±{18, 19, 126, 153, 260, 261, 368, 395, 502, 503, 530, 531, 638, 665, 772, 773, 880, 907, 1014, 1041, 1148, 1175, 1282, 1283, 1390, 1417, 1524, 1525, 1552, 1553, 1660, 1687, 1794, 1795, 1902, 1929, 2036}
<242 RU>

TABLE 108

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1014:−773 | −772:−531 | −502:−261 | −260:−19 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 261:502
Null subcarriers: ±{18, 503, 530, 1525, 1552}
<484 RU>

TABLE 109

| RU1 | RU2 | RU3 | RU4 |
|---|---|---|---|
| −2036:−1553 | −1524:−1041 | −1014:−531 | −502:−19 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 531:1014
Null subcarriers: ±{18, 503, 530, 1525, 1552}
<996 RU>

TABLE 110

| RU1 | RU2 | RU3 | RU4 |
|---|---|---|---|
| −2036:−1041 | −1014:−19 | 19:1014 | 1041:2036 |

Null subcarriers: ±{18}
<2018 RU>

TABLE 111

| RU1 | RU2 |
|---|---|
| −2036:−19 | 19:2036 |

Null subcarriers: ±{18}
<4068 or 4066 or 4064 or 4062 RU for New 160 MHz tone plan>
4068RU: −2036:−3, 3:2036
4066RU: −2036:−4, 4:2036
4064RU: −2036:−5, 5:2036
4062RU: −2036:−6, 6:2036
Null subcarriers: X
Pilot subcarrier indices according to the above tone plans are listed below.
<26 RU>
±{10 (or 12), 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 510, 524, 538, 552, 564, 578, 592, 606, 618, 632, 644, 658, 672, 686, 698, 712, 726, 740, 752, 766, 780, 794, 806, 820, 834, 848, 860, 874, 886, 900, 914, 928, 940, 954, 968, 982, 994, 1008, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1532, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}
<52 RU>
±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 538, 552, 564, 578, 592, 606, 618, 632, 672, 686, 698, 712, 726, 740, 752, 766, 780, 794, 806, 820, 834, 848, 860, 874, 914, 928, 940, 954, 968, 982, 994, 1008, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}

<106/242/484 RU>

±{26, 52, 94, 120, 160, 186, 228, 254, 268, 294, 336, 362, 402, 428, 470, 496, 538, 564, 606, 632, 672, 698, 740, 766, 780, 806, 848, 874, 914, 940, 982, 1008, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}

<996 RU/2020 RU/Full Band>

1. P996v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}

1.1. P2020v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}

P4096v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}

P4096v2: ±{120, 254, 362, 496, 632, 766, 874, 1008, 1142, 1276, 1384, 1518, 1654, 1788, 1896, 2030}

P4096v3: ±{52, 186, 294, 428, 564, 698, 806, 940, 1074, 1208, 1316, 1450, 1586, 1720, 1828, 1962}

1.2. P2020v2: +{120, 254, 362, 496, 632, 766, 874, 1008, 1142, 1276, 1384, 1518, 1654, 1788, 1896, 2030}

P4096v1: ±{120, 254, 362, 496, 632, 766, 874, 1008, 1142, 1276, 1384, 1518, 1654, 1788, 1896, 2030}

P4096v2: ±{254, 496, 766, 1008, 1276, 1518, 1788, 2030}

P4096v3: ±{120, 362, 632, 874, 1142, 1384, 1654, 1896}

1.3. P2020v3: ±{52, 186, 294, 428, 564, 698, 806, 940, 1074, 1208, 1316, 1450, 1586, 1720, 1828, 1962}

P4096v1: ±{52, 186, 294, 428, 564, 698, 806, 940, 1074, 1208, 1316, 1450, 1586, 1720, 1828, 1962}

P4096v2: ±{186, 428, 698, 940, 1208, 1450, 1720, 1962}

P4096v3: ±{52, 294, 564, 806, 1074, 1316, 1586, 1828}

1.4. P2020v4: ±{52, 186, 294, 428, 564, 698, 806, 940, 1142, 1276, 1384, 1518, 1654, 1788, 1896, 2030}

P4096v1: ±{52, 186, 294, 428, 564, 698, 806, 940, 1142, 1276, 1384, 1518, 1654, 1788, 1896, 2030}

P4096v2: ±{186, 428, 698, 940, 1276, 1518, 1788, 2030}

P4096v3: ±{52, 294, 564, 806, 1142, 1384, 1654, 1896}

1.5. P2020v5: ±{120, 254, 362, 496, 632, 766, 874, 1008, 1074, 1208, 1316, 1450, 1586, 1720, 1828, 1962}

P4096v1: ±{120, 254, 362, 496, 632, 766, 874, 1008, 1074, 1208, 1316, 1450, 1586, 1720, 1828, 1962}

P4096v2: ±{254, 496, 766, 1008, 1208, 1450, 1720, 1962}

P4096v3: ±{120, 362, 632, 874, 1074, 1316, 1586, 1828}

<996 RU/2020 RU/Full Band>

2. P996v2: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

2.1. P2020v1: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

P4096v1: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

P4096v2: ±{94, 228, 336, 470, 606, 740, 848, 982, 1116, 1250, 1358, 1492, 1628, 1762, 1870, 2004}

P4096v3: ±{26, 160, 268, 402, 538, 672, 780, 914, 1048, 1182, 1290, 1424, 1560, 1694, 1802, 1936}

2.2. P2020v2: ±{94, 228, 336, 470, 606, 740, 848, 982, 1116, 1250, 1358, 1492, 1628, 1762, 1870, 2004}

P4096v1: ±{94, 228, 336, 470, 606, 740, 848, 982, 1116, 1250, 1358, 1492, 1628, 1762, 1870, 2004}

P4096v2: ±{228, 470, 740, 982, 1250, 1492, 1762, 2004}

P4096v3: ±{94, 336, 606, 848, 1116, 1358, 1628, 1870}

2.3. P2020v3: ±{26, 160, 268, 402, 538, 672, 780, 914, 1048, 1182, 1290, 1424, 1560, 1694, 1802, 1936}

P4096v1: ±{26, 160, 268, 402, 538, 672, 780, 914, 1048, 1182, 1290, 1424, 1560, 1694, 1802, 1936}

P4096v2: ±{160, 402, 672, 914, 1182, 1424, 1694, 1936}

P4096v3: ±{26, 268, 538, 780, 1048, 1290, 1560, 1802}

2.4. P2020v4: ±{26, 160, 268, 402, 538, 672, 780, 914, 1116, 1250, 1358, 1492, 1628, 1762, 1870, 2004}

P4096v1: ±{26, 160, 268, 402, 538, 672, 780, 914, 1116, 1250, 1358, 1492, 1628, 1762, 1870, 2004}

P4096v2: ±{160, 402, 672, 914, 1250, 1492, 1762, 2004}

P4096v3: ±{26, 268, 538, 780, 1116, 1358, 1628, 1870}

2.5. P2020v5: ±{94, 228, 336, 470, 606, 740, 848, 982, 1048, 1182, 1290, 1424, 1560, 1694, 1802, 1936}

P4096v1: ±{94, 228, 336, 470, 606, 740, 848, 982, 1048, 1182, 1290, 1424, 1560, 1694, 1802, 1936}

P4096v2: ±{228, 470, 740, 982, 1182, 1424, 1694, 1936}

P4096v3: ±{94, 336, 606, 848, 1048, 1290, 1560, 1802}

<996 RU/2020 RU/Full Band>

3. P996v3: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

3.1. P2020v1: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

P4096v1: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

P4096v2: ±{94, 228, 336, 470, 632, 766, 874, 1008, 1116, 1250, 1358, 1492, 1654, 1788, 1896, 2030}

P4096v3: ±{26, 160, 268, 402, 564, 698, 806, 940, 1048, 1182, 1290, 1424, 1586, 1720, 1828, 1962}

3.2. P2020v2: ±{94, 228, 336, 470, 632, 766, 874, 1008, 1116, 1250, 1358, 1492, 1654, 1788, 1896, 2030}

P4096v1: ±{94, 228, 336, 470, 632, 766, 874, 1008, 1116, 1250, 1358, 1492, 1654, 1788, 1896, 2030}

P4096v2: ±{228, 470, 766, 1008, 1250, 1492, 1788, 2030}

P4096v3: ±{94, 336, 632, 874, 1116, 1358, 1654, 1896}

3.3. P2020v3: ±{26, 160, 268, 402, 564, 698, 806, 940, 1048, 1182, 1290, 1424, 1586, 1720, 1828, 1962}

P4096v1: ±{26, 160, 268, 402, 564, 698, 806, 940, 1048, 1182, 1290, 1424, 1586, 1720, 1828, 1962}

P4096v2: ±{160, 402, 698, 940, 1182, 1424, 1720, 1962}

P4096v3: ±{26, 268, 564, 806, 1048, 1290, 1586, 1828}

3.4. P2020v4: ±{26, 160, 268, 402, 564, 698, 806, 940, 1116, 1250, 1358, 1492, 1654, 1788, 1896, 2030}

P4096v1: ±{26, 160, 268, 402, 564, 698, 806, 940, 1116, 1250, 1358, 1492, 1654, 1788, 1896, 2030}

P4096v2: ±{160, 402, 698, 940, 1250, 1492, 1788, 2030}
P4096v3: ±{26, 268, 564, 806, 1116, 1358, 1654, 1896}
3.5. P2020v5: ±{94, 228, 336, 470, 632, 766, 874, 1008, 1048, 1182, 1290, 1424, 1586, 1720, 1828, 1962}
P4096v1: ±{94, 228, 336, 470, 632, 766, 874, 1008, 1048, 1182, 1290, 1424, 1586, 1720, 1828, 1962}
P4096v2: ±{228, 470, 766, 1008, 1182, 1424, 1720, 1962}
P4096v3: ±{94, 336, 632, 874, 1048, 1290, 1586, 1828}
<996 RU/2020 RU/Full Band>
4. P996v4: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}
4.1. P2020v1: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}
P4096v1: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}
P4096v2: ±{120, 254, 362, 496, 606, 740, 848, 982, 1142, 1276, 1384, 1518, 1628, 1762, 1870, 2004}
P4096v3: ±{52, 186, 294, 428, 538, 672, 780, 914, 1074, 1208, 1316, 1450, 1560, 1694, 1802, 1936}
4.2. P2020v2: ±{120, 254, 362, 496, 606, 740, 848, 982, 1142, 1276, 1384, 1518, 1628, 1762, 1870, 2004}
P4096v1: ±{120, 254, 362, 496, 606, 740, 848, 982, 1142, 1276, 1384, 1518, 1628, 1762, 1870, 2004}
P4096v2: ±{254, 496, 740, 982, 1276, 1518, 1762, 2004}
P4096v3: ±{120, 362, 606, 848, 1142, 1384, 1628, 1870}
4.3. P2020v3: ±{52, 186, 294, 428, 538, 672, 780, 914, 1074, 1208, 1316, 1450, 1560, 1694, 1802, 1936}
P4096v1: ±{52, 186, 294, 428, 538, 672, 780, 914, 1074, 1208, 1316, 1450, 1560, 1694, 1802, 1936}
P4096v2: ±{186, 428, 672, 914, 1208, 1450, 1694, 1936}
P4096v3: +{52, 294, 538, 780, 1074, 1316, 1560, 1802}
4.4. P2020v4: ±{52, 186, 294, 428, 538, 672, 780, 914, 1142, 1276, 1384, 1518, 1628, 1762, 1870, 2004}
P4096v1: ±{52, 186, 294, 428, 538, 672, 780, 914, 1142, 1276, 1384, 1518, 1628, 1762, 1870, 2004}
P4096v2: ±{186, 428, 672, 914, 1276, 1518, 1762, 2004}
P4096v3: ±{52, 294, 538, 780, 1142, 1384, 1628, 1870}
4.5. P2020v5: ±{120, 254, 362, 496, 606, 740, 848, 982, 1074, 1208, 1316, 1450, 1560, 1694, 1802, 1936}
P4096v1: ±{120, 254, 362, 496, 606, 740, 848, 982, 1074, 1208, 1316, 1450, 1560, 1694, 1802, 1936}
P4096v2: ±{254, 496, 740, 982, 1208, 1450, 1694, 1936}
P4096v3: ±{120, 362, 606, 848, 1074, 1316, 1560, 1802}

Listed below are indices for each RU and null tone in a case where a 4062/4064/4066/4068 RU is used in full-band transmission, the tone plane of 12G+2018RU+1N+13RU+9DC+13RU+1N+2018RU+11G is used, and the second configuration for the 996 RU is used.

<26 RU>

TABLE 112

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |

| RU10 | RU11 | RU12 | RU13 | RU14 | RU15 | RU16 | RU17 | RU18 | RU19 |
|---|---|---|---|---|---|---|---|---|---|
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |

| RU20 | RU21 | RU22 | RU23 | RU24 | RU25 | RU26 | RU27 | RU28 |
|---|---|---|---|---|---|---|---|---|
| −1524:−1499 | −1498:−1473 | −1470:−1445 | −1444:−1419 | −1417:−1392 | −1390:−1365 | −1364:−1339 | −1336:−1311 | −1310:−1285 |

| RU29 | RU30 | RU31 | RU32 | RU33 | RU34 | RU35 | RU36 | RU37 | RU38 |
|---|---|---|---|---|---|---|---|---|---|
| −1282:−1257 | −1256:−1231 | −1228:−1203 | −1202:−1177 | −1175:−1150 | −1148:−1123 | −1122:−1097 | −1094:−1069 | −1068:−1043 | −1040:−1015 |

| RU39 | RU40 | RU41 | RU42 | RU43 | RU44 | RU45 | RU46 | RU47 |
|---|---|---|---|---|---|---|---|---|
| −1012:−987 | −986:−961 | −958:−933 | −932:−907 | −905:−880 | −878:−853 | −852:−827 | −824:−799 | −798:−773 |

| RU48 | RU49 | RU50 | RU51 | RU52 | RU53 | RU54 | RU55 | RU56 | RU57 |
|---|---|---|---|---|---|---|---|---|---|
| −770:−745 | −744:−719 | −716:−691 | −690:−665 | −663:−638 | −636:−611 | −610:−585 | −582:−557 | −556:−531 | −529:−504 |

| RU58 | RU59 | RU60 | RU61 | RU62 | RU63 | RU64 | RU65 | RU66 |
|---|---|---|---|---|---|---|---|---|
| −502:−477 | −476:−451 | −448:−423 | −422:−397 | −395:−370 | −368:−343 | −342:−317 | −314:−289 | −288:−263 |

| RU67 | RU68 | RU69 | RU70 | RU71 | RU72 | RU73 | RU74 | RU75 | RU76 |
|---|---|---|---|---|---|---|---|---|---|
| −260:−235 | −234:−209 | −206:−181 | −180:−155 | −153:−128 | −126:−101 | −100:−75 | −72:−47 | −46:−21 | −17:−5, 5:17 |

→RU 77 to RU 151→ Subcarrier indices for RU 76+x are the same as subcarrier indices for RU 76−x multiplied by −1 (x is a positive integer that is less than or equal to 75)
→Ex) Subcarrier indices for RU 77 are the same as subcarriers indices for RU 75 multiplied by −1, that is, 21:46
Null subcarriers: ±{18, 19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<52 RU>

TABLE 113

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −502:−451 | −448:−397 | −368:−317 | −314:−263 |
| RU29 | RU30 | RU31 | RU32 |
| −260:−209 | −206:−155 | −126:−75 | −72:−21 |

→RU 33 to RU 64→ Subcarrier indices for RU 32+x are the same as subcarrier indices for RU 33−x multiplied by −1 (x is a positive integer that is less than or equal to 32)
→Ex) Subcarrier indices for RU 34 are the same as subcarrier indices for RU 31 multiplied by −1, that is, 75:126
Null subcarriers: ±{18, 19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}
<106 RU>

TABLE 114

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1012:−907 | −878:−773 | −770:−665 | −636:−531 |
| RU13 | RU14 | RU15 | RU16 |
| −502:−397 | −368:−263 | −260:−155 | −126:−21 |

→RU 17 to RU 32→ Subcarrier indices for RU 16+x are the same as subcarrier indices for RU 17−x multiplied by −1 (x is a positive integer that is less than or equal to 16)
→Ex) Subcarrier indices for RU 18 are the same as subcarrier indices for RU 15 multiplied by −1, that is, 155:260
Null subcarriers: ±{18, 19, 20, 127, 154, 261, 262, 369, 396, 503, 530, 637, 664, 771, 772, 879, 906, 1013, 1014, 1041, 1042, 1149, 1176, 1283, 1284, 1391, 1418, 1525, 1552, 1659, 1686, 1793, 1794, 1901, 1928, 2035, 2036}
<242 RU>

TABLE 115

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1013:−772 | −771:−530 | −503:−262 | −261:−20 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 262:503
Null subcarriers: ±{18, 19, 1014, 1041, 2036}
<484 RU>

TABLE 116

| RU1 | RU2 | RU3 | RU4 |
|---|---|---|---|
| −2035:−1552 | −1525:−1042 | −1013:−530 | −503:−20 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 530:1013
Null subcarriers: ±{18, 19, 1014, 1041, 2036}
<996 RU>

TABLE 117

| RU1 | RU2 | RU3 | RU4 |
|---|---|---|---|
| −2036:−1041 | −1014:−19 | 19:1014 | 1041:2036 |

Null subcarriers: ±{18}
<2018 RU>

TABLE 118

| RU1 | RU2 |
|---|---|
| −2036:−19 | 19:2036 |

Null subcarriers: ±{18}
<4068 or 4066 or 4064 or 4062 RU for New 160 MHz tone plan>
4068RU: −2036:−3, 3:2036
4066RU: −2036:−4, 4:2036
4064RU: −2036:−5, 5:2036
4062RU: −2036:−6, 6:2036
Null subcarriers: X
Pilot subcarrier indices according to the above tone plans are listed below.
<26 RU>
±{10 (or 12), 26, 40, 52, 66, 80, 94, 106, 120, 134, 148, 160, 174, 186, 200, 214, 228, 240, 254, 268, 282, 294, 308, 322, 336, 348, 362, 376, 390, 402, 416, 428, 442, 456, 470, 482, 496, 510, 524, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1048, 1062, 1074, 1088, 1102, 1116, 1128, 1142, 1156, 1170, 1182, 1196, 1208, 1222, 1236, 1250, 1262, 1276, 1290, 1304, 1316, 1330, 1344, 1358, 1370, 1384, 1398, 1412, 1424, 1438, 1450, 1464, 1478, 1492, 1504, 1518, 1532, 1546, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

<52 RU>

±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>

±{26, 52, 94, 120, 160, 186, 228, 254, 268, 294, 336, 362, 402, 428, 470, 496, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

1.1. P2020v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v2: ±{120, 254, 362, 496, 630, 764, 872, 1006, 1142, 1276, 1384, 1518, 1652, 1786, 1894, 2028}

P4096v3: ±{52, 186, 294, 428, 562, 696, 804, 938, 1074, 1208, 1316, 1450, 1584, 1718, 1826, 1960}

1.2. P2020v2: ±{120, 254, 362, 496, 630, 764, 872, 1006, 1142, 1276, 1384, 1518, 1652, 1786, 1894, 2028}

P4096v1: +{120, 254, 362, 496, 630, 764, 872, 1006, 1142, 1276, 1384, 1518, 1652, 1786, 1894, 2028}

P4096v2: ±{254, 496, 764, 1006, 1276, 1518, 1786, 2028}

P4096v3: ±{120, 362, 630, 872, 1142, 1384, 1652, 1894}

1.3. P2020v3: ±{52, 186, 294, 428, 562, 696, 804, 938, 1074, 1208, 1316, 1450, 1584, 1718, 1826, 1960}

P4096v1: ±{52, 186, 294, 428, 562, 696, 804, 938, 1074, 1208, 1316, 1450, 1584, 1718, 1826, 1960}

P4096v2: ±{186, 428, 696, 938, 1208, 1450, 1718, 1960}

P4096v3: ±{52, 294, 562, 804, 1074, 1316, 1584, 1826}

1.4. P2020v4: ±{52, 186, 294, 428, 562, 696, 804, 938, 1142, 1276, 1384, 1518, 1652, 1786, 1894, 2028}

P4096v1: ±{52, 186, 294, 428, 562, 696, 804, 938, 1142, 1276, 1384, 1518, 1652, 1786, 1894, 2028}

P4096v2: ±{186, 428, 696, 938, 1276, 1518, 1786, 2028}

P4096v3: ±{52, 294, 562, 804, 1142, 1384, 1652, 1894}

1.5. P2020v5:: +{120, 254, 362, 496, 630, 764, 872, 1006, 1074, 1208, 1316, 1450, 1584, 1718, 1826, 1960}

P4096v1: ±{120, 254, 362, 496, 630, 764, 872, 1006, 1074, 1208, 1316, 1450, 1584, 1718, 1826, 1960}

P4096v2: ±{254, 496, 764, 1006, 1208, 1450, 1718, 1960}

P4096v3: ±{120, 362, 630, 872, 1074, 1316, 1584, 1826}

<996 RU/2020 RU/Full Band>

2. P996v2: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

2.1. P2020v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v2: ±{94, 228, 336, 470, 604, 738, 846, 980, 1116, 1250, 1358, 1492, 1626, 1760, 1868, 2002}

P4096v3: ±{26, 160, 268, 402, 536, 670, 778, 912, 1048, 1182, 1290, 1424, 1558, 1692, 1800, 1934}

2.2. P2020v2: ±{94, 228, 336, 470, 604, 738, 846, 980, 1116, 1250, 1358, 1492, 1626, 1760, 1868, 2002}

P4096v1: ±{94, 228, 336, 470, 604, 738, 846, 980, 1116, 1250, 1358, 1492, 1626, 1760, 1868, 2002}

P4096v2: ±{228, 470, 738, 980, 1250, 1492, 1760, 2002}

P4096v3: ±{94, 336, 604, 846, 1116, 1358, 1626, 1868}

2.3. P2020v3: ±{26, 160, 268, 402, 536, 670, 778, 912, 1048, 1182, 1290, 1424, 1558, 1692, 1800, 1934}

P4096v1: ±{26, 160, 268, 402, 536, 670, 778, 912, 1048, 1182, 1290, 1424, 1558, 1692, 1800, 1934}

P4096v2: ±{160, 402, 670, 912, 1182, 1424, 1692, 1934}

P4096v3: ±{26, 268, 536, 778, 1048, 1290, 1558, 1800}

2.4. P2020v4: ±{26, 160, 268, 402, 536, 670, 778, 912, 1116, 1250, 1358, 1492, 1626, 1760, 1868, 2002}

P4096v1: ±{26, 160, 268, 402, 536, 670, 778, 912, 1116, 1250, 1358, 1492, 1626, 1760, 1868, 2002}

P4096v2: ±{160, 402, 670, 912, 1250, 1492, 1760, 2002}

P4096v3: ±{26, 268, 536, 778, 1116, 1358, 1626, 1868}

2.5. P2020v5: ±{94, 228, 336, 470, 604, 738, 846, 980, 1048, 1182, 1290, 1424, 1558, 1692, 1800, 1934}

P4096v1: ±{94, 228, 336, 470, 604, 738, 846, 980, 1048, 1182, 1290, 1424, 1558, 1692, 1800, 1934}

P4096v2: ±{228, 470, 738, 980, 1182, 1424, 1692, 1934}

P4096v3: ±{94, 336, 604, 846, 1048, 1290, 1558, 1800}

<996 RU/2020 RU/Full Band>

3. P996v3: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

3.1. P2020v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v2: ±{94, 228, 336, 470, 630, 764, 872, 1006, 1116, 1250, 1358, 1492, 1652, 1786, 1894, 2028}

P4096v3: ±{26, 160, 268, 402, 562, 696, 804, 938, 1048, 1182, 1290, 1424, 1584, 1718, 1826, 1960}

3.2. P2020v2: ±{94, 228, 336, 470, 630, 764, 872, 1006, 1116, 1250, 1358, 1492, 1652, 1786, 1894, 2028}

P4096v1: ±{94, 228, 336, 470, 630, 764, 872, 1006, 1116, 1250, 1358, 1492, 1652, 1786, 1894, 2028}

P4096v2: ±{228, 470, 764, 1006, 1250, 1492, 1786, 2028}

P4096v3: ±{94, 336, 630, 872, 1116, 1358, 1652, 1894}

3.3. P2020v3: ±{26, 160, 268, 402, 562, 696, 804, 938, 1048, 1182, 1290, 1424, 1584, 1718, 1826, 1960}

P4096v1: ±{26, 160, 268, 402, 562, 696, 804, 938, 1048, 1182, 1290, 1424, 1584, 1718, 1826, 1960}

P4096v2: ±{160, 402, 696, 938, 1182, 1424, 1718, 1960}

P4096v3: ±{26, 268, 562, 804, 1048, 1290, 1584, 1826}

3.4 P2020v4: ±{26, 160, 268, 402, 562, 696, 804, 938, 1116, 1250, 1358, 1492, 1652, 1786, 1894, 2028}

P4096v1: ±{26, 160, 268, 402, 562, 696, 804, 938, 1116, 1250, 1358, 1492, 1652, 1786, 1894, 2028}

P4096v2: ±{160, 402, 696, 938, 1250, 1492, 1786, 2028}

P4096v3: ±{26, 268, 562, 804, 1116, 1358, 1652, 1894}

3.5. P2020v5: ±{94, 228, 336, 470, 630, 764, 872, 1006, 1048, 1182, 1290, 1424, 1584, 1718, 1826, 1960}

P4096v1: ±{94, 228, 336, 470, 630, 764, 872, 1006, 1048, 1182, 1290, 1424, 1584, 1718, 1826, 1960}

P4096v2: ±{228, 470, 764, 1006, 1182, 1424, 1718, 1960}

P4096v3: ±{94, 336, 630, 872, 1048, 1290, 1584, 1826}

<996 RU/2020 RU/Full Band>

4. P996v4: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

4.1. P2020v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v2: ±{120, 254, 362, 496, 604, 738, 846, 980, 1142, 1276, 1384, 1518, 1626, 1760, 1868, 2002}

P4096v3: ±{52, 186, 294, 428, 536, 670, 778, 912, 1074, 1208, 1316, 1450, 1558, 1692, 1800, 1934}

4.2. P2020v2: ±{120, 254, 362, 496, 604, 738, 846, 980, 1142, 1276, 1384, 1518, 1626, 1760, 1868, 2002}

P4096v1: ±{120, 254, 362, 496, 604, 738, 846, 980, 1142, 1276, 1384, 1518, 1626, 1760, 1868, 2002}

P4096v2: ±{254, 496, 738, 980, 1276, 1518, 1760, 2002}

P4096v3: ±{120, 362, 604, 846, 1142, 1384, 1626, 1868}

4.3. P2020v3: ±{52, 186, 294, 428, 536, 670, 778, 912, 1074, 1208, 1316, 1450, 1558, 1692, 1800, 1934}

P4096v1: ±{52, 186, 294, 428, 536, 670, 778, 912, 1074, 1208, 1316, 1450, 1558, 1692, 1800, 1934}

P4096v2: ±{186, 428, 670, 912, 1208, 1450, 1692, 1934}

P4096v3: ±{52, 294, 536, 778, 1074, 1316, 1558, 1800}

4.4. P2020v4: ±{52, 186, 294, 428, 536, 670, 778, 912, 1142, 1276, 1384, 1518, 1626, 1760, 1868, 2002}

P4096v1: ±{52, 186, 294, 428, 536, 670, 778, 912, 1142, 1276, 1384, 1518, 1626, 1760, 1868, 2002}

P4096v2: ±{186, 428, 670, 912, 1276, 1518, 1760, 2002}

P4096v3: ±{52, 294, 536, 778, 1142, 1384, 1626, 1868}

4.5. P2020v5: ±{120, 254, 362, 496, 604, 738, 846, 980, 1074, 1208, 1316, 1450, 1558, 1692, 1800, 1934}

P4096v1: ±{120, 254, 362, 496, 604, 738, 846, 980, 1074, 1208, 1316, 1450, 1558, 1692, 1800, 1934}

P4096v2: ±{254, 496, 738, 980, 1208, 1450, 1692, 1934}

P4096v3: ±{120, 362, 604, 846, 1074, 1316, 1558, 1800}

Listed below are indices for each RU and null tone in a case where a 4062/4064/4066/4068 RU is used in full-band transmission, a tone plane of 12G+2018RU+2N+13RU+7DC+13RU+2N+2018RU+11G is used, and the first configuration for the 996 RU is used.

<26 RU>

TABLE 119

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 |
| −1523:−1498 | −1497:−1472 | −1469:−1444 | −1443:−1418 | −1416:−1391 | −1389:−1364 | −1363:−1338 | −1335:−1310 | −1309:−1284 |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1040:−1015 |
| RU39 | RU40 | RU41 | RU42 | RU43 | RU44 | RU45 | RU46 | RU47 |
| −1013:−988 | −987:−962 | −959:−934 | −933:−908 | −906:−881 | −879:−854 | −853:−828 | −825:−800 | −799:−774 |
| RU48 | RU49 | RU50 | RU51 | RU52 | RU53 | RU54 | RU55 | RU56 | RU57 |
| −771:−746 | −745:−720 | −717:−692 | −691:−666 | −664:−639 | −637:−612 | −611:−586 | −583:−558 | −557:−532 | −529:−504 |
| RU58 | RU59 | RU60 | RU61 | RU62 | RU63 | RU64 | RU65 | RU66 |
| 501:−476 | −475:−450 | −447:−422 | −421:−396 | −394:−369 | −367:−342 | −341:−316 | −313:−288 | −287:−262 |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −16:−4, 4:16 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarriers indices for RU 75 multiplied by −1, that is, 20:45

Null subcarriers: ±{17, 18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 120

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1013:−962 | −959:−908 | −879:−828 | −825:−774 |
| RU21 | RU22 | RU23 | RU24 |
| −771:−720 | −717:−666 | −637:−586 | −583:−532 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 74:125

Null subcarriers: +{17, 18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 121

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |

TABLE 121-continued

| RU9 | RU10 | RU11 | RU12 |
|---|---|---|---|
| −1013:−908 | −879:−774 | −771:−666 | −637:−532 |
| RU13 | RU14 | RU15 | RU16 |
| −501:−396 | −367:−262 | −259:−154 | −125:−20 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 154:259

Null subcarriers: ±{17, 18, 19, 126, 153, 260, 261, 368, 395, 502, 503, 530, 531, 638, 665, 772, 773, 880, 907, 1014, 1041, 1148, 1175, 1282, 1283, 1390, 1417, 1524, 1525, 1552, 1553, 1660, 1687, 1794, 1795, 1902, 1929, 2036}

<242 RU>

TABLE 122

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1014:−773 | −772:−531 | −502:−261 | −260:−19 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 261:502

Null subcarriers: ±{17, 18, 503, 530, 1525, 1552}

<484 RU>

TABLE 123

| RU1 | RU2 | RU3 | RU4 |
|---|---|---|---|
| −2036:−1553 | −1524:−1041 | −1014:−531 | −502:−19 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 531:1014

Null subcarriers: ±{17, 18, 503, 530, 1525, 1552}

<996 RU>

TABLE 124

| RU1 | RU2 | RU3 | RU4 |
|---|---|---|---|
| −2036:−1041 | −1014:−19 | 19:1014 | 1041:2036 |

Null subcarriers: ±{17, 18}

<2018 RU>

TABLE 125

| RU1 | RU2 |
|---|---|
| −2036:−19 | 19:2036 |

Null subcarriers: ±{17, 18}

<4068 or 4066 or 4064 or 4062 RU for New 160 MHz tone plan>
4068RU: −2036:−3, 3:2036
4066RU: −2036:−4, 4:2036
4064RU: −2036:−5, 5:2036
4062RU: −2036:−6, 6:2036
Null subcarriers: X
Pilot subcarrier indices according to the above tone plans are listed below.

<26 RU>
+{10, 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 509, 523, 538, 552, 564, 578, 592, 606, 618, 632, 644, 658, 672, 686, 698, 712, 726, 740, 752, 766, 780, 794, 806, 820, 834, 848, 860, 874, 886, 900, 914, 928, 940, 954, 968, 982, 994, 1008, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}

<52 RU>
±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 538, 552, 564, 578, 592, 606, 618, 632, 672, 686, 698, 712, 726, 740, 752, 766, 780, 794, 806, 820, 834, 848, 860, 874, 914, 928, 940, 954, 968, 982, 994, 1008, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}

<106/242/484 RU>
±{26, 52, 94, 120, 160, 186, 228, 254, 268, 294, 336, 362, 402, 428, 470, 496, 538, 564, 606, 632, 672, 698, 740, 766, 780, 806, 848, 874, 914, 940, 982, 1008, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}

<996 RU/2020 RU/Full Band>
1. P996v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}
 1.1. P2020v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}
  P4096v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}
  P4096v2: ±{120, 254, 362, 496, 632, 766, 874, 1008, 1142, 1276, 1384, 1518, 1654, 1788, 1896, 2030}
  P4096v3: ±{52, 186, 294, 428, 564, 698, 806, 940, 1074, 1208, 1316, 1450, 1586, 1720, 1828, 1962}
 1.2. P2020v2: ±{120, 254, 362, 496, 632, 766, 874, 1008, 1142, 1276, 1384, 1518, 1654, 1788, 1896, 2030}
  P4096v1: ±{120, 254, 362, 496, 632, 766, 874, 1008, 1142, 1276, 1384, 1518, 1654, 1788, 1896, 2030}
  P4096v2: ±{254, 496, 766, 1008, 1276, 1518, 1788, 2030}
  P4096v3: ±{120, 362, 632, 874, 1142, 1384, 1654, 1896}
 1.3. P2020v3: ±{52, 186, 294, 428, 564, 698, 806, 940, 1074, 1208, 1316, 1450, 1586, 1720, 1828, 1962}
  P4096v1: ±{52, 186, 294, 428, 564, 698, 806, 940, 1074, 1208, 1316, 1450, 1586, 1720, 1828, 1962}
  P4096v2: ±{186, 428, 698, 940, 1208, 1450, 1720, 1962}
  P4096v3: ±{52, 294, 564, 806, 1074, 1316, 1586, 1828}
 1.4. P2020v4: ±{52, 186, 294, 428, 564, 698, 806, 940, 1142, 1276, 1384, 1518, 1654, 1788, 1896, 2030}
  P4096v1: ±{52, 186, 294, 428, 564, 698, 806, 940, 1142, 1276, 1384, 1518, 1654, 1788, 1896, 2030}
  P4096v2: ±{186, 428, 698, 940, 1276, 1518, 1788, 2030}
  P4096v3: ±{52, 294, 564, 806, 1142, 1384, 1654, 1896}
 1.5. P2020v5: ±{120, 254, 362, 496, 632, 766, 874, 1008, 1074, 1208, 1316, 1450, 1586, 1720, 1828, 1962}
  P4096v1: ±{120, 254, 362, 496, 632, 766, 874, 1008, 1074, 1208, 1316, 1450, 1586, 1720, 1828, 1962}
  P4096v2: ±{254, 496, 766, 1008, 1208, 1450, 1720, 1962}
  P4096v3: ±{120, 362, 632, 874, 1074, 1316, 1586, 1828}

<996 RU/2020 RU/Full Band>
2. P996v2: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}
 2.1. P2020v1: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}
  P4096v1: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}
  P4096v2: ±{94, 228, 336, 470, 606, 740, 848, 982, 1116, 1250, 1358, 1492, 1628, 1762, 1870, 2004}
  P4096v3: ±{26, 160, 268, 402, 538, 672, 780, 914, 1048, 1182, 1290, 1424, 1560, 1694, 1802, 1936}
 2.2. P2020v2: ±{94, 228, 336, 470, 606, 740, 848, 982, 1116, 1250, 1358, 1492, 1628, 1762, 1870, 2004}
  P4096v1: ±{94, 228, 336, 470, 606, 740, 848, 982, 1116, 1250, 1358, 1492, 1628, 1762, 1870, 2004}
  P4096v2: ±{228, 470, 740, 982, 1250, 1492, 1762, 2004}
  P4096v3: ±{94, 336, 606, 848, 1116, 1358, 1628, 1870}
 2.3. P2020v3: ±{26, 160, 268, 402, 538, 672, 780, 914, 1048, 1182, 1290, 1424, 1560, 1694, 1802, 1936}
  P4096v1: ±{26, 160, 268, 402, 538, 672, 780, 914, 1048, 1182, 1290, 1424, 1560, 1694, 1802, 1936}
  P4096v2: ±{160, 402, 672, 914, 1182, 1424, 1694, 1936}
  P4096v3: ±{26, 268, 538, 780, 1048, 1290, 1560, 1802}
 2.4. P2020v4: ±{26, 160, 268, 402, 538, 672, 780, 914, 1116, 1250, 1358, 1492, 1628, 1762, 1870, 2004}
  P4096v1: ±{26, 160, 268, 402, 538, 672, 780, 914, 1116, 1250, 1358, 1492, 1628, 1762, 1870, 2004}
  P4096v2: ±{160, 402, 672, 914, 1250, 1492, 1762, 2004}
  P4096v3: ±{26, 268, 538, 780, 1116, 1358, 1628, 1870}
 2.5. P2020v5: ±{94, 228, 336, 470, 606, 740, 848, 982, 1048, 1182, 1290, 1424, 1560, 1694, 1802, 1936}
  P4096v1: ±{94, 228, 336, 470, 606, 740, 848, 982, 1048, 1182, 1290, 1424, 1560, 1694, 1802, 1936}
  P4096v2: ±{228, 470, 740, 982, 1182, 1424, 1694, 1936}
  P4096v3: ±{94, 336, 606, 848, 1048, 1290, 1560, 1802}

<996 RU/2020 RU/Full Band>
3. P996v3: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

3.1. P2020v1: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

P4096v1: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

P4096v2: ±{94, 228, 336, 470, 632, 766, 874, 1008, 1116, 1250, 1358, 1492, 1654, 1788, 1896, 2030}

P4096v3: ±{26, 160, 268, 402, 564, 698, 806, 940, 1048, 1182, 1290, 1424, 1586, 1720, 1828, 1962}

3.2. P2020v2: ±{94, 228, 336, 470, 632, 766, 874, 1008, 1116, 1250, 1358, 1492, 1654, 1788, 1896, 2030}

P4096v1: ±{94, 228, 336, 470, 632, 766, 874, 1008, 1116, 1250, 1358, 1492, 1654, 1788, 1896, 2030}

P4096v2: ±{228, 470, 766, 1008, 1250, 1492, 1788, 2030}

P4096v3: ±{94, 336, 632, 874, 1116, 1358, 1654, 1896}

3.3. P2020v3: ±{26, 160, 268, 402, 564, 698, 806, 940, 1048, 1182, 1290, 1424, 1586, 1720, 1828, 1962}

P4096v1: ±{26, 160, 268, 402, 564, 698, 806, 940, 1048, 1182, 1290, 1424, 1586, 1720, 1828, 1962}

P4096v2: ±{160, 402, 698, 940, 1182, 1424, 1720, 1962}

P4096v3: ±{26, 268, 564, 806, 1048, 1290, 1586, 1828}

3.4. P2020v4: ±{26, 160, 268, 402, 564, 698, 806, 940, 1116, 1250, 1358, 1492, 1654, 1788, 1896, 2030}

P4096v1: ±{26, 160, 268, 402, 564, 698, 806, 940, 1116, 1250, 1358, 1492, 1654, 1788, 1896, 2030}

P4096v2: ±{160, 402, 698, 940, 1250, 1492, 1788, 2030}

P4096v3: ±{26, 268, 564, 806, 1116, 1358, 1654, 1896}

3.5. P2020v5: ±{94, 228, 336, 470, 632, 766, 874, 1008, 1048, 1182, 1290, 1424, 1586, 1720, 1828, 1962}

P4096v1: ±{94, 228, 336, 470, 632, 766, 874, 1008, 1048, 1182, 1290, 1424, 1586, 1720, 1828, 1962}

P4096v2: ±{228, 470, 766, 1008, 1182, 1424, 1720, 1962}

P4096v3: ±{94, 336, 632, 874, 1048, 1290, 1586, 1828}

<996 RU/2020 RU/Full Band>
4. P996v4: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

4.1. P2020v1: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

P4096v1: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

P4096v2: ±{120, 254, 362, 496, 606, 740, 848, 982, 1142, 1276, 1384, 1518, 1628, 1762, 1870, 2004}

P4096v3: ±{52, 186, 294, 428, 538, 672, 780, 914, 1074, 1208, 1316, 1450, 1560, 1694, 1802, 1936}

4.2. P2020v2: ±{120, 254, 362, 496, 606, 740, 848, 982, 1142, 1276, 1384, 1518, 1628, 1762, 1870, 2004}

P4096v1: ±{120, 254, 362, 496, 606, 740, 848, 982, 1142, 1276, 1384, 1518, 1628, 1762, 1870, 2004}

P4096v2: ±{254, 496, 740, 982, 1276, 1518, 1762, 2004}

P4096v3: +{120, 362, 606, 848, 1142, 1384, 1628, 1870}

4.3. P2020v3: ±{52, 186, 294, 428, 538, 672, 780, 914, 1074, 1208, 1316, 1450, 1560, 1694, 1802, 1936}

P4096v1: ±{52, 186, 294, 428, 538, 672, 780, 914, 1074, 1208, 1316, 1450, 1560, 1694, 1802, 1936}

P4096v2: ±{186, 428, 672, 914, 1208, 1450, 1694, 1936}

P4096v3: +{52, 294, 538, 780, 1074, 1316, 1560, 1802}

4.4. P2020v4: ±{52, 186, 294, 428, 538, 672, 780, 914, 1142, 1276, 1384, 1518, 1628, 1762, 1870, 2004}

P4096v1: ±{52, 186, 294, 428, 538, 672, 780, 914, 1142, 1276, 1384, 1518, 1628, 1762, 1870, 2004}

P4096v2: ±{186, 428, 672, 914, 1276, 1518, 1762, 2004}

P4096v3: ±{52, 294, 538, 780, 1142, 1384, 1628, 1870}

4.5. P2020v5: ±{120, 254, 362, 496, 606, 740, 848, 982, 1074, 1208, 1316, 1450, 1560, 1694, 1802, 1936}

P4096v1: ±{120, 254, 362, 496, 606, 740, 848, 982, 1074, 1208, 1316, 1450, 1560, 1694, 1802, 1936}

P4096v2: ±{254, 496, 740, 982, 1208, 1450, 1694, 1936}

P4096v3: ±{120, 362, 606, 848, 1074, 1316, 1560, 1802}

Listed below are indices for each RU and null tone in a case where a 4062/4064/4066/4068 RU is used in full-band transmission, the tone plane of 12G+2018RU+2N+13RU+7DC+13RU+2N+2018RU+11G is used, and the second configuration for the 996 RU is used.

<26 RU>

TABLE 126

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |

| RU10 | RU11 | RU12 | RU13 | RU14 | RU15 | RU16 | RU17 | RU18 | RU19 |
|---|---|---|---|---|---|---|---|---|---|
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |

| RU20 | RU21 | RU22 | RU23 | RU24 | RU25 | RU26 | RU27 | RU28 |
|---|---|---|---|---|---|---|---|---|
| −1524:−1499 | −1498:−1473 | −1470:−1445 | −1444:−1419 | −1417:−1392 | −1390:−1365 | −1364:−1339 | −1336:−1311 | −1310:−1285 |

| RU29 | RU30 | RU31 | RU32 | RU33 | RU34 | RU35 | RU36 | RU37 | RU38 |
|---|---|---|---|---|---|---|---|---|---|
| −1282:−1257 | −1256:−1231 | −1228:−1203 | −1202:−1177 | −1175:−1150 | −1148:−1123 | −1122:−1097 | −1094:−1069 | −1068:−1043 | −1040:−1015 |

| RU39 | RU40 | RU41 | RU42 | RU43 | RU44 | RU45 | RU46 | RU47 |
|---|---|---|---|---|---|---|---|---|
| −1012:−987 | −986:−961 | −958:−933 | −932:−907 | −905:−880 | −878:−853 | −852:−827 | −824:−799 | −798:−773 |

TABLE 126-continued

| RU48 | RU49 | RU50 | RU51 | RU52 | RU53 | RU54 | RU55 | RU56 | RU57 |
|---|---|---|---|---|---|---|---|---|---|
| −770:−745 | −744:−719 | −716:−691 | −690:−665 | −663:−638 | −636:−611 | −610:−585 | −582:−557 | −556:−531 | −529:−504 |
| RU58 | RU59 | RU60 | RU61 | RU62 | RU63 | RU64 | RU65 | RU66 | |
| −502:−477 | −476:−451 | −448:−423 | −422:−397 | −395:−370 | −368:−343 | −342:−317 | −314:−289 | −288:−263 | |
| RU67 | RU68 | RU69 | RU70 | RU71 | RU72 | RU73 | RU74 | RU75 | RU76 |
| −260:−235 | −234:−209 | −206:−181 | −180:−155 | −153:−128 | −126:−101 | −100:−75 | −72:−47 | −46:−21 | −16:−4, 4:16 |

→RU 77 to RU 151→ Subcarrier indices for RU 76+x are the same as subcarrier indices for RU 76−x multiplied by −1 (x is a positive integer that is less than or equal to 75)
→Ex) Subcarrier indices for RU 77 are the same as subcarriers indices for RU 75 multiplied by −1, that is, 21:46
Null subcarriers: ±{17, 18, 19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}
<52 RU>

TABLE 127

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −502:−451 | −448:−397 | −368:−317 | −314:−263 |
| RU29 | RU30 | RU31 | RU32 |
| −260:−209 | −206:−155 | −126:−75 | −72:−21 |

→RU 33 to RU 64→ Subcarrier indices for RU 32+x are the same as subcarrier indices for RU 33−x multiplied by −1 (x is a positive integer that is less than or equal to 32)
→Ex) Subcarrier indices for RU 34 are the same as subcarrier indices for RU 31 multiplied by −1, that is, 75:126
Null subcarriers: ±{17, 18, 19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}
<106 RU>

TABLE 128

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1012:−907 | −878:−773 | −770:−665 | −636:−531 |
| RU13 | RU14 | RU15 | RU16 |
| −502:−397 | −368:−263 | −260:−155 | −126:−21 |

→RU 17 to RU 32→ Subcarrier indices for RU 16+x are the same as subcarrier indices for RU 17−x multiplied by −1 (x is a positive integer that is less than or equal to 16)
→Ex) Subcarrier indices for RU 18 are the same as subcarrier indices for RU 15 multiplied by −1, that is, 155:260
Null subcarriers: ±{17, 18, 19, 20, 127, 154, 261, 262, 369, 396, 503, 530, 637, 664, 771, 772, 879, 906, 1013, 1014, 1041, 1042, 1149, 1176, 1283, 1284, 1391, 1418, 1525, 1552, 1659, 1686, 1793, 1794, 1901, 1928, 2035, 2036}
<242 RU>

TABLE 129

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1013:−772 | −771:−530 | −503:−262 | −261:−20 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 262:503
Null subcarriers: ±{17, 18, 19, 1014, 1041, 2036}
<484 RU>

TABLE 130

| RU1 | RU2 | RU3 | RU4 |
|---|---|---|---|
| −2035:−1552 | −1525:−1042 | −1013:−530 | −503:−20 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 530:1013

Null subcarriers: ±{17, 18, 19, 1014, 1041, 2036}
<996 RU>

TABLE 131

| RU1 | RU2 | RU3 | RU4 |
|---|---|---|---|
| −2036:−1041 | −1014:−19 | 19:1014 | 1041:2036 |

Null subcarriers: ±{17, 18}
<2018 RU>

TABLE 132

| RU1 | RU2 |
|---|---|
| −2036:−19 | 19:2036 |

Null subcarriers: ±{17, 18}
<4068 or 4066 or 4064 or 4062 RU for New 160 MHz tone plan>
4068RU: −2036:−3, 3:2036
4066RU: −2036:−4, 4:2036
4064RU: −2036:−5, 5:2036
4062RU: −2036:−6, 6:2036
Null subcarriers: X
Pilot subcarrier indices according to the above tone plans are listed below.
<26 RU>
±{10, 26, 40, 52, 66, 80, 94, 106, 120, 134, 148, 160, 174, 186, 200, 214, 228, 240, 254, 268, 282, 294, 308, 322, 336, 348, 362, 376, 390, 402, 416, 428, 442, 456, 470, 482, 496, 510, 524, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1048, 1062, 1074, 1088, 1102, 1116, 1128, 1142, 1156, 1170, 1182, 1196, 1208, 1222, 1236, 1250, 1262, 1276, 1290, 1304, 1316, 1330, 1344, 1358, 1370, 1384, 1398, 1412, 1424, 1438, 1450, 1464, 1478, 1492, 1504, 1518, 1532, 1546, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}
<52 RU>
±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}
<106/242/484 RU>
±{26, 52, 94, 120, 160, 186, 228, 254, 268, 294, 336, 362, 402, 428, 470, 496, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}
<996 RU/2020 RU/Full Band>
1. P996v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
1.1. P2020v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
P4096v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
P4096v2: ±{120, 254, 362, 496, 630, 764, 872, 1006, 1142, 1276, 1384, 1518, 1652, 1786, 1894, 2028}
P4096v3: ±{52, 186, 294, 428, 562, 696, 804, 938, 1074, 1208, 1316, 1450, 1584, 1718, 1826, 1960}
1.2. P2020v2: ±{120, 254, 362, 496, 630, 764, 872, 1006, 1142, 1276, 1384, 1518, 1652, 1786, 1894, 2028}
P4096v1: ±{120, 254, 362, 496, 630, 764, 872, 1006, 1142, 1276, 1384, 1518, 1652, 1786, 1894, 2028}
P4096v2: ±{254, 496, 764, 1006, 1276, 1518, 1786, 2028}
P4096v3: ±{120, 362, 630, 872, 1142, 1384, 1652, 1894}
1.3. P2020v3: ±{52, 186, 294, 428, 562, 696, 804, 938, 1074, 1208, 1316, 1450, 1584, 1718, 1826, 1960}
P4096v1: ±{52, 186, 294, 428, 562, 696, 804, 938, 1074, 1208, 1316, 1450, 1584, 1718, 1826, 1960}
P4096v2: ±{186, 428, 696, 938, 1208, 1450, 1718, 1960}
P4096v3: ±{52, 294, 562, 804, 1074, 1316, 1584, 1826}
1.4. P2020v4: ±{52, 186, 294, 428, 562, 696, 804, 938, 1142, 1276, 1384, 1518, 1652, 1786, 1894, 2028}
P4096v1: ±{52, 186, 294, 428, 562, 696, 804, 938, 1142, 1276, 1384, 1518, 1652, 1786, 1894, 2028}
P4096v2: ±{186, 428, 696, 938, 1276, 1518, 1786, 2028}
P4096v3: ±{52, 294, 562, 804, 1142, 1384, 1652, 1894}
1.5. P2020v5:: ±{120, 254, 362, 496, 630, 764, 872, 1006, 1074, 1208, 1316, 1450, 1584, 1718, 1826, 1960}
P4096v1: ±{120, 254, 362, 496, 630, 764, 872, 1006, 1074, 1208, 1316, 1450, 1584, 1718, 1826, 1960}
P4096v2: ±{254, 496, 764, 1006, 1208, 1450, 1718, 1960}
P4096v3: ±{120, 362, 630, 872, 1074, 1316, 1584, 1826}
<996 RU/2020 RU/Full Band>
2. P996v2: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
2.1. P2020v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
P4096v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
P4096v2: ±{94, 228, 336, 470, 604, 738, 846, 980, 1116, 1250, 1358, 1492, 1626, 1760, 1868, 2002}
P4096v3: ±{26, 160, 268, 402, 536, 670, 778, 912, 1048, 1182, 1290, 1424, 1558, 1692, 1800, 1934}
2.2. P2020v2: +{94, 228, 336, 470, 604, 738, 846, 980, 1116, 1250, 1358, 1492, 1626, 1760, 1868, 2002}

P4096v1: ±{94, 228, 336, 470, 604, 738, 846, 980, 1116, 1250, 1358, 1492, 1626, 1760, 1868, 2002}
P4096v2: ±{228, 470, 738, 980, 1250, 1492, 1760, 2002}
P4096v3: ±{94, 336, 604, 846, 1116, 1358, 1626, 1868}
  2.3. P2020v3: ±{26, 160, 268, 402, 536, 670, 778, 912, 1048, 1182, 1290, 1424, 1558, 1692, 1800, 1934}
P4096v1: ±{26, 160, 268, 402, 536, 670, 778, 912, 1048, 1182, 1290, 1424, 1558, 1692, 1800, 1934}
P4096v2: ±{160, 402, 670, 912, 1182, 1424, 1692, 1934}
P4096v3: ±{26, 268, 536, 778, 1048, 1290, 1558, 1800}
  2.4. P2020v4: ±{26, 160, 268, 402, 536, 670, 778, 912, 1116, 1250, 1358, 1492, 1626, 1760, 1868, 2002}
P4096v1: ±{26, 160, 268, 402, 536, 670, 778, 912, 1116, 1250, 1358, 1492, 1626, 1760, 1868, 2002}
P4096v2: ±{160, 402, 670, 912, 1250, 1492, 1760, 2002}
P4096v3: ±{26, 268, 536, 778, 1116, 1358, 1626, 1868}
  2.5. P2020v5: ±{94, 228, 336, 470, 604, 738, 846, 980, 1048, 1182, 1290, 1424, 1558, 1692, 1800, 1934}
P4096v1: ±{94, 228, 336, 470, 604, 738, 846, 980, 1048, 1182, 1290, 1424, 1558, 1692, 1800, 1934}
P4096v2: ±{228, 470, 738, 980, 1182, 1424, 1692, 1934}
P4096v3: ±{94, 336, 604, 846, 1048, 1290, 1558, 1800}
<996 RU/2020 RU/Full Band>
  3. P996v3: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}
  3.1. P2020v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}
P4096v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}
P4096v2: ±{94, 228, 336, 470, 630, 764, 872, 1006, 1116, 1250, 1358, 1492, 1652, 1786, 1894, 2028}
P4096v3: ±{26, 160, 268, 402, 562, 696, 804, 938, 1048, 1182, 1290, 1424, 1584, 1718, 1826, 1960}
  3.2. P2020v2: ±{94, 228, 336, 470, 630, 764, 872, 1006, 1116, 1250, 1358, 1492, 1652, 1786, 1894, 2028}
P4096v1: ±{94, 228, 336, 470, 630, 764, 872, 1006, 1116, 1250, 1358, 1492, 1652, 1786, 1894, 2028}
P4096v2: ±{228, 470, 764, 1006, 1250, 1492, 1786, 2028}
P4096v3: ±{94, 336, 630, 872, 1116, 1358, 1652, 1894}
  3.3. P2020v3: ±{26, 160, 268, 402, 562, 696, 804, 938, 1048, 1182, 1290, 1424, 1584, 1718, 1826, 1960}
P4096v1: ±{26, 160, 268, 402, 562, 696, 804, 938, 1048, 1182, 1290, 1424, 1584, 1718, 1826, 1960}
P4096v2: ±{160, 402, 696, 938, 1182, 1424, 1718, 1960}
P4096v3: ±{26, 268, 562, 804, 1048, 1290, 1584, 1826}
  3.4. P2020v4: ±{26, 160, 268, 402, 562, 696, 804, 938, 1116, 1250, 1358, 1492, 1652, 1786, 1894, 2028}
P4096v1: ±{26, 160, 268, 402, 562, 696, 804, 938, 1116, 1250, 1358, 1492, 1652, 1786, 1894, 2028}
P4096v2: ±{160, 402, 696, 938, 1250, 1492, 1786, 2028}
P4096v3: ±{26, 268, 562, 804, 1116, 1358, 1652, 1894}
  3.5. P2020v5: ±{94, 228, 336, 470, 630, 764, 872, 1006, 1048, 1182, 1290, 1424, 1584, 1718, 1826, 1960}
P4096v1: ±{94, 228, 336, 470, 630, 764, 872, 1006, 1048, 1182, 1290, 1424, 1584, 1718, 1826, 1960}
P4096v2: ±{228, 470, 764, 1006, 1182, 1424, 1718, 1960}
P4096v3: ±{94, 336, 630, 872, 1048, 1290, 1584, 1826}
<996 RU/2020 RU/Full Band>
  4. P996v4: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
  4.1. P2020v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
P4096v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
P4096v2: ±{120, 254, 362, 496, 604, 738, 846, 980, 1142, 1276, 1384, 1518, 1626, 1760, 1868, 2002}
P4096v3: ±{52, 186, 294, 428, 536, 670, 778, 912, 1074, 1208, 1316, 1450, 1558, 1692, 1800, 1934}
  4.2. P2020v2: ±{120, 254, 362, 496, 604, 738, 846, 980, 1142, 1276, 1384, 1518, 1626, 1760, 1868, 2002}
P4096v1: ±{120, 254, 362, 496, 604, 738, 846, 980, 1142, 1276, 1384, 1518, 1626, 1760, 1868, 2002}
P4096v2: ±{254, 496, 738, 980, 1276, 1518, 1760, 2002}
P4096v3: ±{120, 362, 604, 846, 1142, 1384, 1626, 1868}
  4.3. P2020v3: ±{52, 186, 294, 428, 536, 670, 778, 912, 1074, 1208, 1316, 1450, 1558, 1692, 1800, 1934}
P4096v1: ±{52, 186, 294, 428, 536, 670, 778, 912, 1074, 1208, 1316, 1450, 1558, 1692, 1800, 1934}
P4096v2: ±{186, 428, 670, 912, 1208, 1450, 1692, 1934}
P4096v3: ±{52, 294, 536, 778, 1074, 1316, 1558, 1800}
  4.4. P2020v4: ±{52, 186, 294, 428, 536, 670, 778, 912, 1142, 1276, 1384, 1518, 1626, 1760, 1868, 2002}
P4096v1: ±{52, 186, 294, 428, 536, 670, 778, 912, 1142, 1276, 1384, 1518, 1626, 1760, 1868, 2002}
P4096v2: ±{186, 428, 670, 912, 1276, 1518, 1760, 2002}
P4096v3: ±{52, 294, 536, 778, 1142, 1384, 1626, 1868}
  4.5. P2020v5: ±{120, 254, 362, 496, 604, 738, 846, 980, 1074, 1208, 1316, 1450, 1558, 1692, 1800, 1934}
P4096v1: ±{120, 254, 362, 496, 604, 738, 846, 980, 1074, 1208, 1316, 1450, 1558, 1692, 1800, 1934}
P4096v2: ±{254, 496, 738, 980, 1208, 1450, 1692, 1934}
P4096v3: ±{120, 362, 604, 846, 1074, 1316, 1558, 1800}

Listed below are indices for each RU and null tone in a case where a 4062/4064/4066/4068 RU is used in full-band transmission, a tone plane of 12G+2018RU+3N+13RU+5DC+13RU+3N+2018RU+11G is used, and the first configuration for the 996 RU is used.

<26 RU>

TABLE 133

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |

| RU10 | RU11 | RU12 | RU13 | RU14 | RU15 | RU16 | RU17 | RU18 | RU19 |
|---|---|---|---|---|---|---|---|---|---|
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |

TABLE 133-continued

| RU20 | RU21 | RU22 | RU23 | RU24 | RU25 | RU26 | RU27 | RU28 |
|---|---|---|---|---|---|---|---|---|
| −1523:−1498 | −1497:−1472 | −1469:−1444 | −1443:−1418 | −1416:−1391 | −1389:−1364 | −1363:−1338 | −1335:−1310 | −1309:−1284 |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1040:−1015 |
| RU39 | RU40 | RU41 | RU42 | RU43 | RU44 | RU45 | RU46 | RU47 | |
| −1013:−988 | −987:−962 | −959:−934 | −933:−908 | −906:−881 | −879:−854 | −853:−828 | −825:−800 | −799:−774 | |
| RU48 | RU49 | RU50 | RU51 | RU52 | RU53 | RU54 | RU55 | RU56 | RU57 |
| −771:−746 | −745:−720 | −717:−692 | −691:−666 | −664:−639 | −637:−612 | −611:−586 | −583:−558 | −557:−532 | −529:−504 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −15:−3, 3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarriers indices for RU 75 multiplied by −1, that is, 20:45

Null subcarriers: ±{16, 17, 18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 74:125

Null subcarriers: ±{16, 17, 18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 134

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1013:−962 | −959:−908 | −879:−828 | −825:−774 |
| RU21 | RU22 | RU23 | RU24 |
| −771:−720 | −717:−666 | −637:−586 | −583:−532 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

TABLE 135

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1013:−908 | −879:−774 | −771:−666 | −637:−532 |
| RU13 | RU14 | RU15 | RU16 |
| −501:−396 | −367:−262 | −259:−154 | −125:−20 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 154:259

Null subcarriers: ±{16, 17, 18, 19, 126, 153, 260, 261, 368, 395, 502, 503, 530, 531, 638, 665, 772, 773, 880, 907, 1014, 1041, 1148, 1175, 1282, 1283, 1390, 1417, 1524, 1525, 1552, 1553, 1660, 1687, 1794, 1795, 1902, 1929, 2036}

<242 RU>

TABLE 136

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1014:−773 | −772:−531 | −502:−261 | −260:−19 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 261:502
Null subcarriers: ±{16, 17, 18, 503, 530, 1525, 1552}
<484 RU>

TABLE 137

| RU1 | RU2 | RU3 | RU4 |
|---|---|---|---|
| −2036:−1553 | −1524:−1041 | −1014:−531 | −502:−19 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 531:1014
Null subcarriers: ±{16, 17, 18, 503, 530, 1525, 1552}
<996 RU>

TABLE 138

| RU1 | RU2 | RU3 | RU4 |
|---|---|---|---|
| −2036:−1041 | −1014:−19 | 19:1014 | 1041:2036 |

Null subcarriers: ±{16, 17, 18}
<2018 RU>

TABLE 139

| RU1 | RU2 |
|---|---|
| −2036:−19 | 19:2036 |

Null subcarriers: ±{16, 17, 18}
<4068 or 4066 or 4064 or 4062 RU for New 160 MHz tone plan>
4068RU: −2036:−3, 3:2036
4066RU: −2036:−4, 4:2036
4064RU: −2036:−5, 5:2036
4062RU: −2036:−6, 6:2036
Null subcarriers: X
Pilot subcarrier indices according to the above tone plans are listed below.
<26 RU>
±{8 or 10, 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 510, 524, 538, 552, 564, 578, 592, 606, 618, 632, 644, 658, 672, 686, 698, 712, 726, 740, 752, 766, 780, 794, 806, 820, 834, 848, 860, 874, 886, 900, 914, 928, 940, 954, 968, 982, 994, 1008, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1532, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}
<52 RU>
±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 538, 552, 564, 578, 592, 606, 618, 632, 672, 686, 698, 712, 726, 740, 752, 766, 780, 794, 806, 820, 834, 848, 860, 874, 914, 928, 940, 954, 968, 982, 994, 1008, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}
<106/242/484 RU>
±{26, 52, 94, 120, 160, 186, 228, 254, 268, 294, 336, 362, 402, 428, 470, 496, 538, 564, 606, 632, 672, 698, 740, 766, 780, 806, 848, 874, 914, 940, 982, 1008, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}
<996 RU/2020 RU/Full Band>
1. P996v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}
 1.1. P2020v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}
P4096v1: ±{52, 120, 186, 254, 294, 362, 428, 496, 564, 632, 698, 766, 806, 874, 940, 1008, 1074, 1142, 1208, 1276, 1316, 1384, 1450, 1518, 1586, 1654, 1720, 1788, 1828, 1896, 1962, 2030}
P4096v2: ±{120, 254, 362, 496, 632, 766, 874, 1008, 1142, 1276, 1384, 1518, 1654, 1788, 1896, 2030}
P4096v3: ±{52, 186, 294, 428, 564, 698, 806, 940, 1074, 1208, 1316, 1450, 1586, 1720, 1828, 1962}
 1.2. P2020v2: ±{120, 254, 362, 496, 632, 766, 874, 1008, 1142, 1276, 1384, 1518, 1654, 1788, 1896, 2030}
P4096v1: ±{120, 254, 362, 496, 632, 766, 874, 1008, 1142, 1276, 1384, 1518, 1654, 1788, 1896, 2030}
P4096v2: ±{254, 496, 766, 1008, 1276, 1518, 1788, 2030}
P4096v3: ±{120, 362, 632, 874, 1142, 1384, 1654, 1896}
 1.3. P2020v3: ±{52, 186, 294, 428, 564, 698, 806, 940, 1074, 1208, 1316, 1450, 1586, 1720, 1828, 1962}
P4096v1: ±{52, 186, 294, 428, 564, 698, 806, 940, 1074, 1208, 1316, 1450, 1586, 1720, 1828, 1962}
P4096v2: ±{186, 428, 698, 940, 1208, 1450, 1720, 1962}
P4096v3: ±{52, 294, 564, 806, 1074, 1316, 1586, 1828}
 1.4. P2020v4: ±{52, 186, 294, 428, 564, 698, 806, 940, 1142, 1276, 1384, 1518, 1654, 1788, 1896, 2030}
P4096v1: ±{52, 186, 294, 428, 564, 698, 806, 940, 1142, 1276, 1384, 1518, 1654, 1788, 1896, 2030}
P4096v2: ±{186, 428, 698, 940, 1276, 1518, 1788, 2030}
P4096v3: ±{52, 294, 564, 806, 1142, 1384, 1654, 1896}

1.5. P2020v5: ±{120, 254, 362, 496, 632, 766, 874, 1008, 1074, 1208, 1316, 1450, 1586, 1720, 1828, 1962}

P4096v1: ±{120, 254, 362, 496, 632, 766, 874, 1008, 1074, 1208, 1316, 1450, 1586, 1720, 1828, 1962}

P4096v2: ±{254, 496, 766, 1008, 1208, 1450, 1720, 1962}

P4096v3: ±{120, 362, 632, 874, 1074, 1316, 1586, 1828}

<996 RU/2020 RU/Full Band>

2. P996v2: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

2.1. P2020v1: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

P4096v1: ±{26, 94, 160, 228, 268, 336, 402, 470, 538, 606, 672, 740, 780, 848, 914, 982, 1048, 1116, 1182, 1250, 1290, 1358, 1424, 1492, 1560, 1628, 1694, 1762, 1802, 1870, 1936, 2004}

P4096v2: ±{94, 228, 336, 470, 606, 740, 848, 982, 1116, 1250, 1358, 1492, 1628, 1762, 1870, 2004}

P4096v3: ±{26, 160, 268, 402, 538, 672, 780, 914, 1048, 1182, 1290, 1424, 1560, 1694, 1802, 1936}

2.2. P2020v2: ±{94, 228, 336, 470, 606, 740, 848, 982, 1116, 1250, 1358, 1492, 1628, 1762, 1870, 2004}

P4096v1: ±{94, 228, 336, 470, 606, 740, 848, 982, 1116, 1250, 1358, 1492, 1628, 1762, 1870, 2004}

P4096v2: ±{228, 470, 740, 982, 1250, 1492, 1762, 2004}

P4096v3: ±{94, 336, 606, 848, 1116, 1358, 1628, 1870}

2.3. P2020v3: ±{26, 160, 268, 402, 538, 672, 780, 914, 1048, 1182, 1290, 1424, 1560, 1694, 1802, 1936}

P4096v1: ±{26, 160, 268, 402, 538, 672, 780, 914, 1048, 1182, 1290, 1424, 1560, 1694, 1802, 1936}

P4096v2: ±{160, 402, 672, 914, 1182, 1424, 1694, 1936}

P4096v3: ±{26, 268, 538, 780, 1048, 1290, 1560, 1802}

2.4. P2020v4: ±{26, 160, 268, 402, 538, 672, 780, 914, 1116, 1250, 1358, 1492, 1628, 1762, 1870, 2004}

P4096v1: ±{26, 160, 268, 402, 538, 672, 780, 914, 1116, 1250, 1358, 1492, 1628, 1762, 1870, 2004}

P4096v2: ±{160, 402, 672, 914, 1250, 1492, 1762, 2004}

P4096v3: ±{26, 268, 538, 780, 1116, 1358, 1628, 1870}

2.5. P2020v5: ±{94, 228, 336, 470, 606, 740, 848, 982, 1048, 1182, 1290, 1424, 1560, 1694, 1802, 1936}

P4096v1: ±{94, 228, 336, 470, 606, 740, 848, 982, 1048, 1182, 1290, 1424, 1560, 1694, 1802, 1936}

P4096v2: ±{228, 470, 740, 982, 1182, 1424, 1694, 1936}

P4096v3: ±{94, 336, 606, 848, 1048, 1290, 1560, 1802}

<996 RU/2020 RU/Full Band>

3. P996v3: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

3.1. P2020v1: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

P4096v1: ±{26, 94, 160, 228, 268, 336, 402, 470, 564, 632, 698, 766, 806, 874, 940, 1008, 1048, 1116, 1182, 1250, 1290, 1358, 1424, 1492, 1586, 1654, 1720, 1788, 1828, 1896, 1962, 2030}

P4096v2: ±{94, 228, 336, 470, 632, 766, 874, 1008, 1116, 1250, 1358, 1492, 1654, 1788, 1896, 2030}

P4096v3: ±{26, 160, 268, 402, 564, 698, 806, 940, 1048, 1182, 1290, 1424, 1586, 1720, 1828, 1962}

3.2. P2020v2: ±{94, 228, 336, 470, 632, 766, 874, 1008, 1116, 1250, 1358, 1492, 1654, 1788, 1896, 2030}

P4096v1: ±{94, 228, 336, 470, 632, 766, 874, 1008, 1116, 1250, 1358, 1492, 1654, 1788, 1896, 2030}

P4096v2: ±{228, 470, 766, 1008, 1250, 1492, 1788, 2030}

P4096v3: ±{94, 336, 632, 874, 1116, 1358, 1654, 1896}

3.3. P2020v3: ±{26, 160, 268, 402, 564, 698, 806, 940, 1048, 1182, 1290, 1424, 1586, 1720, 1828, 1962}

P4096v1: ±{26, 160, 268, 402, 564, 698, 806, 940, 1048, 1182, 1290, 1424, 1586, 1720, 1828, 1962}

P4096v2: ±{160, 402, 698, 940, 1182, 1424, 1720, 1962}

P4096v3: ±{26, 268, 564, 806, 1048, 1290, 1586, 1828}

3.4. P2020v4: ±{26, 160, 268, 402, 564, 698, 806, 940, 1116, 1250, 1358, 1492, 1654, 1788, 1896, 2030}

P4096v1: ±{26, 160, 268, 402, 564, 698, 806, 940, 1116, 1250, 1358, 1492, 1654, 1788, 1896, 2030}

P4096v2: ±{160, 402, 698, 940, 1250, 1492, 1788, 2030}

P4096v3: ±{26, 268, 564, 806, 1116, 1358, 1654, 1896}

3.5. P2020v5: ±{94, 228, 336, 470, 632, 766, 874, 1008, 1048, 1182, 1290, 1424, 1586, 1720, 1828, 1962}

P4096v1: ±{94, 228, 336, 470, 632, 766, 874, 1008, 1048, 1182, 1290, 1424, 1586, 1720, 1828, 1962}

P4096v2: ±{228, 470, 766, 1008, 1182, 1424, 1720, 1962}

P4096v3: ±{94, 336, 632, 874, 1048, 1290, 1586, 1828}

<996 RU/2020 RU/Full Band>

4. P996v4: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

4.1. P2020v1: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

P4096v1: ±{52, 120, 186, 254, 294, 362, 428, 496, 538, 606, 672, 740, 780, 848, 914, 982, 1074, 1142, 1208, 1276, 1316, 1384, 1450, 1518, 1560, 1628, 1694, 1762, 1802, 1870, 1936, 2004}

P4096v2: ±{120, 254, 362, 496, 606, 740, 848, 982, 1142, 1276, 1384, 1518, 1628, 1762, 1870, 2004}

P4096v3: ±{52, 186, 294, 428, 538, 672, 780, 914, 1074, 1208, 1316, 1450, 1560, 1694, 1802, 1936}

4.2. P2020v2: ±{120, 254, 362, 496, 606, 740, 848, 982, 1142, 1276, 1384, 1518, 1628, 1762, 1870, 2004}

P4096v1: ±{120, 254, 362, 496, 606, 740, 848, 982, 1142, 1276, 1384, 1518, 1628, 1762, 1870, 2004}

P4096v2: ±{254, 496, 740, 982, 1276, 1518, 1762, 2004}

P4096v3: ±{120, 362, 606, 848, 1142, 1384, 1628, 1870}

4.3. P2020v3: ±{52, 186, 294, 428, 538, 672, 780, 914, 1074, 1208, 1316, 1450, 1560, 1694, 1802, 1936}

P4096v1: ±{52, 186, 294, 428, 538, 672, 780, 914, 1074, 1208, 1316, 1450, 1560, 1694, 1802, 1936}

P4096v2: ±{186, 428, 672, 914, 1208, 1450, 1694, 1936}

P4096v3: ±{52, 294, 538, 780, 1074, 1316, 1560, 1802}

4.4. P2020v4: ±{52, 186, 294, 428, 538, 672, 780, 914, 1142, 1276, 1384, 1518, 1628, 1762, 1870, 2004}

P4096v1: ±{52, 186, 294, 428, 538, 672, 780, 914, 1142, 1276, 1384, 1518, 1628, 1762, 1870, 2004}

P4096v2: ±{186, 428, 672, 914, 1276, 1518, 1762, 2004}

P4096v3: ±{52, 294, 538, 780, 1142, 1384, 1628, 1870}

4.5. P2020v5: ±{120, 254, 362, 496, 606, 740, 848, 982, 1074, 1208, 1316, 1450, 1560, 1694, 1802, 1936}

P4096v1: ±{120, 254, 362, 496, 606, 740, 848, 982, 1074, 1208, 1316, 1450, 1560, 1694, 1802, 1936}

P4096v2: ±{254, 496, 740, 982, 1208, 1450, 1694, 1936}

P4096v3: ±{120, 362, 606, 848, 1074, 1316, 1560, 1802}

Pilot indices for a 52/106/242/484/996/2018 RU and the full band are the same as those in the above case where the 4062/4064/4066/4068 RU is used in full-band transmission, the tone plan of 12G+2018RU+2N+13RU+7DC+13RU+ 2N+2018RU+11G is used, and the first configuration for the 996 RU is used.

Listed below are indices for each RU and null tone in a case where a 4062/4064/4066/4068 RU is used in full-band transmission, the tone plane of 12G+2018RU+3N+13RU+ 5DC+13RU+3N+2018RU+11G is used, and the first configuration for the 996 RU is used.

<26 RU>

±{8 or 10, 26, 40, 52, 66, 80, 94, 106, 120, 134, 148, 160, 174, 186, 200, 214, 228, 240, 254, 268, 282, 294, 308, 322, 336, 348, 362, 376, 390, 402, 416, 428, 442, 456, 470, 482, 496, 510, 524, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1048, 1062, 1074, 1088, 1102, 1116, 1128, 1142, 1156, 1170, 1182, 1196, 1208, 1222, 1236, 1250, 1262, 1276, 1290, 1304, 1316, 1330, 1344, 1358, 1370, 1384, 1398, 1412, 1424, 1438, 1450, 1464, 1478, 1492, 1504, 1518, 1532, 1546, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

<52 RU>

±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>

±{26, 52, 94, 120, 160, 186, 228, 254, 268, 294, 336, 362, 402, 428, 470, 496, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

1.1. P2020v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}

P4096v2: ±{120, 254, 362, 496, 630, 764, 872, 1006, 1142, 1276, 1384, 1518, 1652, 1786, 1894, 2028}

P4096v3: ±{52, 186, 294, 428, 562, 696, 804, 938, 1074, 1208, 1316, 1450, 1584, 1718, 1826, 1960}

1.2. P2020v2: ±{120, 254, 362, 496, 630, 764, 872, 1006, 1142, 1276, 1384, 1518, 1652, 1786, 1894, 2028}

P4096v1: ±{120, 254, 362, 496, 630, 764, 872, 1006, 1142, 1276, 1384, 1518, 1652, 1786, 1894, 2028}

P4096v2: ±{254, 496, 764, 1006, 1276, 1518, 1786, 2028}

P4096v3: ±{120, 362, 630, 872, 1142, 1384, 1652, 1894}

1.3. P2020v3: ±{52, 186, 294, 428, 562, 696, 804, 938, 1074, 1208, 1316, 1450, 1584, 1718, 1826, 1960}

P4096v1: ±{52, 186, 294, 428, 562, 696, 804, 938, 1074, 1208, 1316, 1450, 1584, 1718, 1826, 1960}

P4096v2: ±{186, 428, 696, 938, 1208, 1450, 1718, 1960}

P4096v3: ±{52, 294, 562, 804, 1074, 1316, 1584, 1826}

1.4. P2020v4: ±{52, 186, 294, 428, 562, 696, 804, 938, 1142, 1276, 1384, 1518, 1652, 1786, 1894, 2028}

P4096v1: ±{52, 186, 294, 428, 562, 696, 804, 938, 1142, 1276, 1384, 1518, 1652, 1786, 1894, 2028}

P4096v2: ±{186, 428, 696, 938, 1276, 1518, 1786, 2028}

P4096v3: ±{52, 294, 562, 804, 1142, 1384, 1652, 1894}

1.5. P2020v5:: ±{120, 254, 362, 496, 630, 764, 872, 1006, 1074, 1208, 1316, 1450, 1584, 1718, 1826, 1960}

P4096v1: ±{120, 254, 362, 496, 630, 764, 872, 1006, 1074, 1208, 1316, 1450, 1584, 1718, 1826, 1960}

P4096v2: ±{254, 496, 764, 1006, 1208, 1450, 1718, 1960}

P4096v3: ±{120, 362, 630, 872, 1074, 1316, 1584, 1826}

<996 RU/2020 RU/Full Band>

2. P996v2: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

2.1. P2020v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}

P4096v2: ±{94, 228, 336, 470, 604, 738, 846, 980, 1116, 1250, 1358, 1492, 1626, 1760, 1868, 2002}

P4096v3: ±{26, 160, 268, 402, 536, 670, 778, 912, 1048, 1182, 1290, 1424, 1558, 1692, 1800, 1934}

2.2. P2020v2: ±{94, 228, 336, 470, 604, 738, 846, 980, 1116, 1250, 1358, 1492, 1626, 1760, 1868, 2002}

P4096v1: ±{94, 228, 336, 470, 604, 738, 846, 980, 1116, 1250, 1358, 1492, 1626, 1760, 1868, 2002}

P4096v2: ±{228, 470, 738, 980, 1250, 1492, 1760, 2002}

P4096v3: ±{94, 336, 604, 846, 1116, 1358, 1626, 1868}

2.3. P2020v3: ±{26, 160, 268, 402, 536, 670, 778, 912, 1048, 1182, 1290, 1424, 1558, 1692, 1800, 1934}

P4096v1: ±{26, 160, 268, 402, 536, 670, 778, 912, 1182, 1290, 1424, 1558, 1692, 1800, 1934}

P4096v2: ±{160, 402, 670, 912, 1182, 1424, 1692, 1934}

P4096v3: ±{26, 268, 536, 778, 1048, 1290, 1558, 1800}

2.4. P2020v4: ±{26, 160, 268, 402, 536, 670, 778, 912, 1116, 1250, 1358, 1492, 1626, 1760, 1868, 2002}

P4096v1: ±{26, 160, 268, 402, 536, 670, 778, 912, 1116, 1250, 1358, 1492, 1626, 1760, 1868, 2002}

P4096v2: ±{160, 402, 670, 912, 1250, 1492, 1760, 2002}

P4096v3: ±{26, 268, 536, 778, 1116, 1358, 1626, 1868}

2.5. P2020v5: ±{94, 228, 336, 470, 604, 738, 846, 980, 1048, 1182, 1290, 1424, 1558, 1692, 1800, 1934}

P4096v1: ±{94, 228, 336, 470, 604, 738, 846, 980, 1048, 1182, 1290, 1424, 1558, 1692, 1800, 1934}

P4096v2: ±{228, 470, 738, 980, 1182, 1424, 1692, 1934}

P4096v3: ±{94, 336, 604, 846, 1048, 1290, 1558, 1800}

<996 RU/2020 RU/Full Band>

3. P996v3: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

3.1. P2020v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v2: ±{94, 228, 336, 470, 630, 764, 872, 1006, 1116, 1250, 1358, 1492, 1652, 1786, 1894, 2028}

P4096v3: ±{26, 160, 268, 402, 562, 696, 804, 938, 1048, 1182, 1290, 1424, 1584, 1718, 1826, 1960}

3.2. P2020v2: ±{94, 228, 336, 470, 630, 764, 872, 1006, 1116, 1250, 1358, 1492, 1652, 1786, 1894, 2028}

P4096v1: ±{94, 228, 336, 470, 630, 764, 872, 1006, 1116, 1250, 1358, 1492, 1652, 1786, 1894, 2028}

P4096v2: ±{228, 470, 764, 1006, 1250, 1492, 1786, 2028}

P4096v3: ±{94, 336, 630, 872, 1116, 1358, 1652, 1894}

3.3. P2020v3: ±{26, 160, 268, 402, 562, 696, 804, 938, 1048, 1182, 1290, 1424, 1584, 1718, 1826, 1960}

P4096v1: ±{26, 160, 268, 402, 562, 696, 804, 938, 1048, 1182, 1290, 1424, 1584, 1718, 1826, 1960}

P4096v2: ±{160, 402, 696, 938, 1182, 1424, 1718, 1960}

P4096v3: ±{26, 268, 562, 804, 1048, 1290, 1584, 1826}

3.4. P2020v4: ±{26, 160, 268, 402, 562, 696, 804, 938, 1116, 1250, 1358, 1492, 1652, 1786, 1894, 2028}

P4096v1: ±{26, 160, 268, 402, 562, 696, 804, 938, 1116, 1250, 1358, 1492, 1652, 1786, 1894, 2028}

P4096v2: ±{160, 402, 696, 938, 1250, 1492, 1786, 2028}

P4096v3: ±{26, 268, 562, 804, 1116, 1358, 1652, 1894}

3.5. P2020v5: ±{94, 228, 336, 470, 630, 764, 872, 1006, 1048, 1182, 1290, 1424, 1584, 1718, 1826, 1960}

P4096v1: ±{94, 228, 336, 470, 630, 764, 872, 1006, 1048, 1182, 1290, 1424, 1584, 1718, 1826, 1960}

P4096v2: ±{228, 470, 764, 1006, 1182, 1424, 1718, 1960}

P4096v3: ±{94, 336, 630, 872, 1048, 1290, 1584, 1826}

<996 RU/2020 RU/Full Band>

4. P996v4: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

4.1. P2020v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v2: +1120, 254, 362, 496, 604, 738, 846, 980, 1142, 1276, 1384, 1518, 1626, 1760, 1868, 2002)

P4096v3: ±{52, 186, 294, 428, 536, 670, 778, 912, 1074, 1208, 1316, 1450, 1558, 1692, 1800, 1934}

4.2. P2020v2: ±{120, 254, 362, 496, 604, 738, 846, 980, 1142, 1276, 1384, 1518, 1626, 1760, 1868, 2002}

P4096v1: ±{120, 254, 362, 496, 604, 738, 846, 980, 1142, 1276, 1384, 1518, 1626, 1760, 1868, 2002}

P4096v2: ±{254, 496, 738, 980, 1276, 1518, 1760, 2002}

P4096v3: ±{120, 362, 604, 846, 1142, 1384, 1626, 1868}

4.3. P2020v3: ±{52, 186, 294, 428, 536, 670, 778, 912, 1074, 1208, 1316, 1450, 1558, 1692, 1800, 1934}

P4096v1: ±{52, 186, 294, 428, 536, 670, 778, 912, 1074, 1208, 1316, 1450, 1558, 1692, 1800, 1934}

P4096v2: ±{186, 428, 670, 912, 1208, 1450, 1692, 1934}

P4096v3: ±{52, 294, 536, 778, 1074, 1316, 1558, 1800}

4.4. P2020v4: ±{52, 186, 294, 428, 536, 670, 778, 912, 1142, 1276, 1384, 1518, 1626, 1760, 1868, 2002}

P4096v1: ±{52, 186, 294, 428, 536, 670, 778, 912, 1142, 1276, 1384, 1518, 1626, 1760, 1868, 2002}

P4096v2: ±{186, 428, 670, 912, 1276, 1518, 1760, 2002}

P4096v3: ±{52, 294, 536, 778, 1142, 1384, 1626, 1868}

4.5. P2020v5: ±{120, 254, 362, 496, 604, 738, 846, 980, 1074, 1208, 1316, 1450, 1558, 1692, 1800, 1934}

P4096v1: ±{120, 254, 362, 496, 604, 738, 846, 980, 1074, 1208, 1316, 1450, 1558, 1692, 1800, 1934}

P4096v2: ±{254, 496, 738, 980, 1208, 1450, 1692, 1934}

P4096v3: ±{120, 362, 604, 846, 1074, 1316, 1558, 1800}

Pilot indices for a 52/106/242/484/996/2018 RU and the full band are the same as those in the case where the 4062/4064/4066/4068 RU is used in full-band transmission, the tone plan of 12G+2018RU+2N+13RU+7DC+13RU+2N+2018RU+11G is used, and the second configuration for the 996 RU is used.

D. Alternative 320 MHz Tone Plan 3

When a 320 MHz tone plan is used, a wider guard tone may be used in order to further reduce interference in an adjacent channel, and using 14/13G is proposed. Further, in transmission using the full band, a new RU may be proposed, and the size of the new RU may be determined in consideration of various DC tones and a guard tone size according to the impact of a DC offset. The number of DC tones in existing 11 ax 80 MHz is 5 or 7, and when this number of DC tones is considered, the new RU is a 4064 or 4062 RU.

<Full Band>

14/13 guard tone, 5DC, 4064RU (RU subcarrier indices are −2034:−3 and 3:2034)

14/13 guard tone, 7DC, 4062RU (RU subcarrier indices are −2034:−4 and 4:2034)

In 320 MHz, it is not preferable to use a smaller number of DC tones than the number of DC tones conventionally used in 80 MHz, which is 5/7, in consideration of the impact of a DC offset, 5/7 DC tones may be sufficient in view of performance, and up to 7 DC tones may be adequate considering the following OFDMA tone plans using a 2018 RU. The number of DC tones in the OFDMA tone plans is designed in consideration of 7 DC tones used in an existing 11 ax 80 MHz OFDMA tone plan. The number of DC tones smaller than 7 is not preferable, and seven DC tones may be sufficient in view of performance.

<OFDMA Tone Plan>

OFDMA tone plans may be expressed using a 2018 RU and a 26 RU (13+13 RU) as below.

14G+2018RU+13RU+7DC+13RU+2018RU+13G

A configuration for a 2018 RU is proposed as below.

2018RU=996RU+26RU+996RU

Two configurations for a 996 RU are proposed as in the new 160 MHz tone plan.

996RU=484RU+1$N$+26RU+1$N$+484RU  996RU=1$N$+484RU+26RU+484RU+1$N$

A 484 RU has a configuration of two 242 RUs as in existing 11 ax.

484RU=242RU+242RU

A 242 RU has the following configuration as in existing 11ax.

242RU=1$N$+106RU+1$N$+26RU+1$N$+106RU+1$N$

106RU has the following configuration as in existing 11ax.

$$106RU = 52RU + 2N + 52RU$$

A 52 RU has the following configuration as in existing 11ax.

$$52RU = 26RU + 26RU$$

Listed below are indices for each RU and null tone in a case where a 4062/4064 RU is used in full-band transmission and the first configuration for the 996 RU is used.

<26 RU>

TABLE 140

| RU1 | RU2 | RU3 | RU4 | RU5 | RU6 | RU7 | RU8 | RU9 |
|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1549:−1524 |
| RU20 | RU21 | RU22 | RU23 | RU24 | RU25 | RU26 | RU27 | RU28 |
| −1521:−1496 | −1495:−1470 | −1467:−1442 | −1441:−1416 | −1414:−1389 | −1387:−1362 | −1361:−1336 | −1333:−1308 | −1307:−1282 |
| RU29 | RU30 | RU31 | RU32 | RU33 | RU34 | RU35 | RU36 | RU37 | RU38 |
| −1279:−1254 | −1253:−1228 | −1225:−1200 | −1199:−1174 | −1172:−1147 | −1145:−1120 | −1119:−1094 | −1091:−1066 | −1065:−1040 | −1038:−1013 |
| RU39 | RU40 | RU41 | RU42 | RU43 | RU44 | RU45 | RU46 | RU47 |
| −1011:−986 | −985:−960 | −957:−932 | −931:−906 | −904:−879 | −877:−852 | −851:−826 | −823:−798 | −797:−772 |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −527:−502 |
| RU58 | RU59 | RU60 | RU61 | RU62 | RU63 | RU64 | RU65 | RU66 |
| 499:−474 | −473:−448 | −445:−420 | −419:−394 | −392:−367 | −365:−340 | −339:−314 | −311:−286 | −285:−260 |
| RU67 | RU68 | RU69 | RU70 | RU71 | RU72 | RU73 | RU74 | RU75 | RU76 |
| −257:−232 | −231:−206 | −203:−178 | −177:−152 | −150:−125 | −123:−98 | −97:−72 | −69:−44 | −43:−18 | −16:−4, 4:16 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 18:43

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034}

<52 RU>

TABLE 141

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |

TABLE 141-continued

| RU9 | RU10 | RU11 | RU12 |
|---|---|---|---|
| −1521:−1470 | −1467:−1416 | −1387:−1336 | −1333:−1282 |
| RU13 | RU14 | RU15 | RU16 |
| −1279:−1228 | −1225:−1174 | −1145:−1094 | −1091:−1040 |
| RU17 | RU18 | RU19 | RU20 |
| −1011:−960 | −957:−906 | −877:−826 | −823:−772 |

TABLE 141-continued

| RU21 | RU22 | RU23 | RU24 |
|---|---|---|---|
| −769:−718 | −715:−664 | −635:−584 | −581:−530 |
| RU25 | RU26 | RU27 | RU28 |
| −499:−448 | −445:−394 | −365:−314 | −311:−260 |
| RU29 | RU30 | RU31 | RU32 |
| −257:−206 | −203:−152 | −123:−72 | −69:−18 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 72:123

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034}

<106 RU>

TABLE 142

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1521:−1416 | −1387:−1282 | −1279:−1174 | −1145:−1040 |
| RU9 | RU10 | RU11 | RU12 |
| −1011:−906 | −877:−772 | −769:−664 | −635:−530 |
| RU13 | RU14 | RU15 | RU16 |
| −499:−394 | −365:−260 | −257:−152 | −123:−18 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 152:257

Null subcarriers: ±{17, 124, 151, 258, 259, 366, 393, 500, 501, 528, 529, 636, 663, 770, 771, 878, 905, 1012, 1039, 1146, 1173, 1280, 1281, 1388, 1415, 1522, 1523, 1550, 1551, 1658, 1685, 1792, 1793, 1900, 1927, 2034}

<242 RU>

TABLE 143

| RU1 | RU2 | RU3 | RU4 |
|---|---|---|---|
| −2034:−1793 | −1792:−1551 | −1522:−1281 | −1280:−1039 |
| RU5 | RU6 | RU7 | RU8 |
| −1012:−771 | −770:−529 | −500:−259 | −258:−17 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 259:500

Null subcarriers: ±{501, 528, 1523, 1550}

<484 RU>

TABLE 144

| RU1 | RU2 | RU3 | RU4 |
|---|---|---|---|
| −2034:−1551 | −1522:−1039 | −1012:−529 | −500:−17 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 529:1012

Null subcarriers:: ±{501, 528, 1523, 1550}

<996 RU>

TABLE 145

| RU1 | RU2 | RU3 | RU4 |
|---|---|---|---|
| −2034:−1039 | −1012:−17 | 17:1012 | 1039:2034 |

Null subcarriers: X

<2018 RU>

TABLE 146

| RU1 | RU2 |
|---|---|
| −2034:−17 | 17:2034 |

Null subcarriers: X

<4064 or 4062 RU for New 160 MHz tone plan>
4064RU: −2034:−3, 3:2034
4062RU: −2034:−4, 4:2034
Null subcarriers: X Pilot subcarrier indices according to the above tone plans are listed below.

<26 RU>
±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1018, 1032, 1046, 1060, 1072, 1086, 1100, 1114, 1126, 1140, 1152, 1166, 1180, 1194, 1206, 1220, 1234, 1248, 1260, 1274, 1288, 1302, 1314, 1328, 1342, 1356, 1368, 1382, 1394, 1408, 1422, 1436, 1448, 1462, 1476, 1490, 1502, 1516, 1529, 1543, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>

±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1046, 1072, 1114, 1140, 1180, 1206, 1248, 1274, 1288, 1314, 1356, 1382, 1422, 1448, 1490, 1516, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

1.1. P2020v1: +{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

P4096v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

P4096v2: ±{118, 252, 360, 494, 630, 764, 872, 1006, 1140, 1274, 1382, 1516, 1652, 1786, 1894, 2028}

P4096v3: ±{50, 184, 292, 426, 562, 696, 804, 938, 1072, 1206, 1314, 1448, 1584, 1718, 1826, 1960}

1.2. P2020v2: ±{118, 252, 360, 494, 630, 764, 872, 1006, 1140, 1274, 1382, 1516, 1652, 1786, 1894, 2028}

P4096v1: ±{118, 252, 360, 494, 630, 764, 872, 1006, 1140, 1274, 1382, 1516, 1652, 1786, 1894, 2028}

P4096v2: ±{252, 494, 764, 1006, 1274, 1516, 1786, 2028}

P4096v3: ±{118, 360, 630, 872, 1140, 1382, 1652, 1894}

1.3. P2020v3: ±{50, 184, 292, 426, 562, 696, 804, 938, 1072, 1206, 1314, 1448, 1584, 1718, 1826, 1960}

P4096v1: ±{50, 184, 292, 426, 562, 696, 804, 938, 1072, 1206, 1314, 1448, 1584, 1718, 1826, 1960}

P4096v2: ±{184, 426, 696, 938, 1206, 1448, 1718, 1960}

P4096v3: ±{50, 292, 562, 804, 1072, 1314, 1584, 1826}

1.4. P2020v4: ±{50, 184, 292, 426, 562, 696, 804, 938, 1140, 1274, 1382, 1516, 1652, 1786, 1894, 2028}

P4096v1: ±{50, 184, 292, 426, 562, 696, 804, 938, 1140, 1274, 1382, 1516, 1652, 1786, 1894, 2028}

P4096v2: ±{184, 426, 696, 938, 1274, 1516, 1786, 2028}

P4096v3: ±{50, 292, 562, 804, 1140, 1382, 1652, 1894}

1.5. P2020v5: ±{118, 252, 360, 494, 630, 764, 872, 1006, 1072, 1206, 1314, 1448, 1584, 1718, 1826, 1960}

P4096v1: ±{118, 252, 360, 494, 630, 764, 872, 1006, 1072, 1206, 1314, 1448, 1584, 1718, 1826, 1960}

P4096v2: ±{252, 494, 764, 1006, 1206, 1448, 1718, 1960}

P4096v3: ±{118, 360, 630, 872, 1072, 1314, 1584, 1826}

<996 RU/2020 RU/Full Band>

2. P996v2: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

2.1. P2020v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

P4096v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

P4096v2: ±{92, 226, 334, 468, 604, 738, 846, 980, 1114, 1248, 1356, 1490, 1626, 1760, 1868, 2002}

P4096v3: ±{24, 158, 266, 400, 536, 670, 778, 912, 1046, 1180, 1288, 1422, 1558, 1692, 1800, 1934}

2.2. P2020v2: ±{92, 226, 334, 468, 604, 738, 846, 980, 1114, 1248, 1356, 1490, 1626, 1760, 1868, 2002}

P4096v1: ±{92, 226, 334, 468, 604, 738, 846, 980, 1114, 1248, 1356, 1490, 1626, 1760, 1868, 2002}

P4096v2: ±{226, 468, 738, 980, 1248, 1490, 1760, 2002}

P4096v3: ±{92, 334, 604, 846, 1114, 1356, 1626, 1868}

2.3. P2020v3: ±{24, 158, 266, 400, 536, 670, 778, 912, 1046, 1180, 1288, 1422, 1558, 1692, 1800, 1934}

P4096v1: ±{24, 158, 266, 400, 536, 670, 778, 912, 1046, 1180, 1288, 1422, 1558, 1692, 1800, 1934}

P4096v2: ±{158, 400, 670, 912, 1180, 1422, 1692, 1934}

P4096v3: ±{24, 266, 536, 778, 1046, 1288, 1558, 1800}

2.4. P2020v4: ±{24, 158, 266, 400, 536, 670, 778, 912, 1114, 1248, 1356, 1490, 1626, 1760, 1868, 2002}

P4096v1: ±{24, 158, 266, 400, 536, 670, 778, 912, 1114, 1248, 1356, 1490, 1626, 1760, 1868, 2002}

P4096v2: ±{158, 400, 670, 912, 1248, 1490, 1760, 2002}

P4096v3: ±{24, 266, 536, 778, 1114, 1356, 1626, 1868}

2.5. P2020v5: ±{92, 226, 334, 468, 604, 738, 846, 980, 1046, 1180, 1288, 1422, 1558, 1692, 1800, 1934}

P4096v1: ±{92, 226, 334, 468, 604, 738, 846, 980, 1046, 1180, 1288, 1422, 1558, 1692, 1800, 1934}

P4096v2: ±{226, 468, 738, 980, 1180, 1422, 1692, 1934}

P4096v3: ±{92, 334, 604, 846, 1046, 1288, 1558, 1800}

<996 RU/2020 RU/Full Band>

3. P996v3: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

3.1. P2020v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v2: ±{92, 226, 334, 468, 630, 764, 872, 1006, 1114, 1248, 1356, 1490, 1652, 1786, 1894, 2028}

P4096v3: ±{24, 158, 266, 400, 562, 696, 804, 938, 1046, 1180, 1288, 1422, 1584, 1718, 1826, 1960}

3.2. P2020v2: ±{92, 226, 334, 468, 630, 764, 872, 1006, 1114, 1248, 1356, 1490, 1652, 1786, 1894, 2028}

P4096v1: ±{92, 226, 334, 468, 630, 764, 872, 1006, 1114, 1248, 1356, 1490, 1652, 1786, 1894, 2028}

P4096v2: ±{226, 468, 764, 1006, 1248, 1490, 1786, 2028}

P4096v3: ±{92, 334, 630, 872, 1114, 1356, 1652, 1894}

3.3. P2020v3: ±{24, 158, 266, 400, 562, 696, 804, 938, 1046, 1180, 1288, 1422, 1584, 1718, 1826, 1960}

P4096v1: ±{24, 158, 266, 400, 562, 696, 804, 938, 1046, 1180, 1288, 1422, 1584, 1718, 1826, 1960}

P4096v2: ±{158, 400, 696, 938, 1180, 1422, 1718, 1960}

P4096v3: ±{24, 266, 562, 804, 1046, 1288, 1584, 1826}

3.4. P2020v4: ±{24, 158, 266, 400, 562, 696, 804, 938, 1114, 1248, 1356, 1490, 1652, 1786, 1894, 2028}

P4096v1: ±{24, 158, 266, 400, 562, 696, 804, 938, 1114, 1248, 1356, 1490, 1652, 1786, 1894, 2028}

P4096v2: ±{158, 400, 696, 938, 1248, 1490, 1786, 2028}

P4096v3: ±{24, 266, 562, 804, 1114, 1356, 1652, 1894}

3.5. P2020v5: ±{92, 226, 334, 468, 630, 764, 872, 1006, 1046, 1180, 1288, 1422, 1584, 1718, 1826, 1960}

P4096v1: ±{92, 226, 334, 468, 630, 764, 872, 1006, 1046, 1180, 1288, 1422, 1584, 1718, 1826, 1960}

P4096v2: ±{226, 468, 764, 1006, 1180, 1422, 1718, 1960}

P4096v3: ±{92, 334, 630, 872, 1046, 1288, 1584, 1826}

<996 RU/2020 RU/Full Band>

4. P996v4: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

4.1. P2020v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v2: ±{118, 252, 360, 494, 604, 738, 846, 980, 1140, 1274, 1382, 1516, 1626, 1760, 1868, 2002}

P4096v3: ±{50, 184, 292, 426, 536, 670, 778, 912, 1072, 1206, 1314, 1448, 1558, 1692, 1800, 1934}

4.2. P2020v2: ±{118, 252, 360, 494, 604, 738, 846, 980, 1140, 1274, 1382, 1516, 1626, 1760, 1868, 2002}

P4096v1: ±{118, 252, 360, 494, 604, 738, 846, 980, 1140, 1274, 1382, 1516, 1626, 1760, 1868, 2002}

P4096v2: ±{252, 494, 738, 980, 1274, 1516, 1760, 2002}

P4096v3: ±{118, 360, 604, 846, 1140, 1382, 1626, 1868}

4.3. P2020v3: ±{50, 184, 292, 426, 536, 670, 778, 912, 1072, 1206, 1314, 1448, 1558, 1692, 1800, 1934}

P4096v1: ±{50, 184, 292, 426, 536, 670, 778, 912, 1072, 1206, 1314, 1448, 1558, 1692, 1800, 1934}

P4096v2: ±{184, 426, 670, 912, 1206, 1448, 1692, 1934}

P4096v3: ±{50, 292, 536, 778, 1072, 1314, 1558, 1800}

4.4. P2020v4: ±{50, 184, 292, 426, 536, 670, 778, 912, 1140, 1274, 1382, 1516, 1626, 1760, 1868, 2002}

P4096v1: ±{50, 184, 292, 426, 536, 670, 778, 912, 1140, 1274, 1382, 1516, 1626, 1760, 1868, 2002}

P4096v2: ±{184, 426, 670, 912, 1274, 1516, 1760, 2002}

P4096v3: ±{50, 292, 536, 778, 1140, 1382, 1626, 1868}

4.5. P2020v5: +{118, 252, 360, 494, 604, 738, 846, 980, 1072, 1206, 1314, 1448, 1558, 1692, 1800, 1934}

P4096v1: ±{118, 252, 360, 494, 604, 738, 846, 980, 1072, 1206, 1314, 1448, 1558, 1692, 1800, 1934}

P4096v2: ±{252, 494, 738, 980, 1206, 1448, 1692, 1934}

P4096v3: ±{118, 360, 604, 846, 1072, 1314, 1558, 1800}

Listed below are indices for each RU and null tone in a case where a 4062/4064 RU is used in full-band transmission and the second configuration for the 996 RU is used.

<26 RU>

TABLE 147

| RU1 | RU2 | RU3 | RU4 | RU5 | RU6 | RU7 | RU8 | RU9 |
|---|---|---|---|---|---|---|---|---|
| −2032: −2007 | −2006: −1981 | −1978: −1953 | −1952: −1927 | −1925: −1900 | −1898: −1873 | −1872: −1847 | −1844: −1819 | −1818: −1793 |

| RU10 | RU11 | RU12 | RU13 | RU14 | RU15 | RU16 | RU17 | RU18 | RU19 |
|---|---|---|---|---|---|---|---|---|---|
| −1790: −1765 | −1764: −1739 | −1736: −1711 | −1710: −1685 | −1683: −1658 | −1656: −1631 | −1630: −1605 | −1602: −1577 | −1576: −1551 | −1549: −1524 |

| RU20 | RU21 | RU22 | RU23 | RU24 | RU25 | RU26 | RU27 | RU28 |
|---|---|---|---|---|---|---|---|---|
| −1522: −1497 | −1496: −1471 | −1468: −1443 | −1442: −1417 | −1415: −1390 | −1388: −1363 | −1362: −1337 | −1334: −1309 | −1308: −1283 |

| RU29 | RU30 | RU31 | RU32 | RU33 | RU34 | RU35 | RU36 | RU37 | RU38 |
|---|---|---|---|---|---|---|---|---|---|
| −1280: −1255 | −1254: −1229 | −1226: −1201 | −1200: −1175 | −1173: −1148 | −1146: −1121 | −1120: −1095 | −1092: −1067 | −1066: −1041 | −1038: −1013 |

| RU39 | RU40 | RU41 | RU42 | RU43 | RU44 | RU45 | RU46 | RU47 |
|---|---|---|---|---|---|---|---|---|
| −1010: −985 | −984: −959 | −956: −931 | −930: −905 | −903: −878 | −876: −851 | −850: −825 | −822: −797 | −796: −771 |

| RU48 | RU49 | RU50 | RU51 | RU52 | RU53 | RU54 | RU55 | RU56 | RU57 |
|---|---|---|---|---|---|---|---|---|---|
| −768: −743 | −742: −717 | −714: −689 | −688: −663 | −661: −636 | −634: −609 | −608: −583 | −580: −555 | −554: −529 | −527: −502 |

| RU58 | RU59 | RU60 | RU61 | RU62 | RU63 | RU64 | RU65 | RU66 |
|---|---|---|---|---|---|---|---|---|
| −500: −475 | −474: −449 | −446: −421 | −420: −395 | −393: −368 | −366: −341 | −340: −315 | −312: −287 | −286: −261 |

| RU67 | RU68 | RU69 | RU70 | RU71 | RU72 | RU73 | RU74 | RU75 | RU76 |
|---|---|---|---|---|---|---|---|---|---|
| −258: −233 | −232: −207 | −204: −179 | −178: −153 | −151: −126 | −124: −99 | −98:−73 | −70:−45 | −44:−19 | −16:−4, 4:16 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 19:44

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034}
<52 RU>

TABLE 148

| RU1 | RU2 | RU3 | RU4 |
|---|---|---|---|
| −2032:−1981 | −1978:−1927 | −1898:−1847 | −1844:−1793 |
| RU5 | RU6 | RU7 | RU8 |
| −1790:−1739 | −1736:−1685 | −1656:−1605 | −1602:−1551 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)
→Ex) Subcarrier indices for RU 34 are the same as subcarrier indices for RU 31 multiplied by −1, that is, 73:124
Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034}
<106 RU>

TABLE 149

| RU1 | RU2 | RU3 | RU4 |
|---|---|---|---|
| −2032:−1927 | −1898:−1793 | −1790:−1685 | −1656:−1551 |
| RU5 | RU6 | RU7 | RU8 |
| −1522:−1417 | −1388:−1283 | −1280:−1175 | −1146:−1041 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)
→Ex) Subcarrier indices for RU 18 are the same as subcarrier indices for RU 15 multiplied by −1, that is, 153:258
Null subcarriers: ±{17, 18, 125, 152, 259, 260, 367, 394, 501, 528, 635, 662, 769, 770, 877, 904, 1011, 1012, 1039, 1040, 1147, 1174, 1281, 1282, 1389, 1416, 1523, 1550, 1657, 1684, 1791, 1792, 1899, 1926, 2033, 2034}
<242 RU>

TABLE 150

| RU1 | RU2 | RU3 | RU4 |
|---|---|---|---|
| −2033:−1792 | −1791:−1550 | −1523:−1282 | −1281:−1040 |
| RU5 | RU6 | RU7 | RU8 |
| −1011:−770 | −769:−528 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 260:501
Null subcarriers: ±{17, 1012, 1039, 2034}
<484 RU>

TABLE 151

| RU1 | RU2 | RU3 | RU4 |
|---|---|---|---|
| −2033:−1550 | −1523:−1040 | −1011:−528 | −501:−18 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 528:1011
Null subcarriers: ±{17, 1012, 1039, 2034}
<996 RU>

TABLE 152

| RU1 | RU2 | RU3 | RU4 |
|---|---|---|---|
| −2034:−1039 | −1012:−17 | 17:1012 | 1039:2034 |

Null subcarriers: X
<2018 RU>

TABLE 153

| RU1 | RU2 |
|---|---|
| −2034:−17 | 17:2034 |

Null subcarriers: X
<4064 or 4062 RU for New 160 MHz tone plan>
4064RU: −2034:−3, 3:2034
4062RU: −2034:−4, 4:2034
Null subcarriers: X
Pilot subcarrier indices according to the above tone plans are listed below.

<26 RU>
±{10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004, 1018, 1032, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1556, 1570, 1582, 1596, 1610, 1624, 1636, 1650, 1664, 1678, 1690, 1704, 1716, 1730, 1744, 1758, 1770, 1784, 1798, 1812, 1824, 1838, 1852, 1866, 1878, 1892, 1906, 1920, 1932, 1946, 1958, 1972, 1986, 2000, 2012, 2026}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1556, 1570, 1582, 1596, 1610, 1624, 1636, 1650, 1690, 1704, 1716, 1730, 1744, 1758, 1770, 1784, 1798, 1812, 1824, 1838, 1852, 1866, 1878, 1892, 1932, 1946, 1958, 1972, 1986, 2000, 2012, 2026}

<106/242/484 RU>
±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004, 1046, 1072, 1114, 1140, 1180, 1206, 1248, 1274, 1288, 1314, 1356, 1382, 1422, 1448, 1490, 1516, 1556, 1582, 1624, 1650, 1690, 1716, 1758, 1784, 1798, 1824, 1866, 1892, 1932, 1958, 2000, 2026}

<996 RU/2020 RU/Full Band>
1. P996v1: ±{50, 118, 184, 252, 292, 360, 426, 494, 560, 628, 694, 762, 802, 870, 936, 1004, 1072, 1140, 1206, 1274, 1314, 1382, 1448, 1516, 1582, 1650, 1716, 1784, 1824, 1892, 1958, 2026}
1.1. P2020v1:±{50, 118, 184, 252, 292, 360, 426, 494, 560, 628, 694, 762, 802, 870, 936, 1004, 1072, 1140, 1206, 1274, 1314, 1382, 1448, 1516, 1582, 1650, 1716, 1784, 1824, 1892, 1958, 2026}
P4096v1: ±{51, 119, 185, 253, 293, 361, 427, 495, 561, 629, 695, 763, 803, 871, 937, 1005, 1073, 1141, 1207, 1275, 1315, 1383, 1449, 1517, 1583, 1651, 1717, 1785, 1825, 1893, 1959, 2027}
P4096v2: ±{118, 252, 360, 494, 628, 762, 870, 1004, 1140, 1274, 1382, 1516, 1650, 1784, 1892, 2026}
P4096v3: ±{50, 184, 292, 426, 560, 694, 802, 936, 1072, 1206, 1314, 1448, 1582, 1716, 1824, 1958}
1.2. P2020v2: ±{118, 252, 360, 494, 628, 762, 870, 1004, 1140, 1274, 1382, 1516, 1650, 1784, 1892, 2026}
P4096v1: ±{118, 252, 360, 494, 628, 762, 870, 1004, 1140, 1274, 1382, 1516, 1650, 1784, 1892, 2026}
P4096v2: ±{252, 494, 762, 1004, 1274, 1516, 1784, 2026}
P4096v3: ±{118, 360, 628, 870, 1140, 1382, 1650, 1892}
1.3. P2020v3: ±{50, 184, 292, 426, 560, 694, 802, 936, 1072, 1206, 1314, 1448, 1582, 1716, 1824, 1958}
P4096v1: +{50, 184, 292, 426, 560, 694, 802, 936, 1072, 1206, 1314, 1448, 1582, 1716, 1824, 1958}
P4096v2: ±{184, 426, 694, 936, 1206, 1448, 1716, 1958}
P4096v3: ±{50, 292, 560, 802, 1072, 1314, 1582, 1824}
1.4. P2020v4: ±{50, 184, 292, 426, 560, 694, 802, 936, 1140, 1274, 1382, 1516, 1650, 1784, 1892, 2026}
P4096v1: ±{50, 184, 292, 426, 560, 694, 802, 936, 1140, 1274, 1382, 1516, 1650, 1784, 1892, 2026}
P4096v2: ±{184, 426, 694, 936, 1274, 1516, 1784, 2026}
P4096v3: ±{50, 292, 560, 802, 1140, 1382, 1650, 1892}
1.5. P2020v5: ±{118, 252, 360, 494, 628, 762, 870, 1004, 1072, 1206, 1314, 1448, 1582, 1716, 1824, 1958}
P4096v1: ±{118, 252, 360, 494, 628, 762, 870, 1004, 1072, 1206, 1314, 1448, 1582, 1716, 1824, 1958}
P4096v2: ±{252, 494, 762, 1004, 1206, 1448, 1716, 1958}
P4096v3: ±{118, 360, 628, 870, 1072, 1314, 1582, 1824}
<996 RU/2020 RU/Full Band>
2. P996v2: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}
2.1. P2020v1: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}
P4096v1: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}
P4096v2: ±{92, 226, 334, 468, 602, 736, 844, 978, 1114, 1248, 1356, 1490, 1624, 1758, 1866, 2000}
P4096v3: ±{24, 158, 266, 400, 534, 668, 776, 910, 1046, 1180, 1288, 1422, 1556, 1690, 1798, 1932}
2.2. P2020v2: ±{92, 226, 334, 468, 602, 736, 844, 978, 1114, 1248, 1356, 1490, 1624, 1758, 1866, 2000}
P4096v1: ±{92, 226, 334, 468, 602, 736, 844, 978, 1114, 1248, 1356, 1490, 1624, 1758, 1866, 2000}
P4096v2: ±{226, 468, 736, 978, 1248, 1490, 1758, 2000}
P4096v3: ±{92, 334, 602, 844, 1114, 1356, 1624, 1866}
2.3. P2020v3: ±{24, 158, 266, 400, 534, 668, 776, 910, 1046, 1180, 1288, 1422, 1556, 1690, 1798, 1932}
P4096v1: ±{24, 158, 266, 400, 534, 668, 776, 910, 1046, 1180, 1288, 1422, 1556, 1690, 1798, 1932}
P4096v2: ±{158, 400, 668, 910, 1180, 1422, 1690, 1932}
P4096v3: ±{24, 266, 534, 776, 1046, 1288, 1556, 1798}
2.4. P2020v4: ±{24, 158, 266, 400, 534, 668, 776, 910, 1114, 1248, 1356, 1490, 1624, 1758, 1866, 2000}
P4096v1: ±{24, 158, 266, 400, 534, 668, 776, 910, 1114, 1248, 1356, 1490, 1624, 1758, 1866, 2000}
P4096v2: ±{158, 400, 668, 910, 1248, 1490, 1758, 2000}
P4096v3: ±{24, 266, 534, 776, 1114, 1356, 1624, 1866}
2.5. P2020v5: ±{92, 226, 334, 468, 602, 736, 844, 978, 1046, 1180, 1288, 1422, 1556, 1690, 1798, 1932}
P4096v1: ±{92, 226, 334, 468, 602, 736, 844, 978, 1046, 1180, 1288, 1422, 1556, 1690, 1798, 1932}
P4096v2: ±{226, 468, 736, 978, 1180, 1422, 1690, 1932}
P4096v3: ±{92, 334, 602, 844, 1046, 1288, 1556, 1798}
<996 RU/2020 RU/Full Band>
3. P996v3: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}
3.1. P2020v1: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}
P4096v1: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}

P4096v2: ±{92, 226, 334, 468, 628, 762, 870, 1004, 1114, 1248, 1356, 1490, 1650, 1784, 1892, 2026}

P4096v3: ±{24, 158, 266, 400, 560, 694, 802, 936, 1046, 1180, 1288, 1422, 1582, 1716, 1824, 1958}

3.2. P2020v2: ±{92, 226, 334, 468, 628, 762, 870, 1004, 1114, 1248, 1356, 1490, 1650, 1784, 1892, 2026}

P4096v1: ±{92, 226, 334, 468, 628, 762, 870, 1004, 1114, 1248, 1356, 1490, 1650, 1784, 1892, 2026}

P4096v2: ±{226, 468, 762, 1004, 1248, 1490, 1784, 2026}

P4096v3: ±{92, 334, 628, 870, 1114, 1356, 1650, 1892}

3.3. P2020v3: ±{24, 158, 266, 400, 560, 694, 802, 936, 1046, 1180, 1288, 1422, 1582, 1716, 1824, 1958}

P4096v1: ±{24, 158, 266, 400, 560, 694, 802, 936, 1046, 1180, 1288, 1422, 1582, 1716, 1824, 1958}

P4096v2: ±{158, 400, 694, 936, 1180, 1422, 1716, 1958}

P4096v3: ±{24, 266, 560, 802, 1046, 1288, 1582, 1824}

3.4. P2020v4: ±{24, 158, 266, 400, 560, 694, 802, 936, 1114, 1248, 1356, 1490, 1650, 1784, 1892, 2026}

P4096v1: ±{24, 158, 266, 400, 560, 694, 802, 936, 1114, 1248, 1356, 1490, 1650, 1784, 1892, 2026}

P4096v2: ±{158, 400, 694, 936, 1248, 1490, 1784, 2026}

P4096v3: ±{24, 266, 560, 802, 1114, 1356, 1650, 1892}

3.5. P2020v5: ±{92, 226, 334, 468, 628, 762, 870, 1004, 1046, 1180, 1288, 1422, 1582, 1716, 1824, 1958}

P4096v1: ±{92, 226, 334, 468, 628, 762, 870, 1004, 1046, 1180, 1288, 1422, 1582, 1716, 1824, 1958}

P4096v2: ±{226, 468, 762, 1004, 1180, 1422, 1716, 1958}

P4096v3: ±{92, 334, 628, 870, 1046, 1288, 1582, 1824}

<996 RU/2020 RU/Full Band>

4. P996v4: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

4.1. P2020v1: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

P4096v1: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

P4096v2: ±{118, 252, 360, 494, 602, 736, 844, 978, 1140, 1274, 1382, 1516, 1624, 1758, 1866, 2000}

P4096v3: ±{50, 184, 292, 426, 534, 668, 776, 910, 1072, 1206, 1314, 1448, 1556, 1690, 1798, 1932}

4.2. P2020v2: ±{118, 252, 360, 494, 602, 736, 844, 978, 1140, 1274, 1382, 1516, 1624, 1758, 1866, 2000}

P4096v1: ±{118, 252, 360, 494, 602, 736, 844, 978, 1140, 1274, 1382, 1516, 1624, 1758, 1866, 2000}

P4096v2: ±{252, 494, 736, 978, 1274, 1516, 1758, 2000}

P4096v3: ±{118, 360, 602, 844, 1140, 1382, 1624, 1866}

4.3. P2020v3: ±{50, 184, 292, 426, 534, 668, 776, 910, 1072, 1206, 1314, 1448, 1556, 1690, 1798, 1932}

P4096v1: ±{50, 184, 292, 426, 534, 668, 776, 910, 1072, 1206, 1314, 1448, 1556, 1690, 1798, 1932}

P4096v2: ±{184, 426, 668, 910, 1206, 1448, 1690, 1932}

P4096v3: ±{50, 292, 534, 776, 1072, 1314, 1556, 1798}

4.4. P2020v4: ±{50, 184, 292, 426, 534, 668, 776, 910, 1140, 1274, 1382, 1516, 1624, 1758, 1866, 2000}

P4096v1: ±{50, 184, 292, 426, 534, 668, 776, 910, 1140, 1274, 1382, 1516, 1624, 1758, 1866, 2000}

P4096v2: ±{184, 426, 668, 910, 1274, 1516, 1758, 2000}

P4096v3: ±{50, 292, 534, 776, 1140, 1382, 1624, 1866}

4.5. P2020v5: ±{118, 252, 360, 494, 602, 736, 844, 978, 1072, 1206, 1314, 1448, 1556, 1690, 1798, 1932}

P4096v1: ±{118, 252, 360, 494, 602, 736, 844, 978, 1072, 1206, 1314, 1448, 1556, 1690, 1798, 1932}

P4096v2: ±{252, 494, 736, 978, 1206, 1448, 1690, 1932}

P4096v3: ±{118, 360, 602, 844, 1072, 1314, 1556, 1798}

E. Alternative 320 MHz Tone Plan 3-A

Tone plans are designed in the same manner as in D except that the number of DC tones is fixed to 5 in the full band and OFDMA as below.

<Full Band>

14/13 guard tone, 5DC, 4064RU (RU subcarrier indices are −2034:−3, 3:2034)

<OFDMA Tone Plan>

14G+2018RU+1N+13RU+5DC+13RU+1N+2018RU+13G, The number of DC tones is fixed to 5 and one null subcarrier is disposed on either side of a 26 RU, which is for reducing the impact of interference from an adjacent RU on the center 26 RU.

A configuration for a 2018 RU is proposed as below.
2018RU=996RU+26RU+996RU

Two configurations for a 996 RU are proposed as in the new 160 MHz tone plan.
996RU=484RU+1N+26RU+1N+484RU
996RU=1N+484RU+26RU+484RU+1N A 484 RU has a configuration of two 242 RUs as in existing 11ax.
484RU=242RU+242RU A 242 RU has the following configuration as in existing 11ax.
242RU=1N+106RU+1N+26RU+1N+106RU+1N A 106 RU has the following configuration as in existing 11ax.
106RU=52RU+2N+52RU A 52 RU has the following configuration as in existing 11ax.
52RU=26RU+26RU Listed below are indices for each RU and null tone in a case where a 4062/4064 RU is used in full-band transmission and the first configuration for the 996 RU is used.

<26 RU>

TABLE 154

| RU1 | RU2 | RU3 | RU4 | RU5 | RU6 | RU7 | RU8 | RU9 |
|---|---|---|---|---|---|---|---|---|
| −2033: −2008 | −2007: −1982 | −1979: −1954 | −1953: −1928 | −1926: −1901 | −1899: −1874 | −1873: −1848 | −1845: −1820 | −1819: −1794 |

| RU10 | RU11 | RU12 | RU13 | RU14 | RU15 | RU16 | RU17 | RU18 | RU19 |
|---|---|---|---|---|---|---|---|---|---|
| −1791: −1766 | −1765: −1740 | −1737: −1712 | −1711: −1686 | −1684: −1659 | −1657: −1632 | −1631: −1606 | −1603: −1578 | −1577: −1552 | −1549: −1524 |

TABLE 154-continued

| RU20 | RU21 | RU22 | RU23 | RU24 | RU25 | RU26 | RU27 | RU28 |
|---|---|---|---|---|---|---|---|---|
| −1521: −1496 | −1495: −1470 | −1467: −1442 | −1441: −1416 | −1414: −1389 | −1387: −1362 | −1361: −1336 | −1333: −1308 | −1307: −1282 |
| RU29 | RU30 | RU31 | RU32 | RU33 | RU34 | RU35 | RU36 | RU37 | RU38 |
| −1279: −1254 | −1253: −1228 | −1225: −1200 | −1199: −1174 | −1172: −1147 | −1145: −1120 | −1119: −1094 | −1091: −1066 | −1065: −1040 | −1038: −1013 |
| RU39 | RU40 | RU41 | RU42 | RU43 | RU44 | RU45 | RU46 | RU47 |
| −1011: −986 | −985: −960 | −957: −932 | −931: −906 | −904: −879 | −877: −852 | −851: −826 | −823: −798 | −797: −772 |
| RU48 | RU49 | RU50 | RU51 | RU52 | RU53 | RU54 | RU55 | RU56 | RU57 |
| −769: −744 | −743: −718 | −715: −690 | −689: −664 | −662: −637 | −635: −610 | −609: −584 | −581: −556 | −555: −530 | −527: −502 |
| RU58 | RU59 | RU60 | RU61 | RU62 | RU63 | RU64 | RU65 | RU66 |
| 499: −474 | −473: −448 | −445: −420 | −419: −394 | −392: −367 | −365: −340 | −339: −314 | −311: −286 | −285: −260 |
| RU67 | RU68 | RU69 | RU70 | RU71 | RU72 | RU73 | RU74 | RU75 | RU76 |
| −257: −232 | −231: −206 | −203: −178 | −177: −152 | −150: −125 | −123: −98 | −97:−72 | −69:−44 | −43:−18 | −15:−3, 3:15 |

→RU 77 to RU 151→ Subcarrier indices for RU 32+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 18:43

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034} <52 RU>

TABLE 155

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791−1740 | −1737:−1686 | −1657:−1606 | −1603:−1552 |
| RU9 | RU10 | RU11 | RU12 |
| −1521:−1470 | −1467:−1416 | −1387:−1336 | −1333:−1282 |
| RU13 | RU14 | RU15 | RU16 |
| −1279:−1228 | −1225:−1174 | −1145:−1094 | −1091:−1040 |
| RU17 | RU18 | RU19 | RU20 |
| −1011−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −499:−448 | −445:−394 | −365:−314 | −311:−260 |

TABLE 155-continued

| RU29 | RU30 | RU31 | RU32 |
|---|---|---|---|
| −257:−206 | −203:−152 | −123:−72 | −69:−18 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 72:123

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034} <106 RU>

TABLE 156

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1521:−1416 | −1387:−1282 | −1279:−1174 | −1145:−1040 |
| RU9 | RU10 | RU11 | RU12 |
| −1011−906 | −877:−772 | −769:−664 | −635:−530 |
| RU13 | RU14 | RU15 | RU16 |
| −499:−394 | −365:−260 | −257:−152 | −123:−18 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 152:257

Null subcarriers: ±{16, 17, 124, 151, 258, 259, 366, 393, 500, 501, 528, 529, 636, 663, 770, 771, 878, 905, 1012, 1039, 1146, 1173, 1280, 1281, 1388, 1415, 1522, 1523, 1550, 1551, 1658, 1685, 1792, 1793, 1900, 1927, 2034}

<242 RU>

TABLE 157

| RU1 | RU2 | RU3 | RU4 |
|---|---|---|---|
| −2034:−1793 | −1792:−1551 | −1522:−1281 | −1280:−1039 |
| RU5 | RU6 | RU7 | RU8 |
| −1012:−771 | −770:−529 | −500:−259 | −258:−17 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 259:500

Null subcarriers: ±{16, 501, 528, 1523, 1550}

<484 RU>

TABLE 158

| RU1 | RU2 | RU3 | RU4 |
|---|---|---|---|
| −2034:−1551 | −1522:−1039 | −1012:−529 | −500:−17 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 529:1012

Null subcarriers:: ±{16, 501, 528, 1523, 1550}

<996 RU>

TABLE 159

| RU1 | RU2 | RU3 | RU4 |
|---|---|---|---|
| −2034:−1039 | −1012:−17 | 17:1012 | 1039:2034 |

Null subcarriers: ±16

<2018 RU>

TABLE 160

| RU1 | RU2 |
|---|---|
| −2034:−17 | 17:2034 |

Null subcarriers: ±16

<4064 RU for New 320 MHz tone plan>

4064RU: −2034:−3, 3:2034

Null subcarriers: X

Pilot subcarrier indices according to the above tone plans are listed below.

<26 RU>

±{8 or 10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1018, 1032, 1046, 1060, 1072, 1086, 1100, 1114, 1126, 1140, 1152, 1166, 1180, 1194, 1206, 1220, 1234, 1248, 1260, 1274, 1288, 1302, 1314, 1328, 1342, 1356, 1368, 1382, 1394, 1408, 1422, 1436, 1448, 1462, 1476, 1490, 1502, 1516, 1530, 1544, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}

<52 RU>

±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>

±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1046, 1072, 1114, 1140, 1180, 1206, 1248, 1274, 1288, 1314, 1356, 1382, 1422, 1448, 1490, 1516, 1558, 1584, 1626, 1652, 1692, 1718, 1760, 1786, 1800, 1826, 1868, 1894, 1934, 1960, 2002, 2028}

<996 RU/2020 RU/Full Band>

1. P996v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

1.1. P2020v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

P4096v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}

P4096v2: ±{118, 252, 360, 494, 630, 764, 872, 1006, 1140, 1274, 1382, 1516, 1652, 1786, 1894, 2028}

P4096v3: ±{50, 184, 292, 426, 562, 696, 804, 938, 1072, 1206, 1314, 1448, 1584, 1718, 1826, 1960}

1.2. P2020v2: ±{118, 252, 360, 494, 630, 764, 872, 1006, 1140, 1274, 1382, 1516, 1652, 1786, 1894, 2028}

P4096v1: ±{118, 252, 360, 494, 630, 764, 872, 1006, 1140, 1274, 1382, 1516, 1652, 1786, 1894, 2028}

P4096v2: ±{252, 494, 764, 1006, 1274, 1516, 1786, 2028}

P4096v3: ±{118, 360, 630, 872, 1140, 1382, 1652, 1894}

1.3. P2020v3: ±{50, 184, 292, 426, 562, 696, 804, 938, 1072, 1206, 1314, 1448, 1584, 1718, 1826, 1960}

P4096v1: ±{50, 184, 292, 426, 562, 696, 804, 938, 1072, 1206, 1314, 1448, 1584, 1718, 1826, 1960}

P4096v2: ±{184, 426, 696, 938, 1206, 1448, 1718, 1960}

P4096v3: ±{50, 292, 562, 804, 1072, 1314, 1584, 1826}

1.4. P2020v4: ±{50, 184, 292, 426, 562, 696, 804, 938, 1140, 1274, 1382, 1516, 1652, 1786, 1894, 2028}

P4096v1: ±{50, 184, 292, 426, 562, 696, 804, 938, 1140, 1274, 1382, 1516, 1652, 1786, 1894, 2028}

P4096v2: ±{184, 426, 696, 938, 1274, 1516, 1786, 2028}
P4096v3: ±{50, 292, 562, 804, 1140, 1382, 1652, 1894}
 1.5. P2020v5: ±{118, 252, 360, 494, 630, 764, 872, 1006, 1072, 1206, 1314, 1448, 1584, 1718, 1826, 1960}
P4096v1: ±{118, 252, 360, 494, 630, 764, 872, 1006, 1072, 1206, 1314, 1448, 1584, 1718, 1826, 1960}
P4096v2: ±{252, 494, 764, 1006, 1206, 1448, 1718, 1960}
P4096v3: ±{118, 360, 630, 872, 1072, 1314, 1584, 1826}
<996 RU/2020 RU/Full Band>
 2. P996v2: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
 2.1. P2020v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
P4096v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
P4096v2: ±{92, 226, 334, 468, 604, 738, 846, 980, 1114, 1248, 1356, 1490, 1626, 1760, 1868, 2002}
P4096v3: ±{24, 158, 266, 400, 536, 670, 778, 912, 1046, 1180, 1288, 1422, 1558, 1692, 1800, 1934}
 2.2. P2020v2: ±{92, 226, 334, 468, 604, 738, 846, 980, 1114, 1248, 1356, 1490, 1626, 1760, 1868, 2002}
P4096v1: ±{92, 226, 334, 468, 604, 738, 846, 980, 1114, 1248, 1356, 1490, 1626, 1760, 1868, 2002}
P4096v2: ±{226, 468, 738, 980, 1248, 1490, 1760, 2002}
P4096v3: ±{92, 334, 604, 846, 1114, 1356, 1626, 1868}
 2.3. P2020v3: ±{24, 158, 266, 400, 536, 670, 778, 912, 1046, 1180, 1288, 1422, 1558, 1692, 1800, 1934}
P4096v1: ±{24, 158, 266, 400, 536, 670, 778, 912, 1046, 1180, 1288, 1422, 1558, 1692, 1800, 1934}
P4096v2: ±{158, 400, 670, 912, 1180, 1422, 1692, 1934}
P4096v3: ±{24, 266, 536, 778, 1046, 1288, 1558, 1800}
 2.4. P2020v4: ±{24, 158, 266, 400, 536, 670, 778, 912, 1114, 1248, 1356, 1490, 1626, 1760, 1868, 2002}
P4096v1: +{24, 158, 266, 400, 536, 670, 778, 912, 1114, 1248, 1356, 1490, 1626, 1760, 1868, 2002}
P4096v2: +{158, 400, 670, 912, 1248, 1490, 1760, 2002}
P4096v3: +{24, 266, 536, 778, 1114, 1356, 1626, 1868}
 2.5. P2020v5: ±{92, 226, 334, 468, 604, 738, 846, 980, 1046, 1180, 1288, 1422, 1558, 1692, 1800, 1934}
P4096v1: ±{92, 226, 334, 468, 604, 738, 846, 980, 1046, 1180, 1288, 1422, 1558, 1692, 1800, 1934}
P4096v2: +{226, 468, 738, 980, 1180, 1422, 1692, 1934}
P4096v3: ±{92, 334, 604, 846, 1046, 1288, 1558, 1800}
<996 RU/2020 RU/Full Band>
 3. P996v3: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}
 3.1. P2020v1: +124, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028)
P4096v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}
P4096v2: ±{92, 226, 334, 468, 630, 764, 872, 1006, 1114, 1248, 1356, 1490, 1652, 1786, 1894, 2028}
P4096v3: ±{24, 158, 266, 400, 562, 696, 804, 938, 1046, 1180, 1288, 1422, 1584, 1718, 1826, 1960}
 3.2. P2020v2: ±{92, 226, 334, 468, 630, 764, 872, 1006, 1114, 1248, 1356, 1490, 1652, 1786, 1894, 2028}
P4096v1: ±{92, 226, 334, 468, 630, 764, 872, 1006, 1114, 1248, 1356, 1490, 1652, 1786, 1894, 2028}
P4096v2: ±{226, 468, 764, 1006, 1248, 1490, 1786, 2028}
P4096v3: ±{92, 334, 630, 872, 1114, 1356, 1652, 1894}
 3.3. P2020v3: ±{24, 158, 266, 400, 562, 696, 804, 938, 1046, 1180, 1288, 1422, 1584, 1718, 1826, 1960}
P4096v1: ±{24, 158, 266, 400, 562, 696, 804, 938, 1046, 1180, 1288, 1422, 1584, 1718, 1826, 1960}
P4096v2: ±{158, 400, 696, 938, 1180, 1422, 1718, 1960}
P4096v3: ±{24, 266, 562, 804, 1046, 1288, 1584, 1826}
 3.4. P2020v4: ±{24, 158, 266, 400, 562, 696, 804, 938, 1114, 1248, 1356, 1490, 1652, 1786, 1894, 2028}
P4096v1: ±{24, 158, 266, 400, 562, 696, 804, 938, 1114, 1248, 1356, 1490, 1652, 1786, 1894, 2028}
P4096v2: ±{158, 400, 696, 938, 1248, 1490, 1786, 2028}
P4096v3: ±{24, 266, 562, 804, 1114, 1356, 1652, 1894}
 3.5. P2020v5: {92, 226, 334, 468, 630, 764, 872, 1006, 1046, 1180, 1288, 1422, 1584, 1718, 1826, 1960}
P4096v1: ±{92, 226, 334, 468, 630, 764, 872, 1006, 1046, 1180, 1288, 1422, 1584, 1718, 1826, 1960}
P4096v2: ±{226, 468, 764, 1006, 1180, 1422, 1718, 1960}
P4096v3: ±{92, 334, 630, 872, 1046, 1288, 1584, 1826}
<996 RU/2020 RU/Full Band>
 4. P996v4: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}
 4.1. P2020v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}
P4096v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}
P4096v2: ±{118, 252, 360, 494, 604, 738, 846, 980, 1140, 1274, 1382, 1516, 1626, 1760, 1868, 2002}
P4096v3: ±{50, 184, 292, 426, 536, 670, 778, 912, 1072, 1206, 1314, 1448, 1558, 1692, 1800, 1934}
 4.2. P2020v2: +{118, 252, 360, 494, 604, 738, 846, 980, 1140, 1274, 1382, 1516, 1626, 1760, 1868, 2002}
P4096v1: ±{118, 252, 360, 494, 604, 738, 846, 980, 1140, 1274, 1382, 1516, 1626, 1760, 1868, 2002}
P4096v2: ±{252, 494, 738, 980, 1274, 1516, 1760, 2002}
P4096v3: ±{118, 360, 604, 846, 1140, 1382, 1626, 1868}
 4.3. P2020v3: ±{50, 184, 292, 426, 536, 670, 778, 912, 1072, 1206, 1314, 1448, 1558, 1692, 1800, 1934}
P4096v1: ±{50, 184, 292, 426, 536, 670, 778, 912, 1206, 1314, 1448, 1558, 1692, 1800, 1934}
P4096v2: ±{184, 426, 670, 912, 1206, 1448, 1692, 1934}
P4096v3: ±{50, 292, 536, 778, 1072, 1314, 1558, 1800}
 4.4. P2020v4: ±{50, 184, 292, 426, 536, 670, 778, 912, 1140, 1274, 1382, 1516, 1626, 1760, 1868, 2002}
P4096v1: ±{50, 184, 292, 426, 536, 670, 778, 912, 1140, 1274, 1382, 1516, 1626, 1760, 1868, 2002}
P4096v2: ±{184, 426, 670, 912, 1274, 1516, 1760, 2002}
P4096v3: ±{50, 292, 536, 778, 1140, 1382, 1626, 1868}
 4.5. P2020v5: ±{118, 252, 360, 494, 604, 738, 846, 980, 1072, 1206, 1314, 1448, 1558, 1692, 1800, 1934}
P4096v1: ±{118, 252, 360, 494, 604, 738, 846, 980, 1072, 1206, 1314, 1448, 1558, 1692, 1800, 1934}
P4096v2: ±{252, 494, 738, 980, 1206, 1448, 1692, 1934}
P4096v3: ±{118, 360, 604, 846, 1072, 1314, 1558, 1800}

Listed below are indices for each RU and null tone in a case where a 4062/4064 RU is used in full-band transmission and the second configuration for the 996 RU is used.

<26 RU>

TABLE 161

| RU1 | RU2 | RU3 | RU4 | RU5 | RU6 | RU7 | RU8 | RU9 |
|---|---|---|---|---|---|---|---|---|
| −2032:−2007 | −2006:−1981 | −1978:−1953 | −1952:−1927 | −1925:−1900 | −1898:−1873 | −1872:−1847 | −1844:−1819 | −1818:−1793 |

| RU10 | RU11 | RU12 | RU13 | RU14 | RU15 | RU16 | RU17 | RU18 | RU19 |
|---|---|---|---|---|---|---|---|---|---|
| −1790:−1765 | −1764:−1739 | −1736:−1711 | −1710:−1685 | −1683:−1658 | −1656:−1631 | −1630:−1605 | −1602:−1577 | −1576:−1551 | −1549:−1524 |

| RU20 | RU21 | RU22 | RU23 | RU24 | RU25 | RU26 | RU27 | RU28 |
|---|---|---|---|---|---|---|---|---|
| −1522:−1497 | −1496:−1471 | −1468:−1443 | −1442:−1417 | −1415:−1390 | −1388:−1363 | −1362:−1337 | −1334:−1309 | −1308:−1283 |

| RU29 | RU30 | RU31 | RU32 | RU33 | RU34 | RU35 | RU36 | RU37 | RU38 |
|---|---|---|---|---|---|---|---|---|---|
| −1280:−1255 | −1254:−1229 | −1226:−1201 | −1200:−1175 | −1173:−1148 | −1146:−1121 | −1120:−1095 | −1092:−1067 | −1066:−1041 | −1038:−1013 |

| RU39 | RU40 | RU41 | RU42 | RU43 | RU44 | RU45 | RU46 | RU47 |
|---|---|---|---|---|---|---|---|---|
| −1010:−985 | −984:−959 | −956:−931 | −930:−905 | −903:−878 | −876:−851 | −850:−825 | −822:−797 | −796:−771 |

| RU48 | RU49 | RU50 | RU51 | RU52 | RU53 | RU54 | RU55 | RU56 | RU57 |
|---|---|---|---|---|---|---|---|---|---|
| −768:−743 | −742:−717 | −714:−689 | −688:−663 | −661:−636 | −634:−609 | −608:−583 | −580:−555 | −554:−529 | −527:−502 |

| RU58 | RU59 | RU60 | RU61 | RU62 | RU63 | RU64 | RU65 | RU66 |
|---|---|---|---|---|---|---|---|---|
| −500:−475 | −474:−449 | −446:−421 | −420:−395 | −393:−368 | −366:−341 | −340:−315 | −312:−287 | −286:−261 |

| RU67 | RU68 | RU69 | RU70 | RU71 | RU72 | RU73 | RU74 | RU75 | RU76 |
|---|---|---|---|---|---|---|---|---|---|
| −258:−233 | −232:−207 | −204:−179 | −178:−153 | −151:−126 | −124:−99 | −98:−73 | −70:−45 | −44:−19 | −15:−3, 3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 19:44

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034}

<52 RU>

TABLE 162

| RU1 | RU2 | RU3 | RU4 |
|---|---|---|---|
| −2032:−1981 | −1978:−1927 | −1898:−1847 | −1844:−1793 |

| RU5 | RU6 | RU7 | RU8 |
|---|---|---|---|
| −1790:−1739 | −1736:−1685 | −1656:−1605 | −1602:−1551 |

| RU9 | RU10 | RU11 | RU12 |
|---|---|---|---|
| −1522:−1471 | −1468:−1417 | −1388:−1337 | −1334:−1283 |

| RU13 | RU14 | RU15 | RU16 |
|---|---|---|---|
| −1280:−1229 | −1226:−1175 | −1146:−1095 | −1092:−1041 |

TABLE 162-continued

| RU17 | RU18 | RU19 | RU20 |
|---|---|---|---|
| −1010:−959 | −956:−905 | −876:−825 | −822:−771 |

| RU21 | RU22 | RU23 | RU24 |
|---|---|---|---|
| −768:−717 | −714:−663 | −634:−583 | −580:−529 |

| RU25 | RU26 | RU27 | RU28 |
|---|---|---|---|
| −500:−449 | −446:−395 | −366:−315 | −312:−261 |

| RU29 | RU30 | RU31 | RU32 |
|---|---|---|---|
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 73:124

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034}

<106 RU>

TABLE 163

| RU1 | RU2 | RU3 | RU4 |
|---|---|---|---|
| −2032:−1927 | −1898:−1793 | −1790:−1685 | −1656:−1551 |
| RU5 | RU6 | RU7 | RU8 |
| −1522:−1417 | −1388:−1283 | −1280:−1175 | −1146:−1041 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)
→Ex) Subcarrier indices for RU 18 are the same as subcarrier indices for RU 15 multiplied by −1, that is, 153:258
Null subcarriers: ±{16, 17, 18, 125, 152, 259, 260, 367, 394, 501, 528, 635, 662, 769, 770, 877, 904, 1011, 1012, 1039, 1040, 1147, 1174, 1281, 1282, 1389, 1416, 1523, 1550, 1657, 1684, 1791, 1792, 1899, 1926, 2033, 2034}
<242 RU>

TABLE 164

| RU1 | RU2 | RU3 | RU4 |
|---|---|---|---|
| −2033:−1792 | −1791−1550 | −1523:−1282 | −1281−1040 |
| RU5 | RU6 | RU7 | RU8 |
| −1011:−770 | −769:−528 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 260:501
Null subcarriers: ±{16, 17, 1012, 1039, 2034}
<484 RU>

TABLE 165

| RU1 | RU2 | RU3 | RU4 |
|---|---|---|---|
| −2033:−1550 | −1523:−1040 | −1011:−528 | −501:−18 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 528:1011
Null subcarriers: ±{16, 17, 1012, 1039, 2034}
<996 RU>

TABLE 166

| RU1 | RU2 | RU3 | RU4 |
|---|---|---|---|
| −2034:−1039 | −1012:−17 | 17:1012 | 1039:2034 |

Null subcarriers: ±16

<2018 RU>

TABLE 167

| RU1 | RU2 |
|---|---|
| −2034:−17 | 17:2034 |

Null subcarriers: ±16
<4064 RU for New 320 MHz tone plan>
4064RU: −2034:−3, 3:2034
Null subcarriers: X
Pilot subcarrier indices according to the above tone plans are listed below.
<26 RU>
±{8 or 10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004, 1018, 1032, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1556, 1570, 1582, 1596, 1610, 1624, 1636, 1650, 1664, 1678, 1690, 1704, 1716, 1730, 1744, 1758, 1770, 1784, 1798, 1812, 1824, 1838, 1852, 1866, 1878, 1892, 1906, 1920, 1932, 1946, 1958, 1972, 1986, 2000, 2012, 2026}
<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1556, 1570, 1582, 1596, 1610, 1624, 1636, 1650, 1690, 1704, 1716, 1730, 1744, 1758, 1770, 1784, 1798, 1812, 1824, 1838, 1852, 1866, 1878, 1892, 1932, 1946, 1958, 1972, 1986, 2000, 2012, 2026}
<106/242/484 RU>
±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004, 1046, 1072, 1114, 1140, 1180, 1206, 1248, 1274, 1288, 1314, 1356, 1382, 1422, 1448, 1490, 1516, 1556, 1582, 1624, 1650, 1690, 1716, 1758, 1784, 1798, 1824, 1866, 1892, 1932, 1958, 2000, 2026}
<996 RU/2020 RU/Full Band>
1. P996v1: ±{50, 118, 184, 252, 292, 360, 426, 494, 560, 628, 694, 762, 802, 870, 936, 1004, 1072, 1140, 1206, 1274, 1314, 1382, 1448, 1516, 1582, 1650, 1716, 1784, 1824, 1892, 1958, 2026}
1.1. P2020v1:±{50, 118, 184, 252, 292, 360, 426, 494, 560, 628, 694, 762, 802, 870, 936, 1004, 1072, 1140, 1206, 1274, 1314, 1382, 1448, 1516, 1582, 1650, 1716, 1784, 1824, 1892, 1958, 2026}
P4096v1: ±{51, 119, 185, 253, 293, 361, 427, 495, 561, 629, 695, 763, 803, 871, 937, 1005, 1073, 1141, 1207, 1275, 1315, 1383, 1449, 1517, 1583, 1651, 1717, 1785, 1825, 1893, 1959, 2027}
P4096v2: ±{118, 252, 360, 494, 628, 762, 870, 1004, 1140, 1274, 1382, 1516, 1650, 1784, 1892, 2026}

P4096v3: ±{50, 184, 292, 426, 560, 694, 802, 936, 1072, 1206, 1314, 1448, 1582, 1716, 1824, 1958}

1.2. P2020v2: ±{118, 252, 360, 494, 628, 762, 870, 1004, 1140, 1274, 1382, 1516, 1650, 1784, 1892, 2026}

P4096v1: ±{118, 252, 360, 494, 628, 762, 870, 1004, 1140, 1274, 1382, 1516, 1650, 1784, 1892, 2026}

P4096v2: ±{252, 494, 762, 1004, 1274, 1516, 1784, 2026}

P4096v3: ±{118, 360, 628, 870, 1140, 1382, 1650, 1892}

1.3. P2020v3: ±{50, 184, 292, 426, 560, 694, 802, 936, 1072, 1206, 1314, 1448, 1582, 1716, 1824, 1958}

P4096v1: ±{50, 184, 292, 426, 560, 694, 802, 936, 1072, 1206, 1314, 1448, 1582, 1716, 1824, 1958}

P4096v2: ±{184, 426, 694, 936, 1206, 1448, 1716, 1958}

P4096v3: ±{50, 292, 560, 802, 1072, 1314, 1582, 1824}

1.4. P2020v4: ±{50, 184, 292, 426, 560, 694, 802, 936, 1140, 1274, 1382, 1516, 1650, 1784, 1892, 2026}

P4096v1: ±{50, 184, 292, 426, 560, 694, 802, 936, 1140, 1274, 1382, 1516, 1650, 1784, 1892, 2026}

P4096v2: ±{184, 426, 694, 936, 1274, 1516, 1784, 2026}

P4096v3: ±{50, 292, 560, 802, 1140, 1382, 1650, 1892}

1.5. P2020v5: ±{118, 252, 360, 494, 628, 762, 870, 1004, 1072, 1206, 1314, 1448, 1582, 1716, 1824, 1958}

P4096v1: ±{118, 252, 360, 494, 628, 762, 870, 1004, 1072, 1206, 1314, 1448, 1582, 1716, 1824, 1958}

P4096v2: ±{252, 494, 762, 1004, 1206, 1448, 1716, 1958}

P4096v3: ±{118, 360, 628, 870, 1072, 1314, 1582, 1824}

<996 RU/2020 RU/Full Band>

2. P996v2: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}

2.1. P2020v1: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}

P4096v1: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}

P4096v2: ±{92, 226, 334, 468, 602, 736, 844, 978, 1114, 1248, 1356, 1490, 1624, 1758, 1866, 2000}

P4096v3: ±{24, 158, 266, 400, 534, 668, 776, 910, 1046, 1180, 1288, 1422, 1556, 1690, 1798, 1932}

2.2. P2020v2: ±{92, 226, 334, 468, 602, 736, 844, 978, 1114, 1248, 1356, 1490, 1624, 1758, 1866, 2000}

P4096v1: ±{92, 226, 334, 468, 602, 736, 844, 978, 1114, 1248, 1356, 1490, 1624, 1758, 1866, 2000}

P4096v2: ±{226, 468, 736, 978, 1248, 1490, 1758, 2000}

P4096v3: ±{92, 334, 602, 844, 1114, 1356, 1624, 1866}

2.3. P2020v3: ±{24, 158, 266, 400, 534, 668, 776, 910, 1046, 1180, 1288, 1422, 1556, 1690, 1798, 1932}

P4096v1: ±{24, 158, 266, 400, 534, 668, 776, 910, 1046, 1180, 1288, 1422, 1556, 1690, 1798, 1932}

P4096v2: ±{158, 400, 668, 910, 1180, 1422, 1690, 1932}

P4096v3: ±{24, 266, 534, 776, 1046, 1288, 1556, 1798}

2.4. P2020v4: ±{24, 158, 266, 400, 534, 668, 776, 910, 1114, 1248, 1356, 1490, 1624, 1758, 1866, 2000}

P4096v1: ±{24, 158, 266, 400, 534, 668, 776, 910, 1114, 1248, 1356, 1490, 1624, 1758, 1866, 2000}

P4096v2: ±{158, 400, 668, 910, 1248, 1490, 1758, 2000}

P4096v3: ±{24, 266, 534, 776, 1114, 1356, 1624, 1866}

2.5. P2020v5: ±{92, 226, 334, 468, 602, 736, 844, 978, 1046, 1180, 1288, 1422, 1556, 1690, 1798, 1932}

P4096v1: ±{92, 226, 334, 468, 602, 736, 844, 978, 1046, 1180, 1288, 1422, 1556, 1690, 1798, 1932}

P4096v2: ±{226, 468, 736, 978, 1180, 1422, 1690, 1932}

P4096v3: ±{92, 334, 602, 844, 1046, 1288, 1556, 1798}

<996 RU/2020 RU/Full Band>

3. P996v3: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}

3.1. P2020v1: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}

P4096v1: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}

P4096v2: ±{92, 226, 334, 468, 628, 762, 870, 1004, 1114, 1248, 1356, 1490, 1650, 1784, 1892, 2026}

P4096v3: ±{24, 158, 266, 400, 560, 694, 802, 936, 1046, 1180, 1288, 1422, 1582, 1716, 1824, 1958}

3.2. P2020v2: ±{92, 226, 334, 468, 628, 762, 870, 1004, 1114, 1248, 1356, 1490, 1650, 1784, 1892, 2026}

P4096v1: ±{92, 226, 334, 468, 628, 762, 870, 1004, 1114, 1248, 1356, 1490, 1650, 1784, 1892, 2026}

P4096v2: ±{226, 468, 762, 1004, 1248, 1490, 1784, 2026}

P4096v3: ±{92, 334, 628, 870, 1114, 1356, 1650, 1892}

3.3. P2020v3: ±{24, 158, 266, 400, 560, 694, 802, 936, 1046, 1180, 1288, 1422, 1582, 1716, 1824, 1958}

P4096v1: ±{24, 158, 266, 400, 560, 694, 802, 936, 1046, 1180, 1288, 1422, 1582, 1716, 1824, 1958}

P4096v2: ±{158, 400, 694, 936, 1180, 1422, 1716, 1958}

P4096v3: ±{24, 266, 560, 802, 1046, 1288, 1582, 1824}

3.4. P2020v4: ±{24, 158, 266, 400, 560, 694, 802, 936, 1114, 1248, 1356, 1490, 1650, 1784, 1892, 2026}

P4096v1: ±{24, 158, 266, 400, 560, 694, 802, 936, 1114, 1248, 1356, 1490, 1650, 1784, 1892, 2026}

P4096v2: ±{158, 400, 694, 936, 1248, 1490, 1784, 2026}

P4096v3: ±{24, 266, 560, 802, 1114, 1356, 1650, 1892}

3.5. P2020v5: ±{92, 226, 334, 468, 628, 762, 870, 1004, 1046, 1180, 1288, 1422, 1582, 1716, 1824, 1958}

P4096v1: ±{92, 226, 334, 468, 628, 762, 870, 1004, 1046, 1180, 1288, 1422, 1582, 1716, 1824, 1958}

P4096v2: ±{226, 468, 762, 1004, 1180, 1422, 1716, 1958}

P4096v3: ±{92, 334, 628, 870, 1046, 1288, 1582, 1824}

<996 RU/2020 RU/Full Band>

4. P996v4: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

4.1. P2020v1: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

P4096v1: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

P4096v2: ±{118, 252, 360, 494, 602, 736, 844, 978, 1140, 1274, 1382, 1516, 1624, 1758, 1866, 2000}

P4096v3: ±{50, 184, 292, 426, 534, 668, 776, 910, 1072, 1206, 1314, 1448, 1556, 1690, 1798, 1932}

4.2. P2020v2: ±{118, 252, 360, 494, 602, 736, 844, 978, 1140, 1274, 1382, 1516, 1624, 1758, 1866, 2000}

P4096v1: ±{118, 252, 360, 494, 602, 736, 844, 978, 1140, 1274, 1382, 1516, 1624, 1758, 1866, 2000}

P4096v2: ±{252, 494, 736, 978, 1274, 1516, 1758, 2000}

P4096v3: ±{118, 360, 602, 844, 1140, 1382, 1624, 1866}
  4.3. P2020v3: ±{50, 184, 292, 426, 534, 668, 776, 910, 1072, 1206, 1314, 1448, 1556, 1690, 1798, 1932}
  P4096v1: ±{50, 184, 292, 426, 534, 668, 776, 910, 1072, 1206, 1314, 1448, 1556, 1690, 1798, 1932}
  P4096v2: ±{184, 426, 668, 910, 1206, 1448, 1690, 1932}
  P4096v3: ±{50, 292, 534, 776, 1072, 1314, 1556, 1798}
  4.4. P2020v4: ±{50, 184, 292, 426, 534, 668, 776, 910, 1140, 1274, 1382, 1516, 1624, 1758, 1866, 2000}
  P4096v1: ±{50, 184, 292, 426, 534, 668, 776, 910, 1140, 1274, 1382, 1516, 1624, 1758, 1866, 2000}
  P4096v2: ±{184, 426, 668, 910, 1274, 1516, 1758, 2000}
  P4096v3: ±{50, 292, 534, 776, 1140, 1382, 1624, 1866}
  4.5. P2020v5: ±{118, 252, 360, 494, 602, 736, 844, 978, 1072, 1206, 1314, 1448, 1556, 1690, 1798, 1932}
  P4096v1: ±{118, 252, 360, 494, 602, 736, 844, 978, 1072, 1206, 1314, 1448, 1556, 1690, 1798, 1932}
  P4096v2: ±{252, 494, 736, 978, 1206, 1448, 1690, 1932}
  P4096v3: ±{118, 360, 602, 844, 1072, 1314, 1556, 1798}
  F. Alternative 320 MHz Tone Plan 4

When a 320 MHz tone plan is used, a wider guard tone may be used in order to further reduce interference in an adjacent channel, and using 13/12G is proposed. Further, in transmission using the full band, a new RU may be proposed, and the size of the new RU may be determined in consideration of various DC tones and a guard tone size according to the impact of a DC offset. The number of DC tones in existing 1 lax 80 MHz is 5 or 7, and 9 DC tones may be used in consideration of this number of DC tones and performance, in which case the new RU is a 4066/4064/4062 RU.

<Full Band>

13/12 guard tone, 5DC, 4066RU (RU subcarrier indices are −2035:−3 and 3:2035)

13/12 guard tone, 7DC, 4064RU (RU subcarrier indices are −2035:−4 and 4:2035)

13/12 guard tone, 9DC, 4062RU (RU subcarrier indices are −2035:−5 and 5:2035)

In 320 MHz, it is not preferable to use a smaller number of DC tones than the number of DC tones conventionally used in 80 MHz, which is 5/7, in consideration of the impact of a DC offset, it may be adequate to use 5/7 DC tones, and it is possible to use 9 DC tones for reliable performance.

Considering the following OFDMA tone plans using a 2018 RU, up to 9 DC tones may be adequate.

<OFDMA Tone Plan>

OFDMA tone plans may be expressed using a 2018 RU and a 26 RU (13+13 RU) as below.

13G+2018RU+13RU+9DC+13RU+2018RU+12G

13G+2018RU+1N+13RU+7DC+I3RU+1N+2018RU+12G

13G+2018RU+2N+13RU+5DC+13RU+2N+2018RU+12G

The number of DC tones and the number of null tones for the center 26 RU (13+13 RU) may be determined in consideration of the performance of a DC offset and performance according to the impact of interference on the center 25 RU (13+13 RU). Considering the existing 11ax tone plane, when the center 26 RU (13+13 RU) is used, 7 DC tones may be sufficient A configuration for a 2018 RU is proposed as below.

2018RU=996RU+26RU+996RU

Two configurations for a 996 RU are proposed as in the new 160 MHz tone plan.

996RU=484RU+1N+26RU+1N+484RU

996RU=1N+484RU+26RU+484RU+1N

A 484 RU has a configuration of two 242 RUs as in existing 11ax.

484RU=242RU+242RU

A 242 RU has the following configuration as in existing 11ax.

242RU=1N+106RU+1N+26RU+1N+106RU+1N

A 106 RU has the following configuration as in existing 11 ax.

106RU=52RU+2N+52RU

A 52 RU has the following configuration as in existing 11ax.

52RU=26RU+26RU

Listed below are indices for each RU and null tone in a case where a 4062/4064/4066 RU is used in full-band transmission, a tone plane of 13G+2018RU+13RU+9DC+13RU+2018RU+12G is used, and the first configuration for the 996 RU is used.

<26 RU>

TABLE 168

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |

| RU10 | RU11 | RU12 | RU13 | RU14 | RU15 | RU16 | RU17 | RU18 | RU19 |
|---|---|---|---|---|---|---|---|---|---|
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |

| RU20 | RU21 | RU22 | RU23 | RU24 | RU25 | RU26 | RU27 | RU28 |
|---|---|---|---|---|---|---|---|---|
| −1522:−1497 | −1496:−1471 | −1468:−1443 | −1442:−1417 | −1415:−1390 | −1388:−1363 | −1362:−1337 | −1334:−1309 | −1308:−1283 |

| RU29 | RU30 | RU31 | RU32 | RU33 | RU34 | RU35 | RU36 | RU37 | RU38 |
|---|---|---|---|---|---|---|---|---|---|
| −1280:−1255 | −1254:−1229 | −1226:−1201 | −1200:−1175 | −1173:−1148 | −1146:−1121 | −1120:−1095 | −1092:−1067 | −1066:−1041 | −1039:−1014 |

| RU39 | RU40 | RU41 | RU42 | RU43 | RU44 | RU45 | RU46 | RU47 |
|---|---|---|---|---|---|---|---|---|
| −1012:−987 | −986:−961 | −958:−933 | −932:−907 | −905:−880 | −878:−853 | −852:−827 | −824:−799 | −798:−773 |

TABLE 168-continued

| RU48 | RU49 | RU50 | RU51 | RU52 | RU53 | RU54 | RU55 | RU56 | RU57 |
|---|---|---|---|---|---|---|---|---|---|
| −770: −745 | −744: −719 | −716: −691 | −690: −665 | −663: −638 | −636: −611 | −610: −585 | −582: −557 | −556: −531 | −528: −503 |

| RU58 | RU59 | RU60 | RU61 | RU62 | RU63 | RU64 | RU65 | RU66 |
|---|---|---|---|---|---|---|---|---|
| 500: −475 | −474: −449 | −446: −421 | −420: −395 | −393: −368 | −366: −341 | −340: −315 | −312: −287 | −286: −261 |

| RU67 | RU68 | RU69 | RU70 | RU71 | RU72 | RU73 | RU74 | RU75 | RU76 |
|---|---|---|---|---|---|---|---|---|---|
| −258: −233 | −232: −207 | −204: −179 | −178: −153 | −151: −126 | −124: −99 | −98:−73 | −70:−45 | −44:−19 | −17:−5, 5:17 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarriers indices for RU 75 multiplied by −1, that is, 19:44

Null subcarriers: ±{18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<52 RU>

TABLE 169

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 73:124

Null subcarriers: ±{18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<106 RU>

TABLE 170

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 153:258

Null subcarriers: ±{18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035}

<242 RU>

TABLE 171

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 260:501

Null subcarriers: +{502, 529, 1524, 1551}

<484 RU>

TABLE 172

| RU1 | RU2 | RU3 | RU4 |
|---|---|---|---|
| −2035:−1552 | −1523:−1040 | −1013:−530 | −501:−18 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 530:1013
Null subcarriers: ±{502, 529, 1524, 1551}
<996 RU>

TABLE 173

| RU1 | RU2 | RU3 | RU4 |
|---|---|---|---|
| −2035:−1040 | −1013:−18 | 18:1013 | 1040:2035 |

Null subcarriers: X
<2018 RU>

TABLE 174

| RU1 | RU2 |
|---|---|
| −2035:−18 | 18:2035 |

Null subcarriers: X
<4066 or 4064 or 4062 RU for New 160 MHz Tone Plan>
4066RU: −2035:−3, 3:2035
4064RU: −2035:−4, 4:2035
4062RU: −2035:−5, 5:2035
Null subcarriers: X
Pilot subcarrier indices according to the above tone plans are listed below.
<26 RU>
±{10 (or 12), 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}
<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}
<106/242/484 RU>
±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1046, 1072, 1114, 1140, 1180, 1206, 1248, 1274, 1288, 1314, 1356, 1382, 1422, 1448, 1490, 1516, 1558, 1584, 1626, 1652, 1692, 1718, 1760, 1786, 1800, 1826, 1868, 1894, 1934, 1960, 2002, 2028}
<996 RU/2020 RU/Full Band>
1. P996v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
1.1. P2020v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
P4096v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
P4096v2: ±{118, 252, 360, 494, 630, 764, 872, 1006, 1140, 1274, 1382, 1516, 1652, 1786, 1894, 2028}
P4096v3: ±{50, 184, 292, 426, 562, 696, 804, 938, 1072, 1206, 1314, 1448, 1584, 1718, 1826, 1960}
1.2. P2020v2: +{118, 252, 360, 494, 630, 764, 872, 1006, 1140, 1274, 1382, 1516, 1652, 1786, 1894, 2028}
P4096v1: ±{118, 252, 360, 494, 630, 764, 872, 1006, 1140, 1274, 1382, 1516, 1652, 1786, 1894, 2028}
P4096v2: ±{252, 494, 764, 1006, 1274, 1516, 1786, 2028}
P4096v3: ±{118, 360, 630, 872, 1140, 1382, 1652, 1894}
1.3. P2020v3: ±{50, 184, 292, 426, 562, 696, 804, 938, 1072, 1206, 1314, 1448, 1584, 1718, 1826, 1960}
P4096v1: ±{50, 184, 292, 426, 562, 696, 804, 938, 1072, 1206, 1314, 1448, 1584, 1718, 1826, 1960}
P4096v2: ±{184, 426, 696, 938, 1206, 1448, 1718, 1960}
P4096v3: ±{50, 292, 562, 804, 1072, 1314, 1584, 1826}
1.4. P2020v4: ±{50, 184, 292, 426, 562, 696, 804, 938, 1140, 1274, 1382, 1516, 1652, 1786, 1894, 2028}
P4096v1: ±{50, 184, 292, 426, 562, 696, 804, 938, 1140, 1274, 1382, 1516, 1652, 1786, 1894, 2028}
P4096v2: ±{184, 426, 696, 938, 1274, 1516, 1786, 2028}
P4096v3: ±{50, 292, 562, 804, 1140, 1382, 1652, 1894}
1.5. P2020v5: ±{118, 252, 360, 494, 630, 764, 872, 1006, 1072, 1206, 1314, 1448, 1584, 1718, 1826, 1960}
P4096v1: ±{118, 252, 360, 494, 630, 764, 872, 1006, 1072, 1206, 1314, 1448, 1584, 1718, 1826, 1960}
P4096v2: ±{252, 494, 764, 1006, 1206, 1448, 1718, 1960}
P4096v3: ±{118, 360, 630, 872, 1072, 1314, 1584, 1826}
<996 RU/2020 RU/Full Band>
2. P996v2: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
2.1. P2020v1:±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
P4096v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
P4096v2: ±{92, 226, 334, 468, 604, 738, 846, 980, 1114, 1248, 1356, 1490, 1626, 1760, 1868, 2002}

P4096v3: ±{24, 158, 266, 400, 536, 670, 778, 912, 1046, 1180, 1288, 1422, 1558, 1692, 1800, 1934}

2.2. P2020v2: ±{92, 226, 334, 468, 604, 738, 846, 980, 1114, 1248, 1356, 1490, 1626, 1760, 1868, 2002}

P4096v1: ±{92, 226, 334, 468, 604, 738, 846, 980, 1114, 1248, 1356, 1490, 1626, 1760, 1868, 2002}

P4096v2: ±{226, 468, 738, 980, 1248, 1490, 1760, 2002}

P4096v3: ±{92, 334, 604, 846, 1114, 1356, 1626, 1868}

2.3. P2020v3: ±{24, 158, 266, 400, 536, 670, 778, 912, 1046, 1180, 1288, 1422, 1558, 1692, 1800, 1934}

P4096v1: ±{24, 158, 266, 400, 536, 670, 778, 912, 1046, 1180, 1288, 1422, 1558, 1692, 1800, 1934}

P4096v2: +{158, 400, 670, 912, 1180, 1422, 1692, 1934}

P4096v3: ±{24, 266, 536, 778, 1046, 1288, 1558, 1800}

2.4. P2020v4: ±{24, 158, 266, 400, 536, 670, 778, 912, 1114, 1248, 1356, 1490, 1626, 1760, 1868, 2002}

P4096v1: ±{24, 158, 266, 400, 536, 670, 778, 912, 1114, 1248, 1356, 1490, 1626, 1760, 1868, 2002}

P4096v2: ±{158, 400, 670, 912, 1248, 1490, 1760, 2002}

P4096v3: ±{24, 266, 536, 778, 1114, 1356, 1626, 1868}

2.5. P2020v5: ±{92, 226, 334, 468, 604, 738, 846, 980, 1046, 1180, 1288, 1422, 1558, 1692, 1800, 1934}

P4096v1: ±{92, 226, 334, 468, 604, 738, 846, 980, 1046, 1180, 1288, 1422, 1558, 1692, 1800, 1934}

P4096v2: ±{226, 468, 738, 980, 1180, 1422, 1692, 1934}

P4096v3: ±{92, 334, 604, 846, 1046, 1288, 1558, 1800}

<996 RU/2020 RU/Full Band>

3. P996v3: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1'652, 1718, 1786, 1826, 1894, 1960, 2028}

3.1. P2020v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v2: ±{92, 226, 334, 468, 630, 764, 872, 1006, 1114, 1248, 1356, 1490, 1652, 1786, 1894, 2028}

P4096v3: ±{24, 158, 266, 400, 562, 696, 804, 938, 1046, 1180, 1288, 1422, 1584, 1718, 1826, 1960}

3.2. P2020v2: ±{92, 226, 334, 468, 630, 764, 872, 1006, 1114, 1248, 1356, 1490, 1652, 1786, 1894, 2028}

P4096v1: ±{92, 226, 334, 468, 639, 764, 872, 1006, 1114, 1248, 1356, 1490, 1652, 1786, 1894, 2028}

P4096v2: ±{226, 468, 764, 1006, 1248, 1490, 1786, 2028}

P4096v3: ±{92, 334, 630, 872, 1114, 1356, 1652, 1894}

3.3. P2020v3: ±{24, 158, 266, 400, 562, 696, 804, 938, 1046, 1180, 1288, 1422, 1584, 1718, 1826, 1960}

P4096v1: ±{24, 158, 266, 400, 562, 696, 804, 938, 1046, 1180, 1288, 1422, 1584, 1718, 1826, 1960}

P4096v2: ±{158, 400, 696, 938, 1180, 1422, 1718, 1960}

P4096v3: ±{24, 266, 562, 804, 1046, 1288, 1584, 1826}

3.4. P2020v4: ±{24, 158, 266, 400, 562, 696, 804, 938, 1114, 1248, 1356, 1490, 1652, 1786, 1894, 2028}

P4096v1: ±{24, 158, 266, 400, 562, 696, 804, 938, 1114, 1248, 1356, 1490, 1652, 1786, 1894, 2028}

P4096v2: ±{158, 400, 696, 938, 1248, 1490, 1786, 2028}

P4096v3: ±{24, 266, 562, 804, 1114, 1356, 1652, 1894}

3.5. P2020v5: ±{92, 226, 334, 468, 630, 764, 872, 1006, 1046, 1180, 1288, 1422, 1584, 1718, 1826, 1960}

P4096v1: ±{92, 226, 334, 468, 630, 764, 872, 1006, 1046, 1180, 1288, 1422, 1584, 1718, 1826, 1960}

P4096v2: ±{226, 468, 764, 1006, 1180, 1422, 1718, 1960}

P4096v3: ±{92, 334, 630, 872, 1046, 1288, 1584, 1826}

<996 RU/2020 RU/Full Band>

4. P996v4: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

4.1. P2020v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v2: ±{118, 252, 360, 494, 604, 738, 846, 980, 1140, 1274, 1382, 1516, 1626, 1760, 1868, 2002}

P4096v3: ±{50, 184, 292, 426, 536, 670, 778, 912, 1072, 1206, 1314, 1448, 1558, 1692, 1800, 1934}

4.2. P2020v2: ±{118, 252, 360, 494, 604, 738, 846, 980, 1140, 1274, 1382, 1516, 1626, 1760, 1868, 2002}

P4096v1: ±{118, 252, 360, 494, 604, 738, 846, 980, 1140, 1274, 1382, 1516, 1626, 1760, 1868, 2002}

P4096v2: ±{252, 494, 738, 980, 1274, 1516, 1760, 2002}

P4096v3: ±{118, 360, 604, 846, 1140, 1382, 1626, 1868}

4.3. P2020v3: ±{50, 184, 292, 426, 536, 670, 778, 912, 1072, 1206, 1314, 1448, 1558, 1692, 1800, 1934}

P4096v1: ±{50, 184, 292, 426, 536, 670, 778, 912, 1072, 1206, 1314, 1448, 1558, 1692, 1800, 1934}

P4096v2: +{184, 426, 670, 912, 1206, 1448, 1692, 1934}

P4096v3: ±{50, 292, 536, 778, 1072, 1314, 1558, 1800}

4.4. P2020v4: +{50, 184, 292, 426, 536, 670, 778, 912, 1140, 1274, 1382, 1516, 1626, 1760, 1868, 2002}

P4096v1: ±{50, 184, 292, 426, 536, 670, 778, 912, 1140, 1274, 1382, 1516, 1626, 1760, 1868, 2002}

P4096v2: ±{184, 426, 670, 912, 1274, 1516, 1760, 2002}

P4096v3: ±{50, 292, 536, 778, 1140, 1382, 1626, 1868}

4.5. P2020v5: ±{118, 252, 360, 494, 604, 738, 846, 980, 1072, 1206, 1314, 1448, 1558, 1692, 1800, 1934}

P4096v1: ±{118, 252, 360, 494, 604, 738, 846, 980, 1072, 1206, 1314, 1448, 1558, 1692, 1800, 1934}

P4096v2: ±{252, 494, 738, 980, 1206, 1448, 1692, 1934}

P4096v3: ±{118, 360, 604, 846, 1072, 1314, 1558, 1800}

Listed below are indices for each RU and null tone in a case where a 4062/4064/4066 RU is used in full-band transmission, the tone plane of 13G+2018RU+13RU+9DC+13RU+2018RU+12G is used, and the second configuration for the 996 RU is used.

<26 RU>

TABLE 175

| RU1 | RU2 | RU3 | RU4 | RU5 | RU6 | RU7 | RU8 | RU9 |
|---|---|---|---|---|---|---|---|---|
| −2033: −2008 | −2007: −1982 | −1979: −1954 | −1953: −1928 | −1926: −1901 | −1899: −1874 | −1873: −1848 | −1845: −1820 | −1819: −1794 |

TABLE 175-continued

| RU10 | RU11 | RU12 | RU13 | RU14 | RU15 | RU16 | RU17 | RU18 | RU19 |
|---|---|---|---|---|---|---|---|---|---|
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −528:−503 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −17:−5, 5:17 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 20:45

Null subcarriers: ±{18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}
<52 RU>

TABLE 176

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |

TABLE 176-continued

| RU25 | RU26 | RU27 | RU28 |
|---|---|---|---|
| −501:−450 | −447:−396 | −367:−316 | −313:−262 |
| RU29 | RU30 | RU31 | RU32 |
| −259:−208 | −205:−154 | −125:−74 | −71:−20 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 74:125

Null subcarriers: ±{18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}
<106 RU>

TABLE 177

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |

TABLE 177-continued

| RU13 | RU14 | RU15 | RU16 |
|---|---|---|---|
| −501:−396 | −367:−262 | −259:−154 | −125:−20 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 154:259

Null subcarriers: ±{18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035}

<242 RU>

TABLE 178

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1012:−771 | −770:−529 | −502:−261 | −260:−19 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 261:502

Null subcarriers: ±{18, 1013, 1040, 2035}

<484 RU>

TABLE 179

| RU1 | RU2 | RU3 | RU4 |
|---|---|---|---|
| −2034:−1551 | −1524:−1041 | −1012:−529 | −502:−19 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 529:1012

Null subcarriers: ±{18, 1013, 1040, 2035}

<996 RU>

TABLE 180

| RU1 | RU2 | RU3 | RU4 |
|---|---|---|---|
| −2035:−1040 | −1013:−18 | 18:1013 | 1040:2035 |

Null subcarriers: X

<2018 RU>

TABLE 181

| RU1 | RU2 |
|---|---|
| −2035:−18 | 18:2035 |

Null subcarriers: X

<4066 or 4064 or 4062 RU for New 160 MHz Tone Plan>
4066RU: −2035:−3, 3:2035
4064RU: −2035:−4, 4:2035
4062RU: −2035:−5, 5:2035
Null subcarriers: X
Pilot subcarrier indices according to the above tone plans are listed below.

<26 RU>
±{10 (or 12), 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1530, 1544, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}

<52 RU>
±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{26, 52, 94, 120, 160, 186, 228, 254, 268, 294, 336, 362, 402, 428, 470, 496, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>
1. P996v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
1.1. P2020v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
P4096v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
P4096v2: ±{120, 254, 362, 496, 630, 764, 872, 1006, 1142, 1276, 1384, 1518, 1652, 1786, 1894, 2028}
P4096v3: ±{52, 186, 294, 428, 562, 696, 804, 938, 1074, 1208, 1316, 1450, 1584, 1718, 1826, 1960}
1.2. P2020v2: ±{120, 254, 362, 496, 630, 764, 872, 1006, 1142, 1276, 1384, 1518, 1652, 1786, 1894, 2028}
P4096v1: ±{120, 254, 362, 496, 630, 764, 872, 1006, 1142, 1276, 1384, 1518, 1652, 1786, 1894, 2028}
P4096v2: ±{254, 496, 764, 1006, 1276, 1518, 1786, 2028}

P4096v3: ±{120, 362, 630, 872, 1142, 1384, 1652, 1894}
 1.3. P2020v3: ±{52, 186, 294, 428, 562, 696, 804, 938, 1074, 1208, 1316, 1450, 1584, 1718, 1826, 1960}
P4096v1: ±{52, 186, 294, 428, 562, 696, 804, 938, 1074, 1208, 1316, 1450, 1584, 1718, 1826, 1960}
P4096v2: ±{186, 428, 696, 938, 1208, 1450, 1718, 1960}
P4096v3: ±{52, 294, 562, 804, 1074, 1316, 1584, 1826}
 1.4. P2020v4: ±{52, 186, 294, 428, 562, 696, 804, 938, 1142, 1276, 1384, 1518, 1652, 1786, 1894, 2028}
P4096v1: ±{52, 186, 294, 428, 562, 696, 804, 938, 1142, 1276, 1384, 1518, 1652, 1786, 1894, 2028}
P4096v2: ±{186, 428, 696, 938, 1276, 1518, 1786, 2028}
P4096v3: ±{52, 294, 562, 804, 1142, 1384, 1652, 1894}
 1.5. P2020v5: ±{120, 254, 362, 496, 630, 764, 872, 1006, 1074, 1208, 1316, 1450, 1584, 1718, 1826, 1960}
P4096v1: ±{120, 254, 362, 496, 630, 764, 872, 1006, 1074, 1208, 1316, 1450, 1584, 1718, 1826, 1960}
P4096v2: ±{254, 496, 764, 1006, 1208, 1450, 1718, 1960}
P4096v3: ±{120, 362, 630, 872, 1074, 1316, 1584, 1826}
<996 RU/2020 RU/Full Band>
 2. P996v2: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
 2.1. P2020v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
P4096v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
P4096v2: ±{94, 228, 336, 470, 604, 738, 846, 980, 1116, 1250, 1358, 1492, 1626, 1760, 1868, 2002}
P4096v3: ±{26, 160, 268, 402, 536, 670, 778, 912, 1048, 1182, 1290, 1424, 1558, 1692, 1800, 1934}
 2.2. P2020v2: ±{94, 228, 336, 470, 604, 738, 846, 980, 1116, 1250, 1358, 1492, 1626, 1760, 1868, 2002}
P4096v1: ±{94, 228, 336, 470, 604, 738, 846, 980, 1116, 1250, 1358, 1492, 1626, 1760, 1868, 2002}
P4096v2: ±{228, 470, 738, 980, 1250, 1492, 1760, 2002}
P4096v3: ±{94, 336, 604, 846, 1116, 1358, 1626, 1868}
 2.3. P2020v3: ±{26, 160, 268, 402, 536, 670, 778, 912, 1048, 1182, 1290, 1424, 1558, 1692, 1800, 1934}
P4096v1: ±{26, 160, 268, 402, 536, 670, 778, 912, 1048, 1182, 1290, 1424, 1558, 1692, 1800, 1934}
P4096v2: ±{160, 402, 670, 912, 1182, 1424, 1692, 1934}
P4096v3: ±{26, 268, 536, 778, 1048, 1290, 1558, 1800}
 2.4. P2020v4: ±{26, 160, 268, 402, 536, 670, 778, 912, 1116, 1250, 1358, 1492, 1626, 1760, 1868, 2002}
P4096v1: ±{26, 160, 268, 402, 536, 670, 778, 912, 1116, 1250, 1358, 1492, 1626, 1760, 1868, 2002}
P4096v2: ±{160, 402, 670, 912, 1250, 1492, 1760, 2002}
P4096v3: ±{26, 268, 536, 778, 1116, 1358, 1626, 1868}
 2.5. P2020v5: ±{94, 228, 336, 470, 604, 738, 846, 980, 1048, 1182, 1290, 1424, 1558, 1692, 1800, 1934}
P4096v1: ±{94, 228, 336, 470, 604, 738, 846, 980, 1048, 1182, 1290, 1424, 1558, 1692, 1800, 1934}
P4096v2: ±{228, 470, 738, 980, 1182, 1424, 1692, 1934}
P4096v3: ±{94, 336, 604, 846, 1048, 1290, 1558, 1800}
<996 RU/2020 RU/Full Band>
 3. P996v3: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}
 3.1. P2020v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}
P4096v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}
P4096v2: ±{94, 228, 336, 470, 630, 764, 872, 1006, 1116, 1250, 1358, 1492, 1652, 1786, 1894, 2028}
P4096v3: ±{26, 160, 268, 402, 562, 696, 804, 938, 1048, 1182, 1290, 1424, 1584, 1718, 1826, 1960}
 3.2. P2020v2: ±{94, 228, 336, 470, 630, 764, 872, 1006, 1116, 1250, 1358, 1492, 1652, 1786, 1894, 2028}
P4096v1: ±{94, 228, 336, 470, 630, 764, 872, 1006, 1116, 1250, 1358, 1492, 1652, 1786, 1894, 2028}
P4096v2: ±{228, 470, 764, 1006, 1250, 1492, 1786, 2028}
P4096v3: ±{94, 336, 630, 872, 1116, 1358, 1652, 1894}
 3.3. P2020v3: ±{26, 160, 268, 402, 562, 696, 804, 938, 1048, 1182, 1290, 1424, 1584, 1718, 1826, 1960}
P4096v1: ±{26, 160, 268, 402, 562, 696, 804, 938, 1048, 1182, 1290, 1424, 1584, 1718, 1826, 1960}
P4096v2: ±{160, 402, 696, 938, 1182, 1424, 1718, 1960}
P4096v3: ±{26, 268, 562, 804, 1048, 1290, 1584, 1826}
 3.4. P2020v4: ±{26, 160, 268, 402, 562, 696, 804, 938, 1116, 1250, 1358, 1492, 1652, 1786, 1894, 2028}
P4096v1: ±{26, 160, 268, 402, 562, 696, 804, 938, 1116, 1250, 1358, 1492, 1652, 1786, 1894, 2028}
P4096v2: ±{160, 402, 696, 938, 1250, 1492, 1786, 2028}
P4096v3: ±{26, 268, 562, 804, 1116, 1358, 1652, 1894}
 3.5. P2020v5: ±{94, 228, 336, 470, 630, 764, 872, 1006, 1048, 1182, 1290, 1424, 1584, 1718, 1826, 1960}
P4096v1: ±{94, 228, 336, 470, 630, 764, 872, 1006, 1048, 1182, 1290, 1424, 1584, 1718, 1826, 1960}
P4096v2: ±{228, 470, 764, 1006, 1182, 1424, 1718, 1960}
P4096v3: ±{94, 336, 630, 872, 1048, 1290, 1584, 1826}
<996 RU/2020 RU/Full Band>
 4. P996v4: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
 4.1. P2020v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
P4096v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}
P4096v2: ±{120, 254, 362, 496, 604, 738, 846, 980, 1142, 1276, 1384, 1518, 1626, 1760, 1868, 2002}
P4096v3: ±{52, 186, 294, 428, 536, 670, 778, 912, 1074, 1208, 1316, 1450, 1558, 1692, 1800, 1934}
 4.2. P2020v2: ±{120, 254, 362, 496, 604, 738, 846, 980, 1142, 1276, 1384, 1518, 1626, 1760, 1868, 2002}
P4096v1: ±{120, 254, 362, 496, 604, 738, 846, 980, 1142, 1276, 1384, 1518, 1626, 1760, 1868, 2002}
P4096v2: ±{254, 496, 738, 980, 1276, 1518, 1760, 2002}
P4096v3: ±{120, 362, 604, 846, 1142, 1384, 1626, 1868}
 4.3. P2020v3: ±{52, 186, 294, 428, 536, 670, 778, 912, 1074, 1208, 1316, 1450, 1558, 1692, 1800, 1934}
P4096v1: ±{52, 186, 294, 428, 536, 670, 778, 912, 1074, 1208, 1316, 1450, 1558, 1692, 1800, 1934}
P4096v2: ±{186, 428, 670, 912, 1208, 1450, 1692, 1934}
P4096v3: ±{52, 294, 536, 778, 1074, 1316, 1558, 1800}

4.4. P2020v4: +{52, 186, 294, 428, 536, 670, 778, 912, 1142, 1276, 1384, 1518, 1626, 1760, 1868, 2002}
P4096v1: ±{52, 186, 294, 428, 536, 670, 778, 912, 1142, 1276, 1384, 1518, 1626, 1760, 1868, 2002}
P4096v2: ±{186, 428, 670, 912, 1276, 1518, 1760, 2002}
P4096v3: ±{52, 294, 536, 778, 1142, 1384, 1626, 1868}
4.5. P2020v5: ±{120, 254, 362, 496, 604, 738, 846, 980, 1074, 1208, 1316, 1450, 1558, 1692, 1800, 1934}
P4096v1: ±{120, 254, 362, 496, 604, 738, 846, 980, 1074, 1208, 1316, 1450, 1558, 1692, 1800, 1934}
P4096v2: ±{254, 496, 738, 980, 1208, 1450, 1692, 1934}
P4096v3: ±{120, 362, 604, 846, 1074, 1316, 1558, 1800}

Listed below are indices for each RU and null tone in a case where a 4062/4064/4066 RU is used in full-band transmission, a tone plane of 13G+2018RU+1N+13RU+7DC+13RU+1N+2018RU+12G is used, and the first configuration for the 996 RU is used.

<26 RU>

TABLE 182

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |
| RU20 | RU21 | RU22 | RU23 | RU24 | RU25 | RU26 | RU27 | RU28 |
| −1522:−1497 | −1496:−1471 | −1468:−1443 | −1442:−1417 | −1415:−1390 | −1388:−1363 | −1362:−1337 | −1334:−1309 | −1308:−1283 |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1039:−1014 |
| RU39 | RU40 | RU41 | RU42 | RU43 | RU44 | RU45 | RU46 | RU47 |
| −1012:−987 | −986:−961 | −958:−933 | −932:−907 | −905:−880 | −878:−853 | −852:−827 | −824:−799 | −798:−773 |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −528:−503 |
| RU58 | RU59 | RU60 | RU61 | RU62 | RU63 | RU64 | RU65 | RU66 |
| 500:−475 | −474:−449 | −446:−421 | −420:−395 | −393:−368 | −366:−341 | −340:−315 | −312:−287 | −286:−261 |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −16:−4, 4:16 |

→RU 77 to RU 151→ Subcarrier indices for RU 76+x are the same as subcarrier indices for RU 76−x multiplied by −1 (x is a positive integer that is less than or equal to 75)
→Ex) Subcarrier indices for RU 77 are the same as subcarrier indices for RU 75 multiplied by −1, that is, 19:44

Null subcarriers: ±{17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<52 RU>

TABLE 183

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |

TABLE 183-continued

| RU17 | RU18 | RU19 | RU20 |
|---|---|---|---|
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −500:−449 | −446:−395 | −366:−315 | −312:−261 |

TABLE 183-continued

| RU29 | RU30 | RU31 | RU32 |
|---|---|---|---|
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 73:124

Null subcarriers: ±{17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<106 RU>

TABLE 184

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 153:258

Null subcarriers: ±{17, 18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035}

<242 RU>

TABLE 185

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 260:501

Null subcarriers: ±{17, 502, 529, 1524, 1551}

<484 RU>

TABLE 186

| RU1 | RU2 | RU3 | RU4 |
|---|---|---|---|
| −2035:−1552 | −1523:−1040 | −1013:−530 | −501:−18 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 530:1013

Null subcarriers: ±{17, 502, 529, 1524, 1551}

<996 RU>

TABLE 187

| RU1 | RU2 | RU3 | RU4 |
|---|---|---|---|
| −2035:−1040 | −1013:−18 | 18:1013 | 1040:2035 |

Null subcarriers: ±{17}

<2018 RU>

TABLE 188

| RU1 | RU2 |
|---|---|
| −2035:−18 | 18:2035 |

Null subcarriers: ±{17}

<4066 or 4064 or 4062 RU for New 160 MHz tone plan>
4066RU: −2035:−3, 3:2035
4064RU: −2035:−4, 4:2035
4062RU: −2035:−5, 5:2035
Null subcarriers: X
Pilot subcarrier indices according to the above tone plans are listed below.

<26 RU>
±{10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1046, 1072, 1114, 1140, 1180, 1206, 1248, 1274, 1288, 1314, 1356, 1382, 1422, 1448, 1490, 1516, 1558, 1584, 1626, 1652, 1692, 1718, 1760, 1786, 1800, 1826, 1868, 1894, 1934, 1960, 2002, 2028}

<996 RU/2020 RU/Full Band>
1. P996v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
1.1. P2020v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
P4096v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
P4096v2: ±{118, 252, 360, 494, 630, 764, 872, 1006, 1140, 1274, 1382, 1516, 1652, 1786, 1894, 2028}
P4096v3: ±{50, 184, 292, 426, 562, 696, 804, 938, 1072, 1206, 1314, 1448, 1584, 1718, 1826, 1960}
1.2. P2020v2: ±{118, 252, 360, 494, 630, 764, 872, 1006, 1140, 1274, 1382, 1516, 1652, 1786, 1894, 2028}
P4096v1: ±{118, 252, 360, 494, 630, 764, 872, 1006, 1140, 1274, 1382, 1516, 1652, 1786, 1894, 2028}
P4096v2: ±{252, 494, 764, 1006, 1274, 1516, 1786, 2028}
P4096v3: ±{118, 360, 630, 872, 1140, 1382, 1652, 1894}
1.3. P2020v3: ±{50, 184, 292, 426, 562, 696, 804, 938, 1072, 1206, 1314, 1448, 1584, 1718, 1826, 1960}
P4096v1: ±{50, 184, 292, 426, 562, 696, 804, 938, 1072, 1206, 1314, 1448, 1584, 1718, 1826, 1960}
P4096v2: ±{184, 426, 696, 938, 1206, 1448, 1718, 1960}
P4096v3: ±{50, 292, 562, 804, 1072, 1314, 1584, 1826}
1.4. P2020v4: ±{50, 184, 292, 426, 562, 696, 804, 938, 1140, 1274, 1382, 1516, 1652, 1786, 1894, 2028}
P4096v1: ±{50, 184, 292, 426, 562, 696, 804, 938, 1140, 1274, 1382, 1516, 1652, 1786, 1894, 2028}
P4096v2: ±{184, 426, 696, 938, 1274, 1516, 1786, 2028}
P4096v3: ±{50, 292, 562, 804, 1140, 1382, 1652, 1894}
1.5. P2020v5: +{118, 252, 360, 494, 630, 764, 872, 1006, 1072, 1206, 1314, 1448, 1584, 1718, 1826, 1960}
P4096v1: ±{118, 252, 360, 494, 630, 764, 872, 1006, 1072, 1206, 1314, 1448, 1584, 1718, 1826, 1960}
P4096v2: ±{252, 494, 764, 1006, 1206, 1448, 1718, 1960}
P4096v3: ±{118, 360, 630, 872, 1072, 1314, 1584, 1826}

<996 RU/2020 RU/Full Band>
2. P996v2: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
2.1. P2020v1:±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
P4096v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}
P4096v2: ±{92, 226, 334, 468, 604, 738, 846, 980, 1114, 1248, 1356, 1490, 1626, 1760, 1868, 2002}
P4096v3: ±{24, 158, 266, 400, 536, 670, 778, 912, 1046, 1180, 1288, 1422, 1558, 1692, 1800, 1934}
2.2. P2020v2: ±{92, 226, 334, 468, 604, 738, 846, 980, 1114, 1248, 1356, 1490, 1626, 1760, 1868, 2002}
P4096v1: ±{92, 226, 334, 468, 604, 738, 846, 980, 1114, 1248, 1356, 1490, 1626, 1760, 1868, 2002}
P4096v2: ±{226, 468, 738, 980, 1248, 1490, 1760, 2002}
P4096v3: ±{92, 334, 604, 846, 1114, 1356, 1626, 1868}
2.3. P2020v3: ±{24, 158, 266, 400, 536, 670, 778, 912, 1046, 1180, 1288, 1422, 1558, 1692, 1800, 1934}
P4096v1: ±{24, 158, 266, 400, 536, 670, 778, 912, 1046, 1180, 1288, 1422, 1558, 1692, 1800, 1934}
P4096v2: ±{158, 400, 670, 912, 1180, 1422, 1692, 1934}
P4096v3: ±{24, 266, 536, 778, 1046, 1288, 1558, 1800}
2.4. P2020v4: ±{24, 158, 266, 400, 536, 670, 778, 912, 1114, 1248, 1356, 1490, 1626, 1760, 1868, 2002}
P4096v1: ±{24, 158, 266, 400, 536, 670, 778, 912, 1114, 1248, 1356, 1490, 1626, 1760, 1868, 2002}
P4096v2: ±{158, 400, 670, 912, 1248, 1490, 1760, 2002}
P4096v3: ±{24, 266, 536, 778, 1114, 1356, 1626, 1868}
2.5. P2020v5: ±{92, 226, 334, 468, 604, 738, 846, 980, 1046, 1180, 1288, 1422, 1558, 1692, 1800, 1934}
P4096v1: ±{92, 226, 334, 468, 604, 738, 846, 980, 1046, 1180, 1288, 1422, 1558, 1692, 1800, 1934}
P4096v2: ±{226, 468, 738, 980, 1180, 1422, 1692, 1934}
P4096v3: ±{92, 334, 604, 846, 1046, 1288, 1558, 1800}

<996 RU/2020 RU/Full Band>
3. P996v3: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}
3.1. P2020v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}
P4096v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}
P4096v2: ±{92, 226, 334, 468, 630, 764, 872, 1006, 1114, 1248, 1356, 1490, 1652, 1786, 1894, 2028}
P4096v3: ±{24, 158, 266, 400, 562, 696, 804, 938, 1046, 1180, 1288, 1422, 1584, 1718, 1826, 1960}
3.2. P2020v2: ±{92, 226, 334, 468, 630, 764, 872, 1006, 1114, 1248, 1356, 1490, 1652, 1786, 1894, 2028}
P4096v1: ±{92, 226, 334, 468, 639, 764, 872, 1006, 1114, 1248, 1356, 1490, 1652, 1786, 1894, 2028}
P4096v2: ±{226, 468, 764, 1006, 1248, 1490, 1786, 2028}
P4096v3: ±{92, 334, 630, 872, 1114, 1356, 1652, 1894}
3.3. P2020v3: ±{24, 158, 266, 400, 562, 696, 804, 938, 1046, 1180, 1288, 1422, 1584, 1718, 1826, 1960}
P4096v1: ±{24, 158, 266, 400, 562, 696, 804, 938, 1046, 1180, 1288, 1422, 1584, 1718, 1826, 1960}
P4096v2: ±{158, 400, 696, 938, 1180, 1422, 1718, 1960}
P4096v3: ±{24, 266, 562, 804, 1046, 1288, 1584, 1826}
3.4. P2020v4: ±{24, 158, 266, 400, 562, 696, 804, 938, 1114, 1248, 1356, 1490, 1652, 1786, 1894, 2028}
P4096v1: ±{24, 158, 266, 400, 562, 696, 804, 938, 1114, 1248, 1356, 1490, 1652, 1786, 1894, 2028}
P4096v2: ±{158, 400, 696, 938, 1248, 1490, 1786, 2028}
P4096v3: ±{24, 266, 562, 804, 1114, 1356, 1652, 1894}
3.5. P2020v5: ±{92, 226, 334, 468, 630, 764, 872, 1006, 1046, 1180, 1288, 1422, 1584, 1718, 1826, 1960}
P4096v1: ±{92, 226, 334, 468, 630, 764, 872, 1006, 1046, 1180, 1288, 1422, 1584, 1718, 1826, 1960}

P4096v2: ±{226, 468, 764, 1006, 1180, 1422, 1718, 1960}

P4096v3: ±{92, 334, 630, 872, 1046, 1288, 1584, 1826}

<996 RU/2020 RU/Full Band>

4. P996v4: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

4.1. P2020v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v2: ±{118, 252, 360, 494, 604, 738, 846, 980, 1140, 1274, 1382, 1516, 1626, 1760, 1868, 2002}

P4096v3: ±{50, 184, 292, 426, 536, 670, 778, 912, 1072, 1206, 1314, 1448, 1558, 1692, 1800, 1934}

4.2. P2020v2: ±{118, 252, 360, 494, 604, 738, 846, 980, 1140, 1274, 1382, 1516, 1626, 1760, 1868, 2002}

P4096v1: ±{118, 252, 360, 494, 604, 738, 846, 980, 1140, 1274, 1382, 1516, 1626, 1760, 1868, 2002}

P4096v2: ±{252, 494, 738, 980, 1274, 1516, 1760, 2002}

P4096v3: ±{118, 360, 604, 846, 1140, 1382, 1626, 1868}

4.3. P2020v3: ±{50, 184, 292, 426, 536, 670, 778, 912, 1072, 1206, 1314, 1448, 1558, 1692, 1800, 1934}

P4096v1: ±{50, 184, 292, 426, 536, 670, 778, 912, 1072, 1206, 1314, 1448, 1558, 1692, 1800, 1934}

P4096v2: ±{184, 426, 670, 912, 1206, 1448, 1692, 1934}

P4096v3: ±{50, 292, 536, 778, 1072, 1314, 1558, 1800}

4.4. P2020v4: ±{50, 184, 292, 426, 536, 670, 778, 912, 1140, 1274, 1382, 1516, 1626, 1760, 1868, 2002}

P4096v1: ±{50, 184, 292, 426, 536, 670, 778, 912, 1140, 1274, 1382, 1516, 1626, 1760, 1868, 2002}

P4096v2: ±{184, 426, 670, 912, 1274, 1516, 1760, 2002}

P4096v3: ±{50, 292, 536, 778, 1140, 1382, 1626, 1868}

4.5. P2020v5: +{118, 252, 360, 494, 604, 738, 846, 980, 1072, 1206, 1314, 1448, 1558, 1692, 1800, 1934}

P4096v1: ±{118, 252, 360, 494, 604, 738, 846, 980, 1072, 1206, 1314, 1448, 1558, 1692, 1800, 1934}

P4096v2: ±{252, 494, 738, 980, 1206, 1448, 1692, 1934}

P4096v3: ±{118, 360, 604, 846, 1072, 1314, 1558, 1800}

Listed below are indices for each RU and null tone in a case where a 4062/4064/4066 RU is used in full-band transmission, the tone plane of 13G+2018RU+1N+13RU+7DC+13RU+1N+2018RU+12G is used, and the second configuration for the 996 RU is used.

<26 RU>

TABLE 189

| RU1 | RU2 | RU3 | RU4 | RU5 | RU6 | RU7 | RU8 | RU9 |
|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 |

| RU10 | RU11 | RU12 | RU13 | RU14 | RU15 | RU16 | RU17 | RU18 | RU19 |
|---|---|---|---|---|---|---|---|---|---|
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |

| RU20 | RU21 | RU22 | RU23 | RU24 | RU25 | RU26 | RU27 | RU28 |
|---|---|---|---|---|---|---|---|---|
| −1523:−1498 | −1497:−1472 | −1469:−1444 | −1443:−1418 | −1416:−1391 | −1389:−1364 | −1363:−1338 | −1335:−1310 | −1309:−1284 |

| RU29 | RU30 | RU31 | RU32 | RU33 | RU34 | RU35 | RU36 | RU37 | RU38 |
|---|---|---|---|---|---|---|---|---|---|
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |

| RU39 | RU40 | RU41 | RU42 | RU43 | RU44 | RU45 | RU46 | RU47 |
|---|---|---|---|---|---|---|---|---|
| −1011:−986 | −985:−960 | −957:−932 | −931:−906 | −904:−879 | −877:−852 | −851:−826 | −823:−798 | −797:−772 |

| RU48 | RU49 | RU50 | RU51 | RU52 | RU53 | RU54 | RU55 | RU56 | RU57 |
|---|---|---|---|---|---|---|---|---|---|
| −769:−744 | −743:−718 | −715:−690 | −689:−664 | −662:−637 | −635:−610 | −609:−584 | −581:−556 | −555:−530 | −528:−503 |

| RU58 | RU59 | RU60 | RU61 | RU62 | RU63 | RU64 | RU65 | RU66 |
|---|---|---|---|---|---|---|---|---|
| −501:−476 | −475:−450 | −447:−422 | −421:−396 | −394:−369 | −367:−342 | −341:−316 | −313:−288 | −287:−262 |

| RU67 | RU68 | RU69 | RU70 | RU71 | RU72 | RU73 | RU74 | RU75 | RU76 |
|---|---|---|---|---|---|---|---|---|---|
| −259:−234 | −233:−208 | −205:−180 | −179:−154 | −152:−127 | −125:−100 | −99:−74 | −71:−46 | −45:−20 | −16:−4, 4:16 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 20:45

Null subcarriers: ±{17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}

<52 RU>

TABLE 190

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 74:125

Null subcarriers: ±{17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}

<106 RU>

TABLE 191

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |

TABLE 191-continued

| RU9 | RU10 | RU11 | RU12 |
|---|---|---|---|
| −1011:−906 | −877:−772 | −769:−664 | −635:−530 |
| RU13 | RU14 | RU15 | RU16 |
| −501:−396 | −367:−262 | −259:−154 | −125:−20 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 154:259

Null subcarriers: ±{17, 18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035}

<242 RU>

TABLE 192

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1012:−771 | −770:−529 | −502:−261 | −260:−19 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 261:502

Null subcarriers: ±{17, 18, 1013, 1040, 2035}

<484 RU>

TABLE 193

| RU1 | RU2 | RU3 | RU4 |
|---|---|---|---|
| −2034:−1551 | −1524:−1041 | −1012:−529 | −502:−19 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 529:1012

Null subcarriers: ±{17, 18, 1013, 1040, 2035}

<996 RU>

TABLE 194

| RU1 | RU2 | RU3 | RU4 |
|---|---|---|---|
| −2035:−1040 | −1013:−18 | 18:1013 | 1040:2035 |

Null subcarriers: ±{17}

<2018 RU>

TABLE 195

| RU1 | RU2 |
|---|---|
| −2035:−18 | 18:2035 |

Null subcarriers: ±{17}

<4066 or 4064 or 4062 RU for New 160 MHz tone plan>
4066RU: −2035:−3, 3:2035
4064RU: −2035:−4, 4:2035
4062RU: −2035:−5, 5:2035
Null subcarriers: X
Pilot subcarrier indices according to the above tone plans are listed below.

<26 RU>
±{10, 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1530, 1544, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}

<52 RU>
±{26, 40, 52, 66, 80, 94, 106, 120, 160, 174, 186, 200, 214, 228, 240, 254, 268, 282, 294, 308, 322, 336, 348, 362, 402, 416, 428, 442, 456, 470, 482, 496, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{26, 52, 94, 120, 160, 186, 228, 254, 268, 294, 336, 362, 402, 428, 470, 496, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

<996 RU/2020 RU/Full Band>
1. P996v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
1.1. P2020v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
P4096v1: ±{52, 120, 186, 254, 294, 362, 428, 496, 562, 630, 696, 764, 804, 872, 938, 1006, 1074, 1142, 1208, 1276, 1316, 1384, 1450, 1518, 1584, 1652, 1718, 1786, 1826, 1894, 1960, 2028}
P4096v2: ±{120, 254, 362, 496, 630, 764, 872, 1006, 1142, 1276, 1384, 1518, 1652, 1786, 1894, 2028}
P4096v3: ±{52, 186, 294, 428, 562, 696, 804, 938, 1074, 1208, 1316, 1450, 1584, 1718, 1826, 1960}
1.2. P2020v2: ±{120, 254, 362, 496, 630, 764, 872, 1006, 1142, 1276, 1384, 1518, 1652, 1786, 1894, 2028}
P4096v1: ±{120, 254, 362, 496, 630, 764, 872, 1006, 1142, 1276, 1384, 1518, 1652, 1786, 1894, 2028}
P4096v2: ±{254, 496, 764, 1006, 1276, 1518, 1786, 2028}
P4096v3: +{120, 362, 630, 872, 1142, 1384, 1652, 1894}
1.3. P2020v3: ±{52, 186, 294, 428, 562, 696, 804, 938, 1074, 1208, 1316, 1450, 1584, 1718, 1826, 1960}
P4096v1: ±{52, 186, 294, 428, 562, 696, 804, 938, 1074, 1208, 1316, 1450, 1584, 1718, 1826, 1960}
P4096v2: ±{186, 428, 696, 938, 1208, 1450, 1718, 1960}
P4096v3: ±{52, 294, 562, 804, 1074, 1316, 1584, 1826}
1.4. P2020v4: ±{52, 186, 294, 428, 562, 696, 804, 938, 1142, 1276, 1384, 1518, 1652, 1786, 1894, 2028}
P4096v1: ±{52, 186, 294, 428, 562, 696, 804, 938, 1142, 1276, 1384, 1518, 1652, 1786, 1894, 2028}
P4096v2: ±{186, 428, 696, 938, 1276, 1518, 1786, 2028}
P4096v3: ±{52, 294, 562, 804, 1142, 1384, 1652, 1894}
1.5. P2020v5: ±{120, 254, 362, 496, 630, 764, 872, 1006, 1074, 1208, 1316, 1450, 1584, 1718, 1826, 1960}
P4096v1: ±{120, 254, 362, 496, 630, 764, 872, 1006, 1074, 1208, 1316, 1450, 1584, 1718, 1826, 1960}
P4096v2: ±{254, 496, 764, 1006, 1208, 1450, 1718, 1960}
P4096v3: ±{120, 362, 630, 872, 1074, 1316, 1584, 1826}

<96 RU/2020 RU/Full Band>
2. P996v2: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
2.1. P2020v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
P4096v1: ±{26, 94, 160, 228, 268, 336, 402, 470, 536, 604, 670, 738, 778, 846, 912, 980, 1048, 1116, 1182, 1250, 1290, 1358, 1424, 1492, 1558, 1626, 1692, 1760, 1800, 1868, 1934, 2002}
P4096v2: ±{94, 228, 336, 470, 604, 738, 846, 980, 1116, 1250, 1358, 1492, 1626, 1760, 1868, 2002}
P4096v3: ±{26, 160, 268, 402, 536, 670, 778, 912, 1048, 1182, 1290, 1424, 1558, 1692, 1800, 1934}
2.2. P2020v2: ±{94, 228, 336, 470, 604, 738, 846, 980, 1116, 1250, 1358, 1492, 1626, 1760, 1868, 2002}
P4096v1: ±{94, 228, 336, 470, 604, 738, 846, 980, 1116, 1250, 1358, 1492, 1626, 1760, 1868, 2002}
P4096v2: ±{228, 470, 738, 980, 1250, 1492, 1760, 2002}
P4096v3: ±{94, 336, 604, 846, 1116, 1358, 1626, 1868}
2.3. P2020v3: ±{26, 160, 268, 402, 536, 670, 778, 912, 1048, 1182, 1290, 1424, 1558, 1692, 1800, 1934}
P4096v1: ±{26, 160, 268, 402, 536, 670, 778, 912, 1048, 1182, 1290, 1424, 1558, 1692, 1800, 1934}
P4096v2: ±{160, 402, 670, 912, 1182, 1424, 1692, 1934}
P4096v3: ±{26, 268, 536, 778, 1048, 1290, 1558, 1800}
2.4. P2020v4: ±{26, 160, 268, 402, 536, 670, 778, 912, 1116, 1250, 1358, 1492, 1626, 1760, 1868, 2002}
P4096v1: ±{26, 160, 268, 402, 536, 670, 778, 912, 1116, 1250, 1358, 1492, 1626, 1760, 1868, 2002}
P4096v2: ±{160, 402, 670, 912, 1250, 1492, 1760, 2002}
P4096v3: ±{26, 268, 536, 778, 1116, 1358, 1626, 1868}
2.5. P2020v5: ±{94, 228, 336, 470, 604, 738, 846, 980, 1048, 1182, 1290, 1424, 1558, 1692, 1800, 1934}
P4096v1: ±{94, 228, 336, 470, 604, 738, 846, 980, 1048, 1182, 1290, 1424, 1558, 1692, 1800, 1934}
P4096v2: ±{228, 470, 738, 980, 1182, 1424, 1692, 1934}
P4096v3: ±{94, 336, 604, 846, 1048, 1290, 1558, 1800}

<996 RU/2020 RU/Full Band>

3. P996v3: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

3.1. P2020v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v1: ±{26, 94, 160, 228, 268, 336, 402, 470, 562, 630, 696, 764, 804, 872, 938, 1006, 1048, 1116, 1182, 1250, 1290, 1358, 1424, 1492, 1584, 1652, 1718, 1786, 1826, 1894, 1960, 2028}

P4096v2: ±{94, 228, 336, 470, 630, 764, 872, 1006, 1116, 1250, 1358, 1492, 1652, 1786, 1894, 2028}

P4096v3: ±{26, 160, 268, 402, 562, 696, 804, 938, 1048, 1182, 1290, 1424, 1584, 1718, 1826, 1960}

3.2. P2020v2: ±{94, 228, 336, 470, 630, 764, 872, 1006, 1116, 1250, 1358, 1492, 1652, 1786, 1894, 2028}

P4096v1: ±{94, 228, 336, 470, 630, 764, 872, 1006, 1116, 1250, 1358, 1492, 1652, 1786, 1894, 2028}

P4096v2: ±{228, 470, 764, 1006, 1250, 1492, 1786, 2028}

P4096v3: ±{94, 336, 630, 872, 1116, 1358, 1652, 1894}

3.3. P2020v3: ±{26, 160, 268, 402, 562, 696, 804, 938, 1048, 1182, 1290, 1424, 1584, 1718, 1826, 1960}

P4096v1: ±{26, 160, 268, 402, 562, 696, 804, 938, 1048, 1182, 1290, 1424, 1584, 1718, 18.26, 1960}

P4096v2: ±{160, 402, 696, 938, 1182, 1424, 1718, 1960}

P4096v3: ±{26, 268, 562, 804, 1048, 1290, 1584, 1826}

3.4. P2020v4: ±{26, 160, 268, 402, 562, 696, 804, 938, 1116, 1250, 1358, 1492, 1652, 1786, 1894, 2028}

P4096v1: ±{26, 160, 268, 402, 562, 696, 804, 938, 1116, 1250, 1358, 1492, 1652, 1786, 1894, 2028}

P4096v2: ±{160, 402, 696, 938, 1250, 1492, 1786, 2028}

P4096v3: ±{26, 268, 562, 804, 1116, 1358, 1652, 1894}

3.5. P2020v5: ±{94, 228, 336, 470, 630, 764, 872, 1006, 1048, 1182, 1290, 1424, 1584, 1718, 1826, 1960}

P4096v1: ±{94, 228, 336, 470, 630, 764, 872, 1006, 1048, 1182, 1290, 1424, 1584, 1718, 1826, 1960}

P4096v2: ±{228, 470, 764, 1006, 1182, 1424, 1718, 1960}

P4096v3: ±{94, 336, 630, 872, 1048, 1290, 1584, 1826}

<996 RU/2020 RU/Full Band>

4. P996v4: +{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

4.1. P2020v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v1: ±{52, 120, 186, 254, 294, 362, 428, 496, 536, 604, 670, 738, 778, 846, 912, 980, 1074, 1142, 1208, 1276, 1316, 1384, 1450, 1518, 1558, 1626, 1692, 1760, 1800, 1868, 1934, 2002}

P4096v2: ±{120, 254, 362, 496, 604, 738, 846, 980, 1142, 1276, 1384, 1518, 1626, 1760, 1868, 2002}

P4096v3: ±{52, 186, 294, 428, 536, 670, 778, 912, 1074, 1208, 1316, 1450, 1558, 1692, 1800, 1934}

4.2. P2020v2: ±{120, 254, 362, 496, 604, 738, 846, 980, 1142, 1276, 1384, 1518, 1626, 1760, 1868, 2002}

P4096v1: ±{120, 254, 362, 496, 604, 738, 846, 980, 1142, 1276, 1384, 1518, 1626, 1760, 1868, 2002}

P4096v2: ±{254, 496, 738, 980, 1276, 1518, 1760, 2002}

P4096v3: ±{120, 362, 604, 846, 1142, 1384, 1626, 1868}

4.3. P2020v3: ±{52, 186, 294, 428, 536, 670, 778, 912, 1074, 1208, 1316, 1450, 1558, 1692, 1800, 1934}

P4096v1: ±{52, 186, 294, 428, 536, 670, 778, 912, 1074, 1208, 1316, 1450, 1558, 1692, 1800, 1934}

P4096v2: ±{186, 428, 670, 912, 1208, 1450, 1692, 1934}

P4096v3: ±{52, 294, 536, 778, 1074, 1316, 1558, 1800}

4.4. P2020v4: ±{52, 186, 294, 428, 536, 670, 778, 912, 1142, 1276, 1384, 1518, 1626, 1760, 1868, 2002}

P4096v1: ±{52, 186, 294, 428, 536, 670, 778, 912, 1142, 1276, 1384, 1518, 1626, 1760, 1868, 2002}

P4096v2: ±{186, 428, 670, 912, 1276, 1518, 1760, 2002}

P4096v3: ±{52, 294, 536, 778, 1142, 1384, 1626, 1868}

4.5. P2020v5: ±{120, 254, 362, 496, 604, 738, 846, 980, 1074, 1208, 1316, 1450, 1558, 1692, 1800, 1934}

P4096v1: ±{120, 254, 362, 496, 604, 738, 846, 980, 1074, 1208, 1316, 1450, 1558, 1692, 1800, 1934}

P4096v2: ±{254, 496, 738, 980, 1208, 1450, 1692, 1934}

P4096v3: ±{120, 362, 604, 846, 1074, 1316, 1558, 1800}

Listed below are indices for each RU and null tone in a case where a 4062/4064/4066 RU is used in full-band transmission, a tone plane of 13G+2018RU+2N+13RU+5DC+13RU+2N+2018RU+12G is used, and the first configuration for the 996 RU is used.

<26 RU>

TABLE 196

| RU1 | RU2 | RU3 | RU4 | RU5 | RU6 | RU7 | RU8 | RU9 |
|---|---|---|---|---|---|---|---|---|
| −2034: −2009 | −2008: −1983 | −1980: −1955 | −1954: −1929 | −1927: −1902 | −1900: −1875 | −1874: −1849 | −1846: −1821 | −1820: −1795 |
| RU10 | RU11 | RU12 | RU13 | RU14 | RU15 | RU16 | RU17 | RU18 | RU19 |
| −1792: −1767 | −1766: −1741 | −1738: −1713 | −1712: −1687 | −1685: −1660 | −1658: −1633 | −1632: −1607 | −1604: −1579 | −1578: −1553 | −1550: −1525 |
| RU20 | RU21 | RU22 | RU23 | RU24 | RU25 | RU26 | RU27 | RU28 |
| −1522: −1497 | −1496: −1471 | −1468: −1443 | −1442: −1417 | −1415: −1390 | −1388: −1363 | −1362: −1337 | −1334: −1309 | −1308: −1283 |
| RU29 | RU30 | RU31 | RU32 | RU33 | RU34 | RU35 | RU36 | RU37 | RU38 |
| −1280: −1255 | −1254: −1229 | −1226: −1201 | −1200: −1175 | −1173: −1148 | −1146: −1121 | −1120: −1095 | −1092: −1067 | −1066: −1041 | −1039: −1014 |

TABLE 196-continued

| RU39 | RU40 | RU41 | RU42 | RU43 | RU44 | RU45 | RU46 | RU47 |
|---|---|---|---|---|---|---|---|---|
| −1012:−987 | −986:−961 | −958:−933 | −932:−907 | −905:−880 | −878:−853 | −852:−827 | −824:−799 | −798:−773 |

| RU48 | RU49 | RU50 | RU51 | RU52 | RU53 | RU54 | RU55 | RU56 | RU57 |
|---|---|---|---|---|---|---|---|---|---|
| −770:−745 | −744:−719 | −716:−691 | −690:−665 | −663:−638 | −636:−611 | −610:−585 | −582:−557 | −556:−531 | −528:−503 |

| RU58 | RU59 | RU60 | RU61 | RU62 | RU63 | RU64 | RU65 | RU66 |
|---|---|---|---|---|---|---|---|---|
| 500:−475 | −474:−449 | −446:−421 | −420:−395 | −393:−368 | −366:−341 | −340:−315 | −312:−287 | −286:−261 |

| RU67 | RU68 | RU69 | RU70 | RU71 | RU72 | RU73 | RU74 | RU75 | RU76 |
|---|---|---|---|---|---|---|---|---|---|
| −258:−233 | −232:−207 | −204:−179 | −178:−153 | −151:−126 | −124:−99 | −98:−73 | −70:−45 | −44:−19 | −15:−3, 3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 19:44

Null subcarriers: ±{16, 17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<52 RU>

TABLE 197

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 73:124

Null subcarriers: ±{16, 17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<106 RU>

TABLE 198

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 153:258

Null subcarriers: ±{16, 17, 18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035}

<242 RU>

TABLE 199

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 260:501
Null subcarriers: ±{16, 17, 502, 529, 1524, 1551}
<484 RU>

TABLE 200

| RU1 | RU2 | RU3 | RU4 |
|---|---|---|---|
| −2035:−1552 | −1523:−1040 | −1013:−530 | −501:−18 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 530:1013
Null subcarriers: ±{16, 17, 502, 529, 1524, 1551}
<996 RU>

TABLE 201

| RU1 | RU2 | RU3 | RU4 |
|---|---|---|---|
| −2035:−1040 | −1013:−18 | 18:1013 | 1040:2035 |

Null subcarriers: ±{16, 17}
<2018 RU>

TABLE 202

| RU1 | RU2 |
|---|---|
| −2035:−18 | 18:2035 |

Null subcarriers: ±{16, 17}

<4066 or 4064 or 4062 RU for New 160 MHz tone plan>
4066RU: −2035:−3, 3:2035
4064RU: −2035:−4, 4:2035
4062RU: −2035:−5, 5:2035
Null subcarriers: X Pilot subcarrier indices according to the above tone plans are listed below.

<26 RU>
±{8 or 10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

Pilot indices for a 52/106/242/484/996/2018 RU and the full band are the same as those in the above case where the 4062/4064/4066 RU is used in full-band transmission, the tone plan of 13G+2018RU+1N+13RU+7DC+13RU+1N+2018RU+12G is used, and the first configuration for the 996 RU is used.

Listed below are indices for each RU and null tone in a case where a 4062/4064/4066 RU is used in full-band transmission, the tone plane of 13G+2018RU+2N+13RU+5DC+13RU+2N+2018RU+12G is used, and the second configuration for the 996 RU is used.

<26 RU>

TABLE 203

| RU1 | RU2 | RU3 | RU4 | RU5 | RU6 | RU7 | RU8 | RU9 |
|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 |
| −1523:−1498 | −1497:−1472 | −1469:−1444 | −1443:−1418 | −1416:−1391 | −1389:−1364 | −1363:−1338 | −1335:−1310 | −1309:−1284 |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 |
| −1011:−986 | −985:−960 | −957:−932 | −931:−906 | −904:−879 | −877:−852 | −851:−826 | −823:−798 | −797:−772 |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −528:−503 |

TABLE 203-continued

| RU58 | RU59 | RU60 | RU61 | RU62 | RU63 | RU64 | RU65 | RU66 |
|---|---|---|---|---|---|---|---|---|
| −501:<br>−476 | −475:<br>−450 | −447:<br>−422 | −421:<br>−396 | −394:<br>−369 | −367:<br>−342 | −341:<br>−316 | −313:<br>−288 | −287:<br>−262 |

| RU67 | RU68 | RU69 | RU70 | RU71 | RU72 | RU73 | RU74 | RU75 | RU76 |
|---|---|---|---|---|---|---|---|---|---|
| −259:<br>−234 | −233:<br>−208 | −205:<br>−180 | −179:<br>−154 | −152:<br>−127 | −125:<br>−100 | −99:−74 | −71:−46 | −45:−20 | −15:−3,<br>3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 20:45

Null subcarriers: ±{16, 17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}

<52 RU>

TABLE 204

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 74:125

Null subcarriers: ±{16, 17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}

<106 RU>

TABLE 205

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011−906 | −877:−772 | −769:−664 | −635:−530 |
| RU13 | RU14 | RU15 | RU16 |
| −501:−396 | −367:−262 | −259:−154 | −125:−20 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 154:259

Null subcarriers: ±{16, 17, 18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035}

<242 RU>

TABLE 206

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1012:−771 | −770:−529 | −502:−261 | −260:−19 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 261:502

Null subcarriers: ±{16, 17, 18, 1013, 1040, 2035}

<484 RU>

TABLE 207

| RU1 | RU2 | RU3 | RU4 |
|---|---|---|---|
| −2034:−1551 | −1524:−1041 | −1012:−529 | −502:−19 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 529:1012

Null subcarriers: ±{16, 17, 18, 1013, 1040, 2035}
<996 RU>

TABLE 208

| RU1 | RU2 | RU3 | RU4 |
|---|---|---|---|
| −2035:−1040 | −1013:−18 | 18:1013 | 1040:2035 |

Null subcarriers: ±{16, 17}
<2018 RU>

TABLE 209

| RU1 | RU2 |
|---|---|
| −2035:−18 | 18:2035 |

Null subcarriers: ±{16, 17}
<4066 or 4064 or 4062 RU for New 160 MHz tone plan>
4066RU: −2035:−3, 3:2035
4064RU: −2035:−4, 4:2035
4062RU: −2035:−5, 5:2035
Null subcarriers: X
Pilot subcarrier indices according to the above tone plans are listed below.
<26 RU>
±{8 or 10, 26, 40, 52, 66, 80, 94, 106, 120, 132, 146, 160, 174, 186, 200, 214, 228, 240, 254, 268, 282, 294, 308, 322, 336, 348, 362, 374, 388, 402, 416, 428, 442, 456, 470, 482, 496, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1530, 1544, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}
Pilot indices for a 5252/106/242/484/996/2018 RU and the full band are the same as those in the above case where the 4062/4064/4066 RU is used in full-band transmission, the tone plan of 13G+2018RU+1N+13RU+7DC+13RU+1N+2018RU+12G is used, and the second configuration for the 996 RU is used.

G. Alternative 320 MHz Tone Plan 5

Tone plans may be designed such that 13 left/12 right guard tones may be used by increasing the number of guard tones used in alternative 320 MHz tone plan 1 by one in order to reduce the impact of interference in an adjacent channel or from an adjacent channel and the number of DC tones is reduced by one instead in an OFDMA tone plan to deal with a slight DC offset. Full-band and OFDMA tone plans are illustrated below.
<Full Band>
13/12 guard tone, 5DC, 4066RU (RU subcarrier indices are −2035:−3 and 3:2035)
<OFDMA Tone Plan>
13G+2020RU+13RU+5DC+13RU+2020RU+12G
Two configurations for a 2020 RU are proposed as below
2020RU=996RU+1N+26RU+1N+996RU
2020RU=1N+996RU+26RU+996RU+11N1
A first configuration has a null tone disposed on either side of a 26 RU to reduce the impact of interference from/in an adjacent RU, while a second configuration can reduce the impact of interference between a 996 RU and an RU adjacent thereto. An RU using a small number of subcarriers, such as a 26 RU, may preferably use the first configuration since interference significantly affects performance.
Two configurations for a 996 RU are proposed as in the new 160 MHz tone plan.
996RU=484RU+1N+26RU+1N+484RU
996RU=1N+484RU+26RU+484RU+1N
A 484 RU has a configuration of two 242 RUs as in existing 11ax.
484RU=242RU+242RU
A 242 RU has the following configuration as in existing 11ax.
242RU=1N+106RU+1N+26RU+1N+106RU+1N
A 106 RU has the following configuration as in existing 11ax.
106RU=52RU+2N+52RU
A 52 RU has the following configuration as in existing 11ax.
52RU=26RU+26RU
Listed below are indices for each RU and null tone in a case where the first configuration for the 2020 RU is used and the first configuration for the 996 RU is used.
<26 RU>

TABLE 210

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |

| RU10 | RU11 | RU12 | RU13 | RU14 | RU15 | RU16 | RU17 | RU18 | RU19 |
|---|---|---|---|---|---|---|---|---|---|
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |

| RU20 | RU21 | RU22 | RU23 | RU24 | RU25 | RU26 | RU27 | RU28 |
|---|---|---|---|---|---|---|---|---|
| −1522:−1497 | −1496:−1471 | −1468:−1443 | −1442:−1417 | −1415:−1390 | −1388:−1363 | −1362:−1337 | −1334:−1309 | −1308:−1283 |

| RU29 | RU30 | RU31 | RU32 | RU33 | RU34 | RU35 | RU36 | RU37 | RU38 |
|---|---|---|---|---|---|---|---|---|---|
| −1280:−1255 | −1254:−1229 | −1226:−1201 | −1200:−1175 | −1173:−1148 | −1146:−1121 | −1120:−1095 | −1092:−1067 | −1066:−1041 | −1038:−1013 |

TABLE 210-continued

| RU39 | RU40 | RU41 | RU42 | RU43 | RU44 | RU45 | RU46 | RU47 |
|---|---|---|---|---|---|---|---|---|
| −1010:−985 | −984:−959 | −956:−931 | −930:−905 | −903:−878 | −876:−851 | −850:−825 | −822:−797 | −796:−771 |

| RU48 | RU49 | RU50 | RU51 | RU52 | RU53 | RU54 | RU55 | RU56 | RU57 |
|---|---|---|---|---|---|---|---|---|---|
| −768:−743 | −742:−717 | −714:−689 | −688:−663 | −661:−636 | −634:−609 | −608:−583 | −580:−555 | −554:−529 | −526:−501 |

| RU58 | RU59 | RU60 | RU61 | RU62 | RU63 | RU64 | RU65 | RU66 |
|---|---|---|---|---|---|---|---|---|
| −498:−473 | −472:−447 | −444:−419 | −418:−393 | −391:−366 | −364:−339 | −338:−313 | −310:−285 | −284:−259 |

| RU67 | RU68 | RU69 | RU70 | RU71 | RU72 | RU73 | RU74 | RU75 | RU76 |
|---|---|---|---|---|---|---|---|---|---|
| −256:−231 | −230:−205 | −202:−177 | −176:−151 | −149:−124 | −122:−97 | −96:−71 | −68:−43 | −42:−17 | −15:−3, 3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarriers indices for RU 75 multiplied by −1, that is, 17:42

Null subcarriers: ±{16, 69, 70, 123, 150, 203, 204, 257, 258, 311, 312, 365, 392, 445, 446, 499, 500, 527, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<52 RU>

TABLE 211

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −498:−447 | −444:−393 | −364:−313 | −310:−259 |
| RU29 | RU30 | RU31 | RU32 |
| −256:−205 | −202:−151 | −122:−71 | −68:−17 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 71:122

Null subcarriers: ±{16, 69, 70, 123, 150, 203, 204, 257, 258, 311, 312, 365, 392, 445, 446, 499, 500, 527, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<106 RU>

TABLE 212

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1010:−905 | −876:−771 | −768:−663 | −634:−529 |
| RU13 | RU14 | RU15 | RU16 |
| −498:−393 | −364:−259 | −256:−151 | −122:−17 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 151:256

Null subcarriers: ±{16, 123, 150, 257, 258, 365, 392, 499, 500, 527, 528, 635, 662, 769, 770, 877, 904, 1011, 1012, 1039, 1040, 1147, 1174, 1281, 1282, 1389, 1416, 1523, 1524, 1551, 1552, 1659, 1686, 1793, 1794, 1901, 1928, 2035}

<242 RU>

TABLE 213

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1011:−770 | −769:−528 | −499:−258 | −257:−16 |

→RU 9 to RU 16→ Subcarrier indices for RU 8+x are the same as subcarrier indices for RU 9-x subcarrier index multiplied by −1 (x is a positive integer that is less than or equal to 8)

→Ex) Subcarrier indices for RU 10 are the same as subcarrier indices for RU 7 multiplied by −1, that is, 258:499

Null subcarriers: ±{500, 527, 1012, 1039, 1524, 1551}

<484 RU>

TABLE 214

| RU1 | RU2 | RU3 | RU4 |
|---|---|---|---|
| −2035:−1552 | −1523:−1040 | −1011:−528 | −499:−16 |

→RU 5 to RU 8→ Subcarrier indices for RU 4+x are the same as subcarrier indices for RU 5-x multiplied by −1 (x is a positive integer that is less than or equal to 4)

→Ex) Subcarrier indices for RU 6 are the same as subcarrier indices for RU 3 multiplied by −1, that is, 528:1011

Null subcarriers: +{500, 527, 1012, 1039, 1524, 1551}

<996 RU>

TABLE 215

| RU1 | RU2 | RU3 | RU4 |
|---|---|---|---|
| −2035:−1040 | −1011:−16 | 16:1011 | 1040:2035 |

Null subcarriers: ±{1012, 1039}
<2020 RU>

TABLE 216

| RU1 | RU2 |
|---|---|
| −2035:−16 | 16:2035 |

Null subcarriers: X
<4066 RU>
4066RU: −2035:−3, 3:2035
Null subcarriers: X

Listed below are pilot indices in the case where the first configuration for the 2020 RU is used and the first configuration for the 996 RU is used.

<26 RU>
±{8 or 10, 22, 36, 48, 62, 76, 90, 102, 116, 130, 144, 156, 170, 182, 196, 210, 224, 236, 250, 264, 278, 290, 304, 318, 332, 344, 358, 372, 386, 398, 412, 424, 438, 452, 466, 478, 492, 506, 520, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004, 1018, 1032, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1558, 1572, 1584, 1598, 1612, 1626, 1638, 1652, 1666, 1680, 1692, 1706, 1718, 1732, 1746, 1760, 1772, 1786, 1800, 1814, 1826, 1840, 1854, 1868, 1880, 1894, 1908, 1922, 1934, 1948, 1960, 1974, 1988, 2002, 2014, 2028}

<52 RU>
±{22, 36, 48, 62, 76, 90, 102, 116, 156, 170, 182, 196, 210, 224, 236, 250, 264, 278, 290, 304, 318, 332, 344, 358, 398, 412, 424, 438, 452, 466, 478, 492, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{22, 48, 90, 116, 156, 182, 224, 250, 264, 290, 332, 358, 398, 424, 466, 492, 534, 560, 602, 628, 668, 694, 736, 762, 776, 802, 844, 870, 910, 936, 978, 1004, 1046, 1072, 1114, 1140, 1180, 1206, 1248, 1274, 1288, 1314, 1356, 1382, 1422, 1448, 1490, 1516, 1558, 1584, 1626, 1652, 1692, 1718, 1760, 1786, 1800, 1826, 1868, 1894, 1934, 1960, 2002, 2028}

<996 RU/2020 RU/Full Band>
1. P996v1: ±{48, 116, 182, 250, 290, 358, 424, 492, 560, 628, 694, 762, 802, 870, 936, 1004, 1072, 1140, 1206, 1274, 1314, 1382, 1448, 1516, 1584, 1652, 1718, 1786, 1826, 1894, 1960, 2028}
1.1. P2020v1: ±{48, 116, 182, 250, 290, 358, 424, 492, 560, 628, 694, 762, 802, 870, 936, 1004, 1072, 1140, 1206, 1274, 1314, 1382, 1448, 1516, 1584, 1652, 1718, 1786, 1826, 1894, 1960, 2028}
P4096v1: ±{48, 116, 182, 250, 290, 358, 424, 492, 560, 628, 694, 762, 802, 870, 936, 1004, 1072, 1140, 1206, 1274, 1314, 1382, 1448, 1516, 1584, 1652, 1718, 1786, 1826, 1894, 1960, 2028}
P4096v2: ±{116, 250, 358, 492, 628, 762, 870, 1004, 1140, 1274, 1382, 1516, 1652, 1786, 1894, 2028}
P4096v3: ±{48, 182, 290, 424, 560, 694, 802, 936, 1072, 1206, 1314, 1448, 1584, 1718, 1826, 1960}
1.2. P2020v2: ±{116, 250, 358, 492, 628, 762, 870, 1004, 1140, 1274, 1382, 1516, 1652, 1786, 1894, 2028}
P4096v1: ±{116, 250, 358, 492, 628, 762, 870, 1004, 1140, 1274, 1382, 1516, 1652, 1786, 1894, 2028}
P4096v2: ±{250, 492, 762, 1004, 1274, 1516, 1786, 2028}
P4096v3: ±{116, 358, 628, 870, 1140, 1382, 1652, 1894}
1.3. P2020v3: ±{48, 182, 290, 424, 560, 694, 802, 936, 1072, 1206, 1314, 1448, 1584, 1718, 1826, 1960}
P4096v1: ±{48, 182, 290, 424, 560, 694, 802, 936, 1072, 1206, 1314, 1448, 1584, 1718, 1826, 1960}
P4096v2: ±{182, 424, 694, 936, 1206, 1448, 1718, 1960}
P4096v3: ±{48, 290, 560, 802, 1072, 1314, 1584, 1826}
1.4. P2020v4: ±{48, 182, 290, 424, 560, 694, 802, 936, 1140, 1274, 1382, 1516, 1652, 1786, 1894, 2028}
P4096v1: ±{48, 182, 290, 424, 560, 694, 802, 936, 1140, 1274, 1382, 1516, 1652, 1786, 1894, 2028}
P4096v2: ±{182, 424, 694, 936, 1274, 1516, 1786, 2028}
P4096v3: ±{48, 290, 560, 802, 1140, 1382, 1652, 1894}
1.5. P2020v5: ±{116, 250, 358, 492, 628, 762, 870, 1004, 1072, 1206, 1314, 1448, 1584, 1718, 1826, 1960}
P4096v1: ±{116, 250, 358, 492, 628, 762, 870, 1004, 1072, 1206, 1314, 1448, 1584, 1718, 1826, 1960}
P4096v2: ±{250, 492, 762, 1004, 1206, 1448, 1718, 1960}
P4096v3: ±{116, 358, 628, 870, 1072, 1314, 1584, 1826}
<996 RU/2020 RU/Full Band>
2. P996v2: ±{22, 90, 156, 224, 264, 332, 398, 466, 534, 602, 668, 736, 776, 844, 910, 978, 1046, 1114, 1180, 1248, 1288, 1356, 1422, 1490, 1558, 1626, 1692, 1760, 1800, 1868, 1934, 2002}

2.1. P2020v1: ±{22, 90, 156, 224, 264, 332, 398, 466, 534, 602, 668, 736, 776, 844, 910, 978, 1046, 1114, 1180, 1248, 1288, 1356, 1422, 1490, 1558, 1626, 1692, 1760, 1800, 1868, 1934, 2002}

P4096v1: ±{22, 90, 156, 224, 264, 332, 398, 466, 534, 602, 668, 736, 776, 844, 910, 978, 1046, 1114, 1180, 1248, 1288, 1356, 1422, 1490, 1558, 1626, 1692, 1760, 1800, 1868, 1934, 2002}

P4096v2: ±{90, 224, 332, 466, 602, 736, 844, 978, 1114, 1248, 1356, 1490, 1626, 1760, 1868, 2002}

P4096v3: ±{22, 156, 264, 398, 534, 668, 776, 910, 1046, 1180, 1288, 1422, 1558, 1692, 1800, 1934}

2.2. P2020v2: ±{90, 224, 332, 466, 602, 736, 844, 978, 1114, 1248, 1356, 1490, 1626, 1760, 1868, 2002}

P4096v1: ±{90, 224, 332, 466, 602, 736, 844, 978, 1114, 1248, 1356, 1490, 1626, 1760, 1868, 2002}

P4096v2: ±{224, 466, 736, 978, 1248, 1490, 1760, 2002}

P4096v3: ±{90, 332, 602, 844, 1114, 1356, 1626, 1868}

2.3. P2020v3: ±{22, 156, 264, 398, 534, 668, 776, 910, 1046, 1180, 1288, 1422, 1558, 1692, 1800, 1934}

P4096v1: ±{22, 156, 264, 398, 534, 668, 776, 910, 1046, 1180, 1288, 1422, 1558, 1692, 1800, 1934}

P4096v2: ±{156, 398, 668, 910, 1180, 1422, 1692, 1934}

P4096v3: ±{22, 264, 534, 776, 1046, 1288, 1558, 1800}

2.4. P2020v4: ±{22, 156, 264, 398, 534, 668, 776, 910, 1114, 1248, 1356, 1490, 1626, 1760, 1868, 2002}

P4096v1: ±{22, 156, 264, 398, 534, 668, 776, 910, 1114, 1248, 1356, 1490, 1626, 1760, 1868, 2002}

P4096v2: ±{156, 398, 668, 910, 1248, 1490, 1760, 2002}

P4096v3: ±{22, 264, 534, 776, 1114, 1356, 1626, 1868}

2.5. P2020v5: ±{90, 224, 332, 466, 602, 736, 844, 978, 1046, 1180, 1288, 1422, 1558, 1692, 1800, 1934}

P4096v1: ±{90, 224, 332, 466, 602, 736, 844, 978, 1046, 1180, 1288, 1422, 1558, 1692, 1800, 1934}

P4096v2: ±{224, 466, 736, 978, 1180, 1422, 1692, 1934}

P4096v3: ±{90, 332, 602, 844, 1046, 1288, 1558, 1800}

<996 RU/2020 RU/Full Band>

3. P996v3: ±{22, 90, 156, 224, 264, 332, 398, 466, 560, 628, 694, 762, 802, 870, 936, 1004, 1046, 1114, 1180, 1248, 1288, 1356, 1422, 1490, 1584, 1652, 1718, 1786, 1826, 1894, 1960, 2028}

3.1. P2020v1: ±{22, 90, 156, 224, 264, 332, 398, 466, 560, 628, 694, 762, 802, 870, 936, 1004, 1046, 1114, 1180, 1248, 1288, 1356, 1422, 1490, 1584, 1652, 1718, 1786, 1826, 1894, 1960, 2028}

P4096v1: ±{22, 90, 156, 224, 264, 332, 398, 466, 560, 628, 694, 762, 802, 870, 936, 1004, 1046, 1114, 1180, 1248, 1288, 1356, 1422, 1490, 1584, 1652, 1718, 1786, 1826, 1894, 1960, 2028}

P4096v2: ±{90, 224, 332, 466, 628, 762, 870, 1004, 1114, 1248, 1356, 1490, 1652, 1786, 1894, 2028}

P4096v3: ±{22, 156, 264, 398, 560, 694, 802, 936, 1046, 1180, 1288, 1422, 1584, 1718, 1826, 1960}

3.2. P2020v2: ±{90, 224, 332, 466, 628, 762, 870, 1004, 1114, 1248, 1356, 1490, 1652, 1786, 1894, 2028}

P4096v1: ±{90, 224, 332, 466, 628, 762, 870, 1004, 1114, 1248, 1356, 1490, 1652, 1786, 1894, 2028}

P4096v2: ±{224, 466, 762, 1004, 1248, 1490, 1786, 2028}

P4096v3: ±{90, 332, 628, 870, 1114, 1356, 1652, 1894}

3.3. P2020v3: ±{22, 156, 264, 398, 560, 694, 802, 936, 1046, 1180, 1288, 1422, 1584, 1718, 1826, 1960}

P4096v1: ±{22, 156, 264, 398, 560, 694, 802, 936, 1046, 1180, 1288, 1422, 1584, 1718, 1826, 1960}

P4096v2: +{156, 398, 694, 936, 1180, 1422, 1718, 1960}

P4096v3: ±{22, 264, 560, 802, 1046, 1288, 1584, 1826}

3.4. P2020v4: ±{22, 156, 264, 398, 560, 694, 802, 936, 1114, 1248, 1356, 1490, 1652, 1786, 1894, 2028}

P4096v1: ±{22, 156, 264, 398, 560, 694, 802, 936, 1114, 1248, 1356, 1490, 1652, 1786, 1894, 2028}

P4096v2: ±{156, 398, 694, 936, 1248, 1490, 1786, 2028}

P4096v3: ±{22, 264, 560, 802, 1114, 1356, 1652, 1894}

3.5. P2020v5: ±{90, 224, 332, 466, 628, 762, 870, 1004, 1046, 1180, 1288, 1422, 1584, 1718, 1826, 1960}

P4096v1: ±{90, 224, 332, 466, 628, 762, 870, 1004, 1046, 1180, 1288, 1422, 1584, 1718, 1826, 1960}

P4096v2: ±{224, 466, 762, 1004, 1180, 1422, 1718, 1960}

P4096v3: ±{90, 332, 628, 870, 1046, 1288, 1584, 1826}

<996 RU/2020 RU/Full Band>

4. P996v4: ±{48, 116, 182, 250, 290, 358, 424, 492, 534, 602, 668, 736, 776, 844, 910, 978, 1072, 1140, 1206, 1274, 1314, 1382, 1448, 1516, 1558, 1626, 1692, 1760, 1800, 1868, 1934, 2002}

4.1. P2020v1: ±{48, 116, 182, 250, 290, 358, 424, 492, 534, 602, 668, 736, 776, 844, 910, 978, 1072, 1140, 1206, 1274, 1314, 1382, 1448, 1516, 1558, 1626, 1692, 1760, 1800, 1868, 1934, 2002}

P4096v1: ±{48, 116, 182, 250, 290, 358, 424, 492, 534, 602, 668, 736, 776, 844, 910, 978, 1072, 1140, 1206, 1274, 1314, 1382, 1448, 1516, 1558, 1626, 1692, 1760, 1800, 1868, 1934, 2002}

P4096v2: ±{116, 250, 358, 492, 602, 736, 844, 978, 1140, 1274, 1382, 1516, 1626, 1760, 1868, 2002}

P4096v3: ±{48, 182, 290, 424, 534, 668, 776, 910, 1072, 1206, 1314, 1448, 1558, 1692, 1800, 1934}

4.2. P2020v2: ±{116, 250, 358, 492, 602, 736, 844, 978, 1140, 1274, 1382, 1516, 1626, 1760, 1868, 2002}

P4096v1: ±{116, 250, 358, 492, 602, 736, 844, 978, 1140, 1274, 1382, 1516, 1626, 1760, 1868, 2002}

P4096v2: ±{250, 492, 736, 978, 1274, 1516, 1760, 2002}

P4096v3: ±{116, 358, 602, 844, 1140, 1382, 1626, 1868}

4.3. P2020v3: ±{48, 182, 290, 424, 534, 668, 776, 910, 1072, 1206, 1314, 1448, 1558, 1692, 1800, 1934}

P4096v1: ±{48, 182, 290, 424, 534, 668, 776, 910, 1072, 1206, 1314, 1448, 1558, 1692, 1800, 1934}

P4096v2: ±{182, 424, 668, 910, 1206, 1448, 1692, 1934}

P4096v3: ±{48, 290, 534, 776, 1072, 1314, 1558, 1800}

4.4. P2020v4: ±{48, 182, 290, 424, 534, 668, 776, 910, 1140, 1274, 1382, 1516, 1626, 1760, 1868, 2002}

P4096v1: ±{48, 182, 290, 424, 534, 668, 776, 910, 1140, 1274, 1382, 1516, 1626, 1760, 1868, 2002}

P4096v2: ±{182, 424, 668, 910, 1274, 1516, 1760, 2002}

P4096v3: ±{48, 290, 534, 776, 1140, 1382, 1626, 1868}

4.5. P2020v5: ±{116, 250, 358, 492, 602, 736, 844, 978, 1072, 1206, 1314, 1448, 1558, 1692, 1800, 1934}

P4096v1: ±{116, 250, 358, 492, 602, 736, 844, 978, 1072, 1206, 1314, 1448, 1558, 1692, 1800, 1934}

P4096v2: ±{250, 492, 736, 978, 1206, 1448, 1692, 1934}

P4096v3: ±{116, 358, 602, 844, 1072, 1314, 1558, 1800}

Listed below are indices for each RU and null tone in a case where the first configuration for the 2020 RU is used and the second configuration for the 996 RU is used.

<26 RU>

TABLE 217

| RU1 | RU2 | RU3 | RU4 | RU5 | RU6 | RU7 | RU8 | RU9 |
|---|---|---|---|---|---|---|---|---|
| −2033:<br>−2008 | −2007:<br>−1982 | −1979:<br>−1954 | −1953:<br>−1928 | −1926:<br>−1901 | −1899:<br>−1874 | −1873:<br>−1848 | −1845:<br>−1820 | −1819:<br>−1794 |

| RU10 | RU11 | RU12 | RU13 | RU14 | RU15 | RU16 | RU17 | RU18 | RU19 |
|---|---|---|---|---|---|---|---|---|---|
| −1791:<br>−1766 | −1765:<br>−1740 | −1737:<br>−1712 | −1711:<br>−1686 | −1684:<br>−1659 | −1657:<br>−1632 | −1631:<br>−1606 | −1603:<br>−1578 | −1577:<br>−1552 | −1550:<br>−1525 |

| RU20 | RU21 | RU22 | RU23 | RU24 | RU25 | RU26 | RU27 | RU28 |
|---|---|---|---|---|---|---|---|---|
| −1523:<br>−1498 | −1497:<br>−1472 | −1469:<br>−1444 | −1443:<br>−1418 | −1416:<br>−1391 | −1389:<br>−1364 | −1363:<br>−1338 | −1335:<br>−1310 | −1309:<br>−1284 |

| RU29 | RU30 | RU31 | RU32 | RU33 | RU34 | RU35 | RU36 | RU37 | RU38 |
|---|---|---|---|---|---|---|---|---|---|
| −1281:<br>−1256 | −1255:<br>−1230 | −1227:<br>−1202 | −1201:<br>−1176 | −1174:<br>−1149 | −1147:<br>−1122 | −1121:<br>−1096 | −1093:<br>−1068 | −1067:<br>−1042 | −1038:<br>−1013 |

| RU39 | RU40 | RU41 | RU42 | RU43 | RU44 | RU45 | RU46 | RU47 |
|---|---|---|---|---|---|---|---|---|
| −1009:<br>−984 | −983:<br>−958 | −955:<br>−930 | −929:<br>−904 | −902:<br>−877 | −875:<br>−850 | −849:<br>−824 | −821:<br>−796 | −795:<br>−770 |

| RU48 | RU49 | RU50 | RU51 | RU52 | RU53 | RU54 | RU55 | RU56 | RU57 |
|---|---|---|---|---|---|---|---|---|---|
| −767:<br>−742 | −741:<br>−716 | −713:<br>−688 | −687:<br>−662 | −660:<br>−635 | −633:<br>−608 | −607:<br>−582 | −579:<br>−554 | −553:<br>−528 | −526:<br>−501 |

| RU58 | RU59 | RU60 | RU61 | RU62 | RU63 | RU64 | RU65 | RU66 |
|---|---|---|---|---|---|---|---|---|
| −499:<br>−474 | −473:<br>−448 | −445:<br>−420 | −419:<br>−394 | −392:<br>−367 | −365:<br>−340 | −339:<br>−314 | −311:<br>−286 | −285:<br>−260 |

| RU67 | RU68 | RU69 | RU70 | RU71 | RU72 | RU73 | RU74 | RU75 | RU76 |
|---|---|---|---|---|---|---|---|---|---|
| −257:<br>−232 | −231:<br>−206 | −203:<br>−178 | −177:<br>−152 | −150:<br>−125 | −123:<br>−98 | −97:−72 | −69:−44 | −43:−18 | −15:−3,<br>3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarriers indices for RU 75 multiplied by −1, that is, 18:43

Null subcarriers: ±{16, 17, 70, 71, 124, 151, 204, 205, 258, 259, 312, 313, 366, 393, 446, 447, 500, 527, 580, 581, 634, 661, 714, 715, 768, 769, 822, 823, 876, 903, 956, 957, 1010, 1011, 1012, 1039, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}

<52 RU>

TABLE 218

| RU1 | RU2 | RU3 | RU4 |
|---|---|---|---|
| −2033:−1982 | −1979:−1928 | −1899:−1848 | −1845:−1794 |

| RU5 | RU6 | RU7 | RU8 |
|---|---|---|---|
| −1791:−1740 | −1737:−1686 | −1657:−1606 | −1603:−1552 |

| RU9 | RU10 | RU11 | RU12 |
|---|---|---|---|
| −1523:−1472 | −1469:−1418 | −1389:−1338 | −1335:−1284 |

| RU13 | RU14 | RU15 | RU16 |
|---|---|---|---|
| −1281:−1230 | −1227:−1176 | −1147:−1096 | −1093:−1042 |

TABLE 218-continued

| RU17 | RU18 | RU19 | RU20 |
|---|---|---|---|
| −1009:−958 | −955:−904 | −875:−824 | −821:−770 |

| RU21 | RU22 | RU23 | RU24 |
|---|---|---|---|
| −767:−716 | −713:−662 | −633:−582 | −579:−528 |

| RU25 | RU26 | RU27 | RU28 |
|---|---|---|---|
| −499:−448 | −445:−394 | −365:−314 | −311:−260 |

| RU29 | RU30 | RU31 | RU32 |
|---|---|---|---|
| −257:−206 | −203:−152 | −123:−72 | −69:−18 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 72:123

Null subcarriers: ±{16, 17, 70, 71, 124, 151, 204, 205, 258, 259, 312, 313, 366, 393, 446, 447, 500, 527, 580, 581, 634, 661, 714, 715, 768, 769, 822, 823, 876, 903, 956, 957, 1010, 1011, 1012, 1039, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}

<106 RU>

TABLE 219

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1009:−904 | −875:−770 | −767:−662 | −633:−528 |
| RU13 | RU14 | RU15 | RU16 |
| −499:−394 | −365:−260 | −257:−152 | −123:−18 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 152:257

Null subcarriers: ±{16, 17, 124, 151, 258, 259, 366, 393, 500, 527, 634, 661, 768, 769, 876, 903, 1010, 1011, 1012, 1039, 1040, 1041, 1148, 1175, 1282, 1283, 1390, 1417, 1524, 1551, 1658, 1685, 1792, 1793, 1900, 1927, 2034, 2035}

<242 RU>

TABLE 220

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1010:−769 | −768:−527 | −500:−259 | −258:−17 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 259:500

Null subcarriers: ±{16, 1011, 1012, 1039, 1040, 2035}

<484 RU>

TABLE 221

| RU1 | RU2 | RU3 | RU4 |
|---|---|---|---|
| −2034:−1551 | −1524:−1041 | −1010:−527 | −500:−17 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 527:1010

Null subcarriers: ±{16, 1011, 1012, 1039, 1040, 2035}

<996 RU>

TABLE 222

| RU1 | RU2 | RU3 | RU4 |
|---|---|---|---|
| −2035:−1040 | −1011:−16 | 16:1011 | 1040:2035 |

Null subcarriers: ±{1012, 1039}

<2020 RU>

TABLE 223

| RU1 | RU2 |
|---|---|
| −2035:−16 | 16:2035 |

Null subcarriers: X

<4066 RU>
4066RU: −2035:−3, 3:2035
Null subcarriers: X
Pilot subcarrier indices according to the above tone plans are listed below.

<26 RU>
±{80r10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 506, 520, 534, 548, 560, 574, 588, 602, 614, 628, 640, 654, 668, 682, 694, 708, 722, 736, 748, 762, 776, 790, 802, 816, 830, 844, 856, 870, 882, 896, 910, 924, 936, 950, 964, 978, 990, 1004, 1018, 1032, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1530, 1544, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004, 1048, 1074, 1116, 1142, 1182, 1208, 1250, 1276, 1290, 1316, 1358, 1384, 1424, 1450, 1492, 1518, 1558, 1584, 1626, 1652, 1692, 1718, 1760, 1786, 1800, 1826, 1868, 1894, 1934, 1960, 2002, 2028}

1. P996v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}

1.1. P2020v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}

P4096v1: ±{50, 118, 184, 252, 292, 360, 426, 494, 560, 628, 694, 762, 802, 870, 936, 1004, 1074, 1142, 1208, 1276, 1316, 1384, 1450, 1518, 1584, 1652, 1718, 1786, 1826, 1894, 1960, 2028}
P4096v2: ±{118, 252, 360, 494, 628, 762, 870, 1004, 1142, 1276, 1384, 1518, 1652, 1786, 1894, 2028}
P4096v3: ±{50, 184, 292, 426, 560, 694, 802, 936, 1074, 1208, 1316, 1450, 1584, 1718, 1826, 1960}
 1.2. P2020v2: ±{118, 252, 360, 494, 628, 762, 870, 1004, 1142, 1276, 1384, 1518, 1652, 1786, 1894, 2028}
P4096v1: ±{118, 252, 360, 494, 628, 762, 870, 1004, 1142, 1276, 1384, 1518, 1652, 1786, 1894, 2028}
P4096v2: ±{252, 494, 762, 1004, 1276, 1518, 1786, 2028}
P4096v3: ±{118, 360, 628, 870, 1142, 1384, 1652, 1894}
 1.3. P2020v3: ±{50, 184, 292, 426, 560, 694, 802, 936, 1074, 1208, 1316, 1450, 1584, 1718, 1826, 1960}
P4096v1: +{50, 184, 292, 426, 560, 694, 802, 936, 1074, 1208, 1316, 1450, 1584, 1718, 1826, 1960}
P4096v2: ±{184, 426, 694, 936, 1208, 1450, 1718, 1960}
P4096v3: ±{50, 292, 562, 802, 1074, 1316, 1584, 1826}
 1.4. P2020v4: ±{50, 184, 292, 426, 560, 694, 802, 936, 1142, 1276, 1384, 1518, 1652, 1786, 1894, 2028}
P4096v1: ±{50, 184, 292, 426, 560, 694, 802, 936, 1142, 1276, 1384, 1518, 1652, 1786, 1894, 2028}
P4096v2: ±{184, 426, 694, 936, 1276, 1518, 1786, 2028}
P4096v3: ±{50, 292, 560, 802, 1142, 1384, 1652, 1894}
 1.5. P2020v5: ±{118, 252, 360, 494, 628, 762, 870, 1004, 1074, 1208, 1316, 1450, 1584, 1718, 1826, 1960}
P4096v1: ±{118, 252, 360, 494, 628, 762, 870, 1004, 1074, 1208, 1316, 1450, 1584, 1718, 1826, 1960}
P4096v2: ±{252, 494, 762, 1004, 1208, 1450, 1718, 1960}
P4096v3: ±{118, 360, 628, 870, 1074, 1316, 1584, 1826}
<996 RU/2020 RU/Full Band>
 2. P996v2: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}
 2.1. P2020v1: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}
P4096v1: ±{24, 92, 158, 226, 266, 334, 400, 468, 534, 602, 668, 736, 776, 844, 910, 978, 1048, 1116, 1182, 1250, 1292, 1358, 1424, 1492, 1558, 1626, 1692, 1760, 1800, 1868, 1934, 2002}
P4096v2: ±{92, 226, 334, 468, 602, 736, 844, 978, 1116, 1250, 1358, 1492, 1626, 1760, 1868, 2002}
P4096v3: ±{24, 158, 266, 400, 534, 668, 776, 910, 1048, 1182, 1290, 1424, 1558, 1692, 1800, 1934}
 2.2. P2020v2: ±{92, 226, 334, 468, 602, 736, 844, 978, 1116, 1250, 1358, 1492, 1626, 1760, 1868, 2002}
P4096v1: ±{92, 226, 334, 468, 602, 736, 844, 978, 1116, 1250, 1358, 1492, 1626, 1760, 1868, 2002}
P4096v2: ±{226, 468, 736, 978, 1250, 1492, 1760, 2002}
P4096v3: ±{92, 334, 602, 844, 1116, 1358, 1626, 1868}
 2.3. P2020v3: ±{24, 158, 266, 400, 534, 668, 776, 910, 1048, 1182, 1290, 1424, 1558, 1692, 1800, 1934}
P4096v1: ±{24, 158, 266, 400, 534, 668, 776, 910, 1048, 1182, 1290, 1424, 1558, 1692, 1800, 1934}
P4096v2: ±{158, 400, 668, 910, 1182, 1424, 1692, 1934}
P4096v3: ±{24, 266, 534, 776, 1048, 1290, 1558, 1800}
 2.4. P2020v4: ±{24, 158, 266, 400, 534, 668, 776, 910, 1116, 1250, 1358, 1492, 1626, 1760, 1868, 2002}
P4096v1: ±{24, 158, 266, 400, 534, 668, 776, 910, 1116, 1250, 1358, 1492, 1626, 1760, 1868, 2002}
P4096v2: +{158, 400, 668, 910, 1250, 1492, 1760, 2002}
P4096v3: ±{24, 266, 534, 776, 1116, 1358, 1626, 1868}
 2.5. P2020v5: ±{92, 226, 334, 468, 602, 736, 844, 978, 1048, 1182, 1290, 1424, 1558, 1692, 1800, 1934}
P4096v1: ±{92, 226, 334, 468, 602, 736, 844, 978, 1048, 1182, 1290, 1424, 1558, 1692, 1800, 1934}
P4096v2: ±{226, 468, 736, 978, 1182, 1424, 1692, 1934}
P4096v3: ±{92, 334, 602, 844, 1048, 1290, 1558, 1800}
 4. P996v4: ±{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}
 4.1. P2020v1: ±{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}
P4096v1: ±{50, 118, 184, 252, 292, 360, 426, 494, 534, 602, 668, 736, 776, 844, 910, 978, 1074, 1142, 1208, 1276, 1316, 1384, 1450, 1518, 1558, 1626, 1692, 1760, 1800, 1868, 1934, 2002}
P4096v2: ±{118, 252, 360, 494, 602, 736, 844, 978, 1142, 1276, 1384, 1518, 1626, 1760, 1868, 2002}
P4096v3: ±{50, 184, 292, 426, 534, 668, 776, 910, 1074, 1208, 1316, 1450, 1558, 1692, 1800, 1934}
 4.2. P2020v2: ±{118, 252, 360, 494, 602, 736, 844, 978, 1142, 1276, 1384, 1518, 1626, 1760, 1868, 2002}
P4096v1: ±{118, 252, 360, 494, 602, 736, 844, 978, 1142, 1276, 1384, 1518, 1626, 1760, 1868, 2002}
P4096v2: ±{252, 494, 736, 978, 1276, 1518, 1760, 2002}
P4096v3: ±{118, 360, 602, 844, 1142, 1384, 1626, 1868}
 4.3. P2020v3: ±{50, 184, 292, 426, 534, 668, 776, 910, 1074, 1208, 1316, 1450, 1558, 1692, 1800, 1934}
P4096v1: ±{50, 184, 292, 426, 534, 668, 776, 910, 1074, 1208, 1316, 1450, 1558, 1692, 1800, 1934}
P4096v2: ±{184, 426, 668, 910, 1208, 1450, 1692, 1934}
P4096v3: ±{50, 292, 534, 776, 1074, 1316, 1558, 1800}
 4.4. P2020v4: ±{50, 184, 292, 426, 534, 668, 776, 910, 1142, 1276, 1384, 1518, 1626, 1760, 1868, 2002}
P4096v1: ±{50, 184, 292, 426, 534, 668, 776, 910, 1142, 1276, 1384, 1518, 1626, 1760, 1868, 2002}
P4096v2: ±{184, 426, 668, 910, 1276, 1518, 1760, 2002}
P4096v3: ±{50, 292, 534, 776, 1142, 1384, 1626, 1868}
 4.5. P2020v5: ±{118, 252, 360, 494, 602, 736, 844, 978, 1074, 1208, 1316, 1450, 1558, 1692, 1800, 1934}
P4096v1: ±{118, 252, 360, 494, 602, 736, 844, 978, 1074, 1208, 1316, 1450, 1558, 1692, 1800, 1934}
P4096v2: ±{252, 494, 736, 978, 1208, 1450, 1692, 1934}
P4096v3: ±{118, 360, 602, 844, 1074, 1316, 1558, 1800}

Listed below are indices for each RU and null tone in a case where the second configuration for the 2020 RU is used and the first configuration for the 996 RU is used.
<26 RU>

TABLE 224

| RU1 | RU2 | RU3 | RU4 | RU5 | RU6 | RU7 | RU8 | RU9 |
|---|---|---|---|---|---|---|---|---|
| −2033: −2008 | −2007: −1982 | −1979: −1954 | −1953: −1928 | −1926: −1901 | −1899: −1874 | −1873: −1848 | −1845: −1820 | −1819: −1794 |

TABLE 224-continued

| RU10 | RU11 | RU12 | RU13 | RU14 | RU15 | RU16 | RU17 | RU18 | RU19 |
|---|---|---|---|---|---|---|---|---|---|
| −1791:−1766 | −1765:−1740 | −1737:−1712 | −1711:−1686 | −1684:−1659 | −1657:−1632 | −1631:−1606 | −1603:−1578 | −1577:−1552 | −1549:−1524 |

| RU20 | RU21 | RU22 | RU23 | RU24 | RU25 | RU26 | RU27 | RU28 | |
|---|---|---|---|---|---|---|---|---|---|
| −1521:−1496 | −1495:−1470 | −1467:−1442 | −1441:−1416 | −1414:−1389 | −1387:−1362 | −1361:−1336 | −1333:−1308 | −1307:−1282 | |

| RU29 | RU30 | RU31 | RU32 | RU33 | RU34 | RU35 | RU36 | RU37 | RU38 |
|---|---|---|---|---|---|---|---|---|---|
| −1279:−1254 | −1253:−1228 | −1225:−1200 | −1199:−1174 | −1172:−1147 | −1145:−1120 | −1119:−1094 | −1091:−1066 | −1065:−1040 | −1038:−1013 |

| RU39 | RU40 | RU41 | RU42 | RU43 | RU44 | RU45 | RU46 | RU47 | |
|---|---|---|---|---|---|---|---|---|---|
| −1011:−986 | −985:−960 | −957:−932 | −931:−906 | −904:−879 | −877:−852 | −851:−826 | −823:−798 | −797:−772 | |

| RU48 | RU49 | RU50 | RU51 | RU52 | RU53 | RU54 | RU55 | RU56 | RU57 |
|---|---|---|---|---|---|---|---|---|---|
| −769:−744 | −743:−718 | −715:−690 | −689:−664 | −662:−637 | −635:−610 | −609:−584 | −581:−556 | −555:−530 | −527:−502 |

| RU58 | RU59 | RU60 | RU61 | RU62 | RU63 | RU64 | RU65 | RU66 | |
|---|---|---|---|---|---|---|---|---|---|
| −499:−474 | −473:−448 | −445:−420 | −419:−394 | −392:−367 | −365:−340 | −339:−314 | −311:−286 | −285:−260 | |

| RU67 | RU68 | RU69 | RU70 | RU71 | RU72 | RU73 | RU74 | RU75 | RU76 |
|---|---|---|---|---|---|---|---|---|---|
| −257:−232 | −231:−206 | −203:−178 | −177:−152 | −150:−125 | −123:−98 | −97:−72 | −69:−44 | −43:−18 | −15:−3, 3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 18:43

Null subcarriers: +{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034, 2035}

<52 RU>

TABLE 225

| RU1 | RU2 | RU3 | RU4 |
|---|---|---|---|
| −2033:−1982 | −1979:−1928 | −1899:−1848 | −1845:−1794 |

| RU5 | RU6 | RU7 | RU8 |
|---|---|---|---|
| −1791:−1740 | −1737:−1686 | −1657:−1606 | −1603:−1552 |

| RU9 | RU10 | RU11 | RU12 |
|---|---|---|---|
| −1521:−1470 | −1467:−1416 | −1387:−1336 | −1333:−1282 |

| RU13 | RU14 | RU15 | RU16 |
|---|---|---|---|
| −1279:−1228 | −1225:−1174 | −1145:−1094 | −1091:−1040 |

| RU17 | RU18 | RU19 | RU20 |
|---|---|---|---|
| −1011:−960 | −957:−906 | −877:−826 | −823:−772 |

TABLE 225-continued

| RU21 | RU22 | RU23 | RU24 |
|---|---|---|---|
| −769:−718 | −715:−664 | −635:−584 | −581:−530 |

| RU25 | RU26 | RU27 | RU28 |
|---|---|---|---|
| −499:−448 | −445:−394 | −365:−314 | −311:−260 |

| RU29 | RU30 | RU31 | RU32 |
|---|---|---|---|
| −257:−206 | −203:−152 | −123:−72 | −69:−18 |

→RU 33 to RU 64→ Subcarrier indices for RU 32+x are the same as subcarrier indices for RU 33−x multiplied by −1 (x is a positive integer that is less than or equal to 32)

→Ex) Subcarrier indices for RU 34 are the same as subcarrier indices for RU 31 multiplied by −1, that is, 72:123

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034, 2035}

<106 RU>

TABLE 226

| RU1 | RU2 | RU3 | RU4 |
|---|---|---|---|
| −2033:−1928 | −1899:−1794 | −1791:−1686 | −1657:−1552 |

TABLE 226-continued

| RU5 | RU6 | RU7 | RU8 |
|---|---|---|---|
| −1521:−1416 | −1387:−1282 | −1279:−1174 | −1145:−1040 |
| RU9 | RU10 | RU11 | RU12 |
| −1011:−906 | −877:−772 | −769:−664 | −635:−530 |
| RU13 | RU14 | RU15 | RU16 |
| −499:−394 | −365:−260 | −257:−152 | −123:−18 |

→RU 17 to RU 32→ Subcarrier indices for RU 16+x are the same as subcarrier indices for RU 17−x multiplied by −1 (x is a positive integer that is less than or equal to 16)

→Ex) Subcarrier indices for RU 18 are the same as subcarrier indices for RU 15 multiplied by −1, that is, 152:257

Null subcarriers: ±{16, 17, 124, 151, 258, 259, 366, 393, 500, 501, 528, 529, 636, 663, 770, 771, 878, 905, 1012, 1039, 1146, 1173, 1280, 1281, 1388, 1415, 1522, 1523, 1550, 1551, 1658, 1685, 1792, 1793, 1900, 1927, 2034, 2035}

<242 RU>

TABLE 227

| RU1 | RU2 | RU3 | RU4 |
|---|---|---|---|
| −2034:−1793 | −1792:−1551 | −1522:−1281 | −1280:−1039 |
| RU5 | RU6 | RU7 | RU8 |
| −1012:−771 | −770:−529 | −500:−259 | −258:−17 |

→RU 9 to RU 16→ Subcarrier indices for RU 8+x are the same as subcarrier indices for RU 9−x subcarrier index multiplied by −1 (x is a positive integer that is less than or equal to 8)

→Ex) Subcarrier indices for RU 10 are the same as subcarrier indices for RU 7 multiplied by −1, that is, 259:500

Null subcarriers: ±{16, 501, 528, 1523, 1550, 2035}

<484 RU>

TABLE 228

| RU1 | RU2 | RU3 | RU4 |
|---|---|---|---|
| −2034:−1551 | −1522:−1039 | −1012:−529 | −500:−17 |

→RU 5 to RU 8→ Subcarrier indices for RU 4+x are the same as subcarrier indices for RU 5−x multiplied by −1 (x is a positive integer that is less than or equal to 4)

→Ex) Subcarrier indices for RU 6 are the same as subcarrier indices for RU 3 multiplied by −1, that is, 529:1012

Null subcarriers: ±{16, 501, 528, 1523, 1550, 2035}

<996 RU>

TABLE 229

| RU1 | RU2 | RU3 | RU4 |
|---|---|---|---|
| −2034:−1039 | −1012:−17 | 17:1012 | 1039:2034 |

Null subcarriers: ±{16, 2035}

<2020 RU>

TABLE 230

| RU1 | RU2 |
|---|---|
| −2035:−16 | 16:2035 |

Null subcarriers: X
<4066 RU>
4066RU: −2035:−3, 3:2035
Null subcarriers: X
Pilot subcarrier indices according to the above tone plans are listed below.

<26 RU>
±{8 or 10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1018, 1032, 1046, 1060, 1072, 1086, 1100, 1114, 1126, 1140, 1152, 1166, 1180, 1194, 1206, 1220, 1234, 1248, 1260, 1274, 1288, 1302, 1314, 1328, 1342, 1356, 1368, 1382, 1394, 1408, 1422, 1436, 1448, 1462, 1476, 1490, 1502, 1516, 1530, 1544, 1558, 1572, 1584, 1598, 1612, 1626, 1638, 1652, 1664, 1678, 1692, 1706, 1718, 1732, 1746, 1760, 1772, 1786, 1800, 1814, 1826, 1840, 1854, 1868, 1880, 1894, 1906, 1920, 1934, 1948, 1960, 1974, 1988, 2002, 2014, 2028}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1558, 1572, 1584, 1598, 1612, 1626, 1638, 1652, 1692, 1706, 1718, 1732, 1746, 1760, 1772, 1786, 1800, 1814, 1826, 1840, 1854, 1868, 1880, 1894, 1934, 1948, 1960, 1974, 1988, 2002, 2014, 2028}

<106/242/484 RU>
±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1046, 1072, 1114, 1140, 1180, 1206, 1248, 1274, 1288, 1314, 1356, 1382, 1422, 1448, 1490, 1516, 1558, 1584, 1626, 1652, 1692, 1718, 1760, 1786, 1800, 1826, 1868, 1894, 1934, 1960, 2002, 2028}

<996 RU/2020 RU/Full Band>
1. P996v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
1.1. P2020v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
P4096v1: ±{50, 118, 184, 252, 292, 360, 426, 494, 562, 630, 696, 764, 804, 872, 938, 1006, 1072, 1140, 1206, 1274, 1314, 1382, 1448, 1516, 1584, 1652, 1718, 1786, 1826, 1894, 1960, 2028}
P4096v2: ±{118, 252, 360, 494, 630, 764, 872, 1006, 1140, 1274, 1382, 1516, 1652, 1786, 1894, 2028}
P4096v3: ±{50, 184, 292, 426, 562, 696, 804, 938, 1072, 1206, 1314, 1448, 1584, 1718, 1826, 1960}

1.2. P2020v2: ±{118, 252, 360, 494, 630, 764, 872, 1006, 1140, 1274, 1382, 1516, 1652, 1786, 1894, 2028}

P4096v1: ±{118, 252, 360, 494, 630, 764, 872, 1006, 1140, 1274, 1382, 1516, 1652, 1786, 1894, 2028}

P4096v2: ±{252, 494, 764, 1006, 1274, 1516, 1786, 2028}

P4096v3: ±{118, 360, 630, 872, 1140, 1382, 1652, 1894}

1.3. P2020v3: ±{50, 184, 292, 426, 562, 696, 804, 938, 1072, 1206, 1314, 1448, 1584, 1718, 1826, 1960}

P4096v1: ±{50, 184, 292, 426, 562, 696, 804, 938, 1072, 1206, 1314, 1448, 1584, 1718, 1826, 1960}

P4096v2: ±{184, 426, 696, 938, 1206, 1448, 1718, 1960}

P4096v3: ±{50, 292, 562, 804, 1072, 1314, 1584, 1826}

1.4. P2020v4: ±{50, 184, 292, 426, 562, 696, 804, 938, 1140, 1274, 1382, 1516, 1652, 1786, 1894, 2028}

P4096v1: ±{50, 184, 292, 426, 562, 696, 804, 938, 1140, 1274, 1382, 1516, 1652, 1786, 1894, 2028}

P4096v2: ±{184, 426, 696, 938, 1274, 1516, 1786, 2028}

P4096v3: ±{50, 292, 562, 804, 1140, 1382, 1652, 1894}

1.5. P2020v5: ±{118, 252, 360, 494, 630, 764, 872, 1006, 1072, 1206, 1314, 1448, 1584, 1718, 1826, 1960}

P4096v1: ±{118, 252, 360, 494, 630, 764, 872, 1006, 1072, 1206, 1314, 1448, 1584, 1718, 1826, 1960}

P4096v2: ±{252, 494, 764, 1006, 1206, 1448, 1718, 1960}

P4096v3: ±{118, 360, 630, 872, 1072, 1314, 1584, 1826}

<996 RU/2020 RU/Full Band>

2. P996v2: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

2.1. P2020v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

P4096v1: ±{24, 92, 158, 226, 266, 334, 400, 468, 536, 604, 670, 738, 778, 846, 912, 980, 1046, 1114, 1180, 1248, 1288, 1356, 1422, 1490, 1558, 1626, 1692, 1760, 1800, 1868, 1934, 2002}

P4096v2: ±{92, 226, 334, 468, 604, 738, 846, 980, 1114, 1248, 1356, 1490, 1626, 1760, 1868, 2002}

P4096v3: ±{24, 158, 266, 400, 536, 670, 778, 912, 1046, 1180, 1288, 1422, 1558, 1692, 1800, 1934}

2.2. P2020v2: ±{92, 226, 334, 468, 604, 738, 846, 980, 1114, 1248, 1356, 1490, 1626, 1760, 1868, 2002}

P4096v1: ±{92, 226, 334, 468, 604, 738, 846, 980, 1114, 1248, 1356, 1490, 1626, 1760, 1868, 2002}

P4096v2: ±{226, 468, 738, 980, 1248, 1490, 1760, 2002}

P4096v3: ±{92, 334, 604, 846, 1114, 1356, 1626, 1868}

2.3. P2020v3: ±{24, 158, 266, 400, 536, 670, 778, 912, 1046, 1180, 1288, 1422, 1558, 1692, 1800, 1934}

P4096v1: ±{24, 158, 266, 400, 536, 670, 778, 912, 1046, 1180, 1288, 1422, 1558, 1692, 1800, 1934}

P4096v2: ±{158, 400, 670, 912, 1180, 1422, 1692, 1934}

P4096v3: ±{24, 266, 536, 778, 1046, 1288, 1558, 1800}

2.4. P2020v4: ±{24, 158, 266, 400, 536, 670, 778, 912, 1114, 1248, 1356, 1490, 1626, 1760, 1868, 2002}

P4096v1: ±{24, 158, 266, 400, 536, 670, 778, 912, 1114, 1248, 1356, 1490, 1626, 1760, 1868, 2002}

P4096v2: ±{158, 400, 670, 912, 1248, 1490, 1760, 2002}

P4096v3: ±{24, 266, 536, 778, 1114, 1356, 1626, 1868}

2.5. P2020v5: ±{92, 226, 334, 468, 604, 738, 846, 980, 1046, 1180, 1288, 1422, 1558, 1692, 1800, 1934}

P4096v1: ±{92, 226, 334, 468, 604, 738, 846, 980, 1046, 1180, 1288, 1422, 1558, 1692, 1800, 1934}

P4096v2: ±{226, 468, 738, 980, 1180, 1422, 1692, 1934}

P4096v3: ±{92, 334, 604, 846, 1046, 1288, 1558, 1800}

<996 RU/2020 RU/Full Band>

3. P996v3: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

3.1. P2020v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v1: ±{24, 92, 158, 226, 266, 334, 400, 468, 562, 630, 696, 764, 804, 872, 938, 1006, 1046, 1114, 1180, 1248, 1288, 1356, 1422, 1490, 1584, 1652, 1718, 1786, 1826, 1894, 1960, 2028}

P4096v2: ±{92, 226, 334, 468, 630, 764, 872, 1006, 1114, 1248, 1356, 1490, 1652, 1786, 1894, 2028}

P4096v3: ±{24, 158, 266, 400, 562, 696, 804, 938, 1046, 1180, 1288, 1422, 1584, 1718, 1826, 1960}

3.2. P2020v2: ±{92, 226, 334, 468, 630, 764, 872, 1006, 1114, 1248, 1356, 1490, 1652, 1786, 1894, 2028}

P4096v1: ±{92, 226, 334, 468, 630, 764, 872, 1006, 1114, 1248, 1356, 1490, 1652, 1786, 1894, 2028}

P4096v2: ±{226, 468, 764, 1006, 1248, 1490, 1786, 2028}

P4096v3: ±{92, 334, 630, 872, 1114, 1356, 1652, 1894}

3.3. P2020v3: ±{24, 158, 266, 400, 562, 696, 804, 938, 1046, 1180, 1288, 1422, 1584, 1718, 1826, 1960}

P4096v1: ±{24, 158, 266, 400, 562, 696, 804, 938, 1046, 1180, 1288, 1422, 1584, 1718, 1826, 1960}

P4096v2: ±{158, 400, 696, 938, 1180, 1422, 1718, 1960}

P4096v3: ±{24, 266, 562, 804, 1046, 1288, 1584, 1826}

3.4. P2020v4: ±{24, 158, 266, 400, 562, 696, 804, 938, 1114, 1248, 1356, 1490, 1652, 1786, 1894, 2028}

P4096v1: ±{24, 158, 266, 400, 562, 696, 804, 938, 1114, 1248, 1356, 1490, 1652, 1786, 1894, 2028}

P4096v2: ±{158, 400, 696, 938, 1248, 1490, 1786, 2028}

P4096v3: ±{24, 266, 562, 804, 1114, 1356, 1652, 1894}

3.5. P2020v5: ±{92, 226, 334, 468, 630, 764, 872, 1006, 1046, 1180, 1288, 1422, 1584, 1718, 1826, 1960}

P4096v1: ±{92, 226, 334, 468, 630, 764, 872, 1006, 1046, 1180, 1288, 1422, 1584, 1718, 1826, 1960}

P4096v2: ±{226, 468, 764, 1006, 1180, 1422, 1718, 1960}

P4096v3: ±{92, 334, 630, 872, 1046, 1288, 1584, 1826}

<996 RU/2020 RU/Full Band>

4. P996v4: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

4.1. P2020v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v1: ±{50, 118, 184, 252, 292, 360, 426, 494, 536, 604, 670, 738, 778, 846, 912, 980, 1072, 1140, 1206, 1274, 1314, 1382, 1448, 1516, 1558, 1626, 1692, 1760, 1800, 1868, 1934, 2002}

P4096v2: ±{118, 252, 360, 494, 604, 738, 846, 980, 1140, 1274, 1382, 1516, 1626, 1760, 1868, 2002}

P4096v3: ±{50, 184, 292, 426, 536, 670, 778, 912, 1072, 1206, 1314, 1448, 1558, 1692, 1800, 1934}

4.2. P2020v2: ±{118, 252, 360, 494, 604, 738, 846, 980, 1140, 1274, 1382, 1516, 1626, 1760, 1868, 2002}

P4096v1: ±{118, 252, 360, 494, 604, 738, 846, 980, 1140, 1274, 1382, 1516, 1626, 1760, 1868, 2002}

P4096v2: ±{252, 494, 738, 980, 1274, 1516, 1760, 2002}

P4096v3: ±{118, 360, 604, 846, 1140, 1382, 1626, 1868}

4.3. P2020v3: ±{50, 184, 292, 426, 536, 670, 778, 912, 1072, 1206, 1314, 1448, 1558, 1692, 1800, 1934}

P4096v1: ±{50, 184, 292, 426, 536, 670, 778, 912, 1072, 1206, 1314, 1448, 1558, 1692, 1800, 1934}

P4096v2: ±{184, 426, 670, 912, 1206, 1448, 1692, 1934}

P4096v3: ±{50, 292, 536, 778, 1072, 1314, 1558, 1800}

4.4 P2020v4: ±{50, 184, 292, 426, 536, 670, 778, 912, 1140, 1274, 1382, 1516, 1626, 1760, 1868, 2002}

P4096v1: ±{50, 184, 292, 426, 536, 670, 778, 912, 1140, 1274, 1382, 1516, 1626, 1760, 1868, 2002}

P4096v2: ±{184, 426, 670, 912, 1274, 1516, 1760, 2002}

P4096v3: ±{50, 292, 536, 778, 1140, 1382, 1626, 1868}

4.5. P2020v5: ±{118, 252, 360, 494, 604, 738, 846, 980, 1072, 1206, 1314, 1448, 1558, 1692, 1800, 1934}

P4096v1: ±{118, 252, 360, 494, 604, 738, 846, 980, 1072, 1206, 1314, 1448, 1558, 1692, 1800, 1934}

P4096v2: ±{252, 494, 738, 980, 1206, 1448, 1692, 1934}

P4096v3: ±{118, 360, 604, 846, 1072, 1314, 1558, 1800}

Listed below are indices for each RU and null tone in a case where the second configuration for the 2020 RU is used and the second configuration for the 996 RU is used.

<26 RU>

TABLE 231

| RU1 | RU2 | RU3 | RU4 | RU5 | RU6 | RU7 | RU8 | RU9 |
|---|---|---|---|---|---|---|---|---|
| −2032:−2007 | −2006:−1981 | −1978:−1953 | −1952:−1927 | −1925:−1900 | −1898:−1873 | −1872:−1847 | −1844:−1819 | −1818:−1793 |

| RU10 | RU11 | RU12 | RU13 | RU14 | RU15 | RU16 | RU17 | RU18 | RU19 |
|---|---|---|---|---|---|---|---|---|---|
| −1790:−1765 | −1764:−1739 | −1736:−1711 | −1710:−1685 | −1683:−1658 | −1656:−1631 | −1630:−1605 | −1602:−1577 | −1576:−1551 | −1549:−1524 |

| RU20 | RU21 | RU22 | RU23 | RU24 | RU25 | RU26 | RU27 | RU28 |
|---|---|---|---|---|---|---|---|---|
| −1522:−1497 | −1496:−1471 | −1468:−1443 | −1442:−1417 | −1415:−1390 | −1388:−1363 | −1362:−1337 | −1334:−1309 | −1308:−1283 |

| RU29 | RU30 | RU31 | RU32 | RU33 | RU34 | RU35 | RU36 | RU37 | RU38 |
|---|---|---|---|---|---|---|---|---|---|
| −1280:−1255 | −1254:−1229 | −1226:−1201 | −1200:−1175 | −1173:−1148 | −1146:−1121 | −1120:−1095 | −1092:−1067 | −1066:−1041 | −1038:−1013 |

| RU39 | RU40 | RU41 | RU42 | RU43 | RU44 | RU45 | RU46 | RU47 |
|---|---|---|---|---|---|---|---|---|
| −1010:−985 | −984:−959 | −956:−931 | −930:−905 | −903:−878 | −876:−851 | −850:−825 | −822:−797 | −796:−771 |

| RU48 | RU49 | RU50 | RU51 | RU52 | RU53 | RU54 | RU55 | RU56 | RU57 |
|---|---|---|---|---|---|---|---|---|---|
| −768:−743 | −742:−717 | −714:−689 | −688:−663 | −661:−636 | −634:−609 | −608:−583 | −580:−555 | −554:−529 | −527:−502 |

| RU58 | RU59 | RU60 | RU61 | RU62 | RU63 | RU64 | RU65 | RU66 |
|---|---|---|---|---|---|---|---|---|
| −500:−475 | −474:−449 | −446:−421 | −420:−395 | −393:−368 | −366:−341 | −340:−315 | −312:−287 | −286:−261 |

| RU67 | RU68 | RU69 | RU70 | RU71 | RU72 | RU73 | RU74 | RU75 | RU76 |
|---|---|---|---|---|---|---|---|---|---|
| −258:−233 | −232:−207 | −204:−179 | −178:−153 | −151:−126 | −124:−99 | −98:−73 | −70:−45 | −44:−19 | −15:−3, 3:15 |

→RU 77 to RU 151→ Subcarrier indices for RU 76+x are the same as subcarrier indices for RU 76−x multiplied by −1 (x is a positive integer that is less than or equal to 75)

→Ex) Subcarrier indices for RU 77 are the same as subcarrier indices for RU 75 multiplied by −1, that is, 19:44

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034, 2035}

<52 RU>

TABLE 232

| RU1 | RU2 | RU3 | RU4 |
|---|---|---|---|
| −2032:−1981 | −1978:−1927 | −1898:−1847 | −1844:−1793 |
| RU5 | RU6 | RU7 | RU8 |
| −1790:−1739 | −1736:−1685 | −1656:−1605 | −1602:−1551 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |

TABLE 232-continued

| RU17 | RU18 | RU19 | RU20 |
|---|---|---|---|
| −1010:−959 | −956:−905 | −876:−825 | −822:−771 |

TABLE 232-continued

| RU21 | RU22 | RU23 | RU24 |
|---|---|---|---|
| −768:−717 | −714:−663 | −634:−583 | −580:−529 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU 33 to RU 64→ Subcarrier indices for RU 32+x are the same as subcarrier indices for RU 33−x multiplied by −1 (x is a positive integer that is less than or equal to 32)
→Ex) Subcarrier indices for RU 34 are the same as subcarrier indices for RU 31 multiplied by −1, that is, 73:124
Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034, 2035}
<106 RU>

TABLE 233

| RU1 | RU2 | RU3 | RU4 |
|---|---|---|---|
| −2032:−1927 | −1898:−1793 | −1790:−1685 | −1656:−1551 |
| RU5 | RU6 | RU7 | RU8 |
| −1522:−1417 | −1388:−1283 | −1280:−1175 | −1146:−1041 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU 17 to RU 32→ Subcarrier indices for RU 16+x are the same as subcarrier indices for RU 17−x multiplied by −1 (x is a positive integer that is less than or equal to 16)
→Ex) Subcarrier indices for RU 18 are the same as subcarrier indices for RU 15 multiplied by −1, that is, 153:258
Null subcarriers: ±{16, 17, 18, 125, 152, 259, 260, 367, 394, 501, 528, 635, 662, 769, 770, 877, 904, 1011, 1012, 1039, 1040, 1147, 1174, 1281, 1282, 1389, 1416, 1523, 1550, 1657, 1684, 1791, 1792, 1899, 1926, 2033, 2034, 2035}
<242 RU>

TABLE 234

| RU1 | RU2 | RU3 | RU4 |
|---|---|---|---|
| −2033:−1792 | −1791−1550 | −1523:−1282 | −1281−1040 |
| RU5 | RU6 | RU7 | RU8 |
| −1011:−770 | −769:−528 | −501:−260 | −259:−18 |

→RU 9 to RU 16→ Subcarrier indices for RU 8+x are the same as subcarrier indices for RU 9−x subcarrier index multiplied by −1 (x is a positive integer that is less than or equal to 8)
→Ex) Subcarrier indices for RU 10 are the same as subcarrier indices for RU 7 multiplied by −1, that is, 260:501
Null subcarriers: ±{16, 17, 1012, 1039, 2034, 2035}
<484 RU>

TABLE 235

| RU1 | RU2 | RU3 | RU4 |
|---|---|---|---|
| −2033:−1550 | −1523:−1040 | −1011:−528 | −501:−18 |

→RU 5 to RU 8→ Subcarrier indices for RU 4+x are the same as subcarrier indices for RU 5−x multiplied by −1 (x is a positive integer that is less than or equal to 4)
→Ex) Subcarrier indices for RU 6 are the same as subcarrier indices for RU 3 multiplied by −1, that is, 528:1011
Null subcarriers: ±{16, 17, 1012, 1039, 2034, 2035}
<996 RU>

TABLE 236

| RU1 | RU2 | RU3 | RU4 |
|---|---|---|---|
| −2034:−1039 | −1012:−17 | 17:1012 | 1039:2034 |

Null subcarriers: ±{16, 2035}
<2020 RU>

TABLE 237

| RU1 | RU2 |
|---|---|
| −2035:−16 | 16:2035 |

Null subcarriers: X
<4066 RU>
4066RU: −2035:−3, 3:2035
Null subcarriers: X
Pilot subcarrier indices according to the above tone plans are listed below.
<26 RU>
±{80r10, 24, 38, 50, 64, 78, 92, 104, 118, 132, 146, 158, 172, 184, 198, 212, 226, 238, 252, 266, 280, 292, 306, 320, 334, 346, 360, 374, 388, 400, 414, 426, 440, 454, 468, 480, 494, 508, 522, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004, 1018, 1032, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516, 1530, 1544, 1556, 1570, 1582, 1596, 1610, 1624, 1636, 1650, 1664, 1678, 1690, 1704, 1716, 1730, 1744, 1758, 1770, 1784, 1798, 1812, 1824, 1838, 1852, 1866, 1878, 1892, 1906, 1920, 1932, 1946, 1958, 1972, 1986, 2000, 2012, 2026}
<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516, 1556, 1570, 1582, 1596, 1610, 1624, 1636, 1650, 1690, 1704, 1716, 1730, 1744, 1758, 1770, 1784, 1798, 1812, 1824, 1838, 1852, 1866, 1878, 1892, 1932, 1946, 1958, 1972, 1986, 2000, 2012, 2026}

<106/242/484 RU>

±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004, 1046, 1072, 1114, 1140, 1180, 1206, 1248, 1274, 1288, 1314, 1356, 1382, 1422, 1448, 1490, 1516, 1556, 1582, 1624, 1650, 1690, 1716, 1758, 1784, 1798, 1824, 1866, 1892, 1932, 1958, 2000, 2026}

<996 RU/2020 RU/Full Band>

1. P996v1: ±{50, 118, 184, 252, 292, 360, 426, 494, 560, 628, 694, 762, 802, 870, 936, 1004, 1072, 1140, 1206, 1274, 1314, 1382, 1448, 1516, 1582, 1650, 1716, 1784, 1824, 1892, 1958, 2026}

1.1. P2020v1: ±{50, 118, 184, 252, 292, 360, 426, 494, 560, 628, 694, 762, 802, 870, 936, 1004, 1072, 1140, 1206, 1274, 1314, 1382, 1448, 1516, 1582, 1650, 1716, 1784, 1824, 1892, 1958, 2026}

P4096v1: ±{50, 118, 184, 252, 292, 360, 426, 494, 560, 628, 694, 762, 802, 870, 936, 1004, 1072, 1140, 1206, 1274, 1314, 1382, 1448, 1516, 1582, 1650, 1716, 1784, 1824, 1892, 1958, 2026}

P4096v2: ±{118, 252, 360, 494, 628, 762, 870, 1004, 1140, 1274, 1382, 1516, 1650, 1784, 1892, 2026}

P4096v3: ±{50, 184, 292, 426, 560, 694, 802, 936, 1072, 1206, 1314, 1448, 1582, 1716, 1824, 1958}

1.2. P2020v2: ±{118, 252, 360, 494, 628, 762, 870, 1004, 1140, 1274, 1382, 1516, 1650, 1784, 1892, 2026}

P4096v1: ±{118, 252, 360, 494, 628, 762, 870, 1004, 1140, 1274, 1382, 1516, 1650, 1784, 1892, 2026}

P4096v2: ±{252, 494, 762, 1004, 1274, 1516, 1784, 2026}

P4096v3: ±{118, 360, 628, 870, 1140, 1382, 1650, 1892}

1.3. P2020v3: ±{50, 184, 292, 426, 560, 694, 802, 936, 1072, 1206, 1314, 1448, 1582, 1716, 1824, 1958}

P4096v1: ±{50, 184, 292, 426, 560, 694, 802, 936, 1072, 1206, 1314, 1448, 1582, 1716, 1824, 1958}

P4096v2: ±{184, 426, 694, 936, 1206, 1448, 1716, 1958}

P4096v3: ±{50, 292, 560, 802, 1072, 1314, 1582, 1824}

1.4. P2020v4: ±{50, 184, 292, 426, 560, 694, 802, 936, 1140, 1274, 1382, 1516, 1650, 1784, 1892, 2026}

P4096v1: ±{50, 184, 292, 426, 560, 694, 802, 936, 1140, 1274, 1382, 1516, 1650, 1784, 1892, 2026}

P4096v2: ±{184, 426, 694, 936, 1274, 1516, 1784, 2026}

P4096v3: ±{50, 292, 560, 802, 1140, 1382, 1650, 1892}

1.5. P2020v5: ±{118, 252, 360, 494, 628, 762, 870, 1004, 1072, 1206, 1314, 1448, 1582, 1716, 1824, 1958}

P4096v1: ±{118, 252, 360, 494, 628, 762, 870, 1004, 1072, 1206, 1314, 1448, 1582, 1716, 1824, 1958}

P4096v2: ±{252, 494, 762, 1004, 1206, 1448, 1716, 1958}

P4096v3: ±{118, 360, 628, 870, 1072, 1314, 1582, 1824}

<996 RU/2020 RU/Full Band>

2. P996v2: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}

2.1. P2020v1: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}

P4096v1: ±{24, 92, 158, 226, 266, 334, 400, 468, 534, 602, 668, 736, 776, 844, 910, 978, 1046, 1114, 1180, 1248, 1288, 1356, 1422, 1490, 1556, 1624, 1690, 1758, 1798, 1866, 1932, 2000}

P4096v2: ±{92, 226, 334, 468, 602, 736, 844, 978, 1114, 1248, 1356, 1490, 1624, 1758, 1866, 2000}

P4096v3: ±{24, 158, 266, 400, 534, 668, 776, 910, 1046, 1180, 1288, 1422, 1556, 1690, 1798, 1932}

2.2. P2020v2: ±{92, 226, 334, 468, 602, 736, 844, 978, 1114, 1248, 1356, 1490, 1624, 1758, 1866, 2000}

P4096v1: ±{92, 226, 334, 468, 602, 736, 844, 978, 1114, 1248, 1356, 1490, 1624, 1758, 1866, 2000}

P4096v2: ±{226, 468, 736, 978, 1248, 1490, 1758, 2000}

P4096v3: ±{92, 334, 602, 844, 1114, 1356, 1624, 1866}

2.3. P2020v3: ±{24, 158, 266, 400, 534, 668, 776, 910, 1046, 1180, 1288, 1422, 1556, 1690, 1798, 1932}

P4096v1: ±{24, 158, 266, 400, 534, 668, 776, 910, 1046, 1180, 1288, 1422, 1556, 1690, 1798, 1932}

P4096v2: ±{158, 400, 668, 910, 1180, 1422, 1690, 1932}

P4096v3: ±{24, 266, 534, 776, 1046, 1288, 1556, 1798}

2.4. P2020v4: ±{24, 158, 266, 400, 534, 668, 776, 910, 1114, 1248, 1356, 1490, 1624, 1758, 1866, 2000}

P4096v1: ±{24, 158, 266, 400, 534, 668, 776, 910, 1114, 1248, 1356, 1490, 1624, 1758, 1866, 2000}

P4096v2: ±{158, 400, 668, 910, 1248, 1490, 1758, 2000}

P4096v3: ±{24, 266, 534, 776, 1114, 1356, 1624, 1866}

2.5. P2020v5: ±{92, 226, 334, 468, 602, 736, 844, 978, 1046, 1180, 1288, 1422, 1556, 1690, 1798, 1932}

P4096v1: ±{92, 226, 334, 468, 602, 736, 844, 978, 1046, 1180, 1288, 1422, 1556, 1690, 1798, 1932}

P4096v2: ±{226, 468, 736, 978, 1180, 1422, 1690, 1932}

P4096v3: ±{92, 334, 602, 844, 1046, 1288, 1556, 1798}

<996 RU/2020 RU/Full Band>

3. P996v3: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}

3.1. P2020v1: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}

P4096v1: ±{24, 92, 158, 226, 266, 334, 400, 468, 560, 628, 694, 762, 802, 870, 936, 1004, 1046, 1114, 1180, 1248, 1288, 1356, 1422, 1490, 1582, 1650, 1716, 1784, 1824, 1892, 1958, 2026}

P4096v2: ±{92, 226, 334, 468, 628, 762, 870, 1004, 1114, 1248, 1356, 1490, 1650, 1784, 1892, 2026}

P4096v3: ±{24, 158, 266, 400, 560, 694, 802, 936, 1046, 1180, 1288, 1422, 1582, 1716, 1824, 1958}

3.2. P2020v2: ±{92, 226, 334, 468, 628, 762, 870, 1004, 1114, 1248, 1356, 1490, 1650, 1784, 1892, 2026}

P4096v1: ±{92, 226, 334, 468, 628, 762, 870, 1004, 1114, 1248, 1356, 1490, 1650, 1784, 1892, 2026}

P4096v2: ±{226, 468, 762, 1004, 1248, 1490, 1784, 2026}

P4096v3: ±{92, 334, 628, 870, 1114, 1356, 1650, 1892}

3.3. P2020v3: ±{24, 158, 266, 400, 560, 694, 802, 936, 1046, 1180, 1288, 1422, 1582, 1716, 1824, 1958}

P4096v1: ±{24, 158, 266, 400, 560, 694, 802, 936, 1046, 1180, 1288, 1422, 1582, 1716, 1824, 1958}

P4096v2: ±{158, 400, 694, 936, 1180, 1422, 1716, 1958}

P4096v3: ±{24, 266, 560, 802, 1046, 1288, 1582, 1824}

3.4. P2020v4: ±{24, 158, 266, 400, 560, 694, 802, 936, 1114, 1248, 1356, 1490, 1650, 1784, 1892, 2026}

P4096v1: ±{24, 158, 266, 400, 560, 694, 802, 936, 1114, 1248, 1356, 1490, 1650, 1784, 1892, 2026}

P4096v2: ±{158, 400, 694, 936, 1248, 1490, 1784, 2026}

P4096v3: ±{24, 266, 560, 802, 1114, 1356, 1650, 1892}

3.5. P2020v5: ±{92, 226, 334, 468, 628, 762, 870, 1004, 1046, 1180, 1288, 1422, 1582, 1716, 1824, 1958}

P4096v1: ±{92, 226, 334, 468, 628, 762, 870, 1004, 1046, 1180, 1288, 1422, 1582, 1716, 1824, 1958}

P4096v2: ±{226, 468, 762, 1004, 1180, 1422, 1716, 1958}

P4096v3: ±{92, 334, 628, 870, 1046, 1288, 1582, 1824}

<996 RU/2020 RU/Full Band>

4. P996v4: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

4.1. P2020v1: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

P4096v1: ±{50, 118, 184, 252, 292, 360, 426, 494, 534, 602, 668, 736, 776, 844, 910, 978, 1072, 1140, 1206, 1274, 1314, 1382, 1448, 1516, 1556, 1624, 1690, 1758, 1798, 1866, 1932, 2000}

P4096v2: ±{118, 252, 360, 494, 602, 736, 844, 978, 1140, 1274, 1382, 1516, 1624, 1758, 1866, 2000}

P4096v3: ±{50, 184, 292, 426, 534, 668, 776, 910, 1072, 1206, 1314, 1448, 1556, 1690, 1798, 1932}

4.2. P2020v2: ±{118, 252, 360, 494, 602, 736, 844, 978, 1140, 1274, 1382, 1516, 1624, 1758, 1866, 2000}

P4096v1: ±{118, 252, 360, 494, 602, 736, 844, 978, 1140, 1274, 1382, 1516, 1624, 1758, 1866, 2000}

P4096v2: ±{252, 494, 736, 978, 1274, 1516, 1758, 2000}

P4096v3: ±{118, 360, 602, 844, 1140, 1382, 1624, 1866}

4.3. P2020v3: ±{50, 184, 292, 426, 534, 668, 776, 910, 1072, 1206, 1314, 1448, 1556, 1690, 1798, 1932}

P4096v1: ±{50, 184, 292, 426, 534, 668, 776, 910, 1072, 1206, 1314, 1448, 1556, 1690, 1798, 1932}

P4096v2: ±{184, 426, 668, 910, 1206, 1448, 1690, 1932}

P4096v3: ±{50, 292, 534, 776, 1072, 1314, 1556, 1798}

4.4. P2020v4: +{50, 184, 292, 426, 534, 668, 776, 910, 1140, 1274, 1382, 1516, 1624, 1758, 1866, 2000}

P4096v1: ±{50, 184, 292, 426, 534, 668, 776, 910, 1140, 1274, 1382, 1516, 1624, 1758, 1866, 2000}

P4096v2: ±{184, 426, 668, 910, 1274, 1516, 1758, 2000}

P4096v3: ±{50, 292, 534, 776, 1140, 1382, 1624, 1866}

4.5. P2020v5: ±{118, 252, 360, 494, 602, 736, 844, 978, 1072, 1206, 1314, 1448, 1556, 1690, 1798, 1932}

P4096v1: ±{118, 252, 360, 494, 602, 736, 844, 978, 1072, 1206, 1314, 1448, 1556, 1690, 1798, 1932}

P4096v2: ±{252, 494, 736, 978, 1206, 1448, 1690, 1932}

P4096v3: ±{118, 360, 602, 844, 1072, 1314, 1556, 1798}

The various full-band plans proposed in to the above alternative 320 MHz tone plans are configured with the same number of guard tones as in the OFDMA tone plans and with a DC tone size in consideration of DC tones for the OFDMA tone plans but may be configured separately therefrom. For example, the full-band tone plans proposed in A may be used for the OFDMA tone plans proposed in B, C, D, E, F, and G.

3. 240 MHz

A bandwidth of 240 MHz may be used in transmission, and may be configured by combining three existing 11ax 80 NHz tone plans. This may be expressed as follows by considering both contiguous and non-contiguous situations.

80+80+80 MHz/160+80 MHz/80+160 MHz/240 MHz

+ means non-contiguous, and 160/240 means that ⅔ 80 MHz tone plans are contiguously arranged in succession.

<In the Presence of Contiguous Band>

When 160 MHz is used, a tone index of a left 80 MHz tone plan is tone index−512 of the existing 80 MHz tone plan, and a tone index of a right 80 MHz tone plan is tone index+512 of the existing 80 MHz tone plan.

When 240 MHz is used, a tone index of a center 80 MHz tone plan is directly a tone index of the existing 80 MHz tone plan, a tone index of the leftmost 80 MHz tone plan is tone index−1024 of the existing 80 MHz tone plan, and a tone index of the right most 80 MHz is tone index+1024 of the existing 80 MHz tone plan.

A pilot subcarrier also needs to be adjusted corresponding to the position. When 160 MHz is used, pilot tone indices in a left 80 MHz tone plan are the pilot tone indices in the conventional 80 MHz tone plan−512, and pilot tone indices in a right 80 MHz tone plan are the pilot tone indices in the conventional 80 MHz tone plan+512.

When 240 MHz is used, pilot tone indices in a middle 80 MHz tone plan are the same pilot tone indices in the conventional 80 MHz tone plan, pilot tone indices in a left 80 MHz tone plan are the pilot tone indices in the conventional 80 MHz tone plan−1024, and pilot tone indices in a right 80 MHz tone plan are the pilot tone indices in the conventional 80 MHz tone plan+1024.

Alternatively, when the conventional 11ax 80 MHz tone plan and the new 160 MHz tone plan may be used and both a contiguous band and a noncontiguous band are considered, a tone plan may be represented as follows.

$c80+n160$ MHz/$n160$ MHz+$c80$/$nc240$ MHz/$cn240$ MHz

+ denotes noncontiguous, and c80 MHz and n160 MHz denote the conventional 11ax 80 MHz tone plan and the new 160 MHz tone plan, respectively. nc240 MHz/cn240 MHz denote one new 160 MHz tone plan and one conventional 11 ax 80 MHz tone plan which are contiguous, and nc/cn denotes the order in which the tone plans are contiguous.

When nc240 MHz is used, tone indices in a left 160 MHz tone plan are the tone indices in the new 160 MHz tone plan−512, and tone indices in a right 80 MHz tone plan are the tone indices in the conventional 80 MHz tone plan+1024.

When cn240 MHz is used, tone indices in a left 80 MHz tone plan are the tone indices in the conventional 80 MHz tone plan−1024, and tone indices in a right 160 MHz tone plan are the tone indices in the new 160 MHz tone plan+512.

A pilot subcarrier also needs to be adjusted corresponding to the position. When nc240 MHz is used, pilot tone indices in a left 160 MHz tone plan are the pilot tone indices in the new 160 MHz tone plan−512, and pilot tone indices in a right 80 MHz tone plan are the pilot tone indices in the conventional 80 MHz tone plan+1024.

When cn240 MHz is used, pilot tone indices in a left 80 MHz tone plan are the pilot tone indices in the conventional 80 MHz tone plan−1024, and pilot tone indices in a right 160 MHz tone plan are the pilot tone indices in the new 160 MHz tone plan+512.

In the above various noncontiguous combinations, not only the same band but also different bands may be used. For example, in 80+80+80 MHz, each 80 MHz bandwidth may be transmitted using a 2.4 GH/5 GHz/6 GHz band.

4. Exemplary Embodiments

Hereinafter, the aforementioned tone plan will be described in detail with reference to FIG. 13 to FIG. 17.

Figure 13:
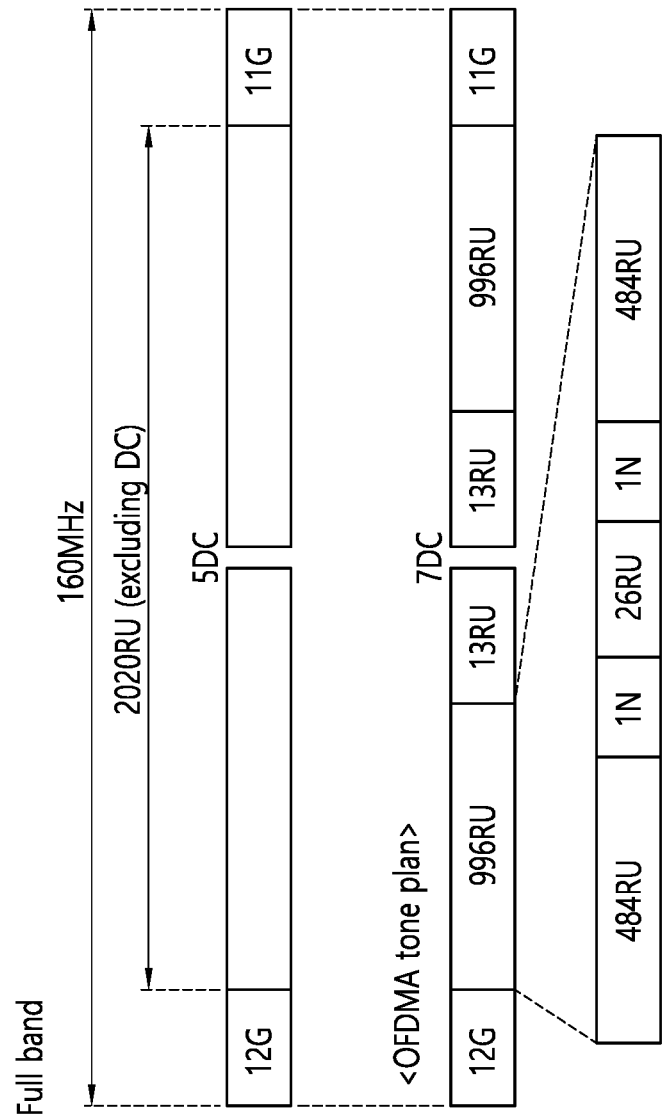
FIG. 13 shows an example of a tone plan in a 160 MHz band according to the present embodiment.

FIG. 13 shows an example of a tone plan in a 160 MHz band according to the present embodiment.

A tone plan in case of a full band and a tone plan in case of applying OFDMA are both illustrated in FIG. 13.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 13 is for one embodiment only, and thus the 12 guard tones and the 11 guard tones may change in locations. When 7 DC tones are located at the center of 160 MHz, the data may be transmitted in 2018RU.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 13 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11 ax.

In the tone plan (OFDMA tone plan) including the 996-tone RU in the 160 MHz band, pilot tone indices may be set to ±{24, 92, 158, 226, 266, 334, 400, 468, 562, 630, 696, 764, 804, 872, 938, 1006}

When the full band tone plan is applied in the 160 MHz band, pilot tone indices may be set to ±{24, 92, 158, 226, 266, 334, 400, 468, 562, 630, 696, 764, 804, 872, 938, 1006}.

The foregoing pilot tone indices are presented only for illustration, and various pilot tone indices may be set in view of CFO estimation.

Figure 14:
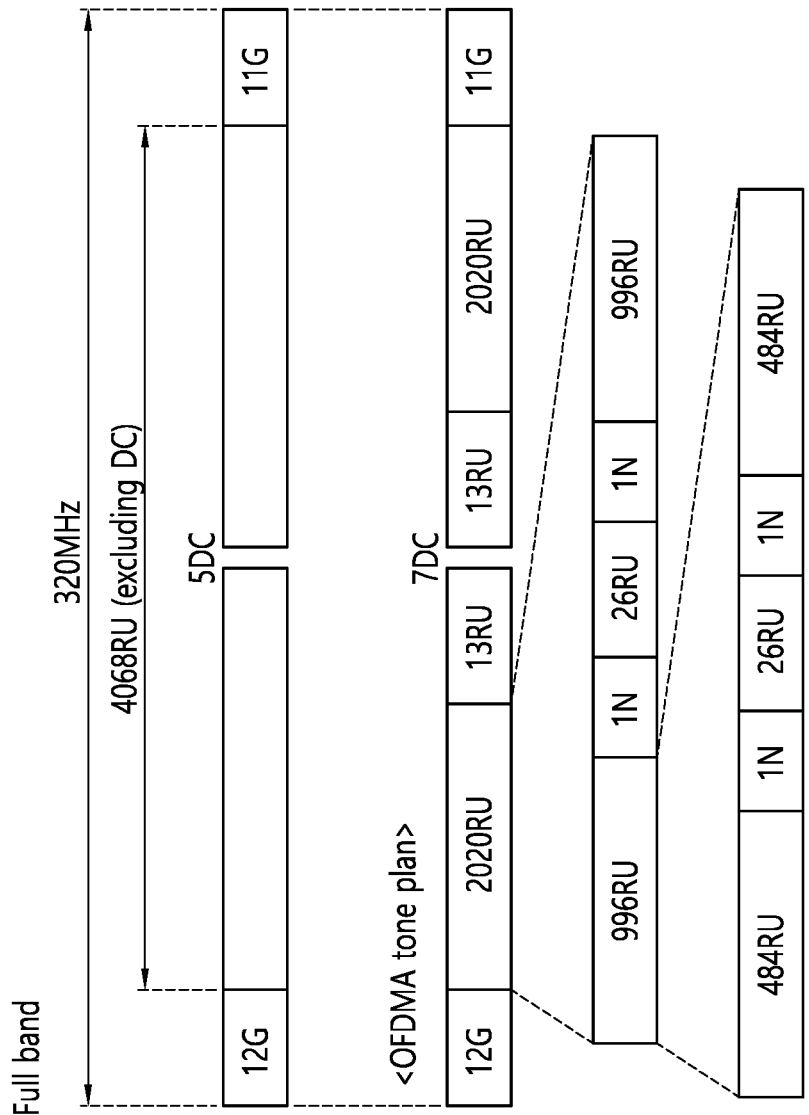
FIG. 14 shows an example of a tone plan in a 320 MHz band according to the present embodiment.

FIG. 14 shows an example of a tone plan in a 320 MHz band according to the present embodiment.

A tone plan in case of a full band and a tone plan in case of applying OFDMA are both illustrated in FIG. 14.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 14 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 14 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

In the tone plan (OFDMA tone plan) including the 996-tone RU in the 320 MHz band, pilot tone indices may be set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

In the tone plan (OFDMA tone plan) including the 2020-tone RU in the 320 MHz band, pilot tone indices may be set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the 320 MHz band is configured with the full band tone plan, pilot tone indices may be set to ±{24, 158, 266, 400, 562, 696, 804, 938, 1048, 1182, 1290, 1424, 1586, 1720, 1828, 1962}.

The foregoing pilot tone indices are presented only for illustration, and various pilot tone indices may be set in view of CFO estimation.

Figure 15:
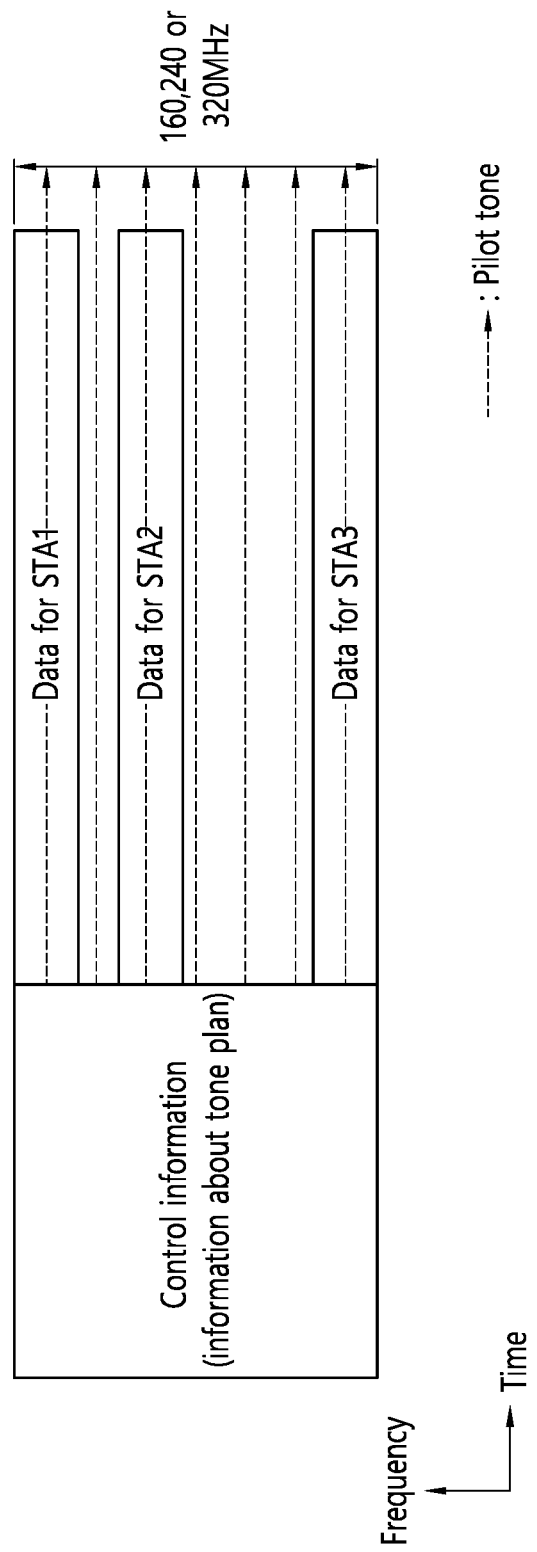
FIG. 15 shows an example of performing OFDMA transmission in a 160 MHz, 240 MHz, or 320 MHz band according to the present embodiment.

FIG. 15 shows an example of performing OFDMA transmission in a 160 MHz, 240 MHz, or 320 MHz band according to the present embodiment.

Referring to FIG. 15, an AP may transmit a PPDU to an STA 1 to an STA 3.

The PPDU may include control information including information on a tone plan. The STA 1 to the STA 3 may transmit/receive data in unit of RU, based on the information on the tone plan at 160 MHz, 240 MHz, or 320 MHz.

That is, the AP may transmit the information on the tone plan to all STAs in BSS at 160 MHz, 240 MHz, or 320 MHz, and the STA may acquire scheduling information of its data, based on the information on the tone plan. Accordingly, among the all STAs in the BSS, the STA 1 to the STA 3, which have data, may transmit/receive data through an RU allocated based on the information on the one plan. The data may include both downlink data and uplink data.

In addition, the AP may generate a pilot tone and may transmit the pilot tone to STA 1 to STA 3. The position of the pilot tone may be configured based on an OFDMA tone plan or a full band tone plan. Upon receiving the pilot tone, STA 1 to STA 3 may perform channel estimation in a 160 MHz, 240 MHz, or 320 MHz band based on the pilot tone.

Configuring a tone plan and a pilot tone in a wideband will be described in detail with reference to FIG. 16 and FIG. 17.

Figure 16:
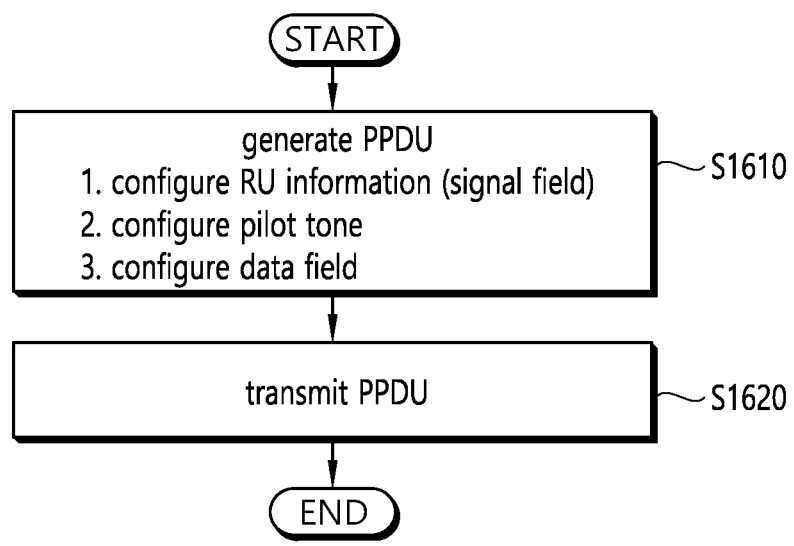
FIG. 16 is a flowchart illustrating a procedure of transmitting/receiving data, based on a tone plan, from an AP perspective according to the present embodiment.

FIG. 16 is a flowchart illustrating a procedure for an AP to transmit and receive data according to a tone plan according to an embodiment.

The embodiment of FIG. 16 may be performed in a network environment supporting a next-generation WLAN system. The next-generation WLAN system may be a WLAN system evolving from an 802.11ax system and may satisfy backward compatibility with the 802.1 lax system.

The embodiment of FIG. 16 may be performed by a transmission device, and the transmission device may correspond to an AP. In FIG. 16, a reception device may correspond to a STA (non-AP STA).

In operation S1610, the access point (AP) generates a physical protocol data unit (PPDU).

In operation S1620, the AP transmits the PPDU to a station (STA).

The PPDU includes an extremely high throughput (EHT)-LTF and a data field. The data field includes a pilot tone. A specific pilot sequence may be inserted into the pilot tone.

The pilot tone is configured based on resource unit (RU) information about a broadband.

A specific operation of generating the PPDU is described as follows. First, the AP may configure the PPDU in the order of the EHT-SIG-A, the EHT-SIG-B, the EHT-STF, the EHT-LTF, and the data field. The AP may configure the RU information in the EHT-SIG-B and may configure the pilot tone. The AP may insert the specific pilot sequence into the pilot tone and may transmit the pilot tone to the STA.

When the broadband includes four 996-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the broadband includes two 2020-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the broadband is defined as only a single full bandwidth based on the RU information, an index for the pilot tone is set to ±{24, 158, 266, 400, 562, 696, 804, 938, 1048, 1182, 1290, 1424, 1586, 1720, 1828, 1962}.

The broadband may be 160 MHz, 240 MHz, or 320 MHz but is limited to 320 MHz in this embodiment.

When the broadband includes eight 484-tone RUs, 16 242-tone RUs, or 32 106-tone RUs based on the RU information, indices for the pilot tone may be set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}.

When the broadband includes 64 52-tone RUs based on the RU information, indices for the pilot tone may be set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}.

When the broadband includes 128 26-tone RUs based on the RU information, indices for the pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

When the broadband includes the 128 26-tone RUs, one 26-tone RU includes two pilot tones with 26-RU tone indices having the sixth largest absolute value and the seventh smallest absolute value or having the seventh largest absolute value and the seventh smallest absolute value.

For the pilot tone in the 52-tone, 106-tone, 242-tone, and 484-tone RUs, a pilot tone configuration method defined in 802.11ax is equally used.

When the broadband includes the four 996-tone RUs based on the RU information, the pilot tones may be partially selected from pilot tones configured when the broadband includes the eight 484-tone RUs. For example, half the pilot tones configured when the broadband includes the eight 484-tone RUs may be used by alternately selecting the pilot tones.

When the broadband includes the two 2020-tone RUs based on the RU information, the pilot tone may be all selected from pilot tones configured when the broadband includes the four 996-tone RUs.

When the broadband is defined as only the single full bandwidth based on the RU information, the pilot tones may be partially selected from pilot tones configured when the broadband includes the two 2020-tone RUs. For example, half the pilot tones configured when the broadband includes the two 2020-tone RUs may be used by alternately selecting the pilot tones.

The index for the pilot tone may be an even number, because 1×/2×LTF is considered.

The AP transmits data to the STA or receives data from the STA based on the RU information.

When the broadband is defined as only the single full bandwidth based on the RU information (full-band tone plan), the broadband may include 12 guard tones, a 4068-tone RU, five DC tones, and 11 guard tones. This configuration is an example, and the RU information may include allocation information about various RU configurations for actually transmitting data. When the tone plan for the full bandwidth of the broadband is used, SU transmission may be performed, and when MU MIMO is applied to the full bandwidth, MU transmission may be performed.

When the broadband includes the two 2020-tone RUs based on the RU information (OFDMA tone plan), the broadband may include 12 guard tones, a 2020-tone RU, a 13-tone RU, seven DC tones, a 13-tone RU, a 2020-tone RU, and 11 guard tones. This configuration is an example, and the RU information may include allocation information about various RU configurations for actually transmitting data.

When the broadband includes the four 996-tone RUs based on the RU information (OFDMA tone plan), the broadband may include 12 guard tones, a 996-tone RU, one null tone, a 26-tone RU, one null tone, a 996-tone RU, a 13-tone RU, seven DC tones, a 13-tone RU, a 996-tone RU, one null tone, a 26-tone RU, one null tone, a 996-tone RU, and 11 guard tones. This configuration is an example, and the RU information may include allocation information about various RU configurations for actually transmitting data. When a tone plan in which OFDMA is applied to the broadband is used, the STA is one or more STAs (SU transmission or MU transmission).

The RU information includes information about a resource unit (RU) for transmitting and receiving the data in the broadband. That is, the RU information may be considered to include scheduling information about the data for the STA (information about the configuration of an RU used for actual data transmission in the broadband). The STA may decode the RU information and may transmit and receive the data in RUs.

The 4068-tone RU is an RU including 4068 tones. The 4068-tone RU has tone indices of −2036 to −3 and 3 to 2036. The data may be transmitted or received through the 4068-tone RU.

The 2020-tone RU is an RU including 2020 tones. The 2020-tone RU may include a 996-tone RU, a null tone, a 26-tone RU, a null tone, and a 996-tone RU.

The 996-tone RU is an RU including 996 tones. The 996-tone RU may include a 484-tone RU, a null tone, a 26-tone RU, a null tone, and a 484-tone RU.

The 484-tone RU is an RU including 484 tones. The 484-tone RU may include a 242-tone RU and a 242-tone RU.

The 242-tone RU is an RU including 242 tones. The 242-tone RU may include a null tone, a 106-tone RU, a null tone, a 26-tone RU, a null tone, a 106-tone RU, and a null tone.

The 106-tone RU is an RU including 106 tones. The 106-tone RU may include a 52-tone RU, a null tone, and a 52-tone RU.

The 52-tone RU is an RU including 52 tones. The 52-tone RU may include a 26-tone RU and a 26-tone RU. The 26-tone RU may be an RU in a minimum unit including 26 tones.

In the tone plan in which OFDMA is applied to the broadband, the data may be transmitted or received through the 2020-tone RU, the 996-tone RU, the 484-tone RU, the 242-tone RU, the 106-tone RU, the 52-tone RU, or the 26-tone RU. That is, the data may be transmitted or received through the 2020-tone RU or an RU (the 996-tone RU, the 484-tone RU, the 242-tone RU, the 106-tone RU, the 52-tone RU, or the 26-tone RU) having a smaller number of tones than included in the 2020-tone RU.

The PPDU may further include a legacy preamble, an EHT-signal (SIG)-A, an EHT-SIG-B, and an EHT-short training field (STF). The RU information may be included in the EHT-SIG-B. The EHT-LTF may include the pilot tone. That is, the EHT-STF, the EHT-LTF, and the data field in the PPDU may be transmitted or received in a band (RU) according to a tone plan for the broadband.

Figure 17:
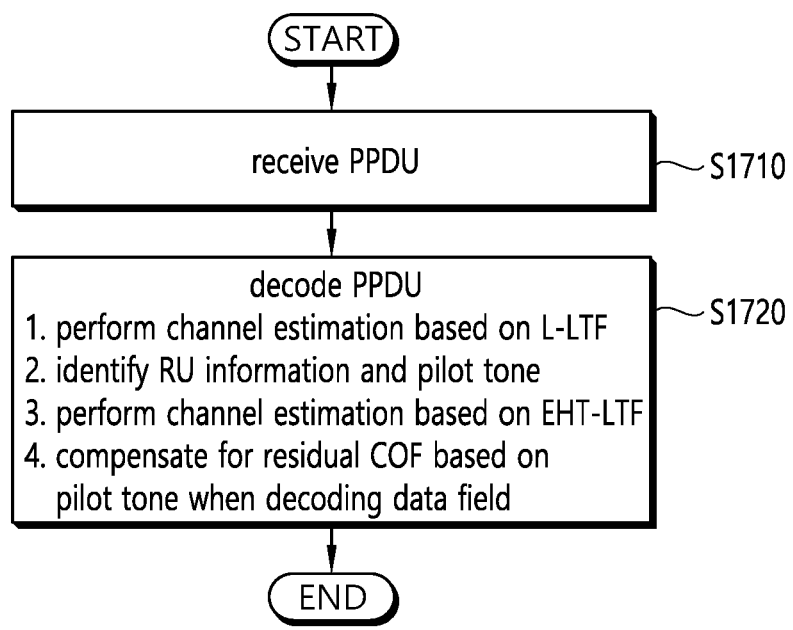
FIG. 17 is a flowchart illustrating a procedure of transmitting/receiving data, based on a tone plan, from an STA perspective according to the present embodiment.

FIG. 17 is a flowchart illustrating a procedure for a STA to transmit and receive data according to a tone plan according to an embodiment.

The embodiment of FIG. 17 may be performed in a network environment supporting a next-generation WLAN system. The next-generation WLAN system may be a WLAN system evolving from an 802.1 lax system and may satisfy backward compatibility with the 802.11ax system.

The embodiment of FIG. 17 may be performed by a reception device, and the reception device may correspond to a STA (non-AP STA).

In operation S1710, a station (STA) receives a physical protocol data unit (PPDU) from an access point (AP).

In operation S1720, the STA decodes the PPDU.

The PPDU includes an extremely high throughput (EHT)-LTF and a data field. The data field includes a pilot tone. A specific pilot sequence may be inserted into the pilot tone.

The pilot tone is configured based on resource unit (RU) information about a broadband.

A specific operation of decoding the PPDU is described as follows. First, the AP may configure the PPDU in the order of the EHT-SIG-A, the EHT-SIG-B, the EHT-STF, the EHT-LTF, and the data field. The AP may insert the specific pilot sequence into the pilot tone and may transmit the pilot tone to the STA. The STA may perform channel estimation based on a legacy (L)-LTF included in the legacy preamble. The STA may identify the RU information included in the EHT-SIG-B and information about the pilot tone using an estimated channel. The STA may perform channel estimation based on the EHT-LTF. The STA may compensate for a residual carrier frequency offset (CFO) based on the pilot tone when decoding the data field using an estimated channel.

When the broadband includes four 996-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the broadband includes two 2020-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the broadband is defined as only a single full bandwidth based on the RU information, an index for the pilot tone is set to ±{24, 158, 266, 400, 562, 696, 804, 938, 1048, 1182, 1290, 1424, 1586, 1720, 1828, 1962}.

The broadband may be 160 MHz, 240 MHz, or 320 MHz but is limited to 320 MHz in this embodiment.

When the broadband includes eight 484-tone RUs, 16 242-tone RUs, or 32 106-tone RUs based on the RU information, indices for the pilot tone may be set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}.

When the broadband includes 64 52-tone RUs based on the RU information, indices for the pilot tone may be set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}.

When the broadband includes 128 26-tone RUs based on the RU information, indices for the pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

When the broadband includes the 128 26-tone RUs, one 26-tone RU includes two pilot tones with 26-RU tone indices having the sixth largest absolute value and the seventh smallest absolute value or having the seventh largest absolute value and the seventh smallest absolute value.

For the pilot tone in the 52-tone, 106-tone, 242-tone, and 484-tone RUs, a pilot tone configuration method defined in 802.11ax is equally used.

When the broadband includes the four 996-tone RUs based on the RU information, the pilot tones may be partially selected from pilot tones configured when the broadband includes the eight 484-tone RUs. For example, half the pilot tones configured when the broadband includes the eight 484-tone RUs may be used by alternately selecting the pilot tones.

When the broadband includes the two 2020-tone RUs based on the RU information, the pilot tone may be all selected from pilot tones configured when the broadband includes the four 996-tone RUs.

When the broadband is defined as only the single full bandwidth based on the RU information, the pilot tones may be partially selected from pilot tones configured when the broadband includes the two 2020-tone RUs. For example, half the pilot tones configured when the broadband includes the two 2020-tone RUs may be used by alternately selecting the pilot tones.

The index for the pilot tone may be an even number, because 1×/2×LTF is considered.

The STA transmits data to the AP or receives data from the AP based on the RU information.

When the broadband is defined as only the single full bandwidth based on the RU information (full-band tone plan), the broadband may include 12 guard tones, a 4068-tone RU, five DC tones, and 11 guard tones. This configuration is an example, and the RU information may include allocation information about various RU configurations for actually transmitting data. When the tone plan for the full bandwidth of the broadband is used, SU transmission may be performed, and when MU MIMO is applied to the full bandwidth, MU transmission may be performed.

When the broadband includes the two 2020-tone RUs based on the RU information (OFDMA tone plan), the broadband may include 12 guard tones, a 2020-tone RU, a 13-tone RU, seven DC tones, a 13-tone RU, a 2020-tone RU, and 11 guard tones. This configuration is an example, and the RU information may include allocation information about various RU configurations for actually transmitting data.

When the broadband includes the four 996-tone RUs based on the RU information (OFDMA tone plan), the broadband may include 12 guard tones, a 996-tone RU, one null tone, a 26-tone RU, one null tone, a 996-tone RU, a 13-tone RU, seven DC tones, a 13-tone RU, a 996-tone RU, one null tone, a 26-tone RU, one null tone, a 996-tone RU, and 11 guard tones. This configuration is an example, and the RU information may include allocation information about various RU configurations for actually transmitting data. When a tone plan in which OFDMA is applied to the broadband is used, the STA is one or more STAs (SU transmission or MU transmission).

The RU information includes information about a resource unit (RU) for transmitting and receiving the data in the broadband. That is, the RU information may be considered to include scheduling information about the data for the STA (information about the configuration of an RU used for actual data transmission in the broadband). The STA may decode the RU information and may transmit and receive the data in RUs.

The 4068-tone RU is an RU including 4068 tones. The 4068-tone RU has tone indices of −2036 to −3 and 3 to 2036. The data may be transmitted or received through the 4068-tone RU.

The 2020-tone RU is an RU including 2020 tones. The 2020-tone RU may include a 996-tone RU, a null tone, a 26-tone RU, a null tone, and a 996-tone RU.

The 996-tone RU is an RU including 996 tones. The 996-tone RU may include a 484-tone RU, a null tone, a 26-tone RU, a null tone, and a 484-tone RU.

The 484-tone RU is an RU including 484 tones. The 484-tone RU may include a 242-tone RU and a 242-tone RU.

The 242-tone RU is an RU including 242 tones. The 242-tone RU may include a null tone, a 106-tone RU, a null tone, a 26-tone RU, a null tone, a 106-tone RU, and a null tone.

The 106-tone RU is an RU including 106 tones. The 106-tone RU may include a 52-tone RU, a null tone, and a 52-tone RU.

The 52-tone RU is an RU including 52 tones. The 52-tone RU may include a 26-tone RU and a 26-tone RU. The 26-tone RU may be an RU in a minimum unit including 26 tones.

In the tone plan in which OFDMA is applied to the broadband, the data may be transmitted or received through the 2020-tone RU, the 996-tone RU, the 484-tone RU, the 242-tone RU, the 106-tone RU, the 52-tone RU, or the 26-tone RU. That is, the data may be transmitted or received through the 2020-tone RU or an RU (the 996-tone RU, the 484-tone RU, the 242-tone RU, the 106-tone RU, the 52-tone RU, or the 26-tone RU) having a smaller number of tones than included in the 2020-tone RU.

The PPDU may further include a legacy preamble, an EHT-signal (SIG)-A, an EHT-SIG-B, and an EHT-short training field (STF). The RU information may be included in the EHT-SIG-B. The EHT-LTF may include the pilot tone. That is, the EHT-STF, the EHT-LTF, and the data field in the PPDU may be transmitted or received in a band (RU) according to a tone plan for the broadband.

5. Device Configuration

Figure 18:
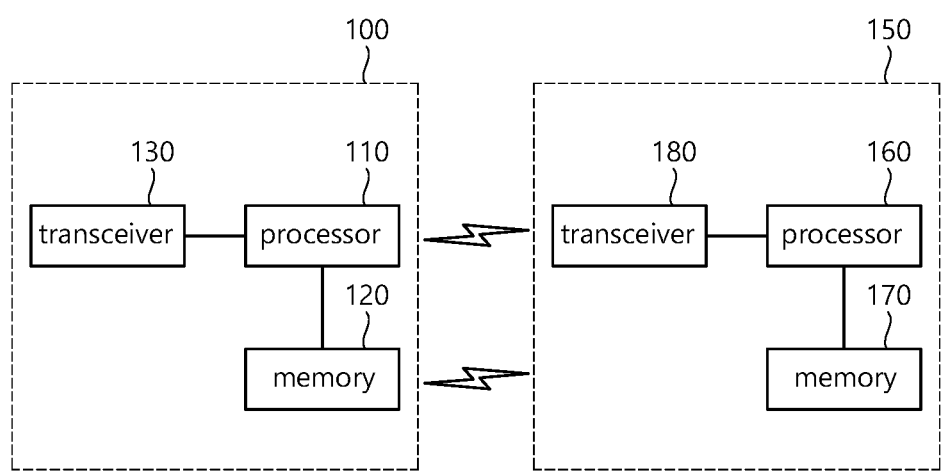
FIG. 18 is a diagram illustrating a device for implementing the above-described method.

FIG. 18 is a diagram illustrating a device for implementing the aforementioned method.

A wireless device (100) of FIG. 18 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present disclosure, the initiator STA transmits a signal is referred to as a transmission device (100), and the responder STA receiving a signal is referred to as a reception device (150).

The transmission device (100) may include a processor (110), a memory (120), and a transceiver (130), and the reception device (150) may include a processor (160), a memory (170), and a transceiver (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transceiver (130, 180).

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

A specific operation of the processor (110) of the transmission device is as follows. The processor (110) of the transmission device generates a PPDU and transmits the PPDU to a STA.

A specific operation of the processor (160) of the reception device is as follows. The processor (160) of the reception device receives a PPDU from an AP and decodes the PPDU.

Figure 19:
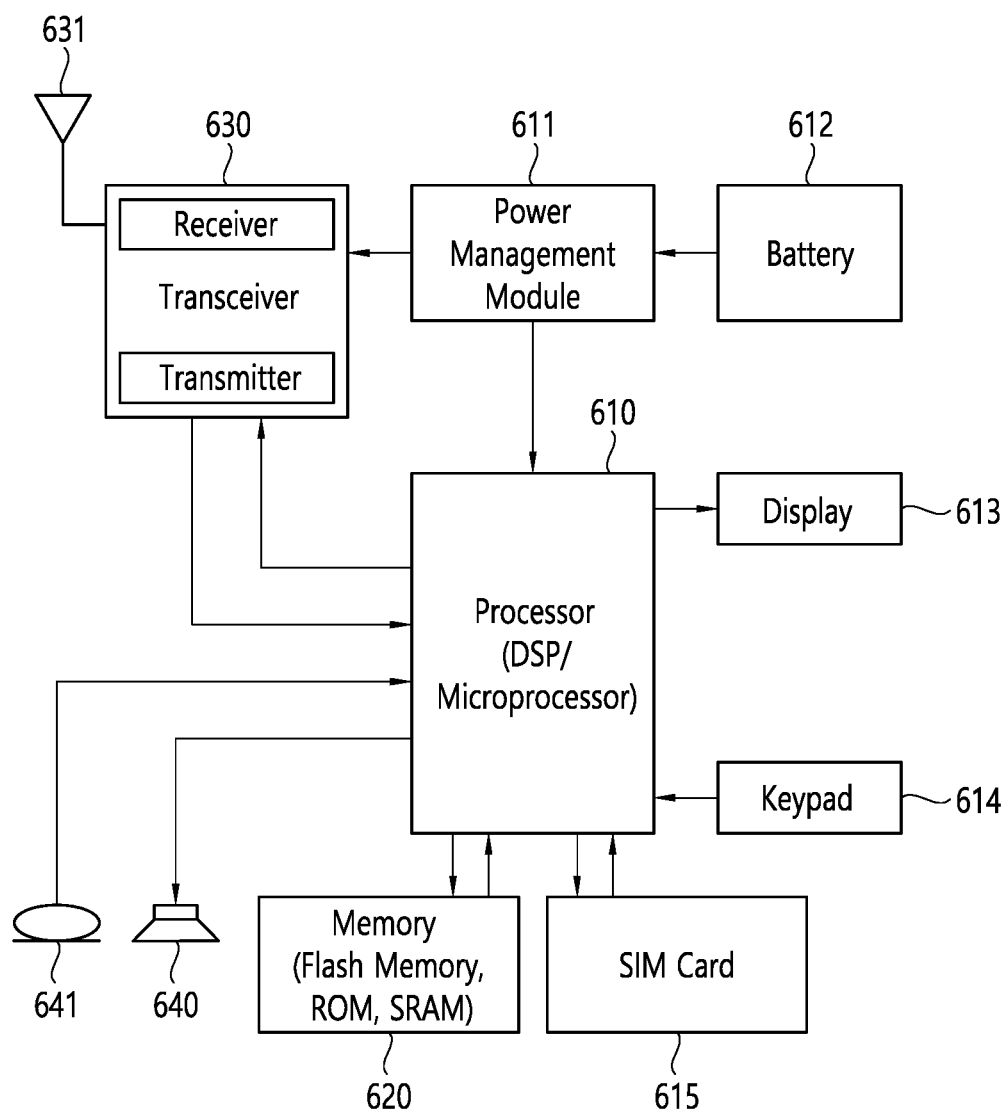
FIG. 19 illustrates a specific wireless device implementing an embodiment of the present disclosure.

FIG. 19 illustrates a specific wireless device to implement an embodiment of the present disclosure. The present disclosure described above for the transmission device or the reception device may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this disclosure. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In the transmission device, the processor (610) generates a PPDU and transmits the PPDU to a STA.

In the reception device, the processor (610) receives a PPDU from an AP and decodes the PPDU.

The PPDU includes an extremely high throughput (EHT)-LTF and a data field. The data field includes a pilot tone. A specific pilot sequence may be inserted into the pilot tone.

The pilot tone is configured based on resource unit (RU) information about a broadband.

A specific operation of generating the PPDU is described as follows. First, the AP may configure the PPDU in the order of the EHT-SIG-A, the EHT-SIG-B, the EHT-STF, the EHT-LTF, and the data field. The AP may configure the RU information in the EHT-SIG-B and may configure the pilot tone. The AP may insert the specific pilot sequence into the pilot tone and may transmit the pilot tone to the STA.

When the broadband includes four 996-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the broadband includes two 2020-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}.

When the broadband is defined as only a single full bandwidth based on the RU information, an index for the pilot tone is set to ±{24, 158, 266, 400, 562, 696, 804, 938, 1048, 1182, 1290, 1424, 1586, 1720, 1828, 1962}.

The broadband may be 160 MHz, 240 MHz, or 320 MHz but is limited to 320 MHz in this embodiment.

When the broadband includes eight 484-tone RUs, 16 242-tone RUs, or 32 106-tone RUs based on the RU information, indices for the pilot tone may be set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030}.

When the broadband includes 64 52-tone RUs based on the RU information, indices for the pilot tone may be set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}.

When the broadband includes 128 26-tone RUs based on the RU information, indices for the pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

When the broadband includes the 128 26-tone RUs, one 26-tone RU includes two pilot tones with 26-RU tone indices having the sixth largest absolute value and the seventh smallest absolute value or having the seventh largest absolute value and the seventh smallest absolute value.

For the pilot tone in the 52-tone, 106-tone, 242-tone, and 484-tone RUs, a pilot tone configuration method defined in 802.11ax is equally used.

When the broadband includes the four 996-tone RUs based on the RU information, the pilot tones may be partially selected from pilot tones configured when the broadband includes the eight 484-tone RUs. For example, half the pilot tones configured when the broadband includes the eight 484-tone RUs may be used by alternately selecting the pilot tones.

When the broadband includes the two 2020-tone RUs based on the RU information, the pilot tone may be all selected from pilot tones configured when the broadband includes the four 996-tone RUs.

When the broadband is defined as only the single full bandwidth based on the RU information, the pilot tones may be partially selected from pilot tones configured when the broadband includes the two 2020-tone RUs. For example, half the pilot tones configured when the broadband includes the two 2020-tone RUs may be used by alternately selecting the pilot tones.

The index for the pilot tone may be an even number, because 1×/2×LTF is considered.

What is claimed is:

1. A method for transmitting a physical protocol data unit (PPDU) in a wireless local area network (WLAN) system, the method comprising:
   generating, by an access point (AP), a PPDU; and
   transmitting, by the AP, the PPDU to a station (STA),
   wherein:
   the PPDU comprises an extremely high throughput (EHT)-LTF and a data field;
   the data field comprises a pilot tone;
   the pilot tone is configured based on resource unit (RU) information about a broadband;

when the broadband comprises four 996-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030};
   when the broadband comprises two 2020-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}; and
   when the broadband is defined as only a single full bandwidth based on the RU information, an index for the pilot tone is set to ±{24, 158, 266, 400, 562, 696, 804, 938, 1048, 1182, 1290, 1424, 1586, 1720, 1828, 1962}.

2. The method of claim 1, wherein:
   when the broadband comprises eight 484-tone RUs, 16 242-tone RUs, or 32 106-tone RUs based on the RU information, an index for the pilot tone is set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030};
   when the broadband comprises 64 52-tone RUs based on the RU information, an index for the pilot tone is set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}; and
   when the broadband comprises 128 26-tone RUs based on the RU information, an index for the pilot tone is set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

3. The method of claim 2, wherein, when the broadband comprises the four 996-tone RUs based on the RU information, the pilot tone is partially selected from pilot tones configured when the broadband comprises the eight 484-tone RUs.

4. The method of claim 2, wherein, when the broadband comprises the two 2020-tone RUs based on the RU information, the pilot tone is entirely selected from pilot tones configured when the broadband comprises the four 996-tone RUs.

5. The method of claim 2, wherein, when the broadband is defined as only a single full bandwidth based on the RU information, the pilot tone is partially selected from pilot tones configured when the broadband comprises the two 2020-tone RUs.

6. The method of claim 1, wherein the index for the pilot tone is an even number.

7. The method of claim 1, comprising:
transmitting, by the AP, data to the STA or receiving, by the AP, data from the STA based on the RU information,
wherein:
when the broadband is defined as only the single full bandwidth based on the RU information, the broadband comprises 12 guard tones, a 4068-tone RU, five DC tones, and 11 guard tones;
when the broadband comprises the two 2020-tone RUs based on the RU information, the broadband comprises 12 guard tones, a 2020-tone RU, a 13-tone RU, seven DC tones, a 13-tone RU, a 2020-tone RU, and 11 guard tones; and
when the broadband comprises the four 996-tone RUs based on the RU information, the broadband comprises 12 guard tones, a 996-tone RU, one null tone, a 26-tone RU, one null tone, a 996-tone RU, a 13-tone RU, seven DC tones, a 13-tone RU, a 996-tone RU, one null tone, a 26-tone RU, one null tone, a 996-tone RU, and 11 guard tones.

8. The method of claim 7, wherein the PPDU further comprises a legacy preamble, an EHT-signal (SIG)-A, an EHT-SIG-B, and an EHT-short training field (STF),
the RU information is comprised in the EHT-SIG-B, and the broadband is 320 MHz.

9. The method of claim 8, wherein the EHT-LTF comprises the pilot tone.

10. An access point (AP) for transmitting a physical protocol data unit (PPDU) in a wireless local area network (WLAN) system, the AP comprising:
a memory;
a transceiver; and
a processor operatively connected with the memory and the transceiver,
wherein the processor is configured to:
generate a PPDU and transmit the PPDU to a station (STA);
wherein:
the PPDU comprises an extremely high throughput (EHT)-LTF and a data field;
the data field comprises a pilot tone;
the pilot tone is configured based on resource unit (RU) information about a broadband;
when the broadband comprises four 996-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030};
when the broadband comprises two 2020-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}; and
when the broadband is defined as only a single full bandwidth based on the RU information, an index for the pilot tone is set to ±{24, 158, 266, 400, 562, 696, 804, 938, 1048, 1182, 1290, 1424, 1586, 1720, 1828, 1962}.

11. The AP of claim 10, wherein:
when the broadband comprises eight 484-tone RUs, 16 242-tone RUs, or 32 106-tone RUs based on the RU information, an index for the pilot tone is set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518, 1560, 1586, 1628, 1654, 1694, 1720, 1762, 1788, 1802, 1828, 1870, 1896, 1936, 1962, 2004, 2030};
when the broadband comprises 64 52-tone RUs based on the RU information, an index for the pilot tone is set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518, 1560, 1574, 1586, 1600, 1614, 1628, 1640, 1654, 1694, 1708, 1720, 1734, 1748, 1762, 1774, 1788, 1802, 1816, 1828, 1842, 1856, 1870, 1882, 1896, 1936, 1950, 1962, 1976, 1990, 2004, 2016, 2030}; and
when the broadband comprises 128 26-tone RUs based on the RU information, an index for the pilot tone is set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 507, 521, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1019, 1033, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518, 1531, 1545, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

12. The AP of claim 11, wherein, when the broadband comprises the four 996-tone RUs based on the RU information, the pilot tone is partially selected from pilot tones configured when the broadband comprises the eight 484-tone RUs.

13. The AP of claim 11, wherein, when the broadband comprises the two 2020-tone RUs based on the RU information, the pilot tone is entirely selected from pilot tones configured when the broadband comprises the four 996-tone RUs.

14. The AP of claim 11, wherein, when the broadband is defined as only a single full bandwidth based on the RU information, the pilot tone is partially selected from pilot tones configured when the broadband comprises the two 2020-tone RUs.

15. The AP of claim 10, wherein the index for the pilot tone is an even number.

16. The AP of claim 10, wherein:
the processor transmits data to the STA or receives data from the STA based on the RU information;
when the broadband is defined as only the single full bandwidth based on the RU information, the broadband comprises 12 guard tones, a 4068-tone RU, five DC tones, and 11 guard tones;
when the broadband comprises the two 2020-tone RUs based on the RU information, the broadband comprises 12 guard tones, a 2020-tone RU, a 13-tone RU, seven DC tones, a 13-tone RU, a 2020-tone RU, and 11 guard tones; and
when the broadband comprises the four 996-tone RUs based on the RU information, the broadband comprises 12 guard tones, a 996-tone RU, one null tone, a 26-tone RU, one null tone, a 996-tone RU, a 13-tone RU, seven DC tones, a 13-tone RU, a 996-tone RU, one null tone, a 26-tone RU, one null tone, a 996-tone RU, and 11 guard tones.

17. The AP of claim 16, wherein the PPDU further comprises a legacy preamble, an EHT-signal (SIG)-A, an EHT-SIG-B, and an EHT-short training field (STF),
the RU information is comprised in the EHT-SIG-B, and the broadband is 320 MHz.

18. The AP of claim 17, wherein the EHT-LTF comprises the pilot tone.

19. A method for receiving a physical protocol data unit (PPDU) in a wireless local area network (WLAN) system, the method comprising:
receiving, by a station (STA), a PPDU from an access point (AP); and
decoding, by the STA, the PPDU,
wherein:
the PPDU comprises an extremely high throughput (EHT)-LTF and a data field;
the data field comprises a pilot tone;
the pilot tone is configured based on resource unit (RU) information about a broadband;
when the broadband comprises four 996-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030};
when the broadband comprises two 2020-tone RUs based on the RU information, an index for the pilot tone is set to ±{24, 92, 158, 226, 266, 334, 400, 468, 562, 630, 696, 764, 804, 872, 938, 1006, 1048, 1116, 1182, 1250, 1290, 1358, 1424, 1492, 1586, 1654, 1720, 1788, 1828, 1896, 1962, 2030}; and
when the broadband is defined as only a single full bandwidth based on the RU information, an index for the pilot tone is set to ±{24, 158, 266, 400, 562, 696, 804, 938, 1048, 1182, 1290, 1424, 1586, 1720, 1828, 1962}.

* * * * *